US007430257B1

(12) United States Patent
Shattil

(10) Patent No.: US 7,430,257 B1
(45) Date of Patent: Sep. 30, 2008

(54) MULTICARRIER SUB-LAYER FOR DIRECT SEQUENCE CHANNEL AND MULTIPLE-ACCESS CODING

(75) Inventor: Steve Shattil, Boulder, CO (US)

(73) Assignee: Lot 41 Acquisition Foundation, LLC, Wilmington, DE (US)

(*) Notice: Subject to any disclaimer, the term of this patent is extended or adjusted under 35 U.S.C. 154(b) by 1026 days.

(21) Appl. No.: 10/131,163

(22) Filed: Apr. 24, 2002

Related U.S. Application Data

(63) Continuation-in-part of application No. 09/381,588, filed on Sep. 20, 1999, now Pat. No. 7,010,048, which is a continuation of application No. 09/022,950, filed on Feb. 12, 1998, now Pat. No. 5,955,992.

(60) Provisional application No. 60/286,850, filed on Apr. 26, 2001.

(51) Int. Cl.
*H04B 7/10* (2006.01)
*H04L 1/02* (2006.01)
*H04B 1/00* (2006.01)

(52) U.S. Cl. ........................ 375/347; 375/340; 375/349; 342/367

(58) Field of Classification Search ................. 375/146, 375/206, 208, 279, 330, 346–347, 349–350, 375/340, 267, 130, 147–148; 342/367
See application file for complete search history.

(56) References Cited

U.S. PATENT DOCUMENTS 4,164,714 A 8/1979 Swanson
4,471,399 A 9/1984 Udren
4,590,511 A 5/1986 Bocchi
4,628,517 A 12/1986 Schwarz
5,282,222 A 1/1994 Fattouche (Continued)

OTHER PUBLICATIONS

C.R. Nassar et al., "High-Performance Broadband DS-CDMA via Carrier Interferometry Chip Shaping," 2000 Int'l Symposium on Advanced Radio Technologies, Boulder, CO, Sep. 6-8, 2000.

*Primary Examiner*—Jean B Corrielus
(74) *Attorney, Agent, or Firm*—Connolly Bove Lodge & Hutz LLP

(57) ABSTRACT

Carrier Interferometry (CI) provides wideband transmission protocols with frequency-band selectivity to improve interference rejection, reduce multipath fading, and enable operation across non-continuous frequency bands. Direct-sequence protocols, such as DS-CDMA, are provided with CI to greatly improve performance and reduce transceiver complexity. CI introduces families of orthogonal polyphase codes that can be used for channel coding, spreading, and/or multiple access. Unlike conventional DS-CDMA, CI coding is not necessary for energy spreading because a set of CI carriers has an inherently wide aggregate bandwidth. Instead, CI codes are used for channelization, energy smoothing in the frequency domain, and interference suppression. CI-based ultra-wideband protocols are implemented via frequency-domain processing to reduce synchronization problems, transceiver complexity, and poor multipath performance of conventional ultra-wideband systems. CI allows wideband protocols to be implemented with space-frequency processing and other array-processing techniques to provide either or both diversity combining and sub-space processing. CI also enables spatial processing without antenna arrays. Even the bandwidth efficiency of multicarrier protocols is greatly enhanced with CI. CI-based wavelets avoid time and frequency resolution trade-offs associated with conventional wavelet processing. CI-based Fourier transforms eliminate all multiplications, which greatly simplifies multi-frequency processing. The quantum-wave principles of CI improve all types of baseband and radio processing.

2 Claims, 111 Drawing Sheets

U.S. PATENT DOCUMENTS

| | | | | |
|---|---|---|---|---|
| 5,309,514 | A | 5/1994 | Johnson | |
| 5,406,551 | A | 4/1995 | Salto | |
| 5,410,538 | A | 4/1995 | Roche | |
| 5,425,049 | A | 6/1995 | Dent | |
| 5,463,376 | A | 10/1995 | Stoffer | |
| 5,491,727 | A | 2/1996 | Petit | |
| 5,519,692 | A | 5/1996 | Hershey | |
| 5,521,937 | A | 5/1996 | Kondo | |
| 5,533,012 | A * | 7/1996 | Fukasawa et al. | 370/342 |
| 5,548,582 | A | 8/1996 | Brajal | |
| 5,563,906 | A | 10/1996 | Hershey | |
| 5,579,304 | A * | 11/1996 | Sugimoto et al. | 370/342 |
| 5,612,978 | A | 3/1997 | Blanchard | |
| 5,640,698 | A | 6/1997 | Shen | |
| 5,712,716 | A | 1/1998 | Vanoli | |
| 5,822,368 | A | 10/1998 | Wang | |
| 5,831,977 | A | 11/1998 | Dent | |
| 5,838,268 | A | 11/1998 | Frenkel | |
| 5,844,951 | A | 12/1998 | Proakis | |
| 5,940,196 | A | 8/1999 | Piehler | |
| 5,960,032 | A | 9/1999 | Letaief | |
| 5,991,334 | A | 11/1999 | Papadopoulos | |
| 6,008,760 | A | 12/1999 | Shattil | |
| 6,018,317 | A | 1/2000 | Dogan | |
| 6,075,812 | A * | 6/2000 | Cafarella et al. | 375/141 |
| 6,097,712 | A | 8/2000 | Secord | |
| 6,097,773 | A * | 8/2000 | Carter et al. | 375/347 |
| 6,128,276 | A | 10/2000 | Agee | |
| 6,141,393 | A | 10/2000 | Thomas | |
| 6,144,711 | A | 11/2000 | Raleigh | |
| 6,154,443 | A | 11/2000 | Huang et al. | |
| 6,175,550 | B1 | 1/2001 | van Nee | |
| 6,192,068 | B1 | 2/2001 | Fattouche | |
| 6,208,295 | B1 | 3/2001 | Dogan | |
| 6,215,983 | B1 | 4/2001 | Dogan | |
| 6,240,129 | B1 | 5/2001 | Reusens | |
| 6,282,167 | B1 | 8/2001 | Michon | |
| 6,310,704 | B1 | 10/2001 | Dogan | |
| 6,377,566 | B1 | 4/2002 | Cupo | |
| 6,438,173 | B1 | 8/2002 | Stantchev | |
| 6,442,130 | B1 | 8/2002 | Jones | |
| 6,442,193 | B1 * | 8/2002 | Hirsch | 375/147 |
| 6,452,981 | B1 | 9/2002 | Raleigh | |
| 6,473,393 | B1 * | 10/2002 | Ariyavisitakul et al. | 370/203 |
| 6,512,737 | B1 | 1/2003 | Agee | |
| 6,549,581 | B1 | 4/2003 | Izumi | |
| 6,563,881 | B1 | 5/2003 | Sakoda | |
| 6,603,827 | B2 * | 8/2003 | Bottomley et al. | 375/350 |
| 6,631,175 | B2 | 10/2003 | Harikumar | |
| 6,654,408 | B1 | 11/2003 | Kadous | |
| 6,654,719 | B1 | 11/2003 | Papadias | |
| 6,674,810 | B1 | 1/2004 | Cheng | |
| 6,678,318 | B1 | 1/2004 | Lai | |
| 6,693,984 | B1 | 2/2004 | Andre | |
| 6,717,908 | B2 | 4/2004 | Vijayan et al. | |
| 6,757,344 | B2 | 6/2004 | Carleton | |
| 6,760,373 | B2 | 7/2004 | Gross | |
| 6,813,485 | B2 | 11/2004 | Sorrells | |
| 6,850,481 | B2 | 2/2005 | Wu | |
| 6,859,641 | B2 | 2/2005 | Collins | |
| 7,035,661 | B1 * | 4/2006 | Yun | 455/522 |
| 2002/0196733 | A1 * | 12/2002 | Shen et al. | 370/208 |
| 2004/0013101 | A1 * | 1/2004 | Akin et al. | 370/342 |
| 2005/0058098 | A1 * | 3/2005 | Klein et al. | 370/329 |
| 2005/0078742 | A1 * | 4/2005 | Cairns et al. | 375/148 |

* cited by examiner

| | Ps(0) | Ps(1) | Ps(2) | ......... | Ps(N-1) |
|---|---|---|---|---|---|
| $f_0$: | $\phi_0$ | $\phi_0$ | $\phi_0$ | | $\phi_0$ |
| $f_1$: | $\phi_1$ | $\phi_1 + 2\pi T_{ps} f_1$ | $\phi_1 + 2\pi 2 T_{ps} f_1$ | ......... | $\phi_1 + 2\pi (N-1) T_{ps} f_1$ |
| $f_2$: | $\phi_2$ | $\phi_2 + 2\pi T_{ps} f_2$ | $\phi_2 + 2\pi 2 T_{ps} f_2$ | ......... | $\phi_2 + 2\pi (N-1) T_{ps} f_2$ |
| ⋮ | ⋮ | ⋮ | ⋮ | | ⋮ |
| $f_{N-1}$: | $\phi_{N-1}$ | $\phi_{N-1} + 2\pi T_{ps} f_{N-1}$ | $\phi_{N-1} + 2\pi 2 T_{ps} f_{N-1}$ | ......... | $\phi_{N-1} + 2\pi (N-1) T_{ps} f_{N-1}$ |

FIG. 15A

| | Ps(0) | Ps(1) | Ps(2) | ......... | Ps(N-1) |
|---|---|---|---|---|---|
| $f_0$: | $s_0$ | $s_1$ | $s_2$ | | $s_{N-1}$ |
| $f_1$: | $s_0$ | $s_1 e^{i2\pi T_{ps} f_s}$ | $s_2 e^{i2\pi 2 T_{ps} f_s}$ | ......... | $s_{N-1} e^{i2\pi (N-1) T_{ps} f_s}$ |
| $f_2$: | $s_0$ | $s_1 e^{i2\pi T_{ps} 2 f_s}$ | $s_2 e^{i2\pi 2 T_{ps} 2 f_s}$ | ......... | $s_{N-1} e^{i2\pi (N-1) T_{ps} 2 f_s}$ |
| ⋮ | ⋮ | ⋮ | ⋮ | | ⋮ |
| $f_{N-1}$: | $s_0$ | $s_1 e^{i2\pi T_{ps} (N-1) f_s}$ | $s_2 e^{i2\pi 2 T_{ps} (N-1) f_s}$ | ......... | $s_{N-1} e^{i2\pi (N-1) T_{ps} (N-1) f_s}$ |

FIG. 15B

| | | | | |
|---|---|---|---|---|
| $HW_{4x4}(1)$: | 1 | 1 | 1 | 1 |
| $HW_{4x4}(2)$: | 1 | -1 | 1 | -1 |
| $HW_{4x4}(3)$: | 1 | 1 | -1 | -1 |
| $HW_{4x4}(4)$: | 1 | -1 | -1 | 1 |

FIG. 29A

| | | | | |
|---|---|---|---|---|
| $CI_{4x4}(1)$: | 1 | 1 | 1 | 1 |
| $CI_{4x4}(2)$: | 1 | i | -1 | -i |
| $CI_{4x4}(3)$: | 1 | -1 | 1 | -1 |
| $CI_{4x4}(4)$: | 1 | -i | -1 | i |

FIG. 29B

| | | | | |
|---|---|---|---|---|
| $HW_{4x4}(1)xCI_{4x4}(1)$: | 1 | 1 | 1 | 1 |
| $HW_{4x4}(1)xCI_{4x4}(2)$: | 1 | i | -1 | -i |
| $HW_{4x4}(1)xCI_{4x4}(3)$: | 1 | -1 | 1 | -1 |
| $HW_{4x4}(1)xCI_{4x4}(4)$: | 1 | -i | -1 | i |

FIG. 30A

| | | | | |
|---|---|---|---|---|
| $HW_{4x4}(2)xCI_{4x4}(1)$: | 1 | -1 | 1 | -1 |
| $HW_{4x4}(2)xCI_{4x4}(2)$: | 1 | -i | -1 | i |
| $HW_{4x4}(2)xCI_{4x4}(3)$: | 1 | 1 | 1 | 1 |
| $HW_{4x4}(2)xCI_{4x4}(4)$: | 1 | i | -1 | -i |

FIG. 30B

| | | | | |
|---|---|---|---|---|
| $HW_{4x4}(1)xCI_{4x4}(1)$: | 1 | 1 | -1 | -1 |
| $HW_{4x4}(1)xCI_{4x4}(2)$: | 1 | i | 1 | i |
| $HW_{4x4}(1)xCI_{4x4}(3)$: | 1 | -1 | -1 | 1 |
| $HW_{4x4}(1)xCI_{4x4}(4)$: | 1 | -i | 1 | -i |

FIG. 30C

| | | | | |
|---|---|---|---|---|
| $HW_{4x4}(2)xCI_{4x4}(1)$: | 1 | -1 | -1 | 1 |
| $HW_{4x4}(2)xCI_{4x4}(2)$: | 1 | -i | 1 | -i |
| $HW_{4x4}(2)xCI_{4x4}(3)$: | 1 | 1 | -1 | -1 |
| $HW_{4x4}(2)xCI_{4x4}(4)$: | 1 | i | 1 | i |

FIG. 30D

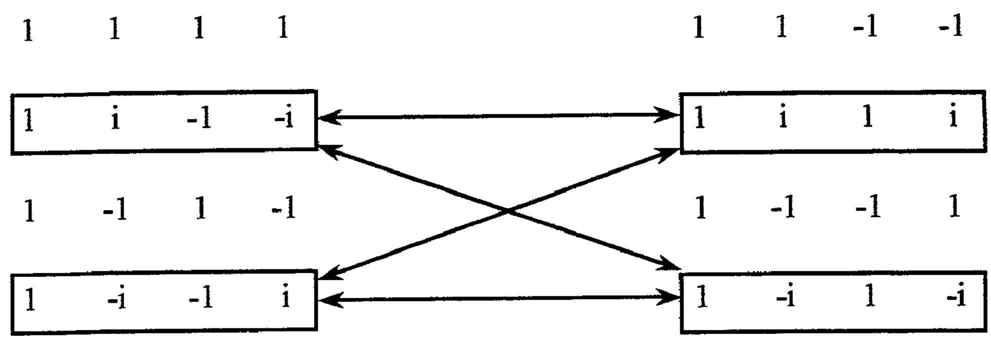
FIG. 31A
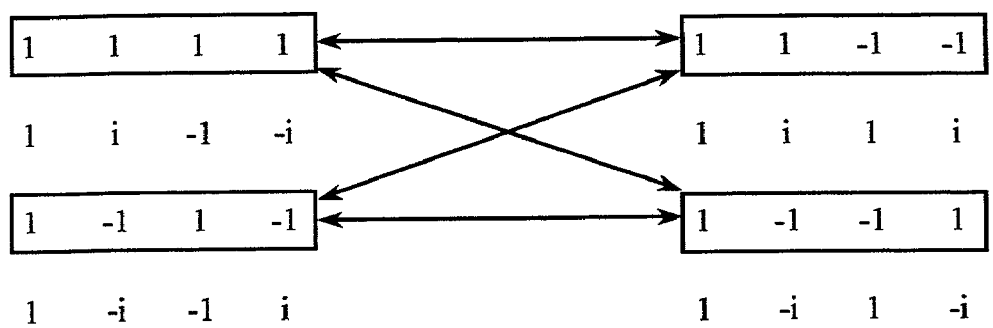
FIG. 31B
| | | | | |
|---|---|---|---|---|
| $PC_{4x4}(1)$: | 1 | i | -1 | -i |
| $PC_{4x4}(2)$: | 1 | i | 1 | i |
| $PC_{4x4}(3)$: | 1 | -i | -1 | i |
| $PC_{4x4}(4)$: | 1 | -i | 1 | -i |
FIG. 31C

| | | | | | | | | |
|---|---|---|---|---|---|---|---|---|
| $HW_{8x8}(1)$: | 1 | 1 | 1 | 1 | 1 | 1 | 1 | 1 |
| $HW_{8x8}(2)$: | 1 | -1 | 1 | -1 | 1 | -1 | 1 | -1 |
| $HW_{8x8}(3)$: | 1 | 1 | -1 | -1 | 1 | 1 | -1 | -1 |
| $HW_{8x8}(4)$: | 1 | -1 | -1 | 1 | 1 | -1 | -1 | 1 |
| $HW_{8x8}(5)$: | 1 | 1 | 1 | 1 | -1 | -1 | -1 | -1 |
| $HW_{8x8}(6)$: | 1 | -1 | 1 | -1 | -1 | 1 | -1 | 1 |
| $HW_{8x8}(7)$: | 1 | 1 | -1 | -1 | -1 | -1 | 1 | 1 |
| $HW_{8x8}(8)$: | 1 | -1 | -1 | 1 | -1 | 1 | 1 | -1 |

FIG. 32A

| | | | | | | | | |
|---|---|---|---|---|---|---|---|---|
| $PC4_{8x8}(1)$: | 1 | i | -1 | -i | 1 | i | -1 | -i |
| $PC4_{8x8}(2)$: | 1 | i | 1 | i | 1 | i | 1 | i |
| $PC4_{8x8}(3)$: | 1 | -i | -1 | i | 1 | -i | -1 | i |
| $PC4_{8x8}(4)$: | 1 | -i | 1 | -i | 1 | -i | 1 | -i |
| $PC4_{8x8}(5)$: | 1 | i | -1 | -i | -1 | -i | 1 | i |
| $PC4_{8x8}(6)$: | 1 | i | 1 | i | -1 | -i | -1 | -i |
| $PC4_{8x8}(7)$: | 1 | -i | -1 | i | -1 | i | 1 | -i |
| $PC4_{8x8}(8)$: | 1 | -i | 1 | -i | -1 | i | -1 | i |

FIG. 32B

| | | | | | | | | |
|---|---|---|---|---|---|---|---|---|
| $CI_{8x8}(1)$: | 1 | 1 | 1 | 1 | 1 | 1 | 1 | 1 |
| $CI_{8x8}(2)$: | 1 | $\frac{1+i}{\sqrt{2}}$ | i | $\frac{-1+i}{\sqrt{2}}$ | -1 | $\frac{-1-i}{\sqrt{2}}$ | -i | $\frac{1-i}{\sqrt{2}}$ |
| $CI_{8x8}(3)$: | 1 | i | -1 | -i | 1 | i | -1 | -i |
| $CI_{8x8}(4)$: | 1 | $\frac{-1+i}{\sqrt{2}}$ | -i | $\frac{1+i}{\sqrt{2}}$ | -1 | $\frac{1-i}{\sqrt{2}}$ | i | $\frac{-1-i}{\sqrt{2}}$ |
| $CI_{8x8}(5)$: | 1 | -1 | 1 | -1 | 1 | -1 | 1 | -1 |
| $CI_{8x8}(6)$: | 1 | $\frac{-1-i}{\sqrt{2}}$ | i | $\frac{1-i}{\sqrt{2}}$ | -1 | $\frac{1+i}{\sqrt{2}}$ | -i | $\frac{-1+i}{\sqrt{2}}$ |
| $CI_{8x8}(7)$: | 1 | -i | -1 | i | 1 | -i | -1 | i |
| $CI_{8x8}(8)$: | 1 | $\frac{1-i}{\sqrt{2}}$ | -i | $\frac{-1-i}{\sqrt{2}}$ | -1 | $\frac{-1+i}{\sqrt{2}}$ | i | $\frac{1+i}{\sqrt{2}}$ |

FIG. 32C $\underline{HW_{8x8}(1)xCI_{8x8}}$

| | | | | | | | | |
|---|---|---|---|---|---|---|---|---|
| $HW_{8x8}(1)$: | 1 | 1 | 1 | 1 | 1 | 1 | 1 | 1 |
| $CI_{8x8}(1)$: | 1 | $\frac{1+i}{\sqrt{2}}$ | i | $\frac{-1+i}{\sqrt{2}}$ | -1 | $\frac{-1-i}{\sqrt{2}}$ | -i | $\frac{1-i}{\sqrt{2}}$ |
| $PC4_{8x8}(1)$: | 1 | i | -1 | -i | 1 | i | -1 | -i |
| $CI_{8x8}(2)$: | 1 | $\frac{-1+i}{\sqrt{2}}$ | -i | $\frac{1+i}{\sqrt{2}}$ | -1 | $\frac{1-i}{\sqrt{2}}$ | i | $\frac{-1-i}{\sqrt{2}}$ |
| $HW_{8x8}(2)$: | 1 | -1 | 1 | -1 | 1 | -1 | 1 | -1 |
| $CI_{8x8}(2)^*$: | 1 | $\frac{-1-i}{\sqrt{2}}$ | i | $\frac{1-i}{\sqrt{2}}$ | -1 | $\frac{1+i}{\sqrt{2}}$ | -i | $\frac{-1+i}{\sqrt{2}}$ |
| $PC4_{8x8}(3)$: | 1 | -i | -1 | i | 1 | -i | -1 | i |
| $CI_{8x8}(1)^*$: | 1 | $\frac{1-i}{\sqrt{2}}$ | -i | $\frac{-1-i}{\sqrt{2}}$ | -1 | $\frac{-1+i}{\sqrt{2}}$ | i | $\frac{1+i}{\sqrt{2}}$ |

FIG. 33A $\underline{HW_{8x8}(2)xCI_{8x8}}$

| | | | | | | | | |
|---|---|---|---|---|---|---|---|---|
| $HW_{8x8}(2)$: | 1 | -1 | 1 | -1 | 1 | -1 | 1 | -1 |
| $CI_{8x8}(2)^*$: | 1 | $\frac{-1-i}{\sqrt{2}}$ | i | $\frac{1-i}{\sqrt{2}}$ | -1 | $\frac{1+i}{\sqrt{2}}$ | -i | $\frac{-1+i}{\sqrt{2}}$ |
| $PC4_{8x8}(3)$: | 1 | -i | -1 | i | 1 | -i | -1 | i |
| $CI_{8x8}(1)^*$: | 1 | $\frac{1-i}{\sqrt{2}}$ | -i | $\frac{-1-i}{\sqrt{2}}$ | -1 | $\frac{-1+i}{\sqrt{2}}$ | i | $\frac{1+i}{\sqrt{2}}$ |
| $HW_{8x8}(1)$: | 1 | 1 | 1 | 1 | 1 | 1 | 1 | 1 |
| $CI_{8x8}(1)$: | 1 | $\frac{1+i}{\sqrt{2}}$ | i | $\frac{-1+i}{\sqrt{2}}$ | -1 | $\frac{-1-i}{\sqrt{2}}$ | -i | $\frac{1-i}{\sqrt{2}}$ |
| $PC4_{8x8}(1)$: | 1 | i | -1 | -i | 1 | i | -1 | -i |
| $CI_{8x8}(2)$: | 1 | $\frac{-1+i}{\sqrt{2}}$ | -i | $\frac{1+i}{\sqrt{2}}$ | -1 | $\frac{1-i}{\sqrt{2}}$ | i | $\frac{-1-i}{\sqrt{2}}$ |

FIG. 33B $HW_{8x8}(3)xCI_{8x8}$

| | | | | | | | | |
|---|---|---|---|---|---|---|---|---|
| $HW_{8x8}(3)$: | 1 | 1 | -1 | -1 | 1 | 1 | -1 | -1 |
| $CI_{8x8}(6)$: | 1 | $\frac{1+i}{\sqrt{2}}$ | -i | $\frac{1-i}{\sqrt{2}}$ | -1 | $\frac{-1-i}{\sqrt{2}}$ | i | $\frac{-1+i}{\sqrt{2}}$ |
| $PC4_{8x8}(2)$: | 1 | i | 1 | i | 1 | i | 1 | i |
| $CI_{8x8}(5)$: | 1 | $\frac{-1+i}{\sqrt{2}}$ | i | $\frac{-1-i}{\sqrt{2}}$ | -1 | $\frac{1-i}{\sqrt{2}}$ | -i | $\frac{1+i}{\sqrt{2}}$ |
| $HW_{8x8}(4)$: | 1 | -1 | -1 | 1 | 1 | -1 | -1 | 1 |
| $CI_{8x8}(5)^*$: | 1 | $\frac{-1-i}{\sqrt{2}}$ | -i | $\frac{-1+i}{\sqrt{2}}$ | -1 | $\frac{1+i}{\sqrt{2}}$ | i | $\frac{1-i}{\sqrt{2}}$ |
| $PC4_{8x8}(4)$: | 1 | -i | 1 | -i | 1 | -i | 1 | -i |
| $CI_{8x8}(6)^*$: | 1 | $\frac{1-i}{\sqrt{2}}$ | i | $\frac{1+i}{\sqrt{2}}$ | -1 | $\frac{-1+i}{\sqrt{2}}$ | -i | $\frac{-1-i}{\sqrt{2}}$ |

FIG. 33C $HW_{8x8}(4)xCI_{8x8}$

| | | | | | | | | |
|---|---|---|---|---|---|---|---|---|
| $HW_{8x8}(4)$: | 1 | -1 | -1 | 1 | 1 | -1 | -1 | 1 |
| $CI_{8x8}(5)$: | 1 | $\frac{-1-i}{\sqrt{2}}$ | -i | $\frac{-1+i}{\sqrt{2}}$ | -1 | $\frac{1+i}{\sqrt{2}}$ | i | $\frac{1-i}{\sqrt{2}}$ |
| $PC4_{8x8}(4)$: | 1 | -i | 1 | -i | 1 | -i | 1 | -i |
| $CI_{8x8}(6)$: | 1 | $\frac{1-i}{\sqrt{2}}$ | i | $\frac{1+i}{\sqrt{2}}$ | -1 | $\frac{-1+i}{\sqrt{2}}$ | -i | $\frac{-1-i}{\sqrt{2}}$ |
| $HW_{8x8}(3)$: | 1 | 1 | -1 | -1 | 1 | 1 | -1 | -1 |
| $CI_{8x8}(6)^*$: | 1 | $\frac{1+i}{\sqrt{2}}$ | -i | $\frac{1-i}{\sqrt{2}}$ | -1 | $\frac{-1-i}{\sqrt{2}}$ | i | $\frac{-1+i}{\sqrt{2}}$ |
| $PC4_{8x8}(2)$: | 1 | i | 1 | i | 1 | i | 1 | i |
| $CI_{8x8}(5)^*$: | 1 | $\frac{-1+i}{\sqrt{2}}$ | i | $\frac{-1-i}{\sqrt{2}}$ | -1 | $\frac{1-i}{\sqrt{2}}$ | -i | $\frac{1+i}{\sqrt{2}}$ |

FIG. 33D $HW_{8x8}(5)xCI_{8x8}$

| | | | | | | | | |
|---|---|---|---|---|---|---|---|---|
| $HW_{8x8}(5)$: | 1 | 1 | 1 | 1 | -1 | -1 | -1 | -1 |
| $CI_{8x8}(3)$: | 1 | $\frac{1+i}{\sqrt{2}}$ | i | $\frac{-1+i}{\sqrt{2}}$ | 1 | $\frac{1+i}{\sqrt{2}}$ | i | $\frac{-1+i}{\sqrt{2}}$ |
| $PC4_{8x8}(5)$: | 1 | i | -1 | -i | -1 | -i | 1 | i |
| $CI_{8x8}(4)$: | 1 | $\frac{-1+i}{\sqrt{2}}$ | -i | $\frac{1+i}{\sqrt{2}}$ | 1 | $\frac{-1+i}{\sqrt{2}}$ | -i | $\frac{1+i}{\sqrt{2}}$ |
| $HW_{8x8}(6)$: | 1 | -1 | 1 | -1 | -1 | 1 | -1 | 1 |
| $CI_{8x8}(4)^*$: | 1 | $\frac{-1-i}{\sqrt{2}}$ | i | $\frac{1-i}{\sqrt{2}}$ | 1 | $\frac{-1-i}{\sqrt{2}}$ | i | $\frac{1-i}{\sqrt{2}}$ |
| $PC4_{8x8}(7)$: | 1 | -i | -1 | i | -1 | i | 1 | -i |
| $CI_{8x8}(3)^*$: | 1 | $\frac{1-i}{\sqrt{2}}$ | -i | $\frac{-1-i}{\sqrt{2}}$ | 1 | $\frac{1-i}{\sqrt{2}}$ | -i | $\frac{-1-i}{\sqrt{2}}$ |

FIG. 33E $HW_{8x8}(6)xCI_{8x8}$

| | | | | | | | | |
|---|---|---|---|---|---|---|---|---|
| $HW_{8x8}(6)$: | 1 | -1 | 1 | -1 | -1 | 1 | -1 | 1 |
| $CI_{8x8}(4)^*$: | 1 | $\frac{-1-i}{\sqrt{2}}$ | i | $\frac{1-i}{\sqrt{2}}$ | 1 | $\frac{-1-i}{\sqrt{2}}$ | i | $\frac{1-i}{\sqrt{2}}$ |
| $PC4_{8x8}(7)$: | 1 | -i | -1 | i | -1 | i | 1 | -i |
| $CI_{8x8}(3)^*$: | 1 | $\frac{-1-i}{\sqrt{2}}$ | -i | $\frac{-1-i}{\sqrt{2}}$ | 1 | $\frac{1-i}{\sqrt{2}}$ | -i | $\frac{-1-i}{\sqrt{2}}$ |
| $HW_{8x8}(5)$: | 1 | 1 | 1 | 1 | -1 | -1 | -1 | -1 |
| $CI_{8x8}(3)$: | 1 | $\frac{1+i}{\sqrt{2}}$ | i | $\frac{-1+i}{\sqrt{2}}$ | 1 | $\frac{1+i}{\sqrt{2}}$ | i | $\frac{-1+i}{\sqrt{2}}$ |
| $PC4_{8x8}(5)$: | 1 | i | -1 | -i | -1 | -i | 1 | i |
| $CI_{8x8}(4)$: | 1 | $\frac{-1+i}{\sqrt{2}}$ | -i | $\frac{1+i}{\sqrt{2}}$ | 1 | $\frac{-1+i}{\sqrt{2}}$ | -i | $\frac{1+i}{\sqrt{2}}$ |

FIG. 33F $\underline{HW_{8x8}(7)xCI_{8x8}}$

| | | | | | | | | |
|---|---|---|---|---|---|---|---|---|
| $HW_{8x8}(7)$: | 1 | 1 | -1 | -1 | -1 | -1 | 1 | 1 |
| $CI_{8x8}(7)$: | 1 | $\frac{1+i}{\sqrt{2}}$ | -i | $\frac{1-i}{\sqrt{2}}$ | 1 | $\frac{1+i}{\sqrt{2}}$ | -i | $\frac{1-i}{\sqrt{2}}$ |
| $PC4_{8x8}(6)$: | 1 | i | 1 | i | -1 | -i | -1 | -i |
| $CI_{8x8}(8)$: | 1 | $\frac{-1+i}{\sqrt{2}}$ | i | $\frac{-1-i}{\sqrt{2}}$ | 1 | $\frac{-1+i}{\sqrt{2}}$ | i | $\frac{-1-i}{\sqrt{2}}$ |
| $HW_{8x8}(8)$: | 1 | -1 | -1 | 1 | -1 | 1 | 1 | -1 |
| $CI_{8x8}(8)^*$: | 1 | $\frac{-1-i}{\sqrt{2}}$ | -i | $\frac{-1+i}{\sqrt{2}}$ | 1 | $\frac{-1-i}{\sqrt{2}}$ | -i | $\frac{-1+i}{\sqrt{2}}$ |
| $PC4_{8x8}(8)$: | 1 | -i | 1 | -i | -1 | i | -1 | i |
| $CI_{8x8}(7)^*$: | 1 | $\frac{1-i}{\sqrt{2}}$ | i | $\frac{1+i}{\sqrt{2}}$ | 1 | $\frac{1-i}{\sqrt{2}}$ | i | $\frac{1+i}{\sqrt{2}}$ |

FIG. 33G $\underline{HW_{8x8}(8)xCI_{8x8}}$

| | | | | | | | | |
|---|---|---|---|---|---|---|---|---|
| $HW_{8x8}(8)$: | 1 | -1 | -1 | 1 | -1 | 1 | 1 | -1 |
| $CI_{8x8}(8)^*$: | 1 | $\frac{-1-i}{\sqrt{2}}$ | -i | $\frac{-1+i}{\sqrt{2}}$ | 1 | $\frac{-1-i}{\sqrt{2}}$ | -i | $\frac{-1+i}{\sqrt{2}}$ |
| $PC4_{8x8}(8)$: | 1 | -i | 1 | -i | -1 | i | -1 | i |
| $CI_{8x8}(7)^*$: | 1 | $\frac{1-i}{\sqrt{2}}$ | i | $\frac{1+i}{\sqrt{2}}$ | 1 | $\frac{1-i}{\sqrt{2}}$ | i | $\frac{1+i}{\sqrt{2}}$ |
| $HW_{8x8}(7)$: | 1 | 1 | -1 | -1 | -1 | -1 | 1 | 1 |
| $CI_{8x8}(7)$: | 1 | $\frac{1+i}{\sqrt{2}}$ | -i | $\frac{1-i}{\sqrt{2}}$ | 1 | $\frac{1+i}{\sqrt{2}}$ | -i | $\frac{1-i}{\sqrt{2}}$ |
| $PC4_{8x8}(6)$: | 1 | i | 1 | i | -1 | -i | -1 | -i |
| $CI_{8x8}(8)$: | 1 | $\frac{-1+i}{\sqrt{2}}$ | i | $\frac{-1-i}{\sqrt{2}}$ | 1 | $\frac{-1+i}{\sqrt{2}}$ | i | $\frac{-1-i}{\sqrt{2}}$ |

FIG. 33H $C(1) = [1\ (1+i)/\sqrt{2}\ i\ (-1+i)/\sqrt{2}\ -1\ (-1-i)/\sqrt{2}\ -i\ (1-i)/\sqrt{2}];$ $C(1)^* = [1\ (1-i)/\sqrt{2}\ -i\ (-1-i)/\sqrt{2}\ -1\ (-1+i)/\sqrt{2}\ i\ (1+i)/\sqrt{2}];$ $C(2) = [1\ (-1+i)/\sqrt{2}\ -i\ (1+i)/\sqrt{2}\ -1\ (1-i)/\sqrt{2}\ i\ (-1-i)/\sqrt{2}];$ $C(2)^* = [1\ (-1-i)/\sqrt{2}\ i\ (1-i)/\sqrt{2}\ -1\ (1+i)/\sqrt{2}\ -i\ (-1+i)/\sqrt{2}];$ $C(3) = [1\ (1+i)/\sqrt{2}\ i\ (-1+i)/\sqrt{2}\ 1\ (1+i)/\sqrt{2}\ i\ (-1+i)/\sqrt{2}];$ $C(3)^* = [1\ (1-i)/\sqrt{2}\ -i\ (-1-i)/\sqrt{2}\ 1\ (1-i)/\sqrt{2}\ -i\ (-1-i)/\sqrt{2}];$ $C(4) = [1\ (-1+i)/\sqrt{2}\ i\ (-1-i)/\sqrt{2}\ 1\ (-1+i)/\sqrt{2}\ i\ (-1-i)/\sqrt{2}];$ $C(4)^* = [1\ (-1-i)/\sqrt{2}\ -i\ (-1+i)/\sqrt{2}\ 1\ (-1-i)/\sqrt{2}\ -i\ (-1+i)/\sqrt{2}];$ $C(5) = [1\ (-1-i)/\sqrt{2}\ -i\ (-1+i)/\sqrt{2}\ -1\ (1+i)/\sqrt{2}\ i\ (1-i)/\sqrt{2}];$ $C(5)^* = [1\ (-1+i)/\sqrt{2}\ i\ (-1-i)/\sqrt{2}\ -1\ (1-i)/\sqrt{2}\ -i\ (1+i)/\sqrt{2}];$ $C(6) = [1\ (1-i)/\sqrt{2}\ i\ (1+i)/\sqrt{2}\ -1\ (-1+i)/\sqrt{2}\ -i\ (-1-i)/\sqrt{2}];$ $C(6)^* = [1\ (1+i)/\sqrt{2}\ -i\ (1-i)/\sqrt{2}\ -1\ (-1-i)/\sqrt{2}\ i\ (-1+i)/\sqrt{2}];$ $C(7) = [1\ (1+i)/\sqrt{2}\ -i\ (1-i)/\sqrt{2}\ 1\ (1+i)/\sqrt{2}\ -i\ (1-i)/\sqrt{2}];$ $C(7)^* = [1\ (1-i)/\sqrt{2}\ i\ (1+i)/\sqrt{2}\ 1\ (1-i)/\sqrt{2}\ i\ (1+i)/\sqrt{2}];$ $C(8) = [1\ (-1+i)/\sqrt{2}\ -i\ (1+i)/\sqrt{2}\ 1\ (-1+i)/\sqrt{2}\ -i\ (1+i)/\sqrt{2}];$ $C(8)^* = [1\ (-1-i)/\sqrt{2}\ i\ (1-i)/\sqrt{2}\ 1\ (-1-i)/\sqrt{2}\ i\ (1-i)/\sqrt{2}];$

FIG. 34A

| | C(1) | C(1)* | C(2) | C(2)* | C(3) | C(3)* | C(4) | C(4)* | C(5) | C(5)* | C(6) | C(6)* | C(7) | C(7)* | C(8) | C(8)* |
|---|---|---|---|---|---|---|---|---|---|---|---|---|---|---|---|---|
| CI(1) | 0 | 8 | 0 | 0 | 0 | 0 | 0 | 0 | 4-4i | 0 | 0 | 4+4i | 0 | 0 | 0 | 0 |
| CI(1)* | 8 | 0 | 0 | 0 | 0 | 0 | 0 | 0 | 0 | 4+4i | 4-4i | 0 | 0 | 0 | 0 | 0 |
| CI(2) | 0 | 0 | 0 | 8 | 0 | 0 | 0 | 0 | 0 | 4-4i | 4+4i | 0 | 0 | 0 | 0 | 0 |
| CI(2)* | 0 | 0 | 8 | 0 | 0 | 0 | 0 | 0 | 4+4i | 0 | 0 | 4-4i | 0 | 0 | 0 | 0 |
| CI(3) | 0 | 0 | 0 | 0 | 0 | 8 | 0 | 4-4i | 0 | 0 | 0 | 0 | 4+4i | 0 | 0 | 0 |
| CI(3)* | 0 | 0 | 0 | 0 | 8 | 0 | 4+4i | 0 | 0 | 0 | 0 | 0 | 0 | 4-4i | 0 | 0 |
| CI(4) | 0 | 0 | 0 | 0 | 0 | 4+4i | 0 | 8 | 0 | 0 | 0 | 0 | 0 | 0 | 4-4i | 0 |
| CI(4)* | 0 | 0 | 0 | 0 | 4-4i | 0 | 8 | 0 | 0 | 0 | 0 | 0 | 0 | 0 | 0 | 4+4i |
| CI(5) | 4-4i | 0 | 0 | 4+4i | 0 | 0 | 0 | 0 | 0 | 8 | 0 | 0 | 0 | 0 | 0 | 0 |
| CI(5)* | 0 | 4+4i | 4-4i | 0 | 0 | 0 | 0 | 0 | 8 | 0 | 0 | 0 | 0 | 0 | 0 | 0 |
| CI(6) | 0 | 4-4i | 4+4i | 0 | 0 | 0 | 0 | 0 | 0 | 0 | 0 | 8 | 0 | 0 | 0 | 0 |
| CI(6)* | 4+4i | 0 | 0 | 4-4i | 0 | 0 | 0 | 0 | 0 | 0 | 8 | 0 | 0 | 0 | 0 | 0 |
| CI(7) | 0 | 0 | 0 | 0 | 4+4i | 0 | 0 | 0 | 0 | 0 | 0 | 0 | 0 | 8 | 0 | 4-4i |
| CI(7)* | 0 | 0 | 0 | 0 | 0 | 4-4i | 0 | 0 | 0 | 0 | 0 | 0 | 8 | 0 | 4+4i | 0 |
| CI(8) | 0 | 0 | 0 | 0 | 0 | 0 | 4-4i | 0 | 0 | 0 | 0 | 0 | 0 | 4+4i | 0 | 8 |
| CI(8)* | 0 | 0 | 0 | 0 | 0 | 0 | 0 | 4+4i | 0 | 0 | 0 | 0 | 4-4i | 0 | 8 | 0 |

FIG. 34B

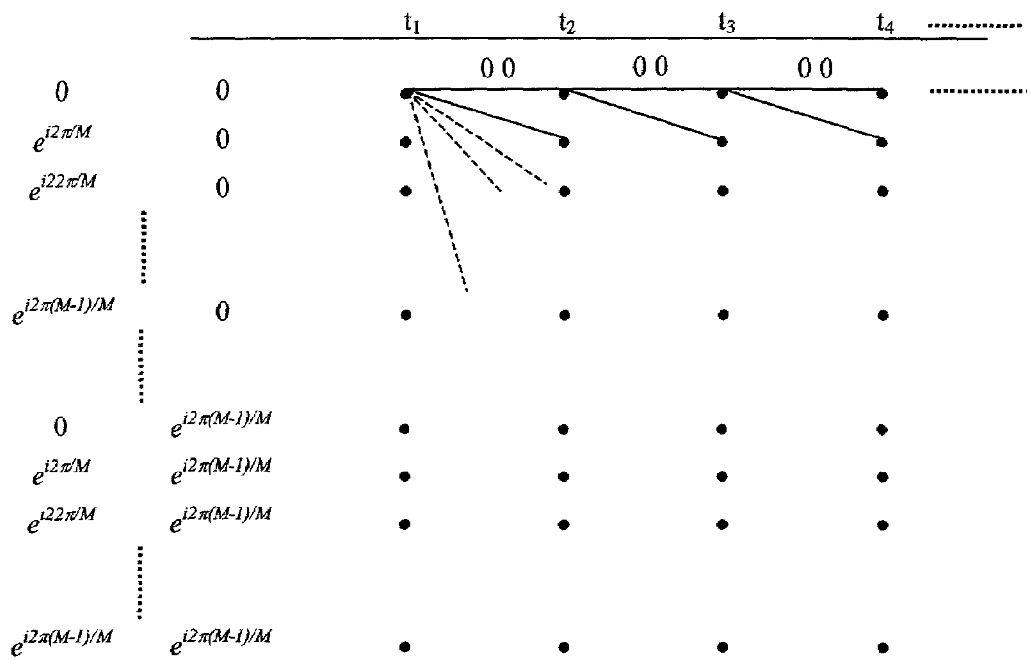
FIG. 43B
FIG. 43C
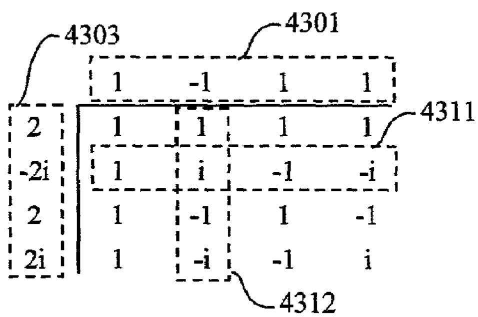
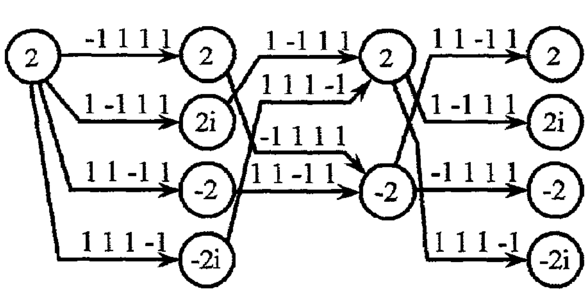
FIG. 43D

| | Spatial Sub-channel #1 | Spatial Sub-channel #2 | .................... | Spatial Sub-channel #N |
|---|---|---|---|---|
| Code #1: | $c_{11}$ | $c_{12}$ | .................... | $c_{1N}$ |
| Code #2: | $c_{21}$ | $c_{22}$ | .................... | $c_{2N}$ |
| ⋮ | ⋮ | ⋮ | | ⋮ |
| Code #n: | $c_{n1}$ | $c_{n2}$ | .................... | $c_{nN}$ |
| ⋮ | ⋮ | ⋮ | | ⋮ |
| Code #N': | $c_{N'1}$ | $c_{N'2}$ | .................... | $c_{N'N}$ |

$f_n : f_n$ $f_n : f_{n+2.5}$ $f_n : f_{n+1}$ $f_n : f_{n+2}$ $f_n : f_{n+1.5}$

| Phase Space | Tx Symbol | Rx Value |
|---|---|---|
| 1 | +1 | +180.3291 |
| 2 | -1 | -167.5694 |
| 3 | +1 | +171.4620 |
| 4 | -1 | -137.1841 |
| 5 | -1 | -131.6329 |
| 6 | +1 | +134.0128 |
| 7 | +1 | +120.8614 |
| 8 | -1 | -116.9687 |
| 9 | -1 | -105.6389 |
| 10 | -1 | -169.7778 |

| Phase Space | Centered at PS 1 | Centered at PS 2 | Centered at PS 3 |
|---|---|---|---|
| PS 1 | **1.9128e+003** | 3.0039 | -3.9450 |
| PS 2 | -1.8043 | **1.9117e+003** | 4.8284 |
| PS 3 | 1.6598 | -2.0786 | **1.9117e+003** |

MULTICARRIER SUB-LAYER FOR DIRECT SEQUENCE CHANNEL AND MULTIPLE-ACCESS CODING

RELATED APPLICATIONS

This application is a Continuation-in-Part of U.S. patent application Ser. No. 09/381,588 filed Sep. 20, 1999 now U.S. Pat. No. 7,010,048, which is a Continuation-in-Part of U.S. patent application Ser. No. 09/022,950, filed Feb. 12, 1998, now U.S. Pat. No. 5,955,992 and which claims the priority benefit of PCT application Ser. No. PCT/US99/02838 filed Feb. 10, 1999 and this application is also a Non-Provisional of and claims priority to U.S. Provisional Patent Application No. 60/286,850, filed Apr. 26, 2001.

BACKGROUND OF THE INVENTION

I. Field of the Invention

The present invention relates to direct-sequence code division multiple access (DS-CDMA), direct sequence spread spectrum (DSSS), and multicarrier spread spectrum communications. More specifically, the invention relates to adaptations of Carrier Interferometry (CI) that generate CDMA-like and DSSS-like signals.

II. Description of the Related Art

A wideband signal (such as a DS-CDMA signal) transmitted in a multipath environment experiences a frequency-selective fade. If the duration of the data bits is smaller than the multipath delay, the received signals experience inter-symbol interference resulting from delayed replicas of earlier bits arriving at the receiver. Improved DS-CDMA systems use interference cancellation to increase capacity; however, the required signal-processing effort is proportional to at least the cube of the bandwidth. Furthermore, DS-CDMA is susceptible to near-far interference, and its long pseudo-noise (PN) codes require long acquisition times. For these reasons, Orthogonal Frequency Division Multiplexing (OFDM) has been merged with DS-CDMA.

An OFDM system using fast Fourier transforms to generate orthogonal wave forms is described in an article by S. B. Weinstein and P. M. Ebert entitled "Data Transmission by Frequency Division Multiplexing Using the Discrete Fourier Transform," IEEE Transactions on Communication Technology, Vol. COM-19, No. 5, pp. 628-634, October 1971. In this OFDM system, the data symbols are processed in the transmitter by an inverse fast Fourier transform and in the receiver by a fast Fourier transform. The symbols are time-limited and the subcarriers overlap in the frequency domain.

OFDM has a high spectral efficiency (the spectrum of the subcarriers overlap) and combats frequency-selective fading. However, the amplitude of each carrier is affected by the Rayleigh law, hence flat fading occurs. Therefore, good channel estimation with an appropriate detection algorithm and channel coding is essential to compensate for fading. Coded OFDM provides data redundancy to reduce probability of error, but at the expense of reduced bandwidth efficiency.

Because frequency diversity is inherent in OFDM, it is much simpler to achieve than in a DS-CDMA system (which requires a Rake receiver to achieve diversity in the time domain). Frequency diversity can exploit all of the reflected energy in a multipath environment whereas a time-diversity (i.e., a Rake) receiver typically combines only a small fraction of the energy. OFDM systems benefit from a lower speed, parallel type of signal processing. A Rake receiver in a DS-CDMA system uses a fast, serial type of signal processing, which results in greater power consumption. In addition, OFDM simplifies the channel estimation problem, thus simplifying the receiver design.

In multicarrier CDMA (MC-CDMA), a spreading sequence is converted from serial to parallel. Each chip in the sequence modulates a different carrier frequency. Thus, the resulting signal has a PN-coded structure in the frequency domain, and the processing gain is equal to the number of carriers.

In multi-tone CDMA, or multicarrier DS-CDMA, the available spectrum is divided into a number of equal-width frequency bands used to transmit a narrowband direct-sequence waveform. In U.S. Pat. No. 5,504,775, binary CDMA code symbols are applied to individual carriers in an OFDM system. U.S. Pat. Nos. 5,521,937, 5,960,032, and 6,097,712 describe multicarrier DSSS systems having direct-sequence coding on each subcarrier.

U.S. Pat. Nos. 5,519,692 and 5,563,906 describe geometric harmonic modulation (GHM) in which preamble and traffic waveforms are created from multiple carrier frequencies (tones). The waveforms comprise tones incorporating a binary phase code where signal phases are 0 or $-\pi/2$. The binary phase offsets, which are applied to the tones, provide the spreading codes. The traffic waveforms are products of the tones. Orthogonality of GHM signals is realized upon correlation with a reference signal at a receiver. A preamble carrier waveform is constructed by summing the tones. Therefore, the preamble signals are similar to MC-CDMA signals.

GHM uses binary-phase offsets instead of polyphase offsets. Thus, GHM does not provide carriers with phase relationships that enable orthogonal superpositions of the carriers. Received GHM signals require processing by a correlator, whereas CI-based signals that are orthogonal in time can be processed using simpler signal-processing techniques, such as time sampling and weight-and-sum. Furthermore, GHM does not achieve the throughput, performance, and adaptability benefits enabled by orthogonal interferometry signals.

U.S. Pat. No. 4,901,307 describes processes of creating marginal isolation, which enhances in frequency reuse in DS-CDMA systems. In DS-CDMA, even small reductions in the overall power level of the system allow for increased system capacity. One particularly effective method for creating isolation and improving frequency reuse is spatial division multiple access (SDMA). SDMA applications to multiple access communications, including adaptive array processing, are discussed in U.S. Pat. No. 5,642,353, U.S. Pat. No. 5,592,490, U.S. Pat. No. 5,515,378, and U.S. Pat. No. 5,471,647. In addition to frequency reuse, antenna arrays also provide increased processing gain and improved interference rejection.

Adaptive antenna arrays may be implemented with DS-CDMA communications to provide significant improvements in range extension, interference reduction, and system capacity. To identify a particular user, a DS-CDMA system demodulates Walsh codes after converting the received signal from RF to digital. Therefore, an adaptive antenna array requires information about the user codes, or it needs to demodulate many different incoming RF signals to track mobile users. These methods are complex processes that are more difficult to implement than tracking users in non-CDMA systems. Furthermore, the wideband nature of DS-CDMA signals restricts the effectiveness of beam forming, interference nulling, spatial interferometry multiplexing, and other techniques employed by adaptive antenna arrays.

U.S. Pat. No. 6,211,671 is one of the earliest references that describe interference cancellation in a non-beamforming type of array processor. A wideband signal is separated into narrowband signal components to optimize cancellation efficiency. This decomposition also reduces computational complexity. Interference cancellation compensates for propagation-path differences and differences in receiver responses to interfering multi-frequency signals.

U.S. Pat. No. 6,008,760, which is assigned to the same entity as the '671 patent, illustrates this cancellation method in a communication system that uses multi-element transmitters and receivers to create a plurality of same-frequency spatial subchannels.

U.S. Pat. Nos. 5,671,168 and 5,528,581 describe the application of well-known beam-forming processes to OFDM. U.S. Pat. No. 6,144,711 describes a simple combination of well-known OFDM and array-processing techniques.

U.S. Pat. No. 6,128,276 describes an application of antenna-array processing to well-known "stacked-carrier" spread spectrum communications in which duplicates of a data sequence are transmitted over different frequencies to achieve frequency diversity. Random or pseudorandom spreading weights are applied to each frequency band to facilitate multiple access. These spreading weights, unlike MC-CDMA weights, may provide both amplitude and phase adjustment. However, like MC-CDMA and other redundantly modulated multicarrier protocols, the spreading weights described in '276 do not enable carrier interferometry nor do they achieve the enormous throughput and performance improvements enabled by carrier interferometry.

In conventional multicarrier protocols, such as OFDM, DMT, and MC-CDMA, spreading is performed by energizing bins of a fast Fourier transform (FFT). U.S. Pat. Nos. 5,282, 222, 6,175,550, and 5,608,764 illustrate exemplary OFDM transceivers. Blocks of coded data bits are serial-to-parallel converted and input into an N-point inverse-FFT (IFFT) operation. The output of the IFFT is parallel-to-serial converted to produce an OFDM signal having N frequency components. Time-domain samples of a received OFDM signal are serial-to-parallel converted and operated upon with an N-point FFT before being parallel-to-serial converted into a recovered data stream.

The N-point transforms used in OFDM essentially map one set of data symbols onto another set of data symbols. Each transform of a transform pair provides the basis for mixing symbols together to form a code that can be reversed by the complementary transform. In addition to Fourier transforms, other transform pairs are described in U.S. Pat. Nos. 5,282,222 and 6,192,068. This type of coding enables an overlay of multiple codes, which is referred to as "multi-code" spread spectrum.

One technique for implementing a Fourier transform includes filtering a time-domain sequence of input symbols. A polyphase FIR filter bank can be implemented equivalently with an N-point discreet Fourier transform (DFT) or inverse DFT (as illustrated by J. G. Proakis in "Digital Signal Processing," $3^{rd}$ edition, p 825-831). Linear FIR filtering performed via the DFT typically involves segmenting the input symbols into blocks. The blocks are processed via the DFT and/or the IDFT to produce a block of output data. Common filtering techniques include the overlap-save method and the overlap-add method. The resulting output symbols are complex-weighted sums of the input symbols.

Various techniques have been developed to efficiently process Fourier transform algorithms, such as described in U.S. Pat. Nos. 6,169,723, 6,137,839, 5,987,005, 5,297,236, and 5,365,470. However, none of the prior-art Fourier transform techniques provide a means to replace direct-sequence processing with Fourier transforms or equivalent frequency-domain operations.

More recently, wavelet theory developed in response to perceived limitations to Fourier analysis and windowed Fourier techniques. Like string theory in quantum mechanics, wavelets provide an effective microscopic basis for describing macroscopic phenomena. However, one of the problems with conventional wavelet theory is that it relies on an abstraction with no physical basis to describe physical phenomena. In Hubbard's *The World According to Wavelets*, Meyer states that a Fourier transform is real, whereas wavelets do not have a physical existence. J. C. Van den Berg states that "wavelets cannot be interpreted in physical terms as easily as sines and cosines and their frequencies." This causes a major disconnect between interpretation and reality. As a result, engineers who work with wavelet transforms often have difficulty with the interpretation. In contrast, the intuitive nature of Fourier transforms is due to their direct association with real phenomena.

None of the prior-art references implement frequency-domain reception for direct-sequence signals. The prior-art references do not enable orthogonal multicarrier processing to be applied to direct-sequence spread-spectrum signals. Conventional direct-sequence protocols are not compatible with many types of adaptive array processing. The prior-art references fail to provide simultaneous improvements of increased throughput and enhanced performance to DSSS and DS-CDMA systems. No prior-art references describe a wave-based signal-processing technology that radically improves coding, wavelet, and Fourier-transform operations. None of the prior-art communication and signal-processing algorithms are based on principles of wave mechanics and quantum interferometry that describe the fundamental nature of all matter and energy.

SUMMARY OF THE INVENTION

Carrier Interferometry (CI) is a class of multicarrier-processing techniques that use sets of phase shifts (i.e., phase spaces) to overlay and separate data streams that are redundantly modulated onto the same sets of carrier signals. Multiple carriers are redundantly modulated with data streams that are orthogonalized by virtue of the different sets of phase spaces encoding each data stream. Interference between the carriers provides the means to orthogonalize the data streams, whether the carriers are combined or processed separately.

CI achieves the benefits of both narrowband and wideband processing. Narrowband processing is simpler than wideband processing. For example, multipath distortions in a narrowband signal can be characterized by a single attenuation and phase offset. Array processing, such as phased-array, adaptive beam forming, space-time, space-frequency, and spatial-interferometry techniques, are more effective and more easily performed with narrowband signals. This is important because array processing enables frequency reuse via spatial division multiple access, which greatly improves system capacity.

Wideband processing can provide benefits of frequency diversity. Path diversity exploits the short symbol length of a wideband signal relative to multipath delay. Path-diversity processing, such as RAKE reception, coherently combines multiple reflections of a desired signal. Frequency-diversity combining processes the reflected energy more efficiently, thus increasing transmission range or reducing required transmission power.

CI avoids multipath-interference problems of both wideband and narrowband signals while appearing like a conventional transmission protocol, such as TDMA or DS-CDMA. Inter-symbol interference occurs when a reflected signal travels a distance sufficiently greater than the distance traversed by a line-of-sight signal so as to cause a delay greater than the duration of a data symbol. This causes an earlier transmitted data symbol to interfere with a later symbol at a receiver. CI avoids inter-symbol interference by transmitting data symbols on narrowband carriers. The long symbol duration associated with a narrowband carrier ensures that multipath delays do not exceed the symbol duration. However, multipath fading occurs when a narrowband signal traverses two paths having a half-cycle phase difference.

CI avoids the problem of multipath fading by redundantly modulating each data symbol onto multiple carriers that are adequately separated with respect to frequency. Data symbols will not be lost to multipath fading if the carriers fade independently. However, redundant modulation typically reduces bandwidth efficiency.

CI avoids the problem of reduced bandwidth efficiency by modulating up to 2N coded data symbols on each of N carriers. However, conventional information theory shows that multiple signals occupying the same frequency band and time interfere with each other. Increased interference on one or more carriers typically increases probability of error.

CI avoids the problem of increased interference and probability of error by exploiting interferometry to orthogonalize data symbols modulated on the same carriers. Interference on each carrier cancels when the carriers are combined. This allows desired signals to be separated from interfering signals via superposition. Thus, CI-based multiple-access protocols achieve higher throughput with better signal quality than any other multiple-access protocols.

CI is distinguishable from conventional multicarrier modulation (MCM) techniques because it achieves both frequency diversity and bandwidth efficiency. CI is distinguishable from OFDM in that CI orthogonalizes data symbols via interferometry in the frequency domain whereas OFDM merely separates data symbols onto non-interfering frequencies. CI differs from MC-CDMA in that polyphase CI codes replace Hadamard-Walsh or Gold codes typically used with MC-CDMA. This provides significant differences between signal and operational characteristics of CI-based and MC-CDMA systems. For example, in MC-CDMA, CI codes are capable of doubling network capacity with almost no performance degradation. Furthermore, CI signals are substantially insensitive to phase jitter and frequency offsets, which are recognized as the major disadvantage of conventional MCM.

CI codes may be employed in direct-sequence-like coding. Additionally, CI codes may be used for channel coding. CI codes and/or CI-based signaling may be used to encode data bits and/or data symbols. CI coding and CI-based codes may include interleaving.

CI enables the application of a redundantly modulated multicarrier architecture to conventional transmission protocols, such as TDMA, DS-CDMA, MC-CDMA, and OFDM. Specifically, CI carrier signals combine to generate a superposition signal having time-domain characteristics that can be controlled via selection of the CI carrier characteristics (such as phase, frequency, and amplitude). This enables CI to be compatible with legacy systems that use TDMA, DS-CDMA, pulse radio, etc. CI also improves existing multicarrier protocols (such as OFDM and MC-CDMA). Thus, CI creates a common multicarrier architecture for all conventional transmission protocols.

The application of CI to DSSS and DS-CDMA is referred to as CI/DS-CDMA. At the transmit side, the usual sinc and raised cosine pulse shapes used with DS-CDMA are replaced by a CI signal. For example, a DS-CDMA chip-shaping filter at a code generator is replaced with a chip-shaping filter matched to the CI signal. At the receive side, a RAKE receiver in a typical DS-CDMA receiver is replaced by a receiver that performs frequency decomposition and recombining. Each chip is separated into its N frequency components and recombined in a manner that provides (1) optimal frequency-diversity benefits, (2) minimal inter-chip interference, and (3) a reduction in additive noise power. Possible combining techniques include equal-gain combining (EGC), orthogonal restoring combining (ORC), and minimum mean squared error combining (MMSEC). Upon recombining the chips, DS-CDMA spreading codes may be applied to separate data symbols and/or data streams from each other. Variations to these transmit and receive side processing techniques, as well as other types of processing, are described in the preferred embodiments.

Although the time-domain characteristics of CI/DS-CDMA signals are similar to DSSS and DS-CDMA signals (thus, making them compatible with conventional DS-CDMA networks), CI/DS-CDMA signals differ from DSSS and DS-CDMA signals. Instead of spreading information symbols over code chips (i.e., the time domain), CI spreads information symbols over interfering subcarriers (i.e., the frequency domain). Consequently, the frequency-domain characteristics of transmitted CI/DS-CDMA signals are fundamentally different than the frequency-domain characteristics of DSSS and DS-CDMA signals. Furthermore, received CI/DS-CDMA signals are processed in the frequency domain (e.g., via frequency decomposition and combining), whereas received DSSS and DS-CDMA signals are processed in the time domain (e.g., via RAKE receivers).

Frequency-domain selectivity enables independent provisioning of CI sub-carrier channels to users who may only need a fraction of the bandwidth of a communication channel. In optical-fiber systems, a CI signal is composed of multiple narrowband subcarriers that are less sensitive to channel impairments, such as delay mode distortion. Thus, CI eliminates the need for high-speed equalization. This significantly reduces transceiver complexity and can increase the range of optical communication systems. The CI signal architecture, as well as efficient modulation (e.g., phase-shift modulation, polarization-shift modulation) achieves higher data rates with lower-frequency optoelectronics.

The frequency profile of a CI superposition signal can be controlled by adjusting weights of CI carriers and/or selecting CI carrier frequencies. This enables conventional single-carrier protocols, such as TDMA and DS-CDMA, to be implemented with a CI carrier architecture distributed across non-continuous frequency bands. CI is also complementary to SONET and wavelength-division multiplexing in optical fiber.

Carrier-weight adjustment facilitates adaptation to multipath and jamming environments. Carrier weights may be used by either or both a transmitter and a receiver to compensate for fading and/or other forms of signal degradation, avoid deep fades and/or interference, and/or optimize transmission power efficiency. A CI signal may be frequency hopped to avoid interference and/or fading. Frequency hopping may be employed to enhance security or frequency diversity.

CI allows network providers to deliver signals that are data rate and protocol independent. This allows rapid, independent provisioning of sub-carrier channels. Scalability is provided by adding CI sub-carriers, thus allowing a "pay as you grow"

approach. Additionally, only one network element needs to be provisioned in order to reconfigure the network.

Frequency-domain and time-domain adjustments of CI superposition signals may be employed to generate wavelets. This link between CI and wavelets enables a simple conversion between CI carrier selection and weight adjustment and wavelet scaling and shifting. CI also provides a multicarrier architecture for encoding, transmitting, and receiving wavelets.

It is an object of the present invention to provide all types of communication signals with immunity to fading, intersymbol interference, and other forms of channel distortion.

An advantage of the present invention is that it provides a common multicarrier platform that can be designed for TDMA, DS-CDMA, MC-CDMA, pulse radio, and OFDM. This can be implemented as a software-defined radio system that uses simple algorithms combined with CI to select different multiple-access protocols.

An advantage of the present invention is that a radio communication method is provided that is compatible with high-order digital modulations.

An advantage of the present invention is that a CDMA radio communication method is provided that can be used with transceiver arrays.

An advantage of the present invention is that a CDMA radio communication method is provided that is compatible with advanced array adaptation techniques and thereby separates signals based on spatial diversity, frequency diversity, and combined spatial/spectral diversity.

CI signals enable antenna arrays to achieve directionality and spatial diversity simultaneously. This reduces the cost of antenna infrastructure deployment and improves system performance. Thus, the invention allows concentration of complex operations at base stations in point-to-multipoint communication links, greatly reducing the cost of the overall system.

An advantage of the present invention is that a radio communication method is provided that has space division multiple access, interference excision, and channel equalization capability.

An advantage of the invention is that it increases throughput of wireless and guided-wave communications. CI-based protocols are highly bandwidth efficient, allowing higher data throughput in a given amount of spectrum than any other transmission protocol. CI provides higher data rates and supports more users than any other transmission protocol.

An advantage of the invention is that it enables improved signal quality. CI signals are highly resistant to interference and distortion.

An advantage of the invention is that it greatly reduces transmit power requirements. Received CI signals can be combined to use all of the transmitted signal energy that gets reflected on the way to the receiver. Other technologies make little or no use of reflected energy.

Some of the many wireless applications of the invention include local-area networks, cellular communications, personal communication systems, broadband wireless services, data link, voice radio, satellite links, tagging and identification, wireless optical links, campus-area communications, wide-area networks, last-mile communication links, and broadcast systems. The invention may be used in non-wireless communication systems, such as guided wave, cable, wire, twisted pair, optical fiber, and any networks connected via conducting elements.

Various aspects of the invention are applicable to many types of signal processing. Some of these types of processing include, but are not limited to, transducer-array processing, space-time processing, space-frequency processing, interferometry, filtering, wavelet processing, transform operations, frequency conversion, diversity processing, correlation, channel coding, error-correction coding, multiple-access coding, spread-spectrum coding, channel compensation, correlation, transmission-protocol conversion, and security coding and authentication. Other applications and embodiments of the invention are apparent from the description of preferred embodiments and the claims that follow.

BRIEF DESCRIPTION OF THE DRAWINGS

FIG. 15A illustrates a plurality of orthogonal phase spaces corresponding to a plurality of CI carrier frequencies.

FIG. 15B shows a matrix of phase-shifted symbol values corresponding to carrier frequencies (rows) and phase spaces (columns).

FIG. 29A shows a conventional 4×4 Hadamard-Walsh matrix that may be used in the invention.

FIG. 29B shows a basic 4×4 CI matrix.

FIG. 30A shows a 4×4 CI matrix multiplied by a first row of a Hadamard-Walsh matrix.

FIG. 30B shows a 4×4 CI matrix multiplied by a second row of a Hadamard-Walsh matrix.

FIG. 30C shows a 4×4 CI matrix multiplied by a third row of a Hadamard-Walsh matrix.

FIG. 30D shows a 4×4 CI matrix multiplied by a fourth row of a Hadamard-Walsh matrix.

FIG. 31A illustrates a selection of quaternary-phase vectors from the matrices shown in FIG. 30A and FIG. 30C.

FIG. 31B illustrates a selection of binary-phase vectors from the matrices shown in FIG. 30A and FIG. 30C.

FIG. 31C shows a 4×4 poly-phase code matrix.

FIG. 32A shows an 8×8 Hadamard-Walsh matrix $HW_{8\times8}$ generated from a 4×4 Hadamard-Walsh matrix $HW_{4\times4}$ using the Hadamard-Walsh matrix-expansion technique.

FIG. 32B shows an 8×8 CI matrix $PC_{8\times8}$ generated from the 4×4 polyphase CI matrix shown in FIG. 31C via Hadamard Walsh matrix expansion.

FIG. 32C shows an 8×8 CI matrix $CI_{8\times8}$ generated from a 4×4 CI matrix $CI_{4\times4}$ via Hadamard Walsh matrix expansion.

FIG. 33A shows an 8×8 CI matrix $HW_{8\times8}(1)\times CI_{8\times8}$ resulting from multiplication of the 8×8 CI matrix $CI_{8\times8}$ shown in FIG. 32C by the first row vector $HW_{8\times8}(1)$ of the 8×8 Hadamard-Walsh matrix shown in FIG. 32A.

FIG. 33B shows an 8×8 CI matrix $HW_{8\times8}(2)\times CI_{8\times8}$ resulting from a multiplication of an 8×8 CI matrix $CI_{8\times8}$ by the second row vector $HW_{8\times8}(2)$ in an 8×8 Hadamard-Walsh matrix shown in FIG. 32A.

FIG. 33C shows an 8×8 CI matrix $HW_{8\times8}(3)\times CI_{8\times8}$ resulting from a multiplication of the 8×8 CI matrix $CI_{8\times8}$ by the third row $HW_{8\times8}(3)$ of the 8×8 Hadamard-Walsh matrix shown in FIG. 32A.

FIG. 33D shows an 8×8 CI matrix $HW_{8\times8}(4)\times CI_{8\times8}$ resulting from a multiplication of the 8×8 CI matrix $CI_{8\times8}$ by the fourth row $HW_{8\times8}(4)$ of the 8×8 Hadamard-Walsh matrix, $HW_{8\times8}$.

FIG. 33E shows an 8×8 CI matrix $HW_{8\times8}(5)\times CI_{8\times8}$ resulting from a multiplication of the 8×8 CI matrix $CI_{8\times8}$ by the fifth row vector $HW_{8\times8}(5)$ of the 8×8 Hadamard-Walsh matrix, $HW_{8\times8}$.

FIG. 33F shows an 8×8 CI matrix $HW_{8\times8}(6)\times CI_{8\times8}$ resulting from a multiplication of the 8×8 CI matrix $CI_{8\times8}$ by the sixth row $HW_{8\times8}(6)$ in the 8×8 Hadamard-Walsh matrix, $HW_{8\times8}$.

FIG. 33G shows an 8×8 CI matrix $HW_{8\times8}(7)\times CI_{8\times8}$ resulting from a multiplication of the 8×8 CI matrix $CI_{8\times8}$ by the seventh row vector $HW_{8\times8}(7)$ of the 8×8 Hadamard-Walsh matrix, $HW_{8\times8}$.

FIG. 33H shows an 8×8 CI matrix $HW_{8\times8}(8)\times CI_{8\times8}$ resulting from a multiplication of the 8×8 CI matrix $CI_{8\times8}$ by the eighth row $HW_{8\times8}(8)$ in the 8×8 Hadamard-Walsh matrix, $HW_{8\times8}$.

FIG. 34A shows a set 16 octonary codes C(n) generated from multiplying an 8×8 CI matrix $CI_{8\times8}$ by rows $HW_{8\times8}(n)$ of the 8×8 Hadamard-Walsh matrix $HW_{8\times8}$.

FIG. 34B shows auto correlations and cross correlations of the 16 octonary codes C(n) shown in FIG. 34A.

FIG. 43B illustrates an M-ary trellis diagram that represents the function of the polyphase convolutional encoder shown in FIG. 43A.

FIG. 43C illustrates polyphase channel coding that may be provided by a CI channel coder coupled to a modulator adapted to perform M-ary modulation.

FIG. 43D illustrates a CI Trellis decoding technique that may be used to decode CI-coded signals.

FIG. 54A illustrates a method of sub-channel coding.

FIG. 54B shows a subchannel coding technique combined with time-domain coding.

FIG. 55 shows an embodiment of a transmitter for combined channel coding and multiple access.

FIG. 56 illustrates a receiver associated with the transmitter shown in FIG. 55.

FIG. 57A shows a continuous frequency-domain profile of a single-carrier signal.

FIG. 57B represents a simplified time-domain profile of a wideband digital signal.

Figure 57A:
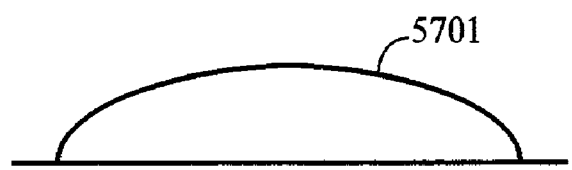
Figure 57B:
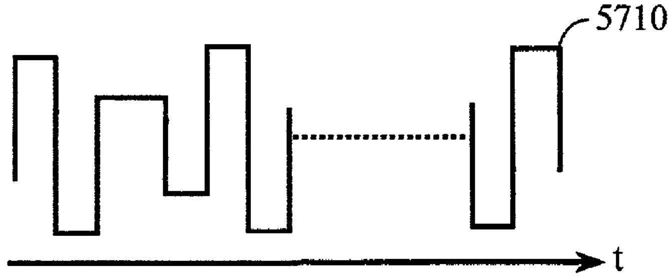
Figure 57C:
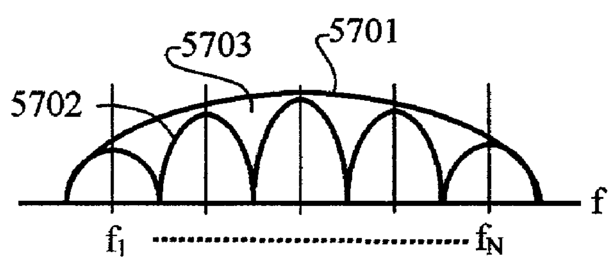

FIG. 57C is a frequency-domain illustration of an inefficient decomposition of the wideband signal into a plurality of narrowband components. The frequency spectra of the components do not overlap. The roll-off factor of an analog filter's frequency response causes some received energy (and thus, information) to be lost.

Figure 58A:
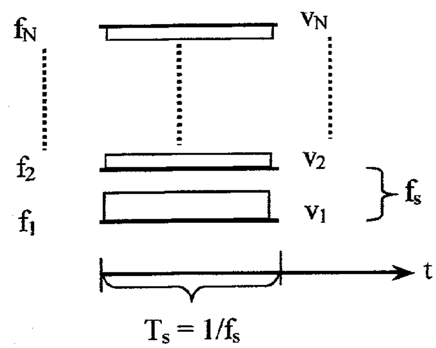

FIG. 58A shows a decomposition of a single-carrier or multicarrier signal into N carrier-frequency components.

Figure 58B:
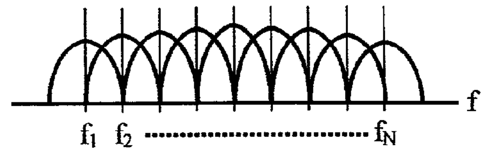

FIG. 58B shows a frequency-domain plot of the signal shown in FIG. 58A.

Figure 58D:
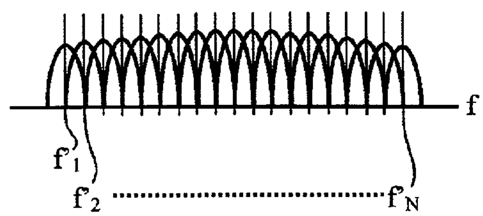
Figure 58C:
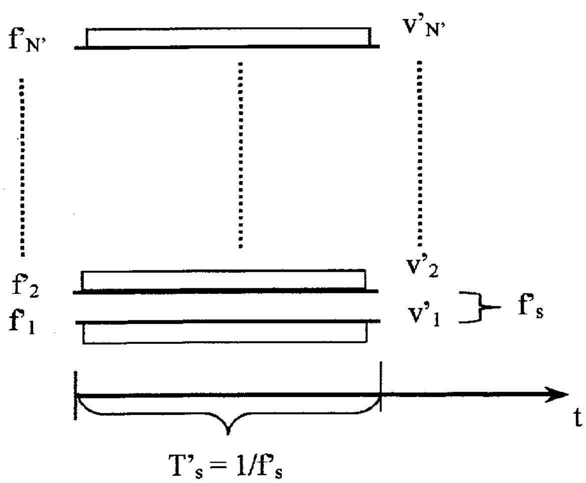

FIG. 58C shows a decomposition of the signal shown in FIG. 58A into N' carrier components where N'>N.

FIG. 58D shows a frequency-domain plot of the signal shown in FIG. 58C.

Figure 58E:
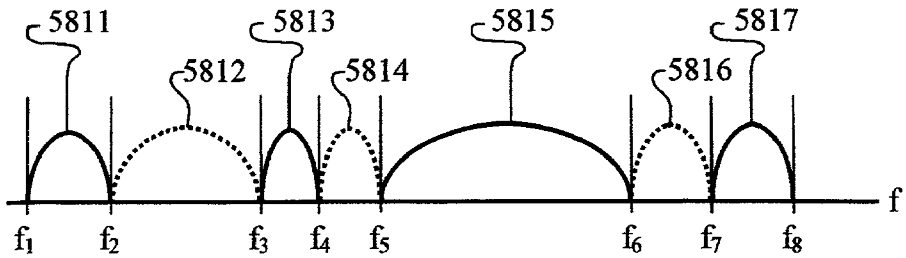

FIG. 58E illustrates a spectral profile selected for transmission or reception in a particular communication channel. Frequency ranges characterized by interference, jamming, fading, and/or frequency allocations to other systems, applications, and/or users can selectively be avoided.

Figure 59A:
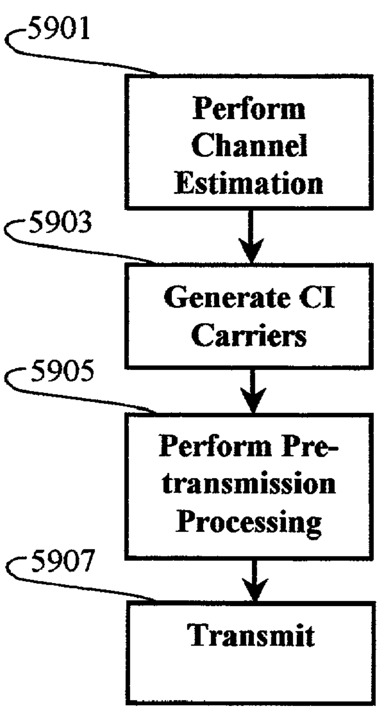

FIG. 59A illustrates a method of generating CI carriers in a transmission system.

Figure 59B:
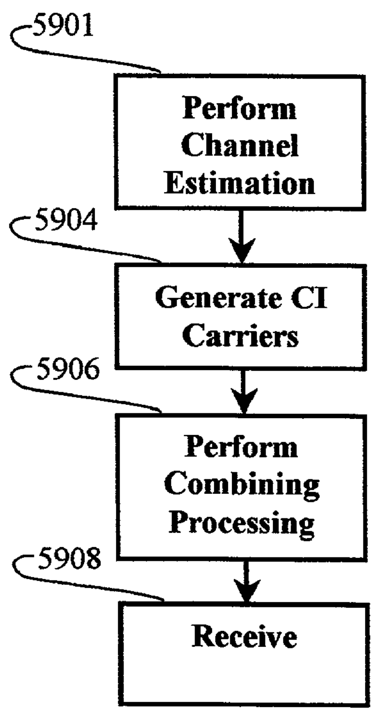

FIG. 59B illustrates a method of generating CI carriers in a decomposition process in a receiver.

Figure 60A:
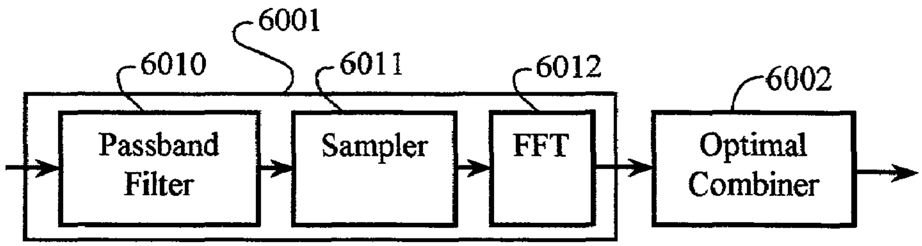

FIG. 60A illustrates a CI receiver adapted to generate a plurality of CI component signals from a received single-carrier signal.

Figure 60B:
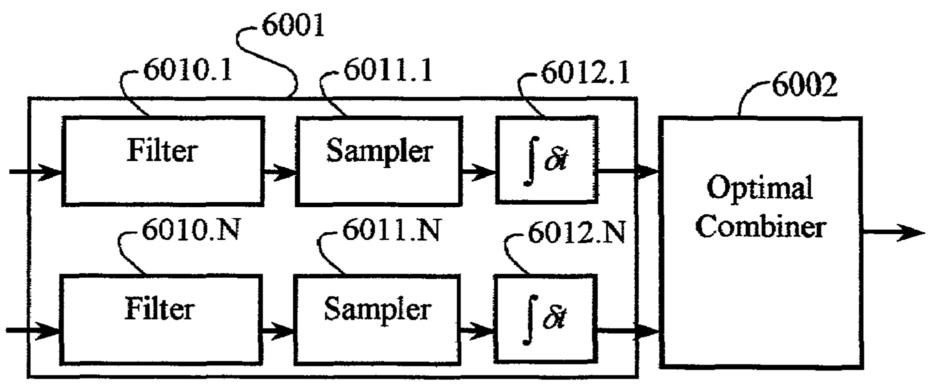

FIG. 60B illustrates an alternative embodiment of a CI receiver adapted to process single-carrier signals.

Figure 61:
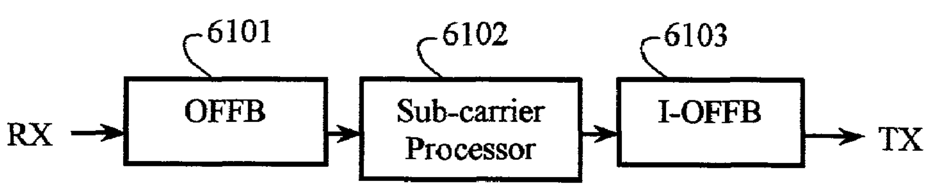

FIG. 61 illustrates a repeater adapted to convert a received signal into overlapping, orthogonal CI sub-carrier components, process the components, and recombine the processed components prior to transmitting the combined components.

Figure 62:
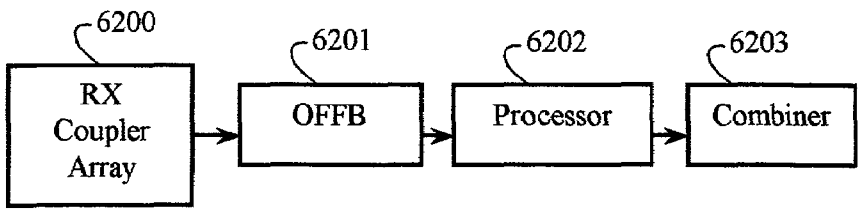

FIG. 62 illustrates a CI receiver coupled to an antenna array wherein the receiver is adapted to process a received single-carrier signal as a plurality of CI components.

Figure 63:
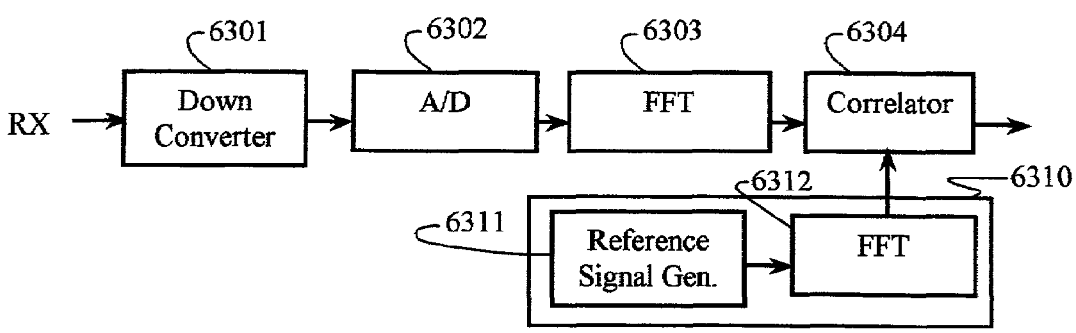

FIG. 63 illustrates a CI-based matched-filter receiver adapted to process a single-carrier signal as a plurality of CI components.

Figure 64A:
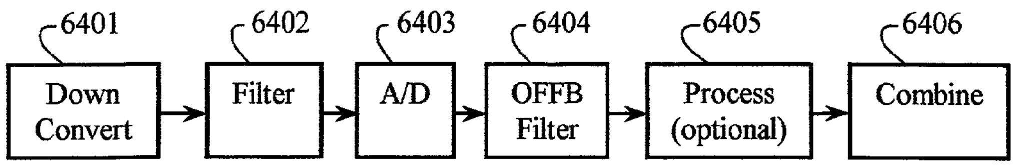

FIG. 64A illustrates a CI receiving method adapted to process a single-carrier signal.

Figure 64B:
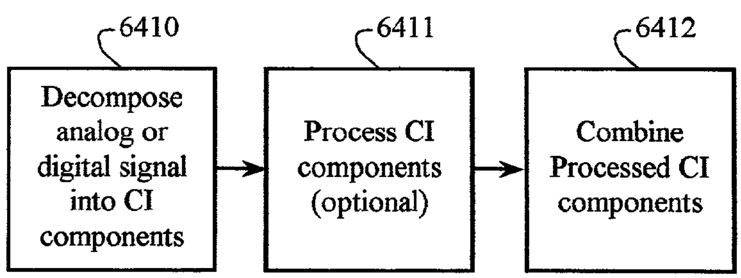

FIG. 64B illustrates basic steps of a CI reception method.

Figure 64C:
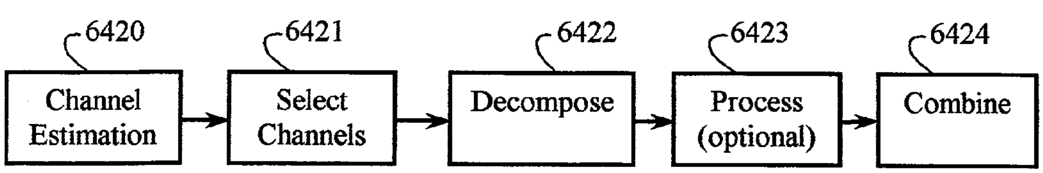

FIG. 64C illustrates basic steps performed by a CI receiver.

Figure 65:
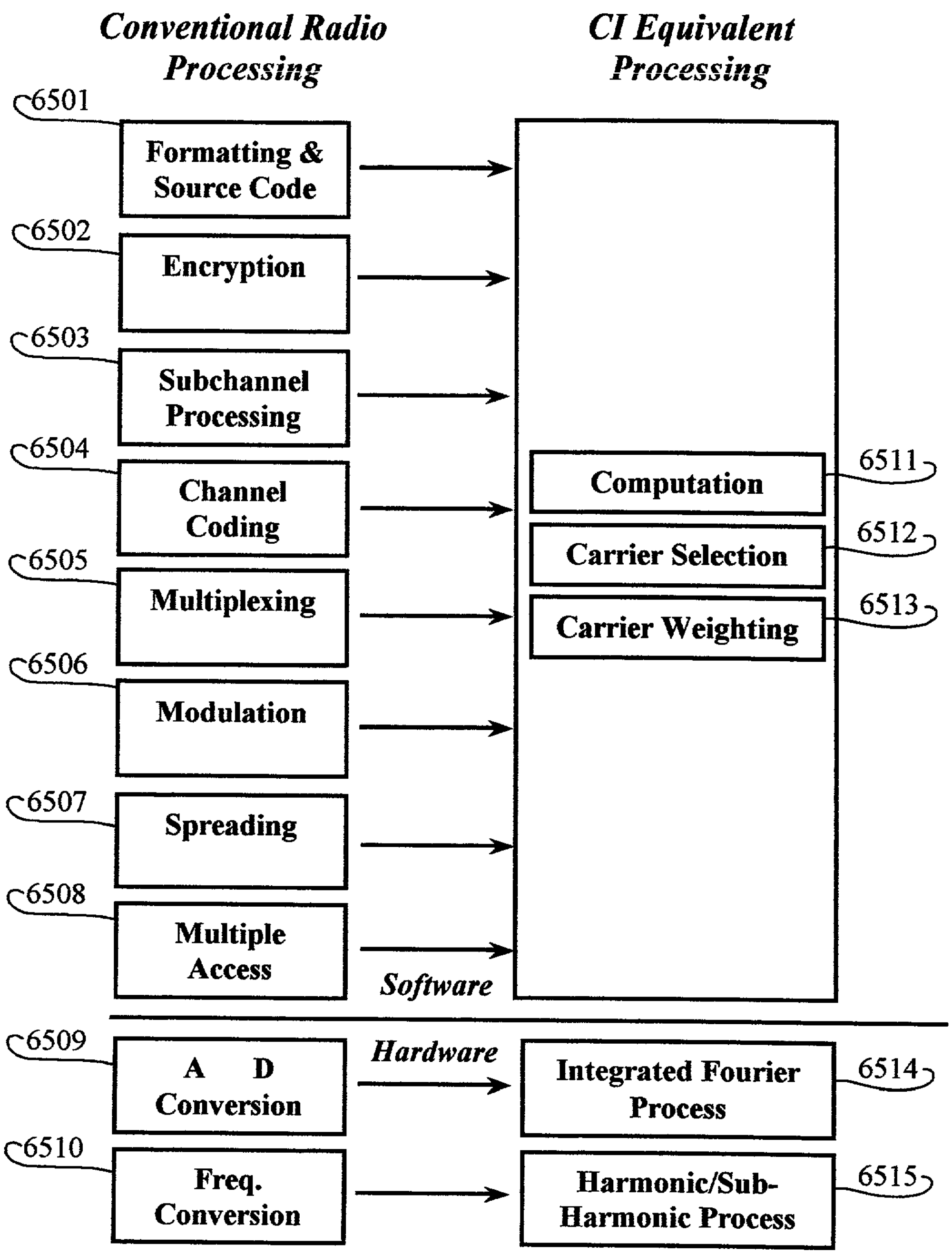

FIG. 65 illustrates how conventional radio-processing techniques can be consolidated into simple CI transceiver processes.

Figure 66:
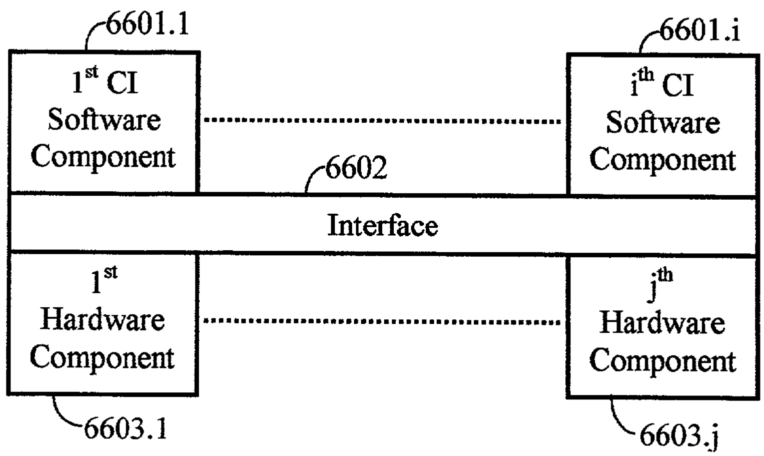

FIG. 66 illustrates an embodiment of a CI-based software-defined radio.

Figure 67:
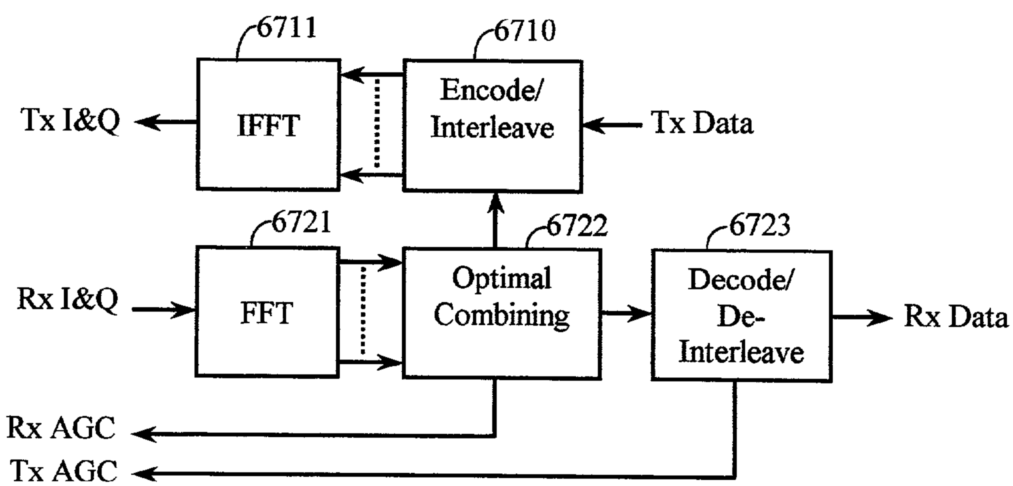

FIG. 67 illustrates basic baseband-processing components of a CI transceiver.

Figure 68:
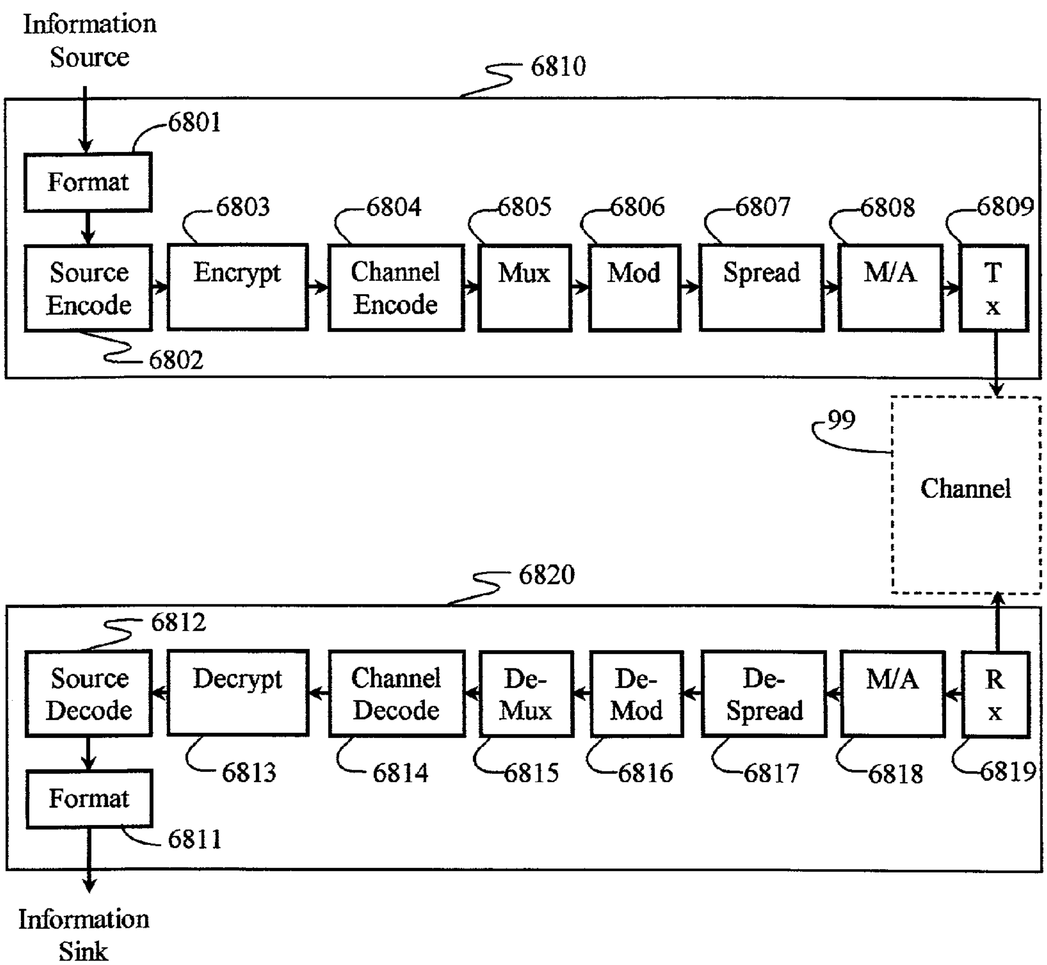

FIG. 68 illustrates transmission methods 6810 and reception methods 6820 of the present invention.

Figure 69A:
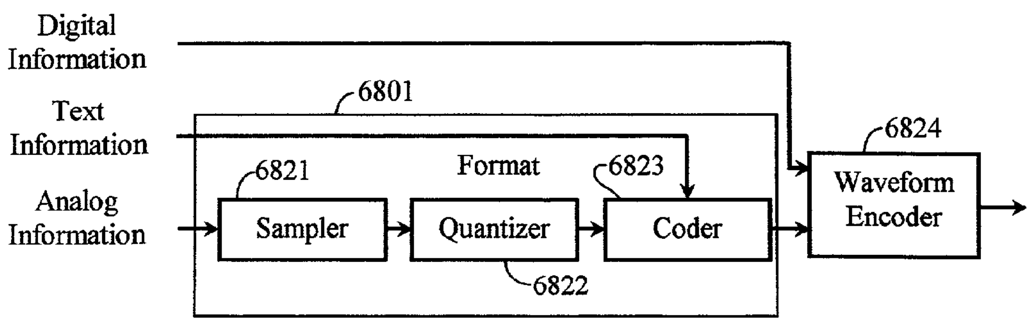

FIG. 69A illustrates how digital, text, and analog signals are formatted for different information signals.

Figure 69B:
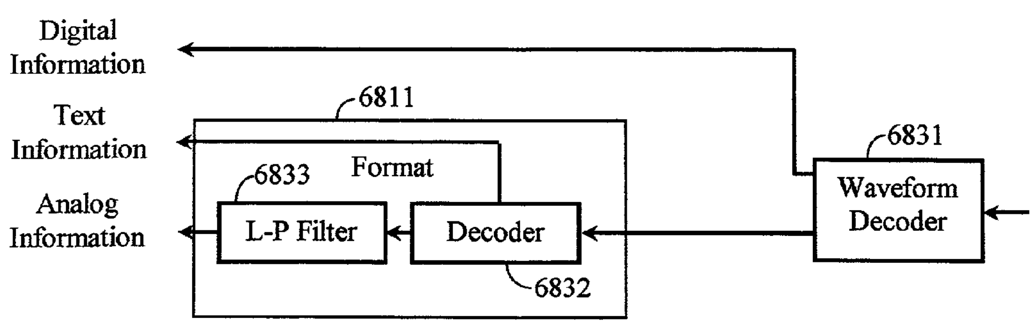

FIG. 69B illustrates a formatting step adapted to process received signals into different information signals.

Figure 70:
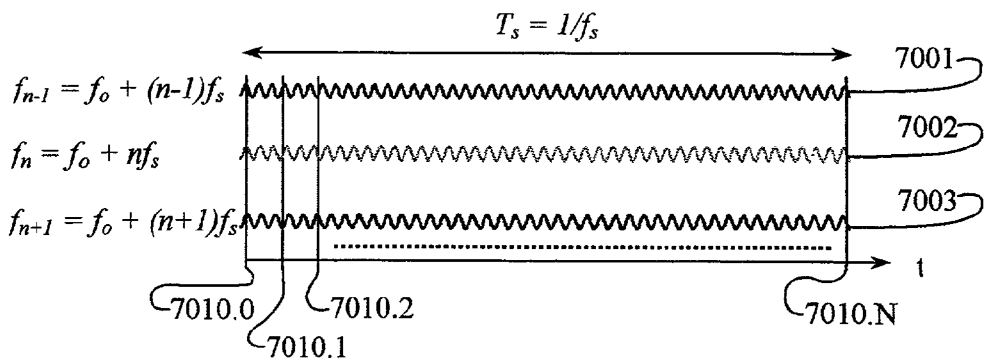

FIG. 70 shows three orthogonal waveforms separated in frequency by integer multiples of a separation frequency.

Figures 71A, 71B, 71C:
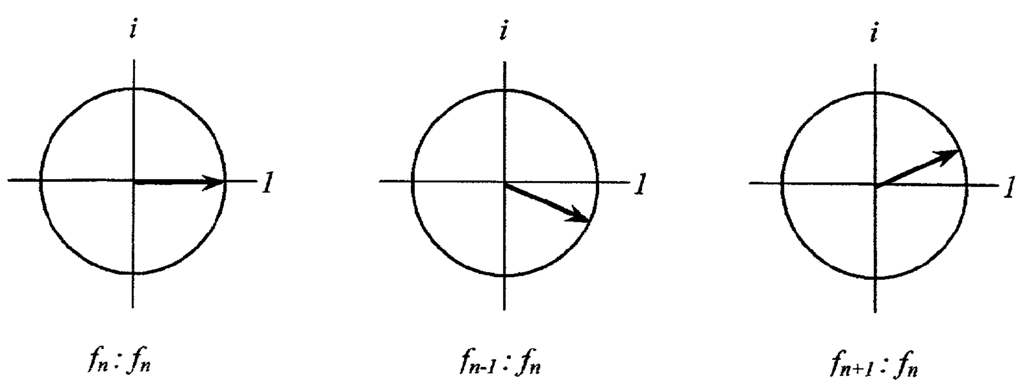

FIG. 71A is a normalized complex-plane representation of samples of a signal having a particular signal frequency collected at a sampling rate that equals, or is some sub-harmonic frequency of, the signal frequency. Each sample corresponds to an integer number of full rotations in the complex plane.

FIG. 71B is a normalized complex-plane representation that illustrates a non-zero progressive phase offset for each sample of a signal having an orthogonal signal frequency (represented by frequency $f_{n-1}$) relative to a sampling rate $f_{sample}=f_n$. Each sample corresponds to less than a full rotation (i.e., $f_{n-1}/f_n$ rotations) in the complex plane.

FIG. 71C is a normalized complex-plane representation that illustrates a non-zero progressive phase offset for each sample of a signal having an orthogonal signal frequency (represented by frequency $f_{n+1}$) relative to a sampling rate $f_{sample}=f_n$. Each sample corresponds to a greater than full rotation (i.e., $f_{n+1}/f_n$ rotations) in the complex plane.

Figure 72:
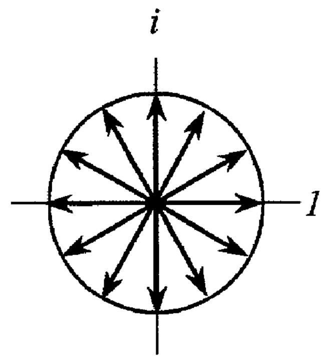

FIG. 72 is a normalized complex-plane representation of samples collected over a symbol interval. In this case, samples of a signal having a signal frequency $f_{signal}$ collected at a sampling rate $f_{sample} \neq f_{signal}$ where $f_{sample}$ is orthogonal to $f_{signal}$, fill an integer number of full rotations in the normalized complex plane. The samples are uniformly spaced throughout the unit circle, and thus, cancel.

Figure 73:
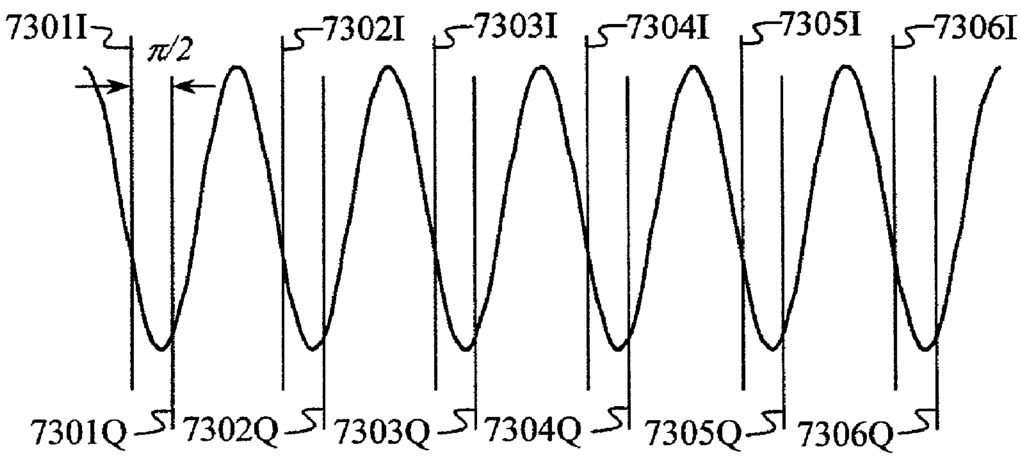

FIG. 73 illustrates in-phase and quadrature-phase samples collected at a particular sampling rate.

Figure 74A:
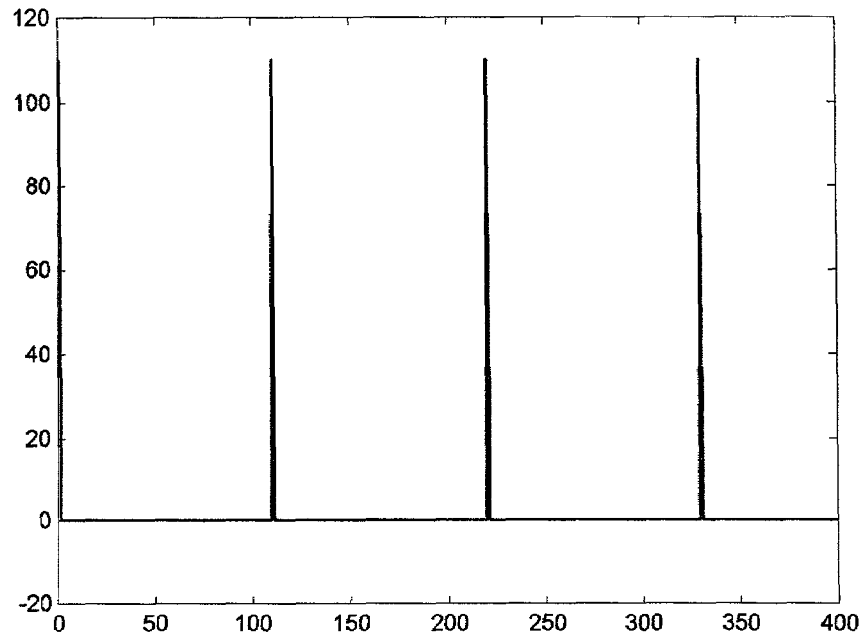

FIG. 74A illustrates combined values of 110 CI samples for each of 400 frequencies in intervals of one cycle per symbol period $T_s$.

Figure 74B:
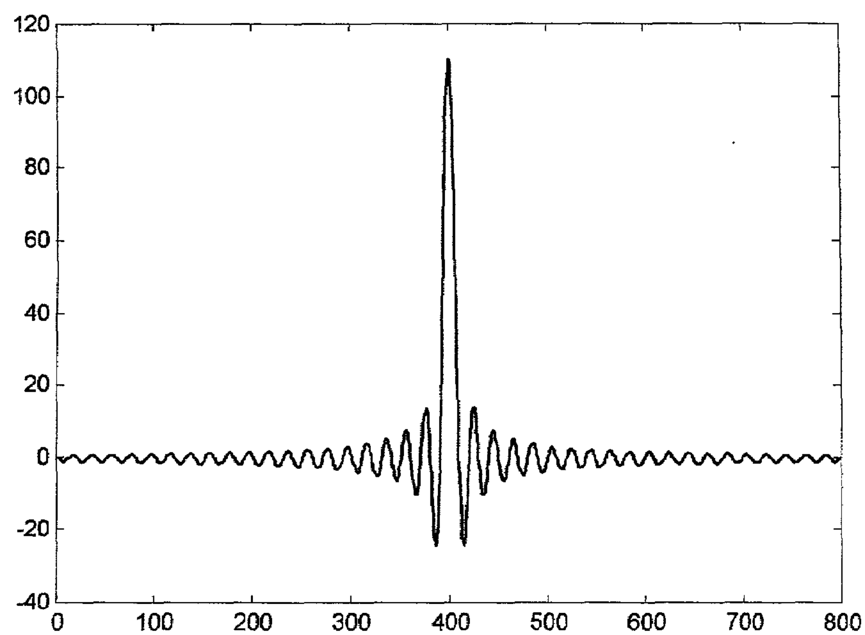

FIG. 74B illustrates the combined values of 110 CI samples for each of 800 frequencies spaced at 0.05 cycles-per-period intervals and centered at 110 cycles per symbol period.

Figure 74C:
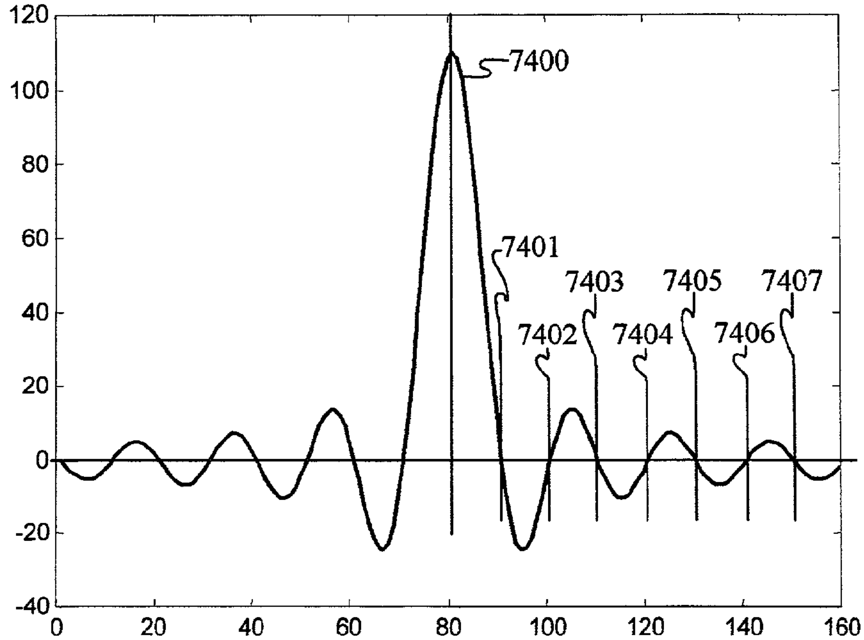

FIG. 74C illustrates a plot of sums of samples collected at a particular sample frequency for a plurality of sampled signal frequencies.

Figure 75:
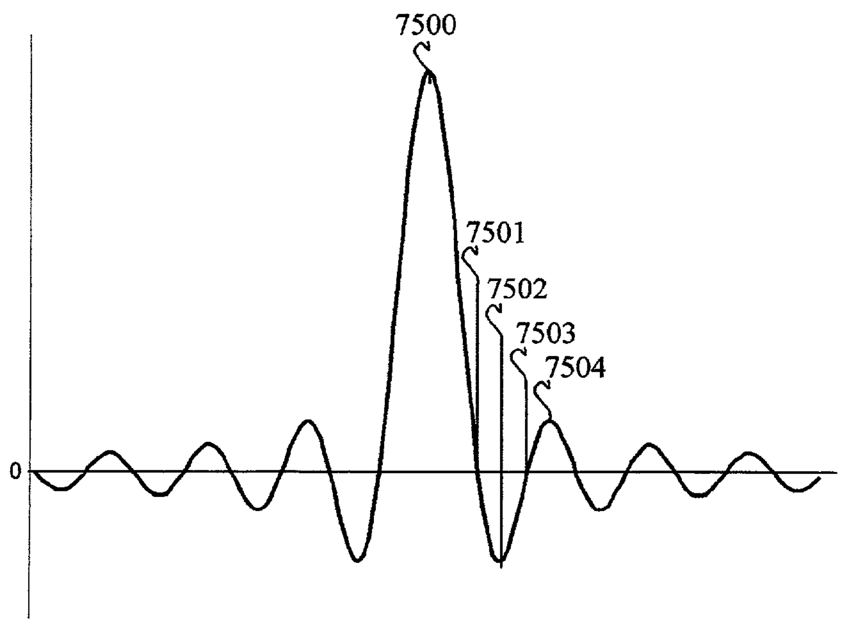

FIG. 75 is a plot of sums of samples collected at a particular sample frequency for a plurality of sampled signal frequencies.

Figure 76A:
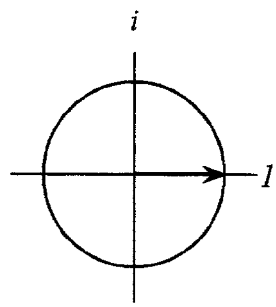

FIG. 76A illustrates samples of a signal having a frequency $f_n$ sampled at a sample frequency $f_{sample}=f_n$. The samples are represented as vectors in a normalized complex plane. Since $f_{sample}=f_n$, the vectors map onto the same position in the complex plane. Thus, the samples add constructively.

Figure 76E:
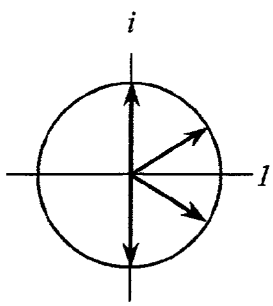
Figure 76B:
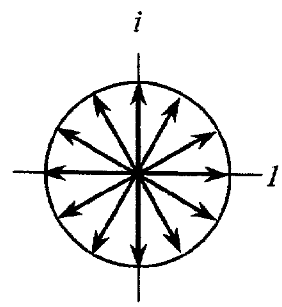

FIG. 76B shows a representation of samples mapped as vectors in a normalized complex plane. The sample frequency is $f_{sample}=f_n$ and the sampled signal's frequency is $f_{signal}=f_{n+1}$. Since the sample and signal frequencies are orthogonal to each other and the samples are collected over a symbol interval $T_s=1/f$, the samples are uniformly distributed around a unit circle in the complex plane. The samples combine destructively to produce a zero value.

Figure 76D:
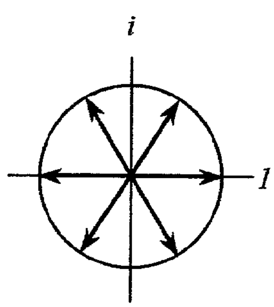
Figure 76C:
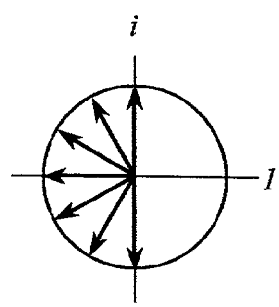

FIG. 76C shows samples mapped on a unit circle in a complex plane. The samples correspond to a sample frequency of $f_{sample}=f_n$ and a sampled signal frequency of $f_{signal}=f_{n+1.5}$. The samples are collected over a symbol interval $T_s=1/f_s$. Since the sample and signal frequencies are not orthogonal, there is a non-uniform distribution of samples over the unit circle. Some of the samples combine constructively to produce a non-zero value.

FIG. 76D illustrates a plurality of samples mapped onto a unit circle in a normalized complex plane. The samples correspond to a sample frequency of $f_{sample}=f_n$ and a sampled signal frequency Of $f_{signal}=f_{n+2}$. The samples are collected over a symbol interval $T_s=1/f_s$. Since the sample and signal frequencies are orthogonal and not harmonically related, the samples are distributed uniformly around the unit circle.

When the samples are summed, they cancel.

FIG. 76E shows samples mapped on a unit circle in a complex plane. The samples correspond to a sample frequency of $f_{sample}=f_n$ and a sampled signal frequency of $f_{signal}=f_{n+2.5}$. The samples are collected over a symbol interval $T_s=1/f_s$. Since the sample and signal frequencies are not orthogonal, there is a non-uniform distribution of samples over the unit circle. The samples combine to produce a non-zero value.

Figure 77A:
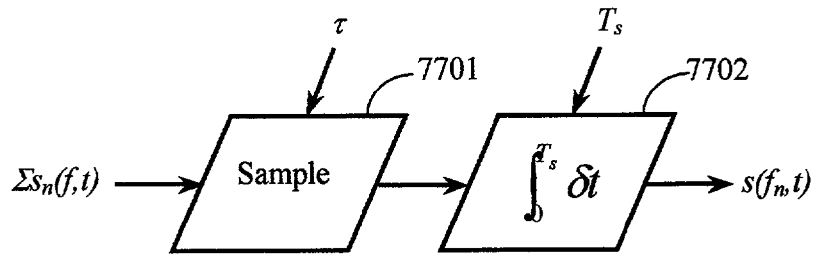

FIG. 77A is a functional diagram that illustrates apparatus and method embodiments of a coherent CI sampler.

Figure 77B:
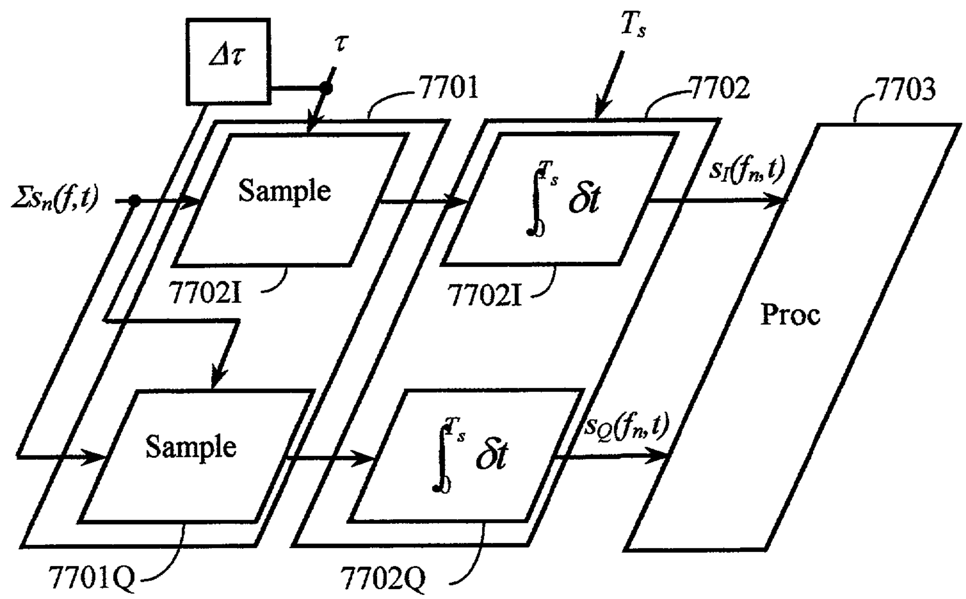

FIG. 77B shows an alternative functional diagram that illustrates apparatus and method embodiments of a coherent CI sampler.

Figures 78A, 78B:
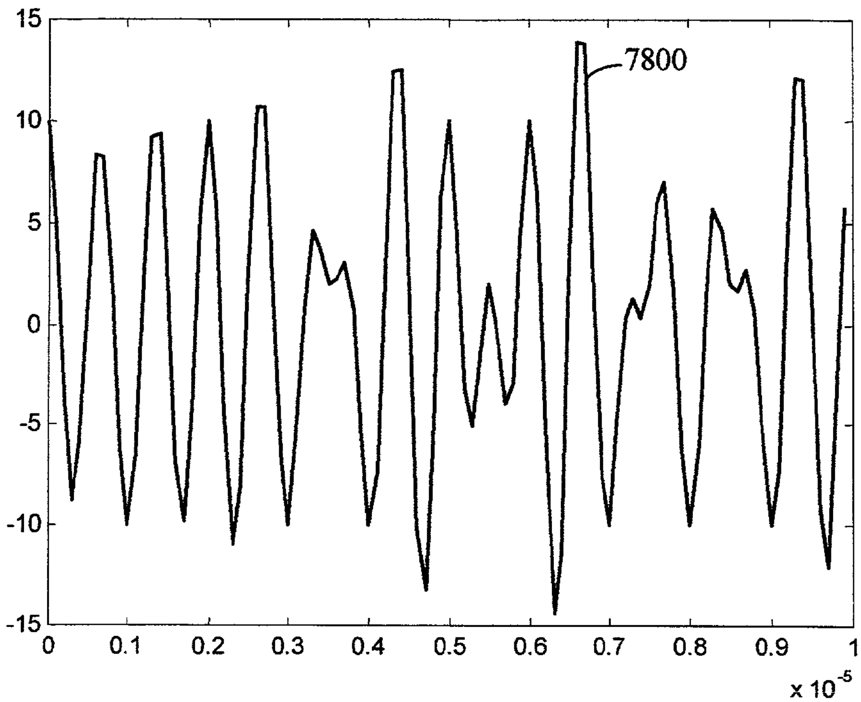

FIG. 78A shows part of a coded CI waveform that may be processed using a CI sampling algorithm.

FIG. 78B shows a table that illustrates 10 transmitted data symbols and corresponding non-normalized received signal values for each of 10 phase spaces.

Figure 79A:
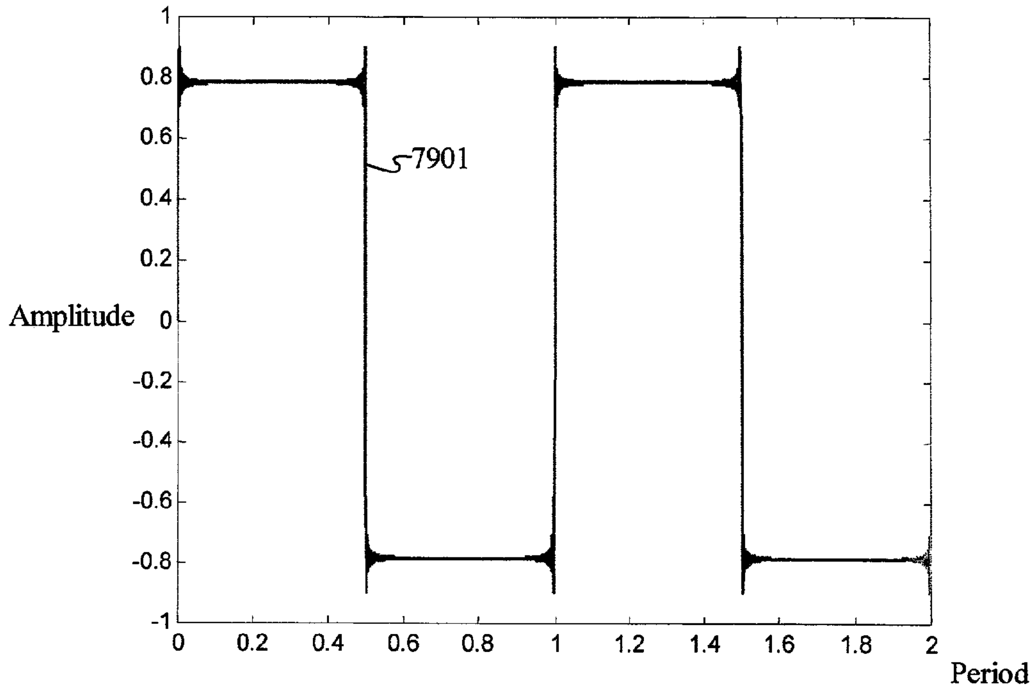

FIG. 79A illustrates two periods of a step function constructed from a superposition of odd-numbered sinusoids.

Figure 79B:
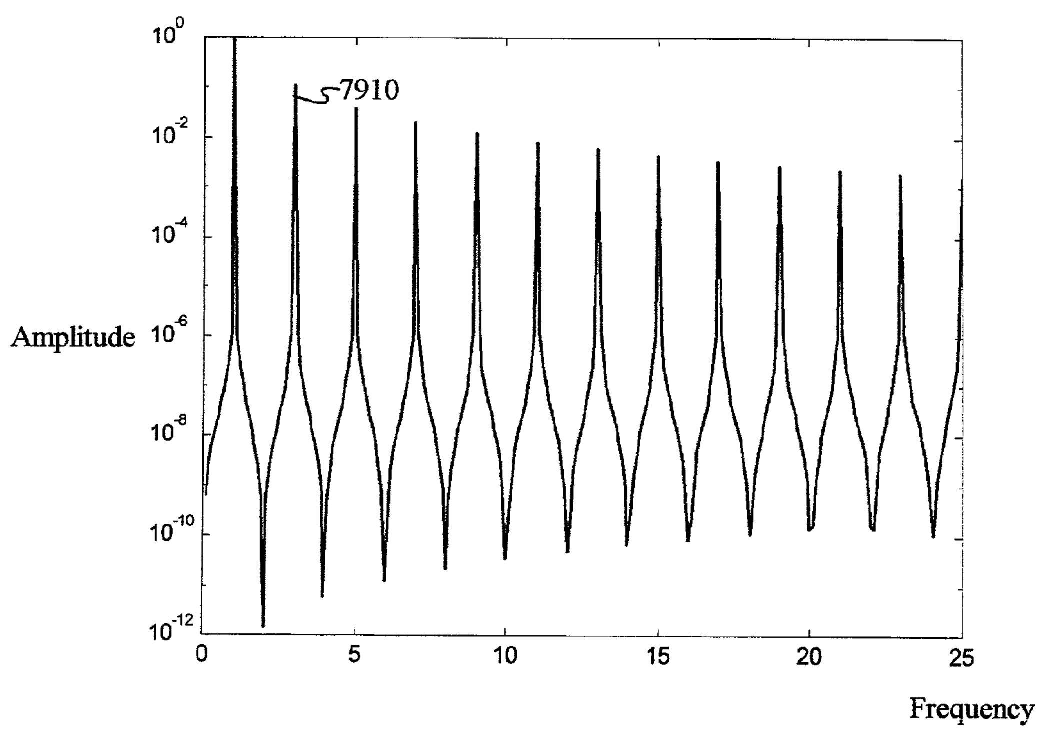

FIG. 79B illustrates a portion of a Fourier transform of the step function shown in FIG. 79A.

Figure 80A:
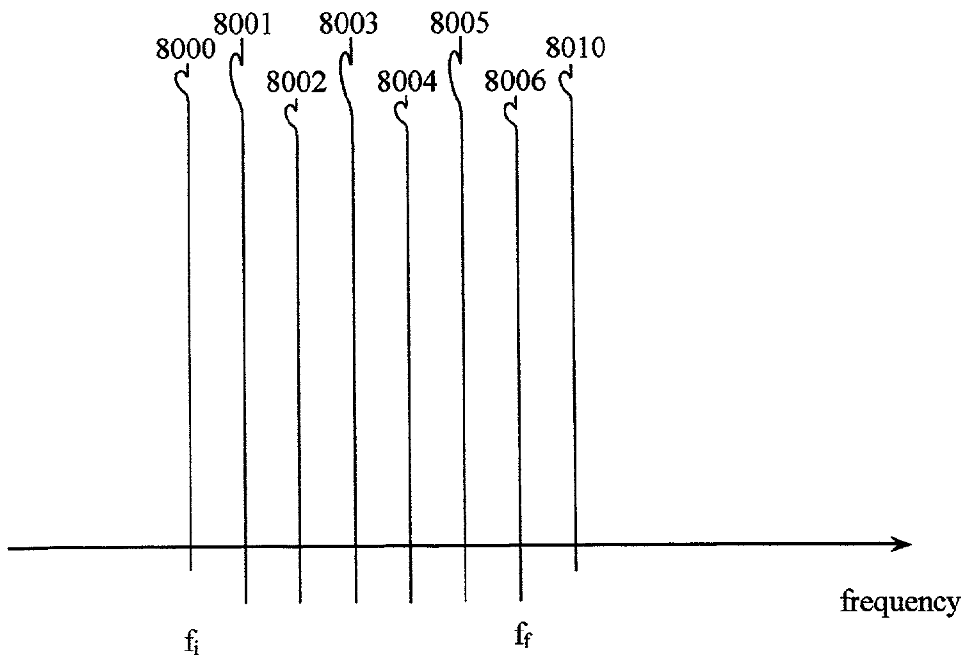

FIG. 80A is a frequency-domain representation showing a first frequency component of a sampling step function that equals a desired carrier frequency. A plurality of orthogonal frequencies is also shown that may correspond to undesired carrier frequencies. A second frequency component of the step function is also shown. The second frequency corresponds to a harmonic of the first frequency. If a carrier frequency equals the second frequency, then the sampling step function generates non-zero values for both carrier frequencies.

Figure 80B:
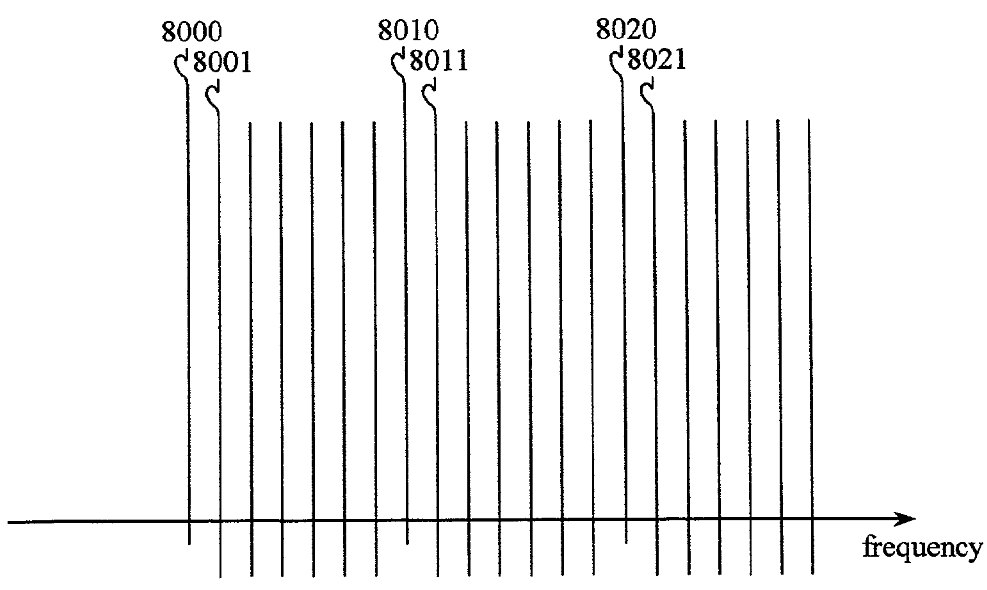

FIG. 80B is a frequency-domain profile that shows a first plurality of harmonics corresponding to both a first plurality of carriers and a plurality of components of a first sampling step function. The frequency-domain profile also shows a second plurality of harmonics corresponding to both a second plurality of carriers and a plurality of components of a second sampling step function. The first and second pluralities of carriers are orthogonal to each other. Thus, the first sampling step function generates non-zero values for only the first set of carriers and the second sampling step function generates non-zero values for only the second set of carriers. Data symbols are advantageously modulated onto more than one carrier of each carrier set.

Figure 81:
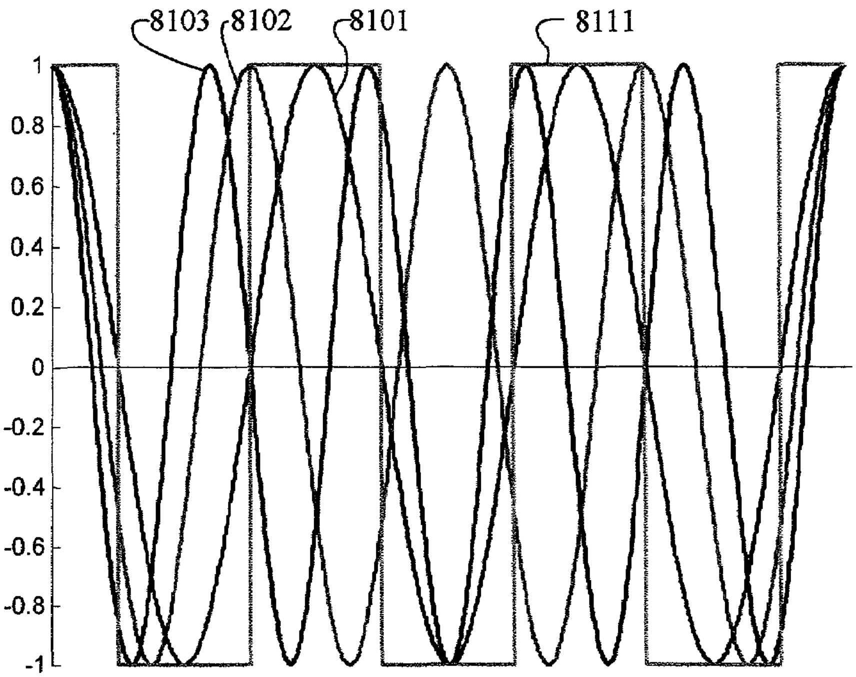

FIG. 81 shows three sinusoidal waves having uniformly spaced frequencies $f_1$,$f_2$, and $f_3$, and a step function 8111 having a frequency equal to frequency $f_1$.

Figure 82:
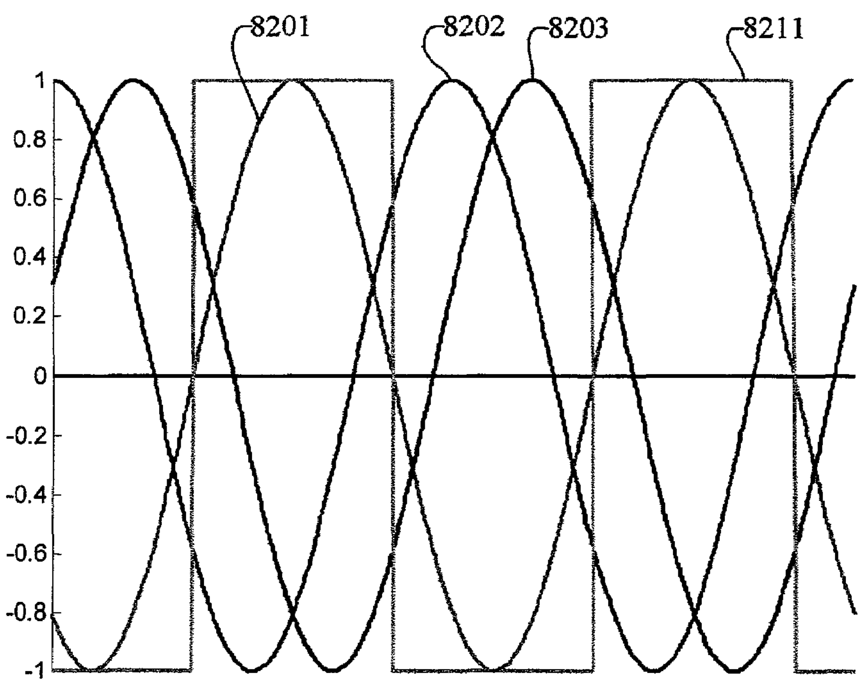

FIG. 82 shows a step function having a particular phase and frequency $f_n$ superimposed over three sinusoidal waves having the same frequency $f_n$, but different phases.

Figures 83, 84:
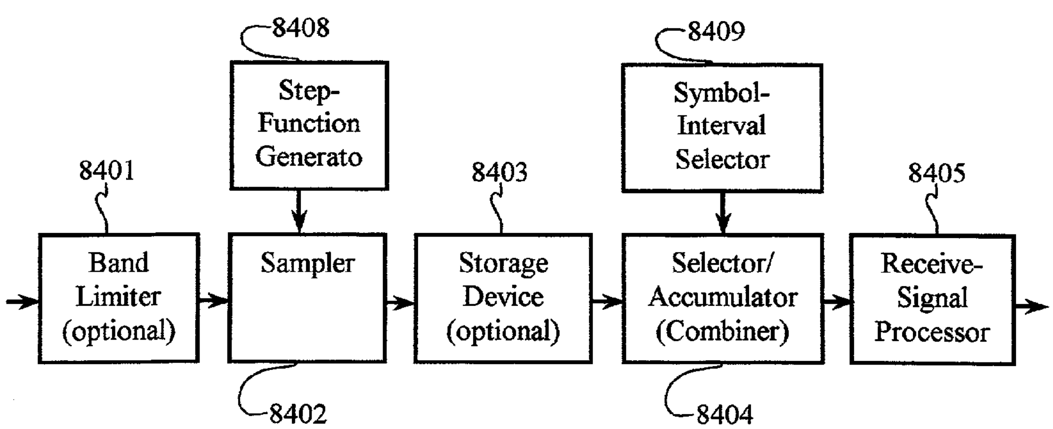

FIG. 83 is a table that illustrates summed values of three frequency bins of a three-carrier signal generated for each of three desired phase spaces and for the two remaining undesired phase spaces.

FIG. 84 illustrates basic components of a CI-OFFT receiver.

Figure 85:
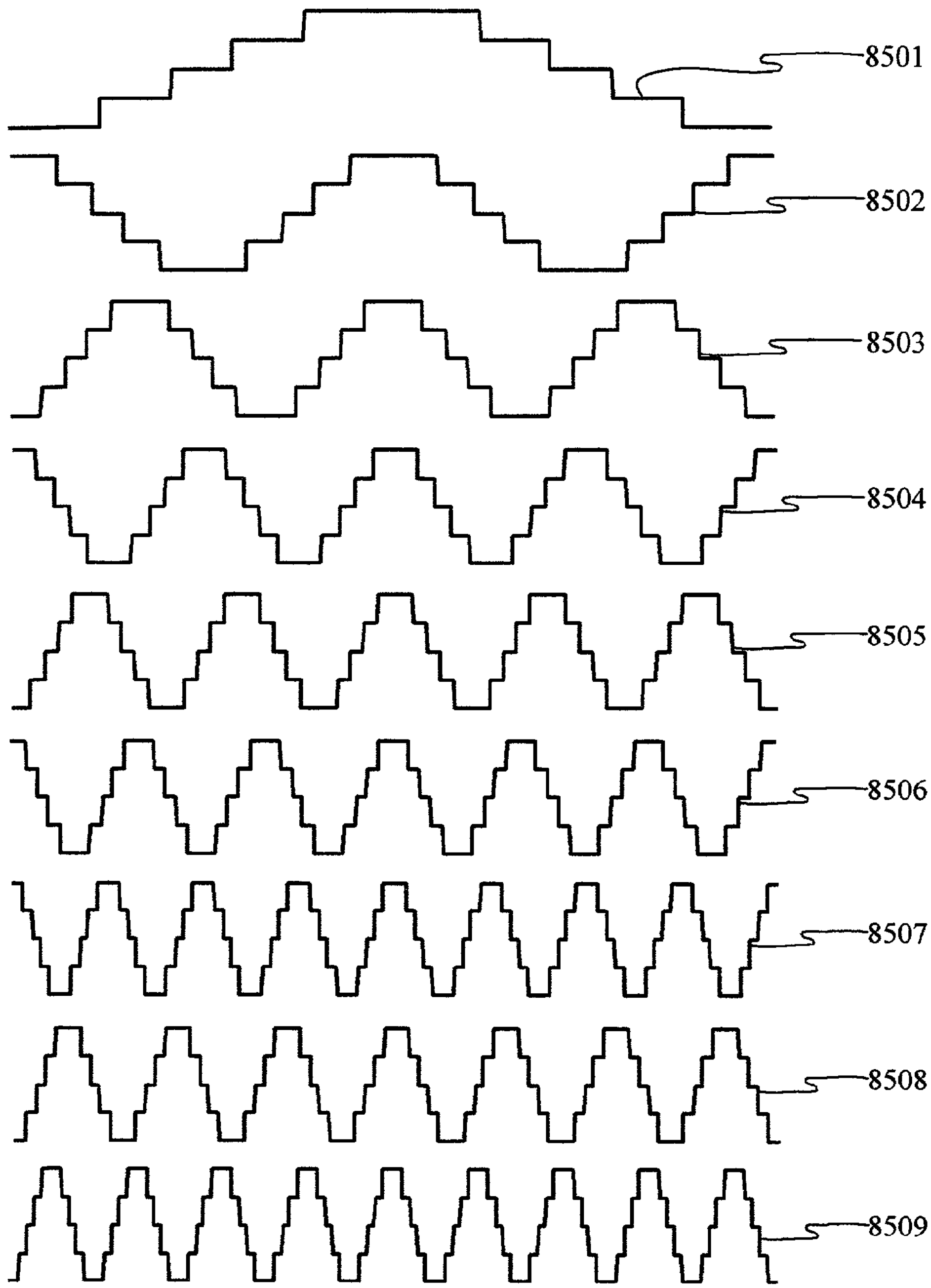

FIG. 85 illustrates a plurality of five-level step functions having orthogonal frequencies, which are shown over a partial symbol interval.

Figure 86A:
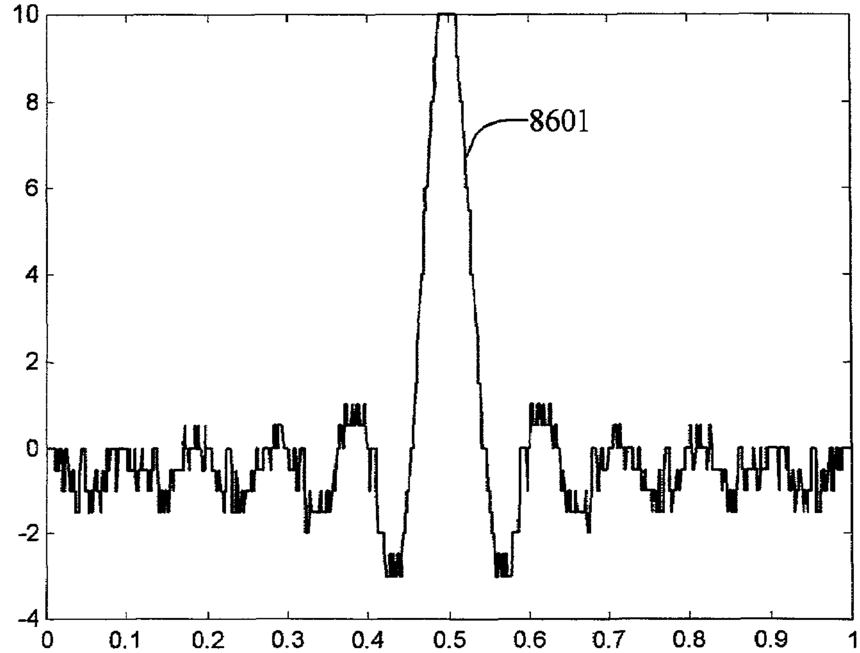

FIG. 86A illustrates a pulse resulting from a superposition of the step functions shown in FIG. 85.

Figure 86B:
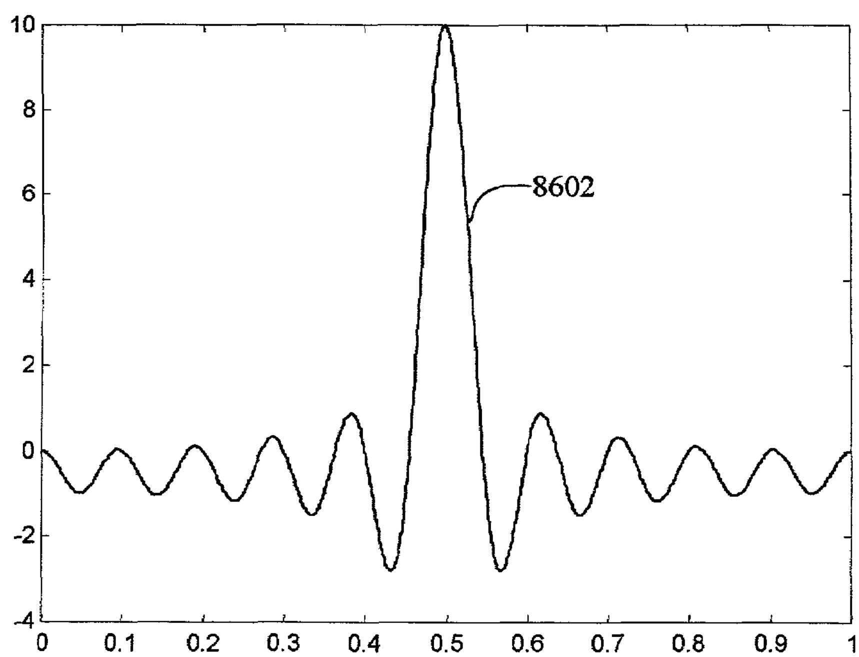

FIG. 86B illustrates a filtered superposition pulse generated by low-pass filtering the pulse shown in FIG. 86A.

Figure 87A:
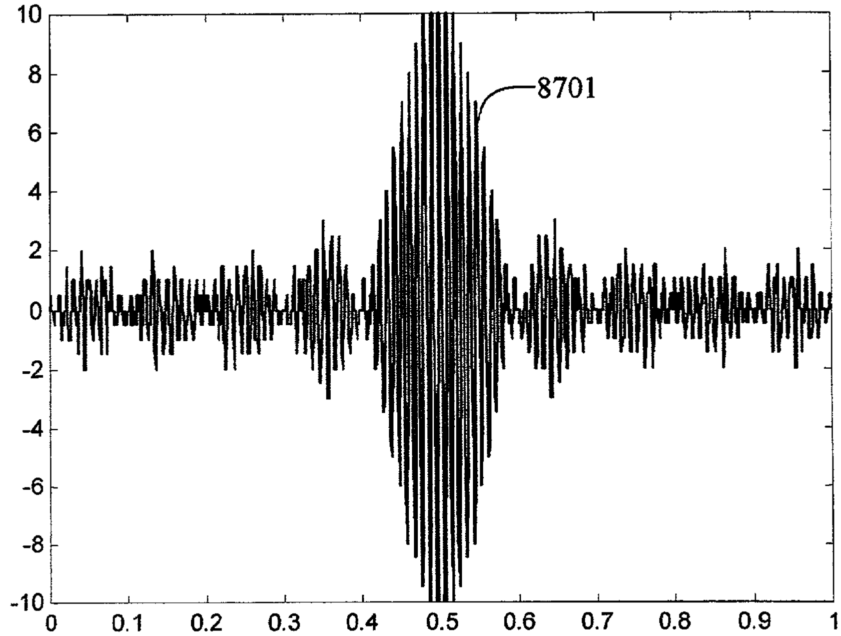

FIG. 87A illustrates a combined signal resulting from a superposition of a plurality of step functions having a frequency offset $f_o$.

Figure 87B:
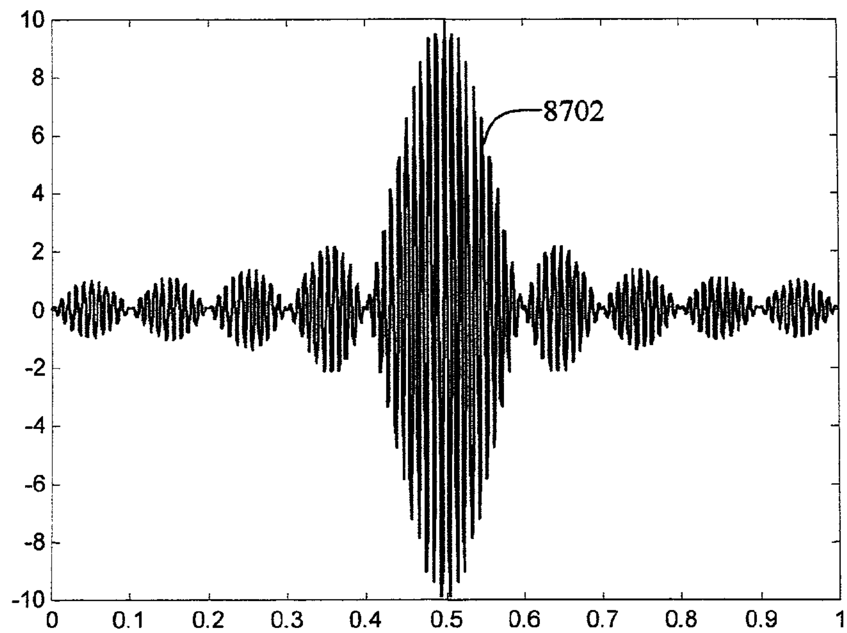

FIG. 87B illustrates a low-pass filtered superposition signal in which high-frequency components have been removed from the combined signal shown in FIG. 87A.

Figure 88A:
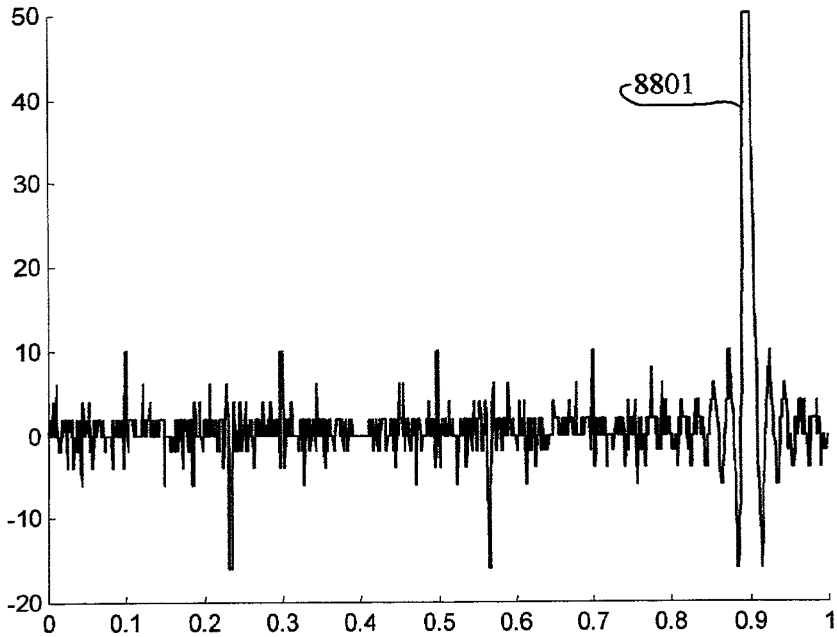

FIG. 88A illustrates a superposition pulse generated from a plurality of binary step functions.

Figure 88B:
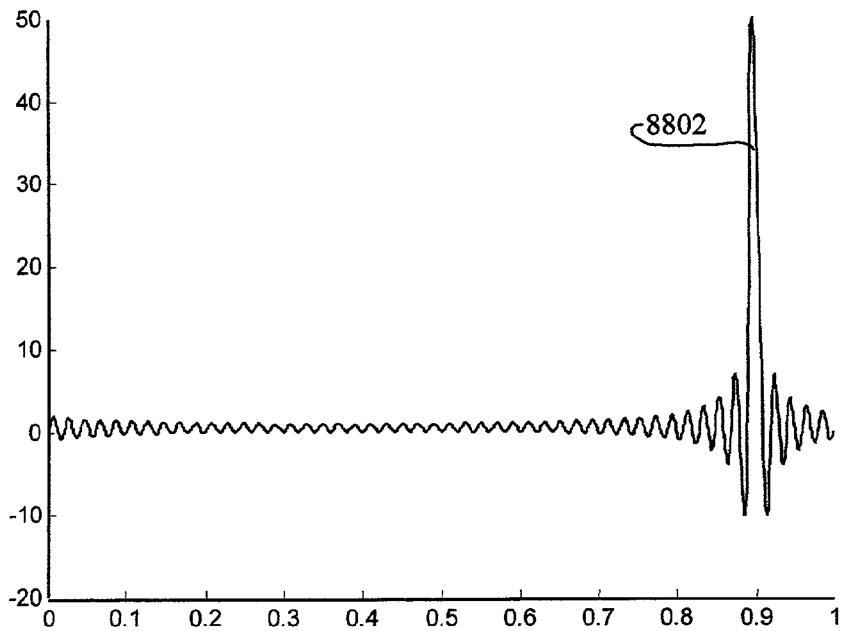

FIG. 88B illustrates a filtered superposition pulse generated by low-pass filtering the pulse shown in FIG. 88A.

Figure 89A:
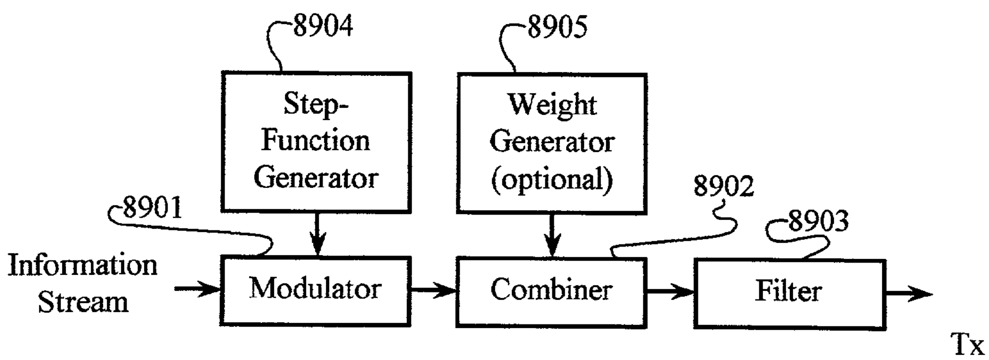

FIG. 89A illustrates a functional embodiment of an inverse CI-OFFT system of the invention.

Figure 89B:
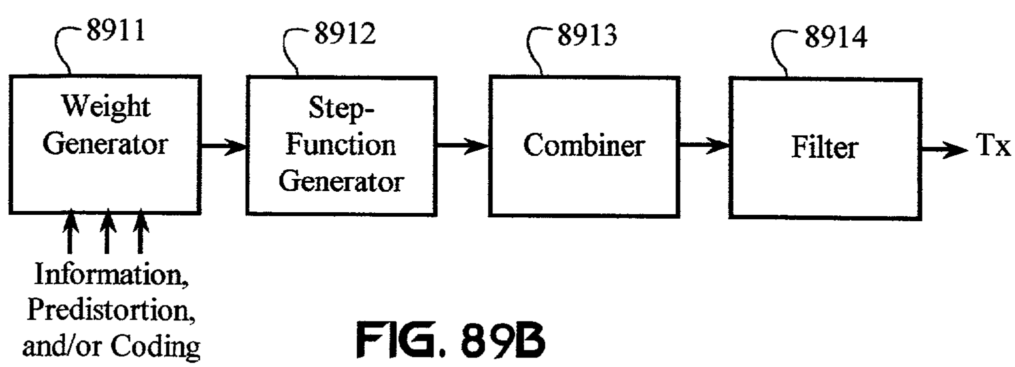

FIG. 89B illustrates an alternative functional embodiment of an inverse CI-OFFT system.

Figure 89C:
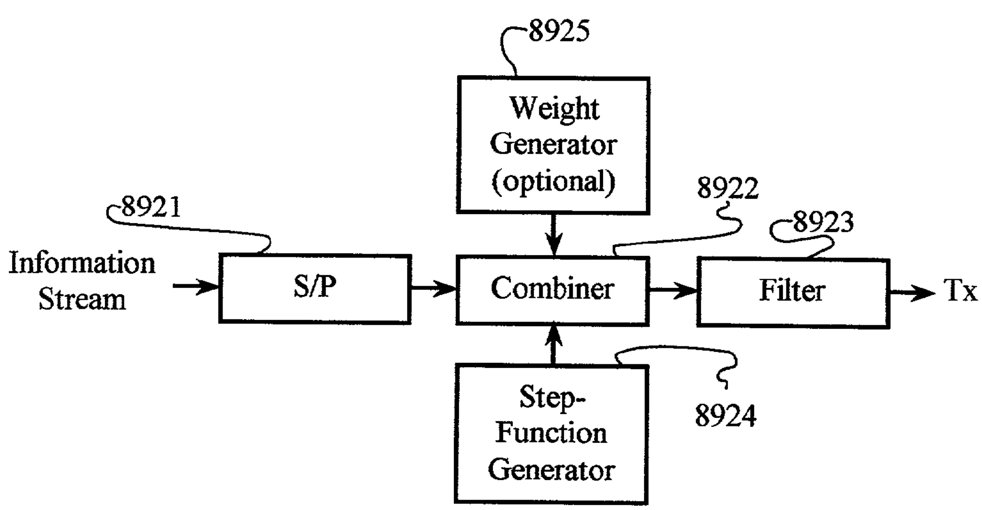

FIG. 89C illustrates yet another functional embodiment of an inverse CI-OFFT system.

Figure 90:
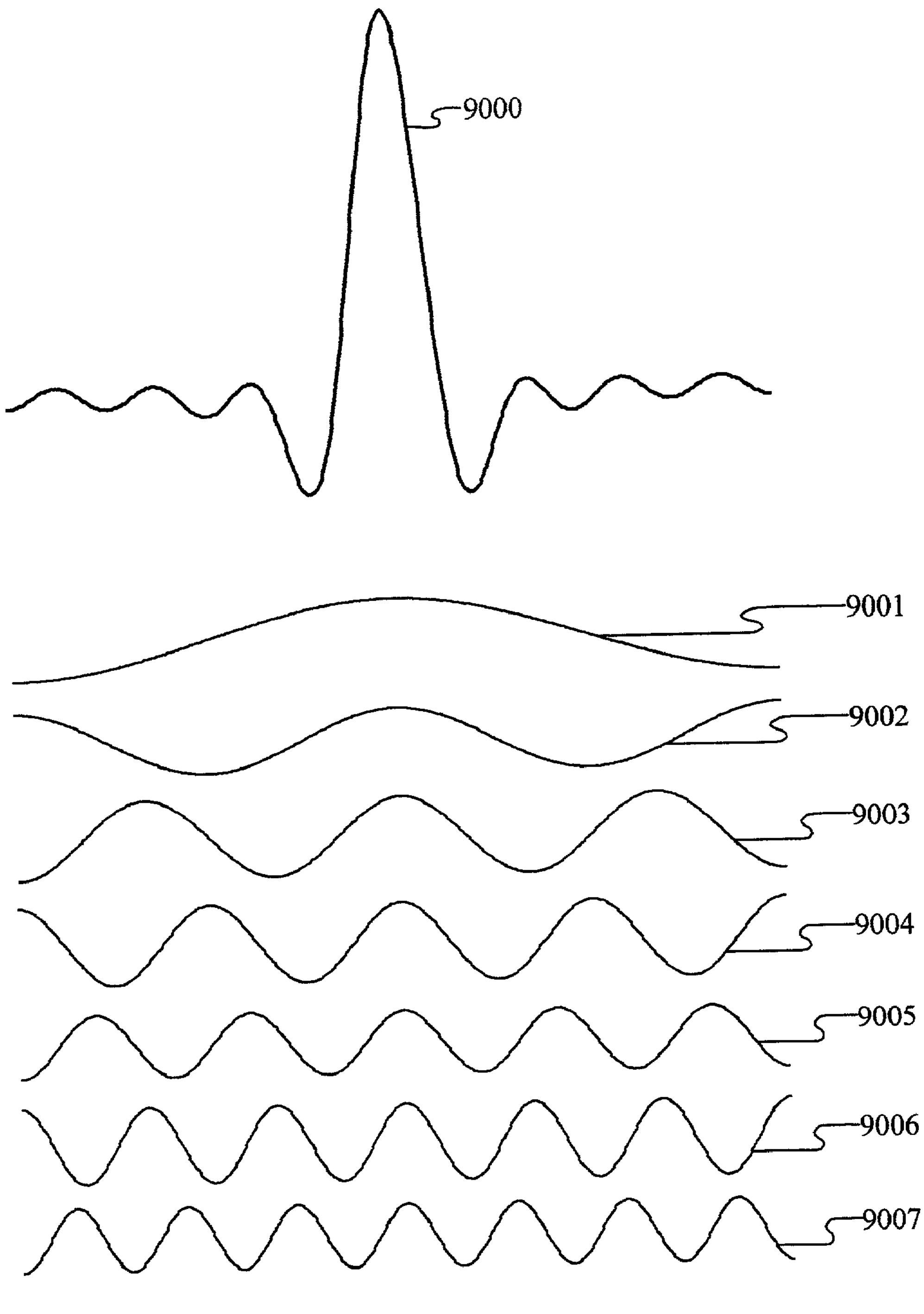

FIG. 90 illustrates a wavelet constructed from a plurality of CI carriers.

Figure 91:
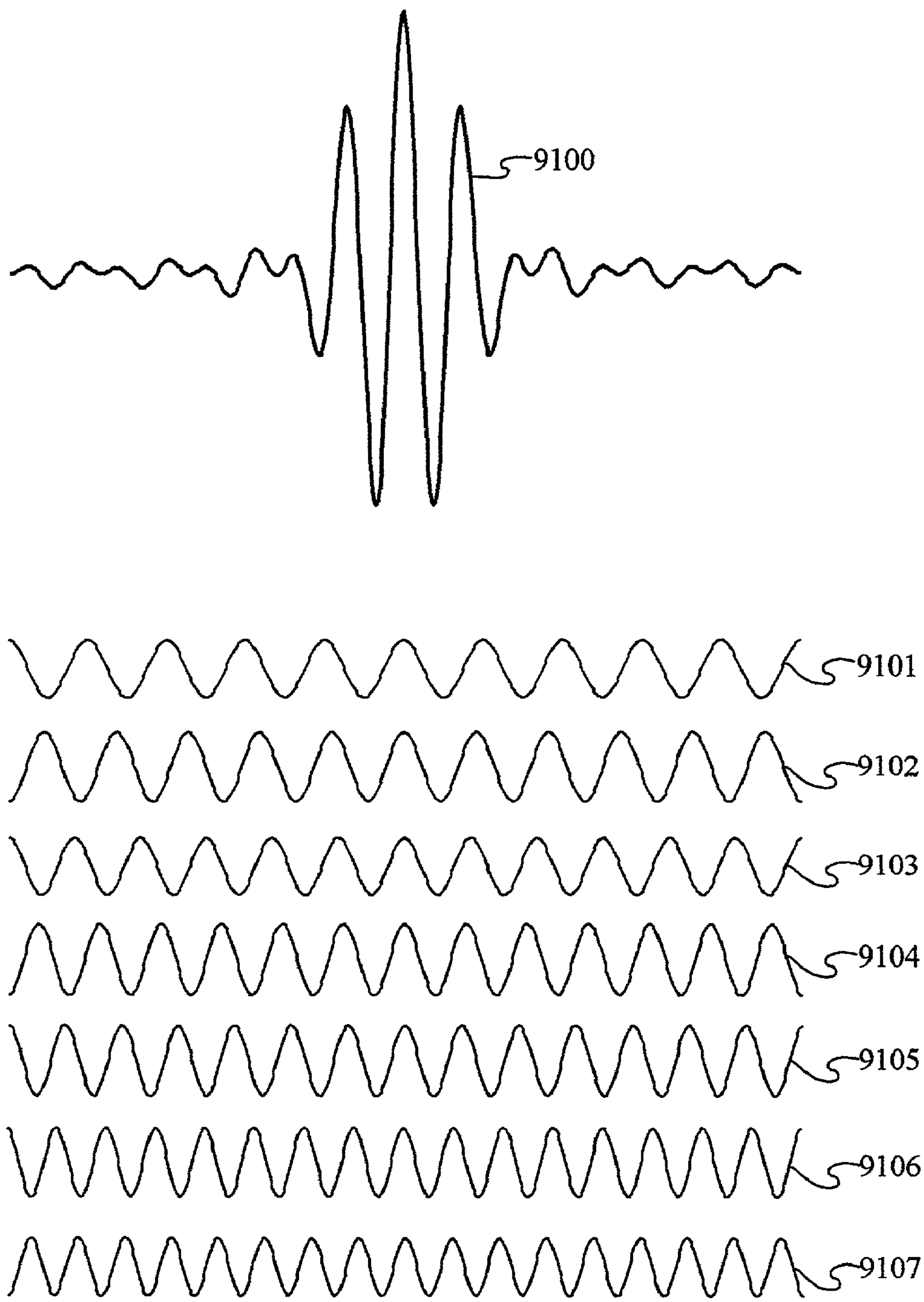

FIG. 91 illustrates a Morlet wavelet packet 9100 constructed from a superposition of CI carriers.

Figure 92A:
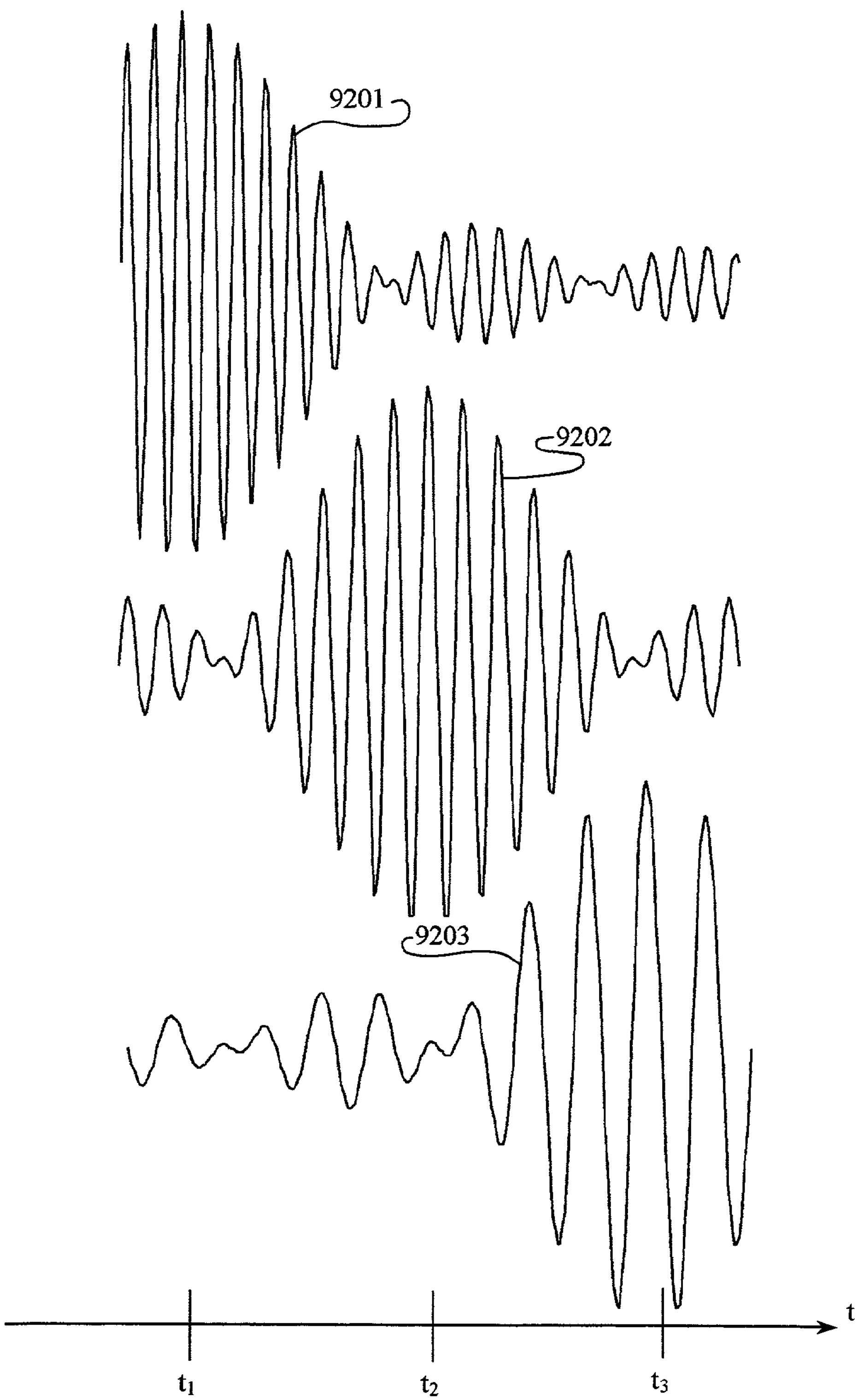

FIG. 92A illustrates three overlapping CI pulses having different effective-carrier frequencies.

Figure 92B:
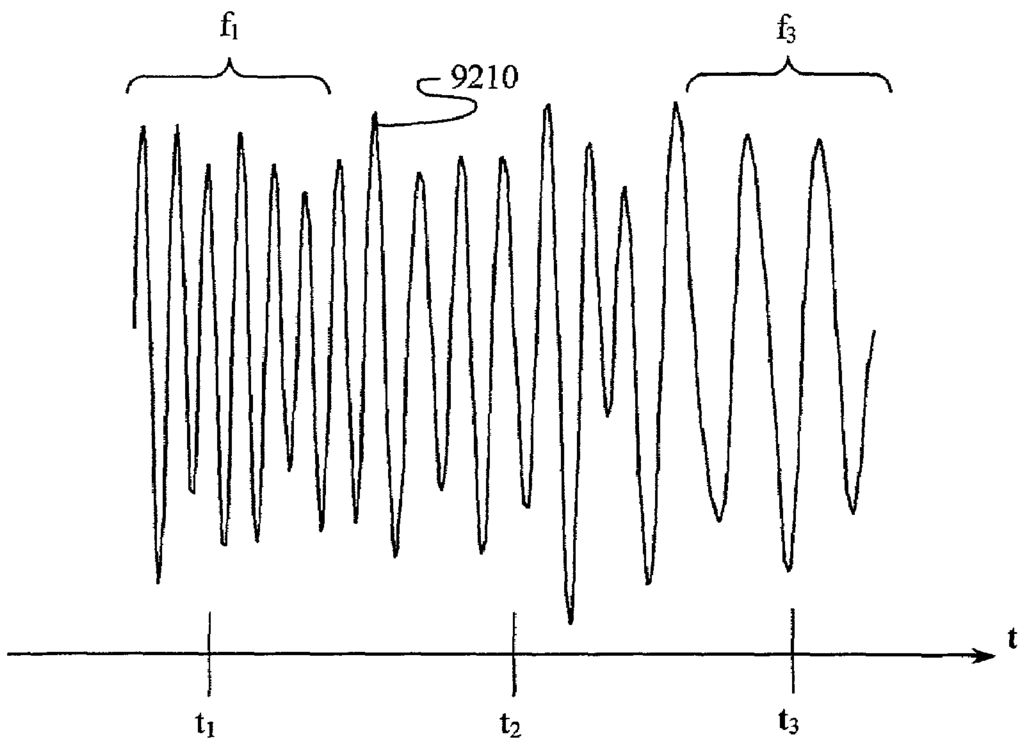

FIG. 92B illustrates a superposition signal produced by combining the three CI pulses shown in FIG. 92A. The superposition signal is characterized by a uniformly changing frequency.

Figure 92C:
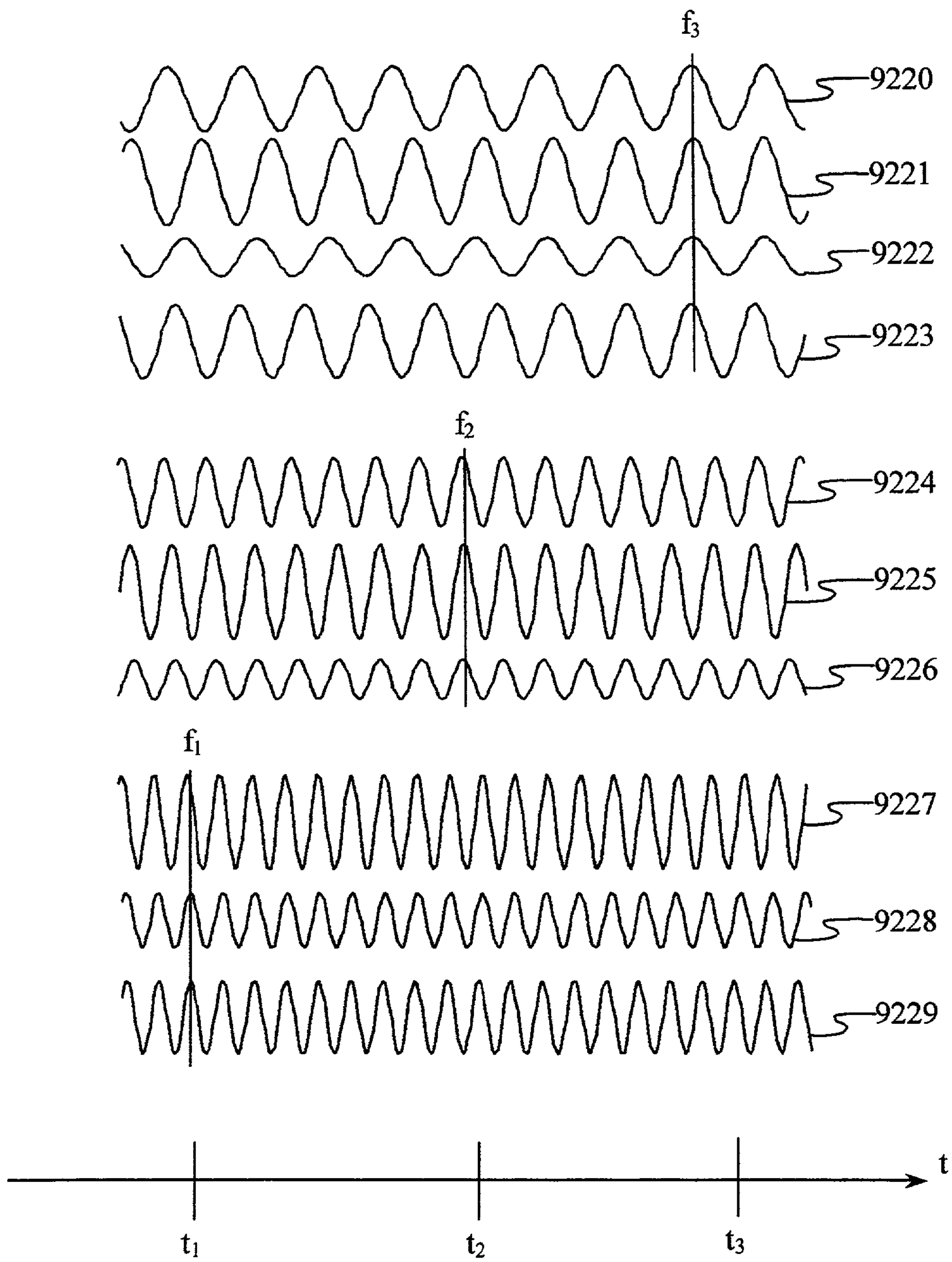

FIG. 92C illustrates a plurality of CI carriers that combine to generate the superposition signal shown in FIG. 92B.

Figure 93:
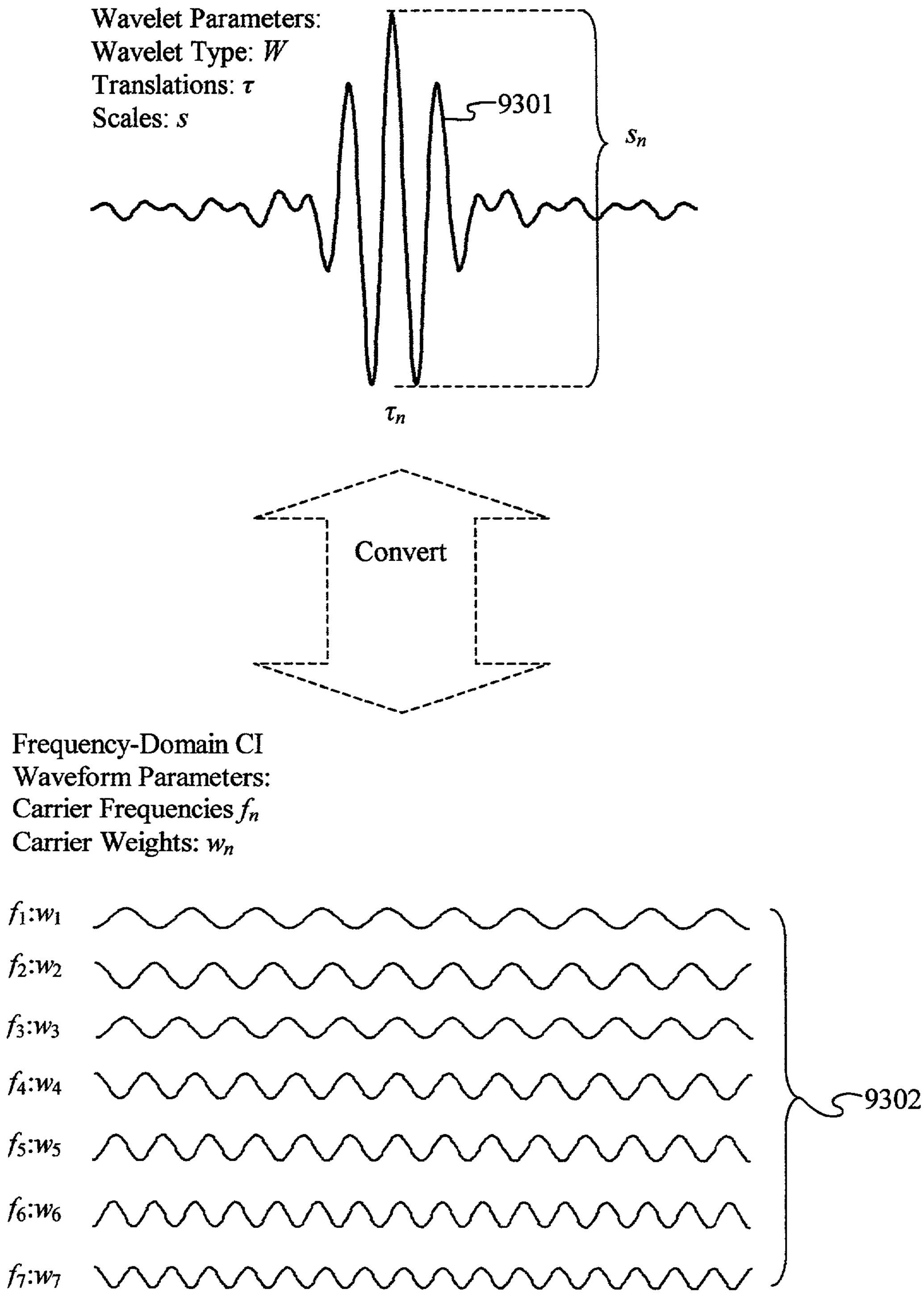

FIG. 93 illustrates a wavelet generated from a plurality of CI carriers. Signals may be expressed by wavelet parameters ($\tau_n$, $s_n$) and/or CI parameters ($f_n$, $w_n$). CI-based wavelets can be used to translate between wavelet parameters and CI parameters.

Figure 94A:
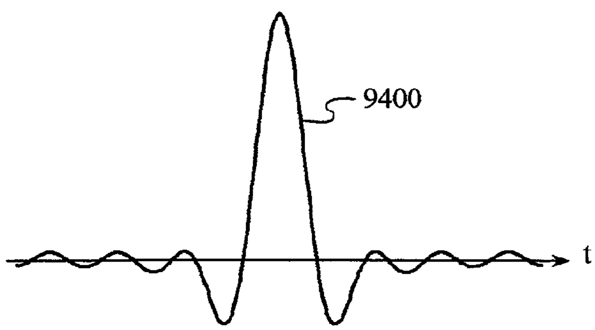

FIG. 94A illustrates a CI-based wavelet (i.e., a CI superposition signal) characterized by a high time resolution (i.e., a narrow time-domain signal).

Figure 94C:
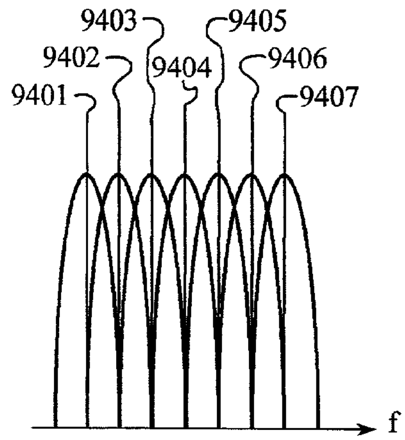
Figure 94B:
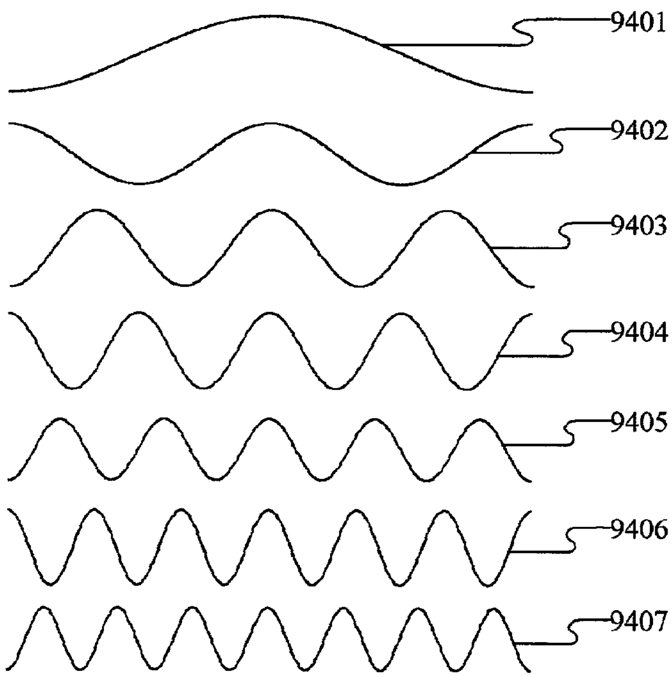

FIG. 94B illustrates a plurality of narrowband CI carriers that are components of the superposition signal shown in FIG. 94B.

FIG. 94C is a frequency-domain illustration of the carriers shown in FIG. 94B. Each frequency-domain component is characterized by high frequency resolution (i.e., a narrow frequency-domain signal).

Figure 95A:
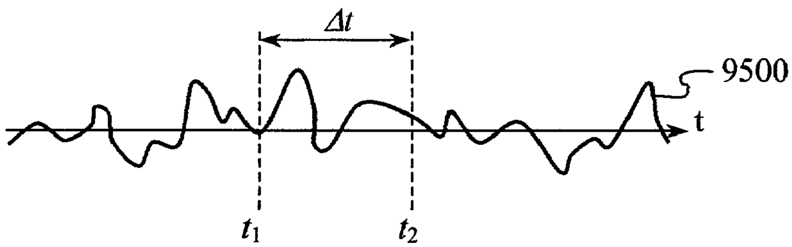

FIG. 95A illustrates a portion of a particular signal having multiple frequencies and transient signal characteristics. The signal may include an information signal. In some applications, the signal may be a received signal that may include noise and/or distortion. In other applications, the signal may include a transmit data sequence.

Figure 95B:
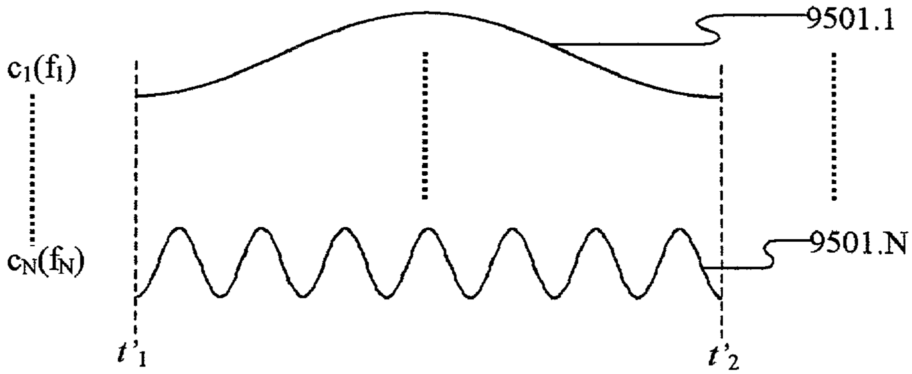

FIG. 95B illustrates a plurality of narrowband CI signals that may be correlated (or similarly processed) with an information signal to provide a plurality of correlation values. The information signal may be processed, such as by filtering, to produce the correlation values. The correlation values are indicative of carrier weights. The carrier weights, when applied to hypothetical narrowband CI signals (such as shown in FIG. 95B), provide a superposition signal with time and frequency-domain characteristics of the information signal.

Figure 95C:
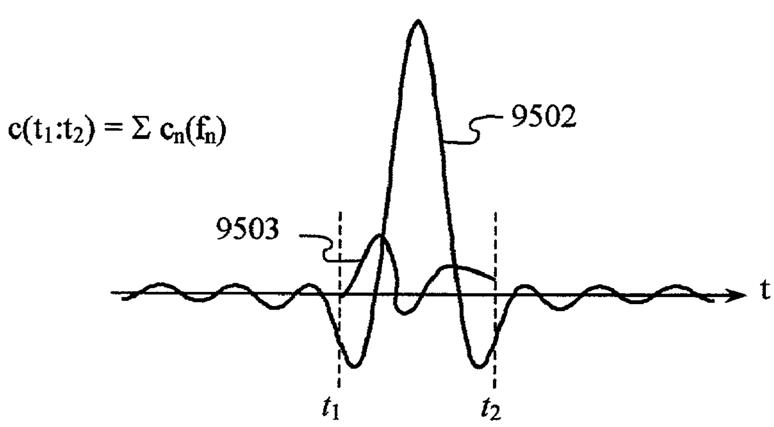

FIG. 95C illustrates a narrow time-domain signal resulting from a superposition of the CI signals. The narrow time-domain signal represents a narrow time-domain portion of the information signal that contributes to a sum of the correlation values represented by the CI signals shown in FIG. 95B.

Figure 96A:
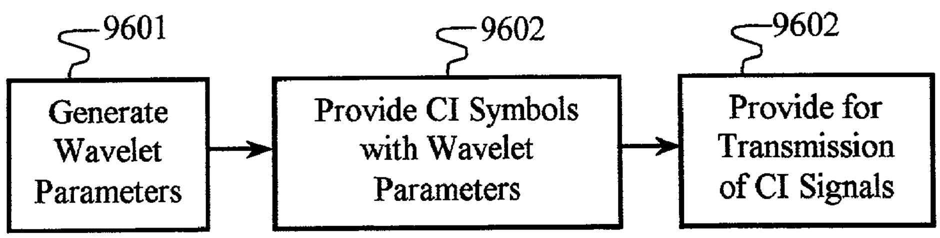

FIG. 96A illustrates one aspect of the invention in which wavelet parameters (such as scale factors, translations, and/or wavelet type) are modulated or otherwise impressed onto CI signals for transmission.

Figure 96B:
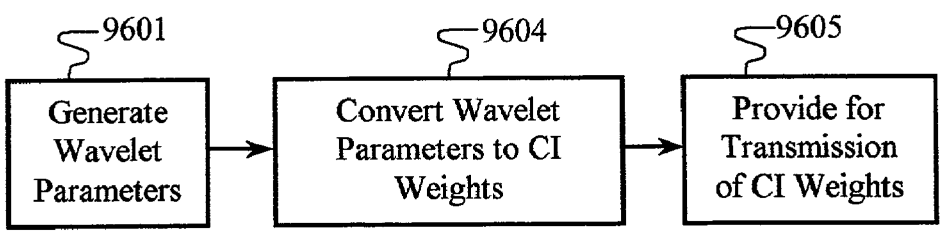

FIG. 96B illustrates a method of transmitting wavelet parameters over a communication channel wherein the wavelet parameters are converted to CI carrier weights.

Figure 96C:
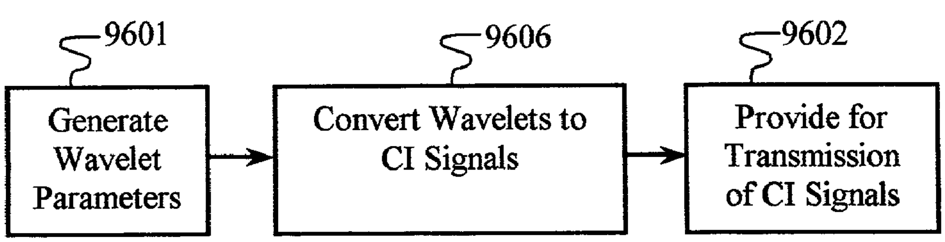

FIG. 96C illustrates a method of conveying wavelet parameters as a CI-based signal wherein the wavelet parameters are converted to CI waveforms.

Figure 97A:
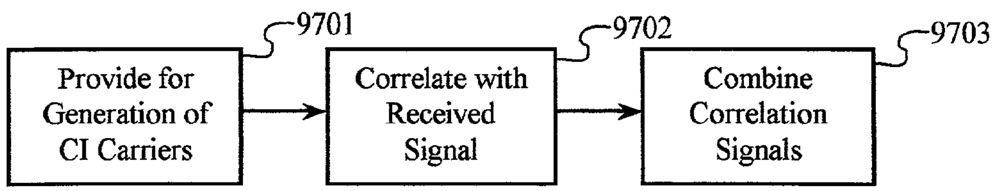

FIG. 97A illustrates a CI reception method of the invention.

Figure 97B:
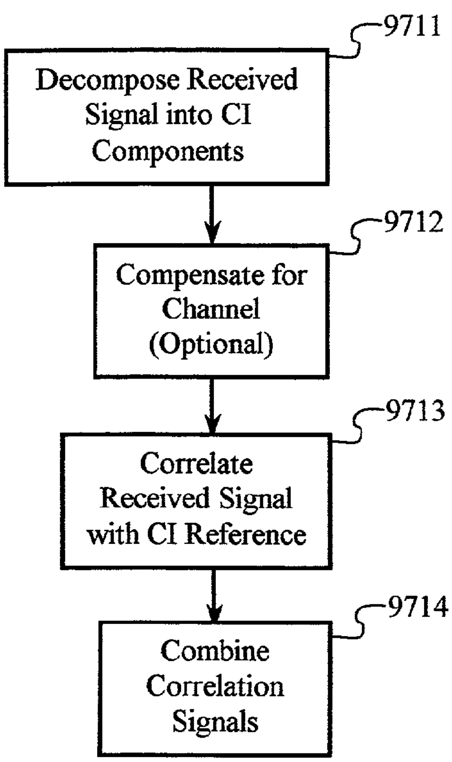

FIG. 97B illustrates an alternative CI reception method.

Figure 97C:
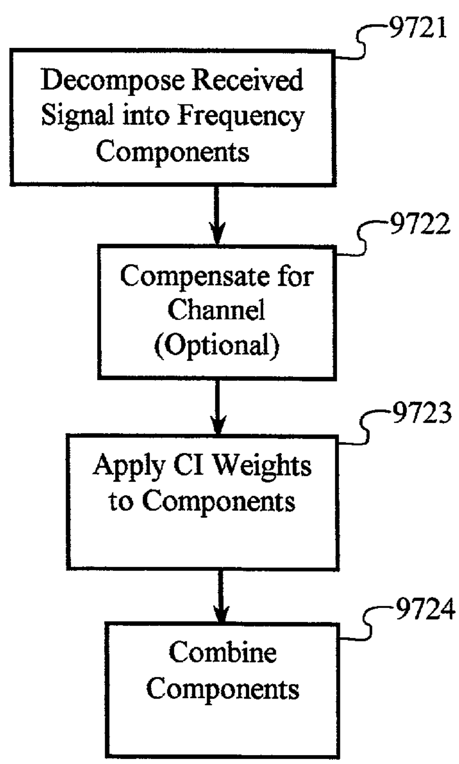

FIG. 97C illustrates steps of a CI reception method.

Figure 98:
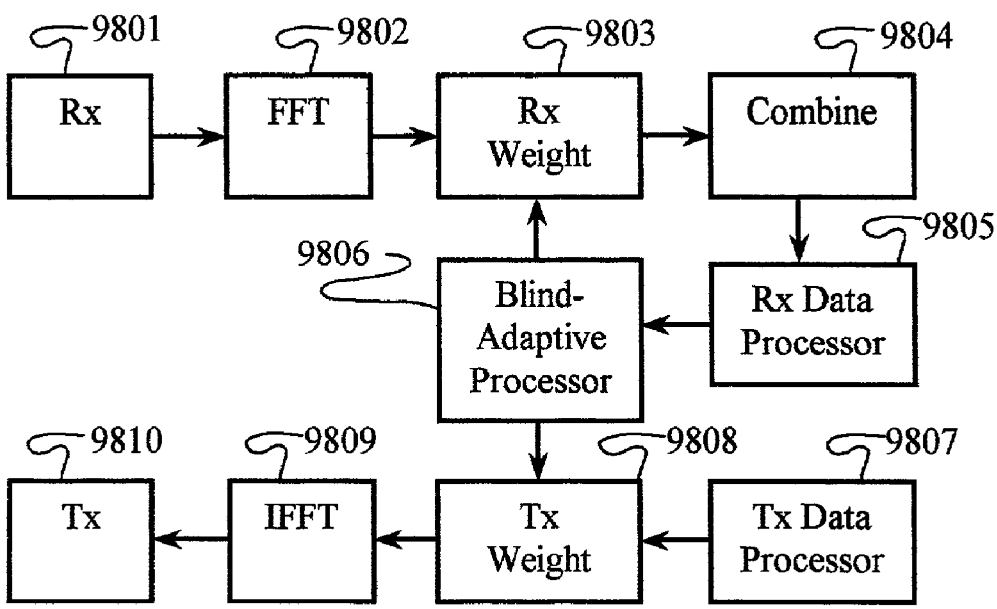

FIG. 98 illustrates a CI transceiver of the invention. A receiver system couples a transmitted signal out of a communication channel. A transmitter system couples an information-bearing transmit signal into a communication channel.

Figure 99:
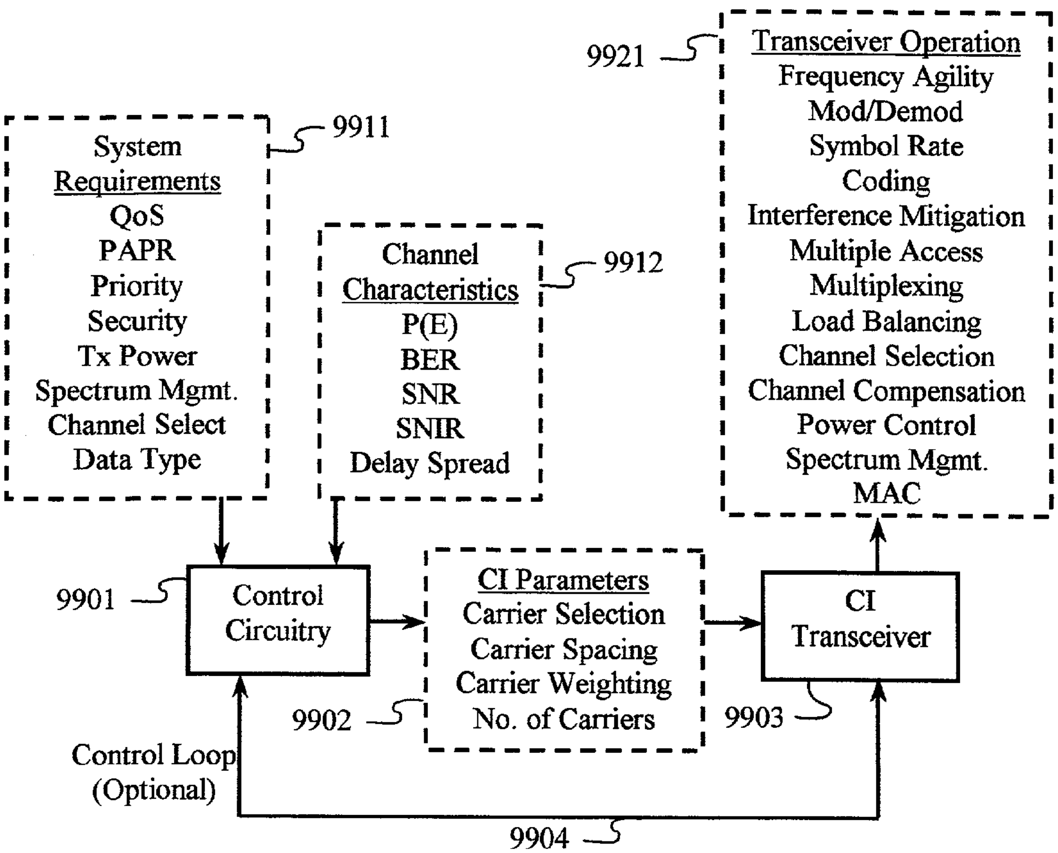

FIG. 99 illustrates a control circuit that processes one or more system requirements and, optionally, one or more channel characteristics to adjust one or more CI parameters in a CI transceiver.

Figure 100A:
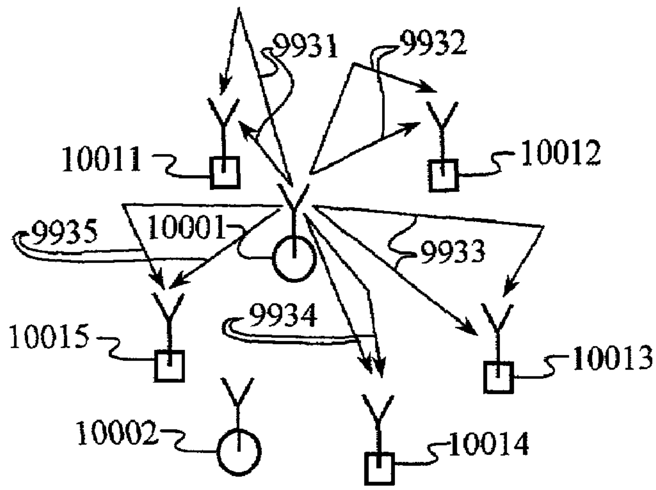

FIG. 100A illustrates a plurality of subscriber units in a network having a plurality of access points. At least one of the subscriber units is adapted to generate a pilot or known reference signal that is processed by the access points in a channel-estimation step.

Figure 100B:
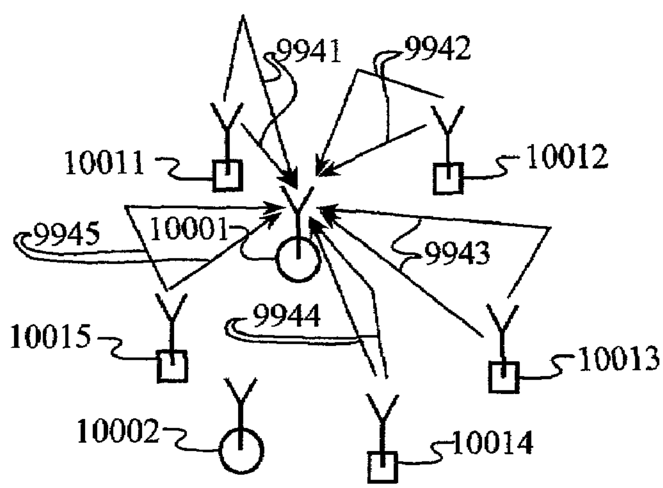

FIG. 100B illustrates a plurality of access points adapted to transmit channel-compensated signals to at least one subscriber unit.

Figure 101:
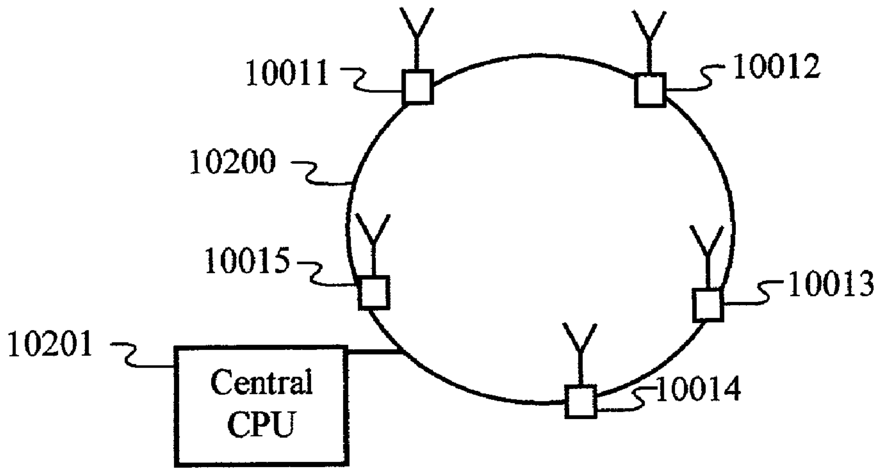

FIG. 101 illustrates a plurality of access points connected to a network. A central processing unit enables the access points to work together to enhance diversity and/or provide sub-space processing.

Figure 102:
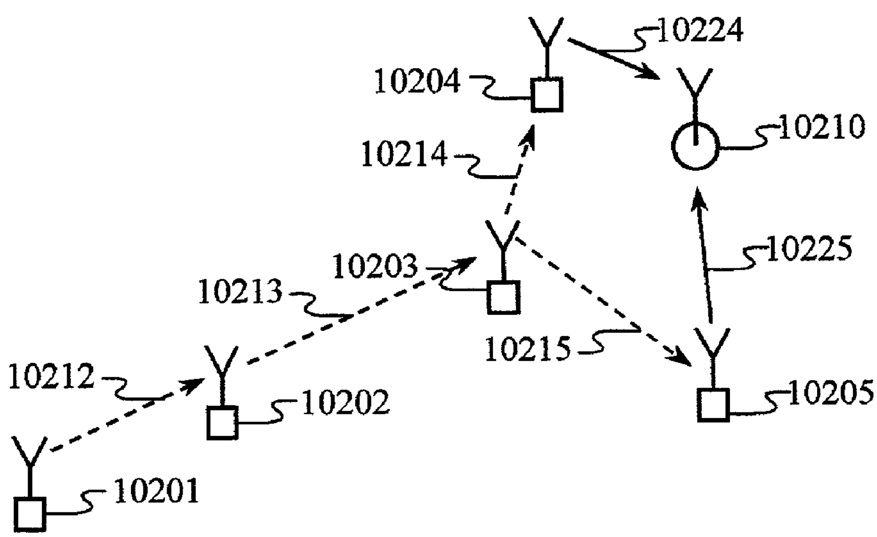

FIG. 102 illustrates a network architecture in which a plurality of subscriber units are adapted to function as routers and/or repeaters.

Figure 103A:
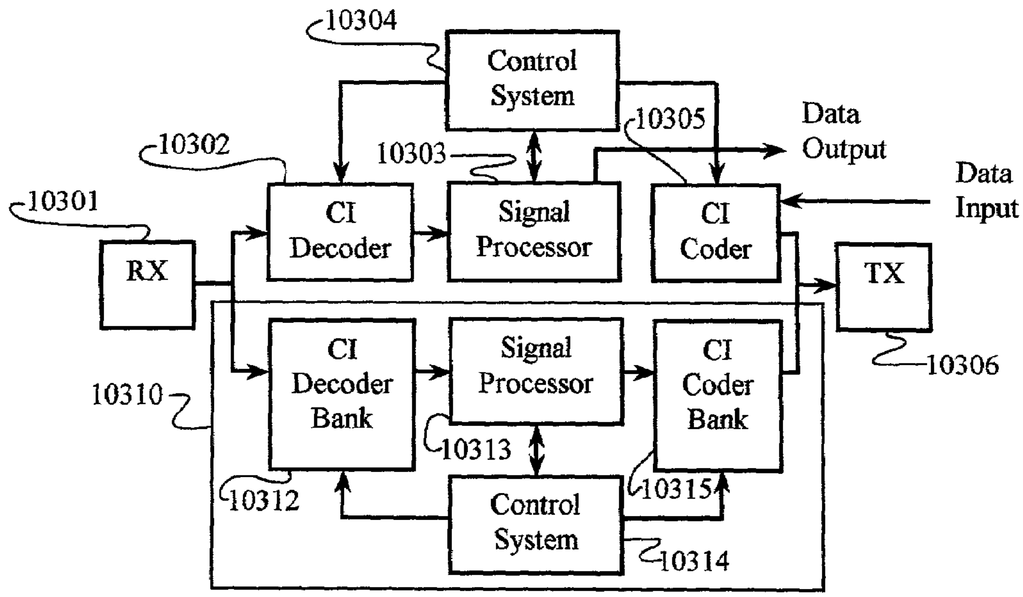

FIG. 103A illustrates a CI transceiver adapted to perform routing.

Figure 103B:
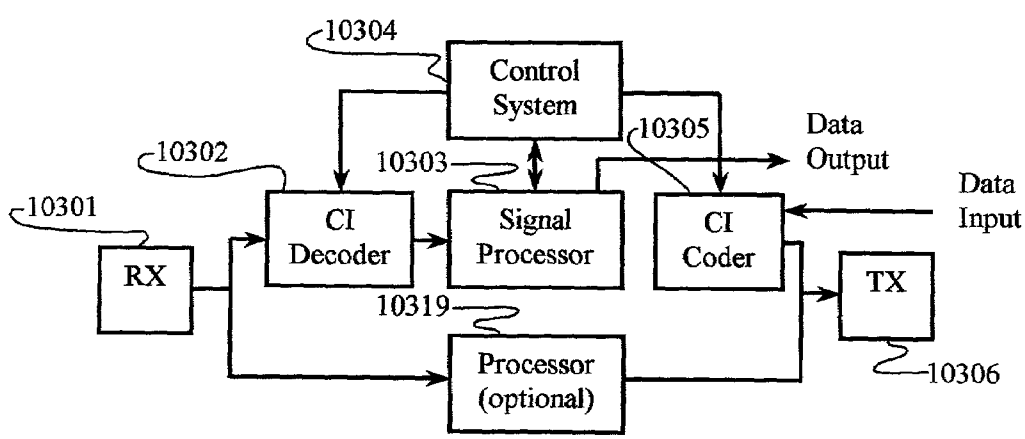

FIG. 103B illustrates a CI transceiver adapted to perform routing.

Figure 103C:
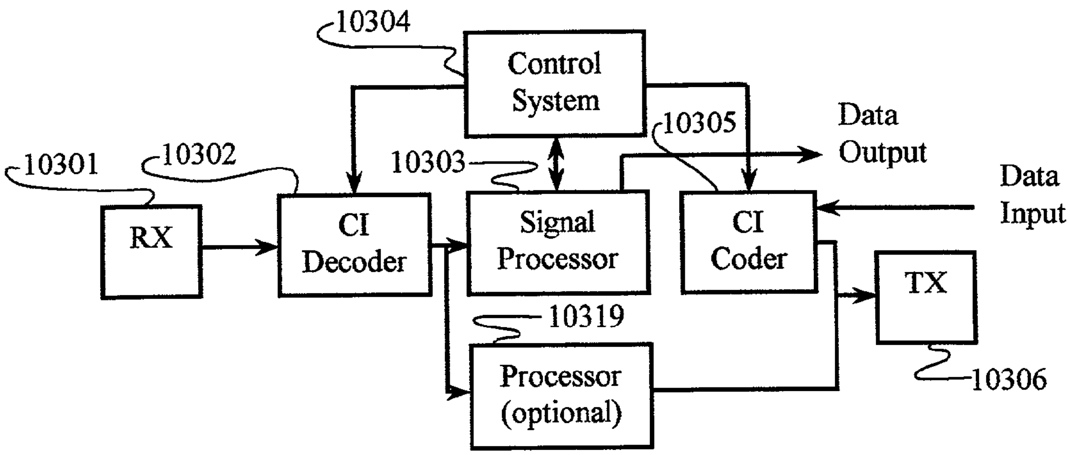

FIG. 103C illustrates a CI transceiver adapted to decode received signals intended for the transceiver and partially decode and route signals intended for one or more other transceivers.

Figure 104A:
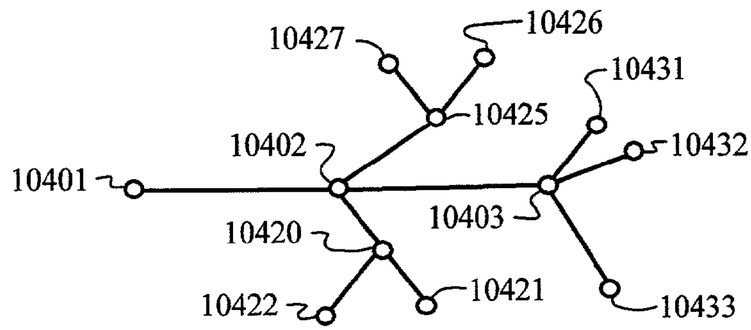

FIG. 104A illustrates a tree network that may be implemented in aspects of the present invention.

Figure 104B:
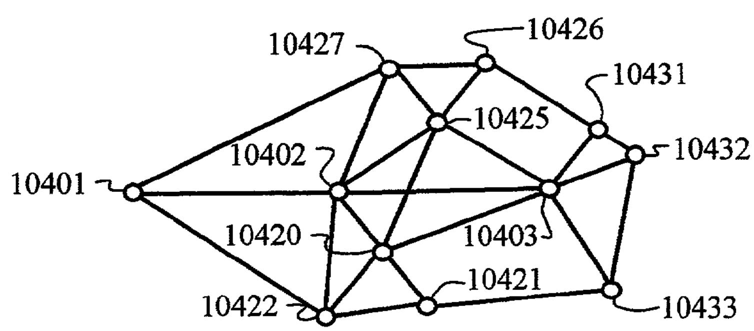

FIG. 104B illustrates a network design that permits a plurality of communication paths to each node.

Figure 104C:
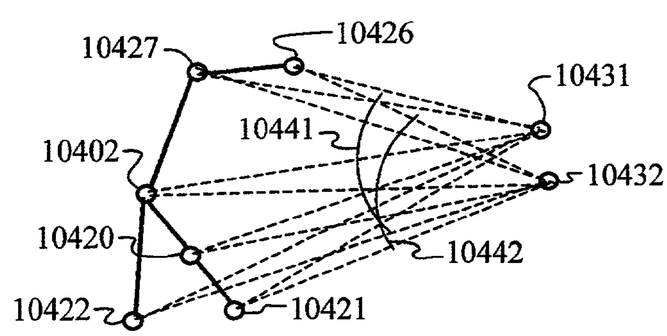

FIG. 104C illustrates a network design adapted to provide array processing performance advantages.

Figure 105A:
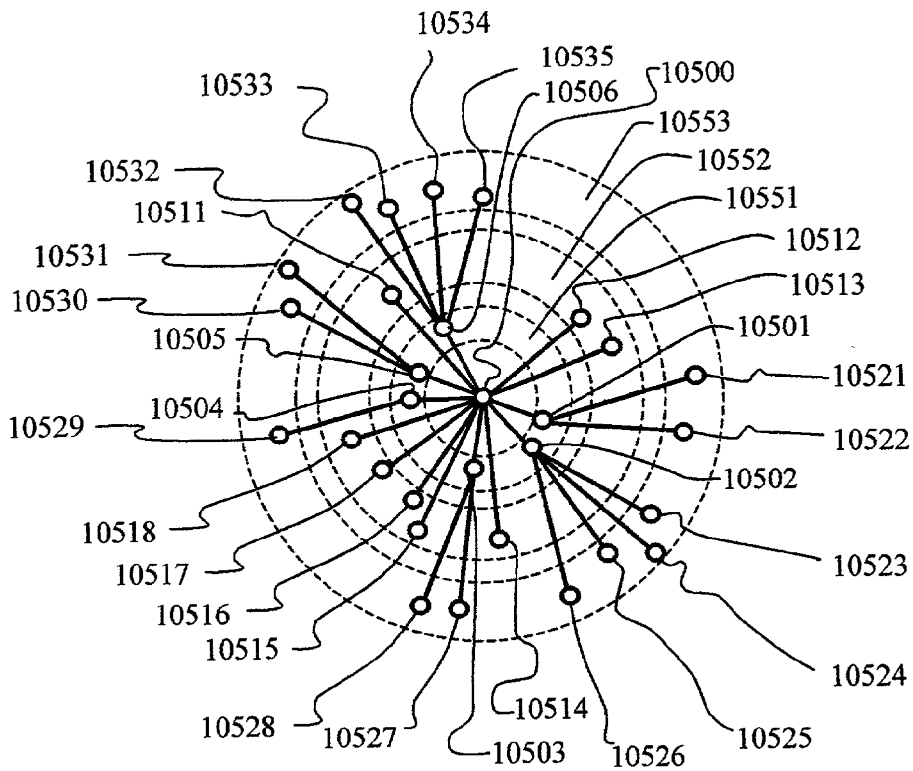

FIG. 105A illustrates a concentric ring network configuration that may be implemented by the present invention.

Figure 105B:
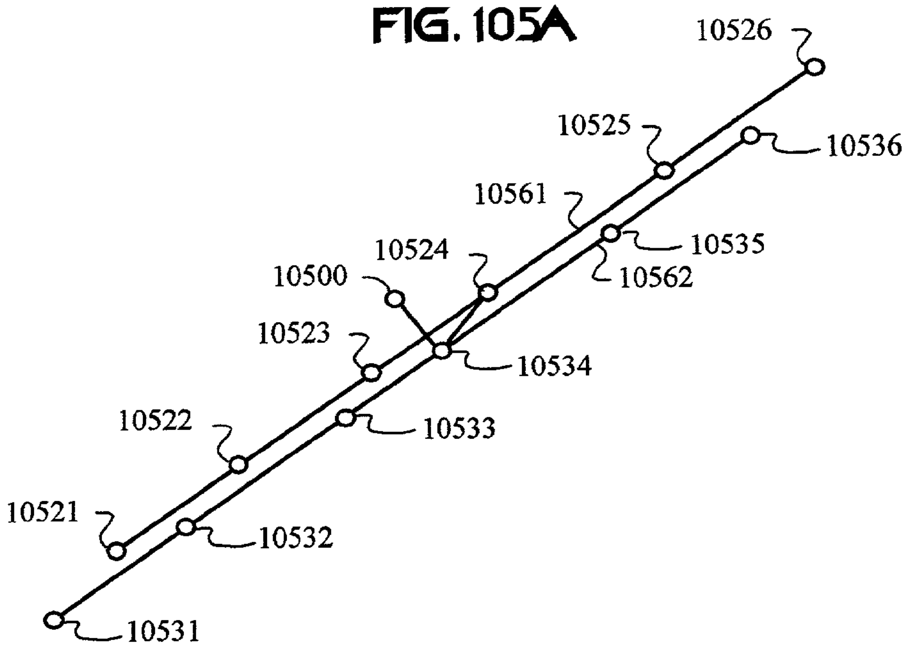

FIG. 105B illustrates a network configuration adapted to the geographic distribution of a plurality of subscribers located along a roadway.

Figure 106A:
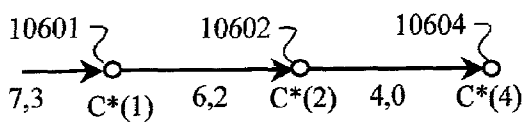

FIG. 106A illustrates a plurality of nodes adapted to route CI code-addressed signals.

Figure 106B:
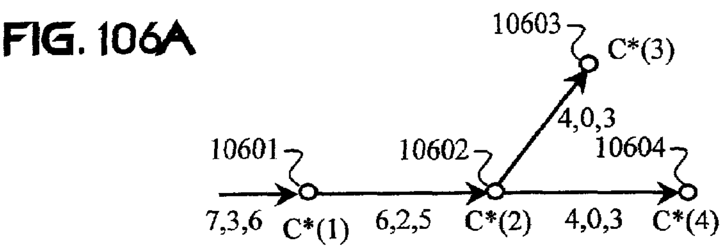

FIG. 106B illustrates a simple tree-style CI-based network of the present invention.

Figure 106C:
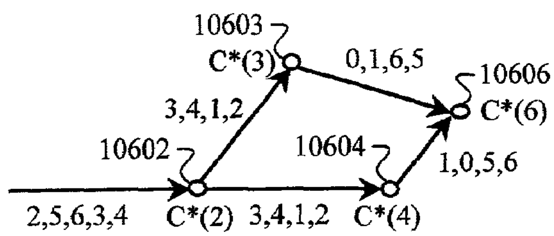

FIG. 106C illustrates a simple CI-based network wherein each node can be reached by a plurality of paths.

Figure 106D:
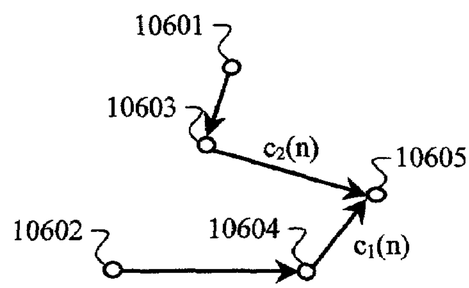

FIG. 106D illustrates a network characterized by two communication paths to a common destination node.

Figure 106E:
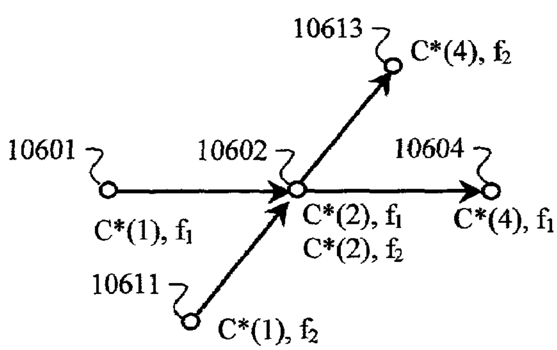

FIG. 106E illustrates a network having a plurality of crossing communication paths.

Figure 107A:
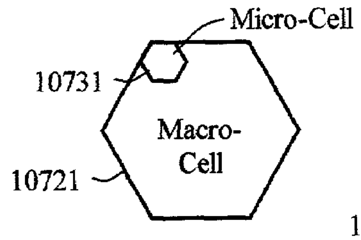

FIG. 107A illustrates a multi-level cellular architecture that may be employed by systems and methods of the present invention.

Figure 107B:
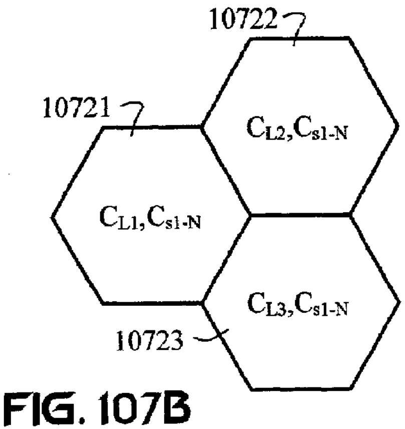

FIG. 107B illustrates three adjacent cells in a cellular network of the present invention.

Figure 107C:
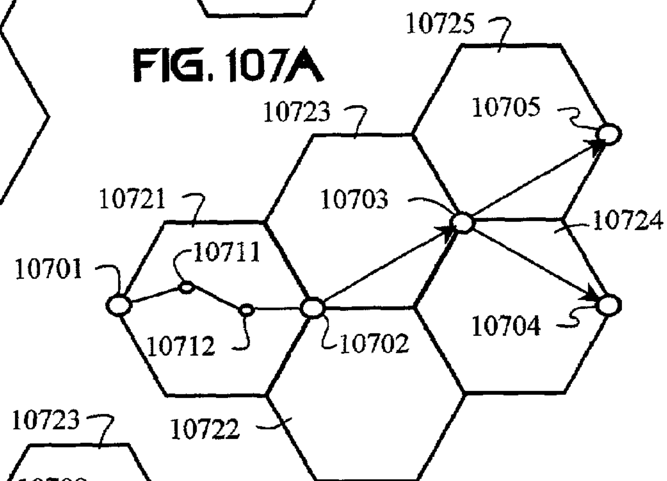

FIG. 107C shows a cellular architecture of the present invention that includes a plurality of cells and a plurality of base stations located on cell boundaries.

Figure 107D:
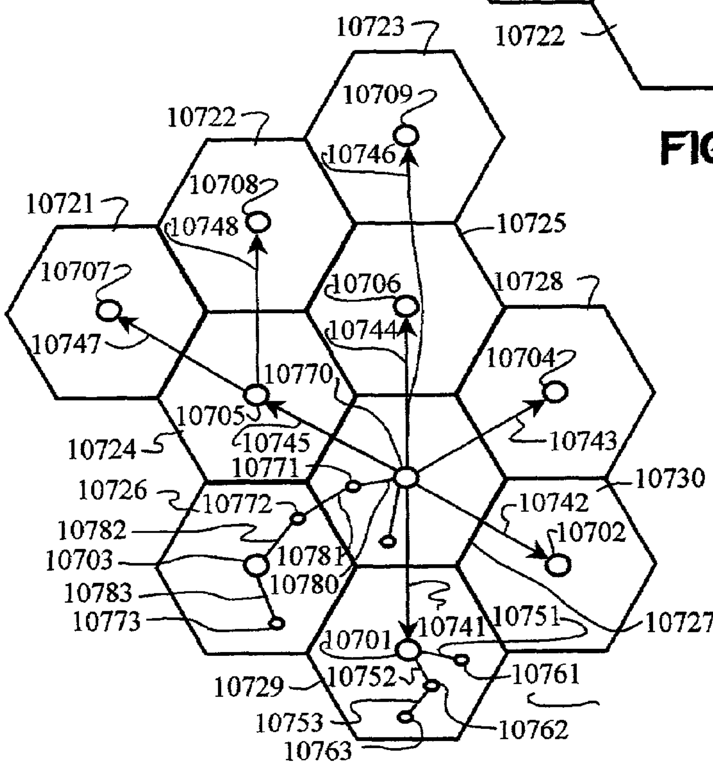

FIG. 107D illustrates a cellular network of the invention including a plurality of cells, a plurality of base stations, and a plurality of subscriber units.

Figure 108A:
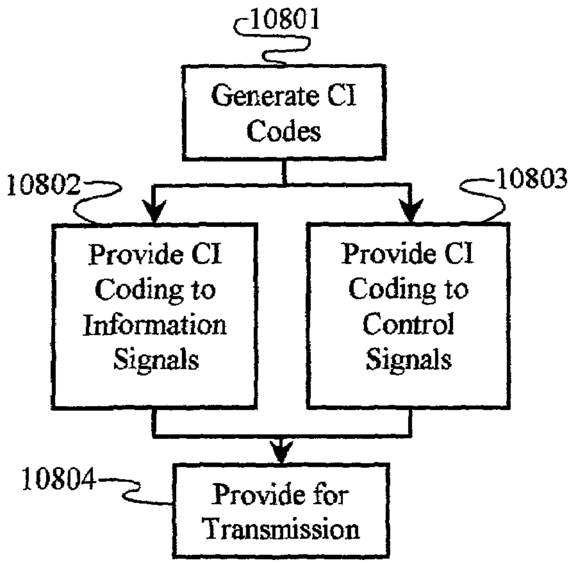

FIG. 108A illustrates a method in which CI-coded information and control signals are generated and processed for transmission.

Figure 108B:
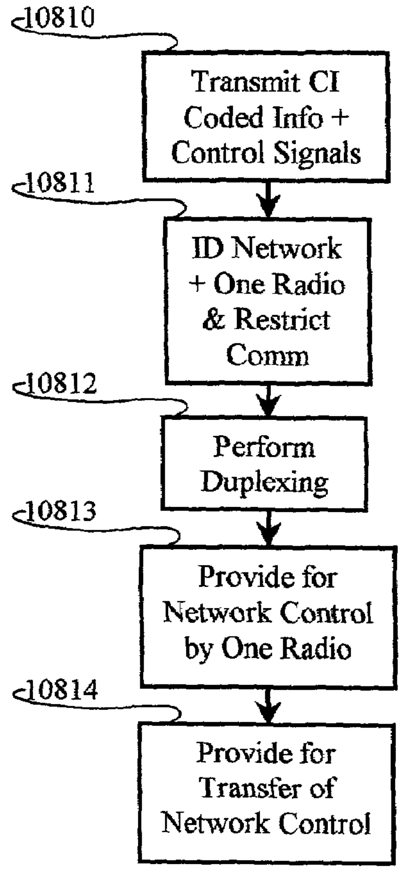

FIG. 108B illustrates a method for managing network control in a CI network by one or more subscriber units adapted to function as base stations.

Figure 108C:
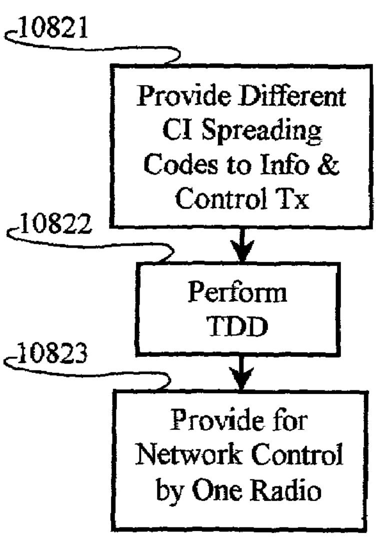

FIG. 108C illustrates an alternative network-control method of the present invention.

Figure 108D:
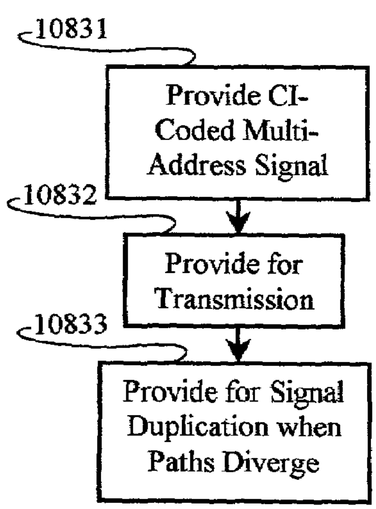

FIG. 108D shows a routing method of the present invention.

Figure 109A:
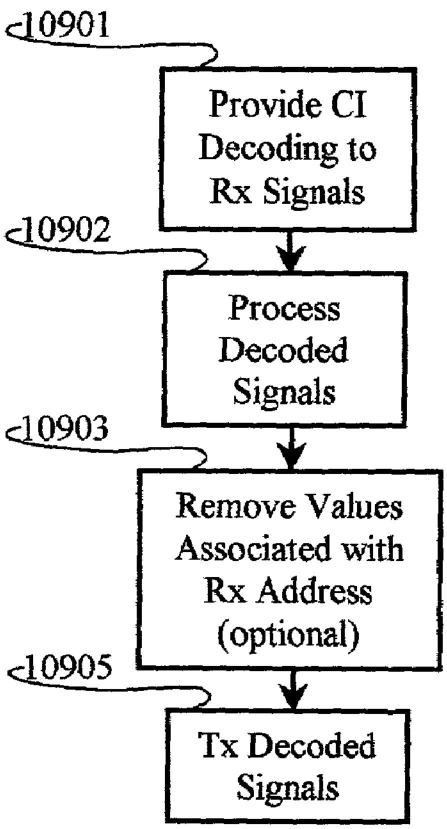

FIG. 109A shows a relay method of the present invention.

Figure 109B:
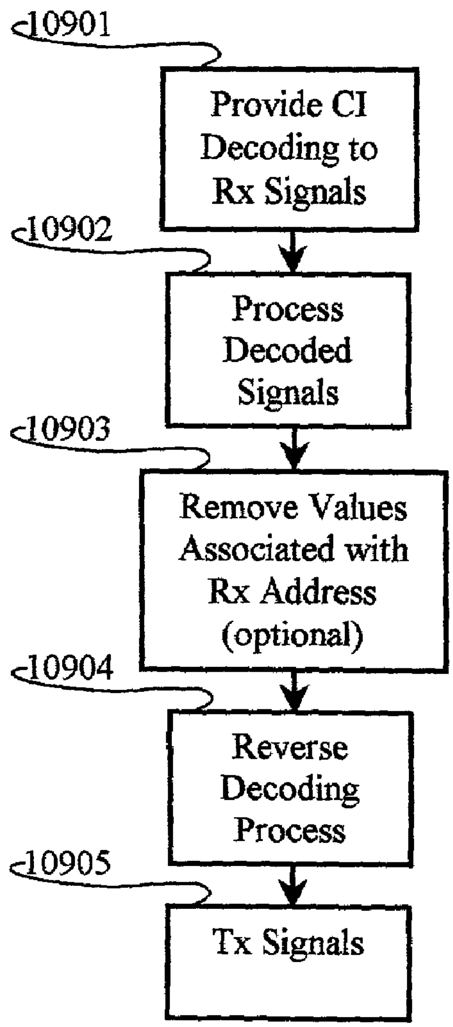

FIG. 109B illustrates an alternative embodiment of a relay method of the invention.

Figure 110A:
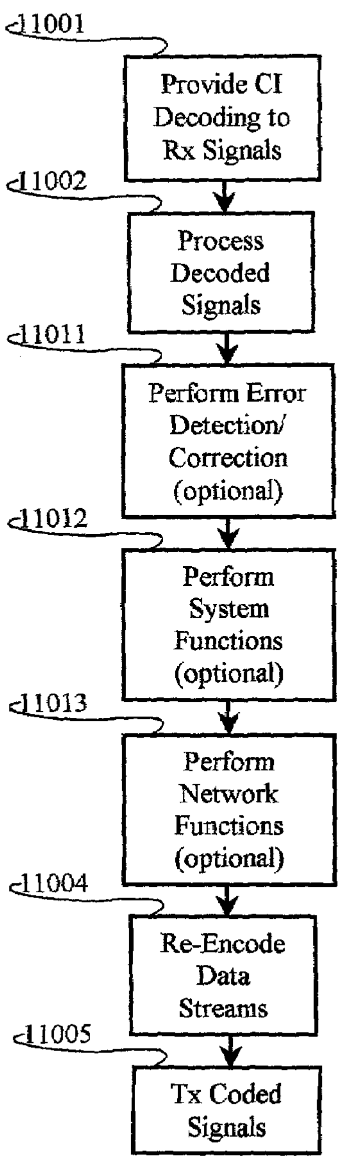

FIG. 110A illustrates a CI transceiver processing and routing method of the invention.

Figure 110B:
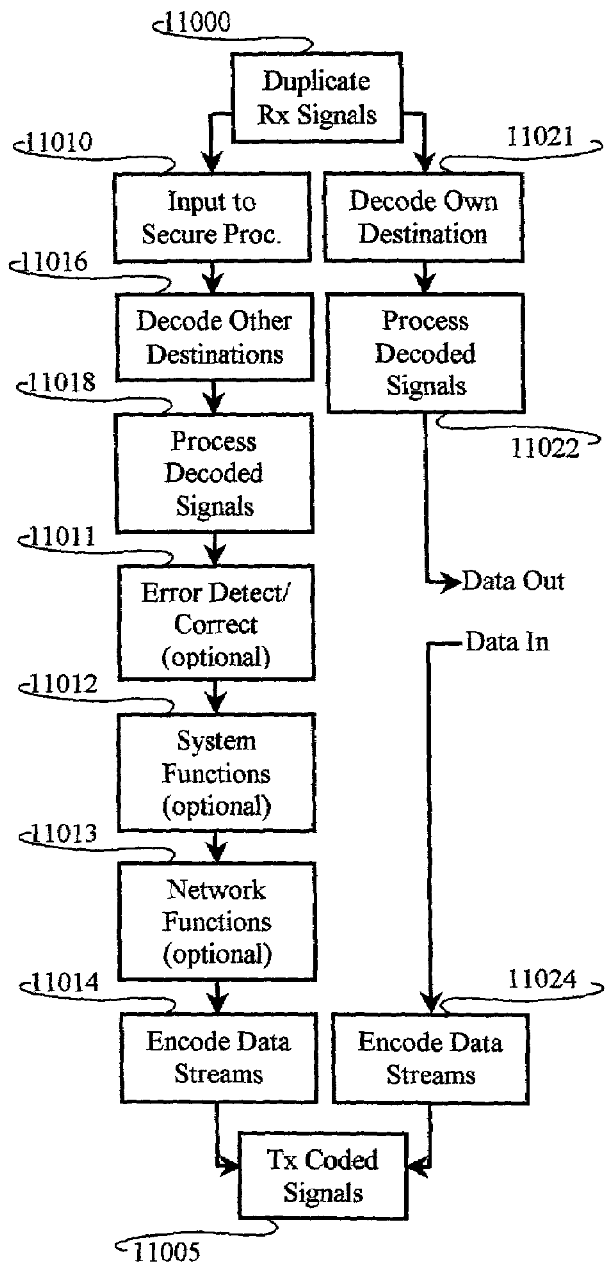

FIG. 110B illustrates an alternative transceiver processing and routing method of the invention.

Figure 111A:
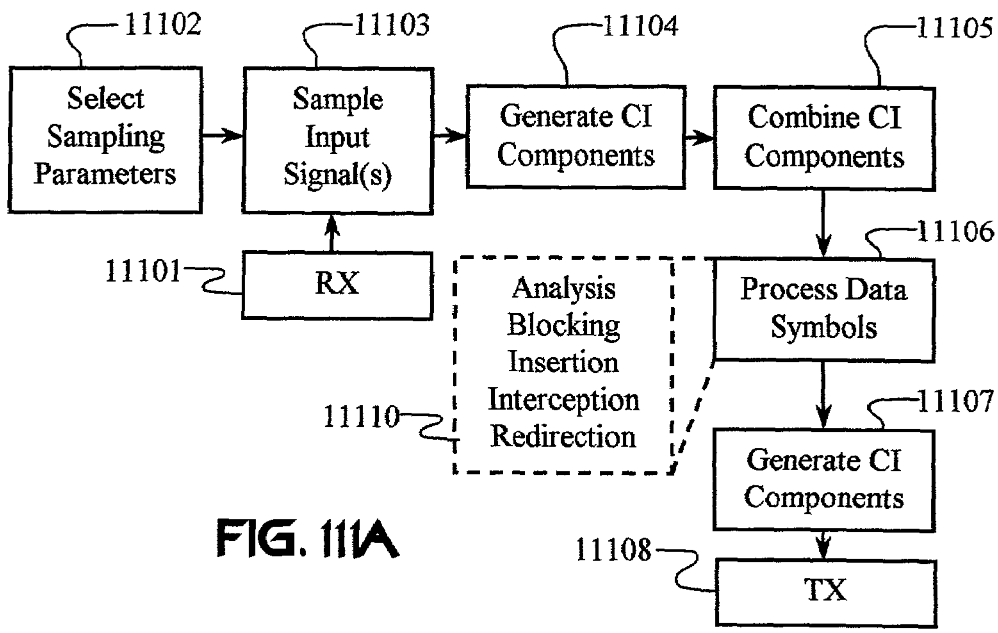

FIG. 111A illustrates a method of receiving, processing, and re-transmitting signals.

Figure 111B:
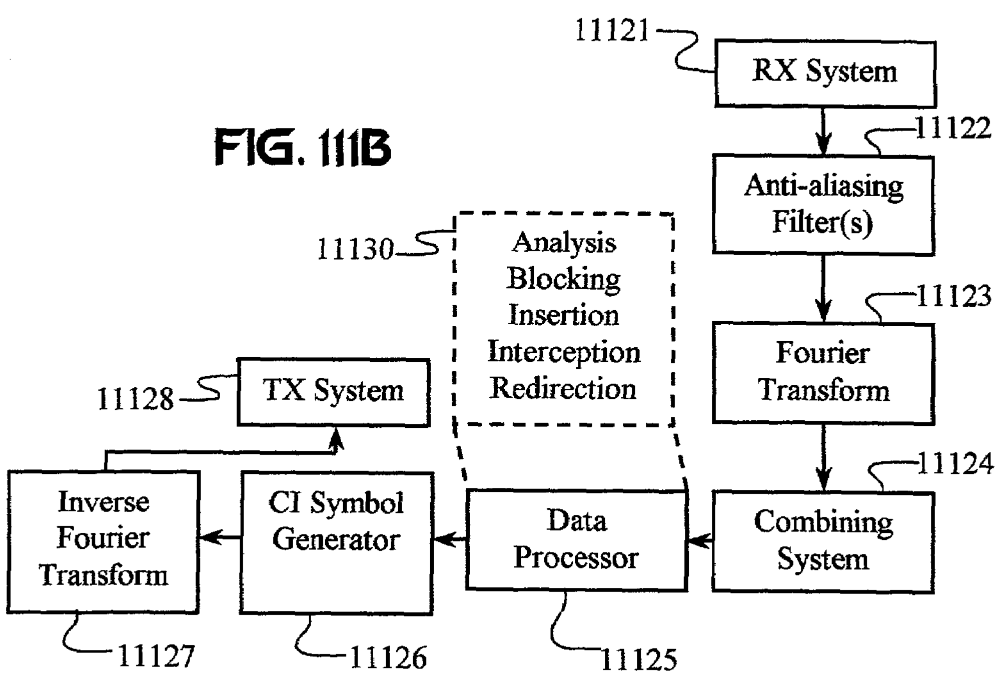

FIG. 111B illustrates a system adapted to receive, process, and re-transmit signals according to the method outlined in FIG. 111A.

DESCRIPTION OF THE PREFERRED EMBODIMENTS

The description of the preferred embodiments assumes that the reader has a familiarity with CI described in the following publications, which are incorporated by reference:

1. B. Natarajan, C. R. Nassar, S. Shattil, M. Michelini, "Application of interferometry to MC-CDMA", accepted for publication in IEEE Transactions on Vehicular Technology.
2. C. R Nassar, B. Natarajan, and S. Shattil, "Introduction of carrier interference to spread spectrum multiple access," IEEE Emerging Technologies Symposium, Dallas, Tex., 12-13 Apr. 1999.
3. B. Natarajan and C. R. Nassar, "Introducing novel FDD and FDM in MC-CDMA to enhance performance," IEEE Radio and Wireless Conference, Denver, Colo., Sep. 10-13, 2000, pp. 29-32.
4. Z. Wu, C. R. Nassar, A. Alagar, and S. Shattil, "Wireless communication system architecture and physical layer design for airport surface management," 2000 IEEE Vehicular Technology Conference, Boston, Mass., Sep. 24-28, 2000, pp. 1950-1955.
5. S. Shattil, A. Alagar, Z. Wu and C. R. Nassar, "Wireless communication system design for airport surface management—Part I: Airport ramp measurements at 5.8 GHz," 2000 IEEE International Conference on Communications, Jun. 18-22, 2000, New OrleanS, pp. 1552-1556.
6. B. Natarajan, C. R. Nassar, and S. Shattil, "Carrier Interferometry TDMA for future generation wireless—Part I: Performance," accepted for publication in IEEE Communications Letters.
7. Z. Wu, C. R. Nassar, and S. Shattil, "Capacity enhanced DS-CDMA via carrier interferometry chip shaping," IEEE 3G Wireless Symposium, May 30-Jun. 2, 2001, San Francisco, Calif.
8. Z. Wu, C. R. Nassar, and S. Shattil, "Frequency diversity performance enhancement in DS-CDMA via carrier interference pulse shaping," The 13th Annual International Conference on Wireless Communications, Calgary, Alberta, Canada, Jul. 7-10, 2001.

9. C. R. Nassar and Z. Wu, "High performance broadband DS-CDMA via carrier interferometry chip shaping," 2000 International Symposium on Advanced Radio Technologies, Boulder, Colo., Sep. 6-8, 2000.
10. Z. Wu and C. R. Nassar, "MMSE frequency combining for CI/DS-CDMA," IEEE Radio and Wireless Conference, Denver, Colo., Sep. 10-13, 2000, pp. 103-106.
11. D. Wiegand, C. R. Nassar, and S. Shattil, "High Performance OFDM for next generation wireless via the application of carrier interferometry," IEEE 3G Wireless Symposium, May 30-Jun. 2, 2001, San Francisco, Calif.
12. B. Natarajan, C. R. Nassar, and S. Shattil, "Exploiting frequency diversity in TDMA through carrier interferometry," Wireless 2000: The 12t Annual International Conference on Wireless Communications, Calgary, Alberta, Canada, Jul. 10-12, 2000, pp. 469-476.
13. B. Natarajan, C. R. Nassar, and S. Shattil, "Throughput enhancement in TDMA through carrier interferometry pulse shaping," 2000 IEEE Vehicular Technology Conference, Boston, Mass., Sep. 24-28, 2000, pp. 1799-1803.
14. S. A. Zekevat, C. R. Nassar, and S. Shattil, "Smart antenna spatial sweeping for combined directionality and transmit diversity," accepted for publication in Journal of Communication NetworkS: Special Issue on Adaptive Antennas for Wireless Communications.
15. S. A. Zekevat, C. R. Nassar, and S. Shattil, "Combined directionality and transmit diversity via smart antenna spatial sweeping," 38th Annual Allerton Conference on Communications, Control, and Computing, Champaign-Urbana, Ill., Oct. 4-6, 2000.
16. S. Shattil and C. R. Nassar, "Array Control Systems For Multicarrier ProtocolS Using a Frequency-Shifted Feedback Cavity" IEEE Radio and Wireless Conference, Denver, Colo., Aug. 1-4, 1999.
17. C. R. Nassar, et. al., MultiCarrier Technologies for Next Generation Multiple Access, Kluwer Academic Publishers: 2001.

Applications of CI, array processing, spatial interferometry, and related systems and methods are cited in the following patents and patent applications, which are hereby incorporated by reference:

1. U.S. Pat. No. 5,955,992
2. U.S. Pat. No. 6,008,760
3. U.S. Pat. No. 6,211,671
4. U.S. Pat. No. 6,331,837
5. PCT Appl. No. PCT/US99/02838
6. PCT Appl. No. PCT/US00/18113
7. U.S. patent application Ser. No. 09/347,182,
8. U.S. Pat. No. 6,882,868
9. U.S. Pat. No. 6,211,671
10. U.S. Pat. No. 6,888,887
11. U.S. patent application Ser. No. 09/718,851
12. U.S. Pat. No. 7,076,168
13. U.S. patent application Ser. No. 10/034,386
14. U.S. Pat. No. 7,092,352
15. U.S. Provisional Pat. Appl. No. 60/163,141
16. U.S. Provisional Pat. Appl. No. 60/219,482
17. U.S. provisional Pat. Appl. No. 60/259,433
18. U.S. provisional Pat. Appl. No. 60/286,850

1. DEFINITIONS

Various terms used in the descriptions of CI methods and systems are generally described in this section. The descriptions in this section are provided for illustrative purposes only, and is not limiting. The meaning of these terms will be apparent to persons skilled in the relevant art(s) based on the entirety of the teachings provided herein. These terms may be discussed throughout the specification and the cited references with additional detail.

The term carrier signal, or carrier, when used herein, refers to at least one electromagnetic wave having at least one characteristic that may be varied by modulation. Carriers may be referred to as subcarriers. Other wave phenomena, such as acoustic waves, may be used as carriers. Carrier signals may include any type of periodic signal. Carrier signals may include sinusoids, square waves, triangle waves, wavelets, and/or arbitrary waveforms. A carrier signal is capable of carrying information via modulation. A carrier signal may be modulated or unmodulated. Multicarrier signals may include multi-frequency signals, multi-spatial signals, multi-directional signals, multipolarization signals, multiple-code signals, multiple sub-space signals, multi-phase-space signals, time-domain (discrete-time) signals, and/or any other set of electromagnetic signals having different orthogonal or quasi-orthogonal values of at least one diversity parameter. A code sequence can be regarded as a carrier signal.

Channel compensation describes signal processing performed on at least one received signal according to channel fluctuations. Channel compensation may include blind adaptive techniques. Alternatively, channel compensation may employ at least one pilot or training signal to probe the channel. Known signals can be used to compensate for various multipath effects (such as fading and/or inter-symbol interference), adapt to non-linear channel distortions (such as chromatic dispersion, four-wave mixing, mode dispersion, and other guided-wave distortions), and/or remove multi-user interference and/or jamming signals. Channel compensation may employ a combination of adaptive and reference-signal processing. Channel compensation may include adaptive channel equalization. Preferably, channel compensation in a CI and/or array implementation employs some type of combining.

Channel estimation describes any combination of blind adaptive techniques and reference-signal processing to determine signal distortion resulting from the effects of at least one communication channel. In one example, a pilot symbol is transmitted periodically from a remote transmitter. A local receiver exploits the known transmission time, frequency, polarization, and/or any other diversity-parameter value of at least one pilot symbol to process the transmitted pilot symbol and estimate the distortion caused by the channel environment. On the basis of an estimated value, distortion in the received data symbols is compensated.

A combiner, as used herein, describes any system, device, and/or algorithm adapted to combine a plurality of signals or symbol values. A combiner may combine multiple carriers or signal values to generate a superposition signal. A combiner may provide weights to carriers or signal values to generate one or more superposition signals having predetermined characteristics, such as time domain, frequency domain, spatial domain, sub-space domain, and/or other physical characteristics. A combiner may compensate for noise, interference, and/or distortion.

Combining often involves generating weights based on channel estimates. The weights may be adapted relative to some performance measurement, such as probability of error, bit error rate (BER), signal-to-noise ratio (SNR), signal-to-noise-plus-interference ratio (SNIR), and/or any other appropriate signal-quality parameter. Performance measurements may include any combination of instantaneous and averaged performance measurements. Averaging may be performed over one or more diversity parameters. A combiner may perform combining in more than one diversity-parameter space. For example, MMSE combining may be performed in the frequency domain to generate a plurality of combined signals that may be processed via equal-gain combining in the time domain. Other types of combining, as well as combining in different dimensions may be performed.

A correlator or matched-filter receiver is any device, system, or algorithm, or combination thereof adapted to correlate at least one input signal with at least one reference signal. A correlator or matched-filter receiver generates at least one signal indicative of the degree of correlation between at least one input signal and at least one reference. In one set of embodiments, the degree of correlation is evaluated using some signal-processing technique (e.g., shift and sum, weight and sum, sample and sum) that depends on the reference. In another set of embodiments, the correlator multiplies (or performs some equivalent operation) reference and input signals and sums the products over a predetermined time interval. Various techniques are available for correlating a received signal with a reference sequence, including those using surface acoustic wave (SAW) correlators, tapped delay line (TDL) correlators, serial correlators, and others. A non-coherent digital matched filter may be employed, such as a matched filter having four real filter channels to perform four-phase quantization in the complex plane. A matched-filter receiver may separate the received signal into real and imaginary parts and correlate both real and imaginary parts for a plurality of chip sequences (e.g., in phase and quadrature phase chip sequences). A matched-filter receiver may combine the real and imaginary signals into a unified signal data stream. For each received symbol, the receiver may determine which of a plurality of phase sectors in which the phase angle lies.

A decoder, as used herein, describes any system, device, or algorithm capable of decoding an encoded information (e.g., data) signal. A decoder typically decodes an encoded signal with respect to one or more reference signals (e.g., codes, decode sequences, code keys, etc.). Decoding may take the form of a correlation process (as defined mathematically), matched filtering, or any kind of processing (e.g., complementary processing) that extracts at least one desired information signal from the coded signal. Correlation, as used herein without specifically conveying the mathematical process of correlation, is meant to convey any process of decoding a signal. In a preferred embodiment, decoding involves summing samples collected over a predetermined interval. In another embodiment, collected samples are phase shifted with respect to at least one code before being summed. In some multicarrier systems, it is impractical to perform matched filtering or the mathematical correlation process. Rather, data symbols are obtained from the output bins of a Fourier transform process. Similarly, other types of transforms or inverse transforms may be performed to decode signals.

A guard interval is a redundant signal period designed to reduce inter-symbol interference by cyclically repeating the signal waveform of the effective symbol period. The effective symbol length, the guard interval length and the number of carrier waves may be determined on the basis of either a fixed-reception mode or a mobile-reception mode. The optimal values of the guard interval length, the effective symbol length, and other transmission parameters may vary depending on the mode of reception.

An information signal, as used herein, describes one or more signals that convey some form of useful information via magnitude, phase, frequency, polarization, mode, direction, and/or some signal property derived therefrom. CI-based information signals may include any type of communication signal, such as, but not limited to voice, data, and text. Information signals may include any of various types of remote-sensing signals, such as radar signals, Lidar signals, spectroscopy signals of various types (e.g., absorption, scatter, luminescence, resonant, emission, harmonic, intermodulation, etc.), probing signals, and imaging signals (e.g., X-ray, gamma-ray, ultrasound, seismic survey, acoustic, sonar, optical, pulse radio, spread spectrum, etc.). Any information signal may be considered to be a CI-based signal if it is processed via CI signal-processing techniques. Thus, a received non-CI signal may be converted into a CI signal by decomposing the received signal into orthogonal sub-carrier components.

Interfering signals, as used herein, describes any plurality of signals (typically data symbols) impressed upon at least one similar diversity-parameter value. For example, two or more data symbols that are impressed on the same frequency and time interval of a signal received by a receiver are interfering signals. Although, the receiver may be a multi-element receiver that can spatially discriminate between (or separate) the received data symbols, the data symbols are considered to be interfering by virtue of the interferometry processing needed to separate them.

The term modulation, as used herein, refers to at least one method of impressing some signal (such as an information signal, a code signal, and/or a sub-carrier) onto an electromagnetic signal. Modulation describes the adjustment of one or more physical signal characteristics with respect to an information signal. Signals, such as analog and/or digital information signals, may be impressed onto one or more carrier signals via any combination of modulation techniques, including, but not limited to, amplitude modulation, phase modulation, frequency modulation, pulse modulation, and/or polarization modulation. Pulse modulation (such as CI-pulse modulation) may include pulse-amplitude modulation, pulse-code modulation, pulse-frequency modulation, pulse-position modulation, and/or pulse-width modulation. CI methods are commonly combined with modulation, such as Pulse Amplitude Modulation (PAM), Frequency Shift Keying (FSK), Phase Shift Keying (PSK), and Quadrature Amplitude Modulation (QAM). Coded modulation, such as trellis-code modulation, may be performed. Data symbols may be modulated onto a code sequence, such as a multiple-access code, a spreading code, an encryption code, a channel code, etc. A code sequence may include digital and/or analog signals. Examples of code sequences include direct-sequence codes, MC-CDMA codes, CI codes, CI/DS-CDMA codes, frequency-hopping codes, chirp codes, coherence-multiplexing codes, sub-channel codes, and code length division multiplexing codes. Various types of modulation can include the formation of code-chip values, continuous-code values, and/or code-chip sequences based on data-symbol values. Data symbols may be input to a code-generation process.

A multi-element receiver describes any receiver adapted to produce multiple separate signals relative to different diversity-parameter values. Each element of a multi-element receiver preferably has a different responsiveness relative to at least one diversity parameter value. For example, spatially separated receiver elements typically have different amplitude and phase responses to received signals by virtue of their physical separation. This is particularly true when received signals are affected by a multipath environment. A multi-element receiver may include a single reflector with multiple feeds.

A multi-element receiver may have a single interface to a communication channel but provide different responsiveness to signals having different physical characteristics. A receiver having a filter bank or equivalent frequency-selective system can be regarded as a multi-element receiver. A receiver that processes a plurality of received coded signals is a multi-element receiver. A multi-element receiver may have selective responsiveness relative to different values of one or more diversity parameters, such as, but not limited to, phase, mode, polarization, polarization-rotation rate, phase-rotation rate, frequency rate-of-change, amplitude rate-of-change, angle of arrival, angle-of-arrival rate-of-change, spatial gain distribution, etc.

A multi-element transmitter, as recited herein, describes any transmitter adapted to couple multiple interfering signals into a communication channel. Interfering signals are signals having one or more similar or overlapping diversity-parameter values or that result in having one or more similar or overlapping diversity-parameter values due to propagation in a communication channel. A multi-element transmitter may include a single data source in which different data symbols or multiple-access channels are transmitted on overlapping diversity-parameter values.

A multi-element transmitter may include multiple data sources that are each transmitted by a separate transmitter unit. A multi-element transmitter may include a multi-frequency transmitter, a multi-code transmitter, a multi-polarization transmitter, a multi-directional transmitter, etc. Overlapping diversity parameters may include at least one of mode, frequency, phase, amplitude, polarization, polarization-rotation rate, phase-rotation rate, angle of arrival, spatial location, spatial gain distribution, beam-pattern sweep rate, code, etc.

Orthogonal overlapping carriers describe two or more carriers that are modulated such that their spectra overlap. If the frequency separation between any two adjacent frequencies is made equal to the reciprocal of the effective symbol period for multicarrier transmission, the nil point of the frequency spectrum of each modulated wave coincides with the center frequency of the adjacent modulated waves. CI signals can include orthogonal, overlapping signals. In some applications, CI carriers may be orthogonal, whereas superpositions of the CI carriers may include pseudo-orthogonal time-domain waveforms.

A receiver, as used herein, includes any system, device, or process that employs any combination of detection and estimation. Detection is the task of determining if a predetermined signal set is present in an observation. Estimation is the task of obtaining or determining values of one or more signal parameters. A receiver may perform various signal-processing operations, including, but not limited to, filtering, channel selection automatic gain control, timing recovery, carrier acquisition, carrier recovery, bandwidth adjustment, sample-rate adjustment, matched filtering, soft-decision quantization, amplification, decoding, DC signal removal, equalization, combining, spectral shaping, noise-bandwidth control, spectral translation, amplifier linearization, de-interleaving, in-phase/quadrature-phase gain and phase balancing, etc.

A sub-space processor, as described herein, includes any system, device, or algorithm, or combination thereof capable of separating interfering signals. Each separated interfering signal is said to occupy a signal sub-space. The type of signal sub-space corresponds to the type of processing and/or the diversity parameter(s) that define the interference. For example, a directional signal sub-space may correspond to phased array processing. A spatial signal sub-space may be defined as a subspace generated by spatial interferometry multiplexing. A phase sub-space (or phase space) can correspond to CI processing. Signal sub-spaces may be defined by one or more diversity parameters. Subspaces may even have their own subspaces.

Synchronization describes one or more time-domain-related techniques by which various timing aspects of signal processing are controlled. Successful CI reception requires that a receiver maintain the correct symbol synchronization and sampling frequency. Symbol synchronization means that the receiver knows at which point of time each symbol begins and times the symbol detection correspondingly. Sampling frequency refers to the frequency at which an A/D converter in the receiver takes samples from a received analog oscillation in order to convert the signal into digital form.

2. INTRODUCTION TO CARRIER INTERFEROMETRY

Various aspects of the present invention are based on CI. Other aspects of the invention are particularly applicable to CI methods and systems. There are too many variations, permutations, and specific implementations of CI to describe in this introduction. Accordingly, the descriptions and examples of CI described herein are not intended to limit the scope of how CI is defined, but rather to illustrate a few of the many ways that the present invention may be implemented. Descriptions of CI are also intended to clarify some of the aspects and embodiments of the present invention.

Inter-symbol interference occurs when a reflected signal travels a distance sufficiently greater than the distance traversed by a line-of-sight signal so as to cause a delay greater than the duration of a data symbol. CI avoids inter-symbol interference by transmitting data symbols on narrowband carriers. Multipath fading occurs when a narrowband signal traverses two paths having a half-cycle phase difference. CI avoids the problem of multipath fading by transmitting each data symbol on multiple carriers that are adequately separated with respect to frequency (or some other diversity parameter). Redundant modulation typically reduces bandwidth efficiency. CI avoids the problem of reduced bandwidth efficiency by modulating up to 2N data symbols on each of N carriers. Increased interference on one or more carriers typically increases probability of error. CI avoids the problem of increased interference and probability of error by exploiting interferometry to orthogonalize data symbols modulated on the same carriers. Thus, CI achieves higher throughput with better signal quality than any other multiple-access protocol.

Figure 1A:
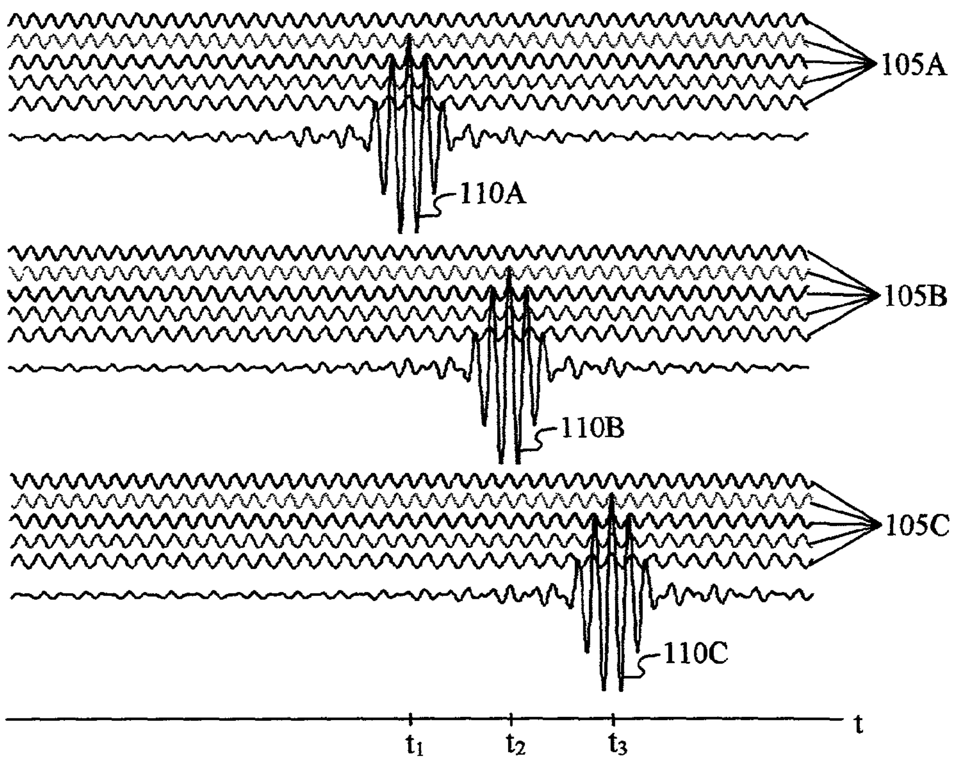
FIG. 1A illustrates CI carriers having phase fronts that are aligned at a specific time. The CI carriers combine to generate a plurality of superposition signals that are orthogonal to each other in time.

FIG. 1A illustrates a basic form of CI in which a plurality of CI carrier sets 105A, 105B, and 105C each have phase fronts aligned at a specific time $t_1$, $t_2$, and $t_3$, respectively. A plurality of superposition signals 110A, 110B, and 110C result from a summation of each carrier set 105A, 105B, and 105C, respectively. The superposition signal 110A illustrates a pulse envelope centered at time $t_1$. All of the carriers 105A are in-phase at time $t_1$ and thus, combine constructively. The superposition signal 110A has a maximum magnitude at time $t_1$. At other times (e.g., times $t_2$ and $t_3$), the carriers in carrier set 105A combine destructively, resulting in low or undetectable signal levels.

In CI, the individual signal components 105A, 105B, and 105C contributing to a CI pulse 110A, 110B, and 110C, respectively, or information symbol $s_n$ have an extended duration $T_s$ relative to the pulse width $T_{pulse}$. The extended symbol duration $T_s$ (i.e., the duration of component waveforms corresponding to a symbol $s_n$) reduces spectral sidelobes associated with the transmitted information symbol $s_n$. The extended waveform shape can be overlapped with extended waveforms associated with other symbols $s_n'$ ($n' \neq n$). Naturally, interference will occur between the waveforms associated with different data symbols. However, CI coding can be employed to provide orthogonality (or quasi-orthogonality) between the composite waveforms (i.e., the data symbols $s_n$).

Although multicarrier-based CI signals (such as signals 110A, 110B, and 110C) can resemble sinc-shaped pulses, which are orthogonalized by time-domain pulse positioning, it is important to note that multicarrier-based CI signals are composed of multicarrier (e.g., multi-frequency) components and are processed (e.g., generated and/or decomposed) in the frequency domain.

The signal 110A results from an addition of N carriers that have a uniform frequency separations. FIG. 1A illustrates a simple case of no tapered windowing of the carrier amplitudes. The CI carriers are uniformly spaced in frequency $f_n=f_o+nf_s$, where $f_o$ is some zero or non-zero offset frequency, $f_s$ is a non-zero shift frequency, and n is some integer or set of integers. A superposition CI signal, such as signal 110A, is expressed by:

$$e(t)=\sum_{n=1}^{N} e^{i[(\omega_c+n\omega_s)t+n\Delta\phi]},$$

which has a magnitude of:

$$|e(t)|=\left|\frac{\sin(N(\omega_s t+\Delta\phi)/2)}{\sin((\omega_s t+\Delta\phi)/2)}\right|.$$

The CI signals are periodic with period $1/f_s$ for an odd number of carriers N and with period $2/f_s$ for an even number of carriers N. The main lobe has a duration $2/Nf_s$ and each of the N-2 side lobes has a duration $1/Nf_s$. The amplitude of the $l^{th}$ side lobe with respect to the main lobe amplitude is:

$$A(l)=\frac{1}{N\sin(\pi(l+1/2)/N)}$$

Applying a phase shift of $n\Delta\phi_k$ to each $n^{th}$ carrier shifts the CI envelope in time by $\Delta t=\Delta\phi_k/2\pi f_s$. Therefore, N signals can be positioned orthogonally in time. The phase shifts can provide necessary phase relationships to create the desired timing of the information signal received by at least one receiver (not shown).

The cross correlation between users is:

$$R_{cc}(\tau)=\frac{1}{2f_s}\frac{\sin(N2\pi f_s\tau/2)}{\sin(2\pi f_s\tau/2)}\cos((N-1)2\pi f_s\tau/2),$$

where $\tau$ is the time shift between envelopes. Zeros occur at: $k/Nf_s$, k=1, 2, . . . , N−1 and at $(2k-1)/2(N-1)f_s$, k=1, 2, . . . , N−1. CI can support N orthogonal users (or channels). If additional users or signals need to be accommodated, CI provides N−1 additional positions to place signals.

Figure 1B:
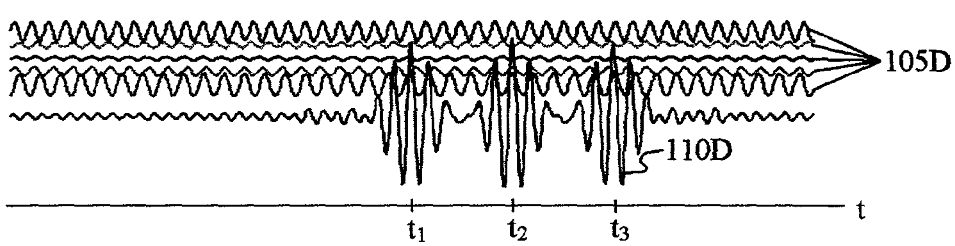
FIG. 1B illustrates an in-phase superposition of CI carriers of a carrier set that produces a superposition signal corresponding to a sum of the superposition signals shown in FIG. 1A

A CI signal centered at time $\tau$ is orthogonal to the CI signal centered at time $t_1$ whenever the difference between $\tau$ and $t_1$ is $\Delta t=k/Nf_s$, k=1, 2, . . . , N−1. This enables CI waveforms to represent information symbols located sequentially in time without creating inter-symbol interference. The superposition signal 110D shown in FIG. 1B represents a sum of the orthogonally positioned superposition signals 110A, 110B, and 110C.

An offset in the time domain corresponds to linearly increasing phase offsets in the frequency domain. A CI signal with a time offset $\tau=k/Nf_s$ is equivalent to a CI carrier set with carriers 1 to N having phase offsets:

$$\{\phi_1\phi_2, \ldots, \phi_N\}=\{0, 2\pi k/N, \ldots, 2\cdot 2\pi k/N, \ldots, (N-1)\cdot 2\pi k/N\}.$$

Orthogonality between CI signals can be understood as an appropriate time separation $\tau\epsilon\{k/f_s, k=1, 2, \ldots, N-1\}$ between superposition signals or as carriers of each carrier set coded with a different polyphase spreading sequence:

$$f(\phi)=\{e^{j\theta 1}, e^{j\theta 2}, \ldots, e^{j\theta N}\}=\{e^{j\theta}, e^{j2\pi k/N}, \ldots, e^{j(N-1)\cdot 2\pi K/N}\}$$

with respect to values of k=0, 1, . . . , N−1.

Figure 1C:
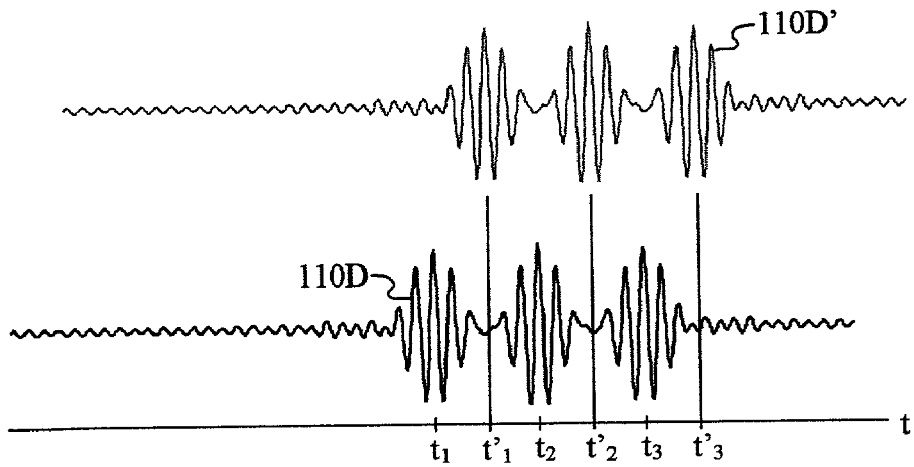
FIG. 1C illustrates two sets of orthogonal superposition signals. The signals in each set are orthogonal to each other. However, signals in a first set are quasi-orthogonal to signals in a second set.

A set of quasi-orthogonal signals can be determined from non-orthogonal time offsets that minimize the mean-squared value of the interference between the quasi-orthogonal signals. This criteria is satisfied by multiples of a time-offset value $\Delta t=1/(2Nf_s)$. FIG. 1C shows a first set of N orthogonal signals 110D represented in time by:

$$\{t_1, t_2, \ldots, t_{N-1}\}=\{1/f_s, 2/f_s, \ldots (N-1)//f_s\}.$$

A second set of N orthogonal signals 110D' is represented in time by:

$$\{t'_1, t'_2, \ldots, t'_{N-1}\}=1/(2Nf_s)+\{1/f_s, 2/f_s, \ldots (N-1)/f_s\}.$$

Figure 1D:
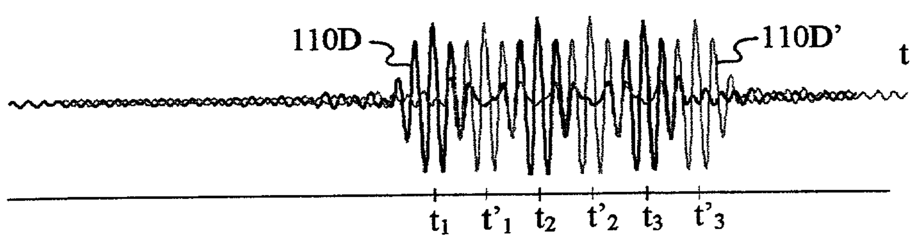
FIG. 1D shows a summation of two orthogonal sets of CI signals wherein signals in a first set are quasi-orthogonal to signals in a second set.

The first set of signals 110D is quasi-orthogonal to the second set 110D' and results in a minimal amount of interference, as shown in FIG. 1D.

This result can also be expressed in terms of carrier phase offsets using the equivalence between shifts in the time domain and phase offsets in the frequency domain. A first set of N orthogonal signals is represented in phase by N complex spreading codes:

$$f_1(\phi)=\{e^{j\phi 1}, e^{j\phi 2}, \ldots e^{j\phi N}\}=\{e^{j0}, e^{j2\pi k/N}, \ldots, e^{j(N-1)\cdot 2\pi k/N}\}$$

A second set of N orthogonal signals is represented in phase by N complex spreading codes:

$$f_2(\phi)=\{e^{j\phi' 1}, e^{j\phi' 2}, \ldots, e^{j\phi' N}\}=\{e^{j(0+\Delta\phi)}, e^{j(2\pi k/N+\Delta\phi)}, \ldots e^{j(N-1)\cdot 2\pi k/N+\Delta\phi)}\}$$

where $\Delta\phi=\pi/N$.

The superposition signal 110D in FIG. 1B can be thought of as a superposition of complex-weighted carriers in a carrier set 105D or a sum of the superposition signals 110A, 110B, and 110C. The carrier set 105D represents a sum of the carrier sets 105A, 105B, and 105C. The complex amplitudes of carrier set 105D can be characterized by a complex-weight vector $w=[w_1, w_2, \ldots, w_N]$. Each value $w_n$ of the weight vector w corresponds to a particular carrier frequency $f_n$. The values $w_n$ can be derived from a complex addition of carriers in the carrier sets 105A, 105B, and 105C. The values $w_n$ can be derived from summing complex numbers representing the magnitude and phase of each carrier in the carrier sets 105A, 105B, and 105C.

CI signals demonstrate both excellent frequency resolution and excellent time resolution. A CI signal is composed of multiple narrowband carriers that allow it to be resolved into its frequency components. When observed in the time domain, a basic CI signal is very narrow, enabling it to be easily separated from other CI signals and to resolve the channel's multipath profiles.

Because the period and width of the pulse envelope depends on the amplitudes, relative phases, and frequency separation of the CI carriers, the frequency of each carrier may be changed without affecting the pulse envelope as long as the amplitudes, relative phases, and frequency separation are preserved. Thus, frequency hopping and frequency shifting of the carriers does not affect the temporal characteristics of the superposition signal, such as superposition signal 110A. Tapering the amplitude distribution of the CI carriers broadens the main-lobe width and reduces the amplitude of the side lobes.

A CI signal has a number of carrier signals that may each have a bandwidth that is less than the coherence bandwidth of the communication channel. The coherence bandwidth is the bandwidth limit in which correlated fading occurs. The total bandwidth of the CI signal preferably exceeds the coherence bandwidth.

CI carriers corresponding to any particular user, channel, or data symbol may be spaced in frequency by large amounts to achieve a large system bandwidth relative to the coherence bandwidth. In this case, CI makes use of frequency to achieve uncorrelated fading. However, any diversity parameter or combination of diversity parameters may be used to achieve uncorrelated fading over the system bandwidth, or even between individual carriers.

The system bandwidth of a group of CI carriers may be selected relative to the coherence bandwidth of one or more subchannels, such as spatial subchannels. Carriers that are closely spaced in frequency may have uncorrelated fading if they are transmitted from different locations or have different degrees of directivity. CI carriers transmitted from different locations may have different fades over each spatial subchannel and therefore, can benefit from diversity combining at a receiver (not shown).

Phase shifts applied to an $n^{th}$ carrier to separate a $k^{th}$ channel from adjacent channels are given by:

$$\phi_{kn}=\pi knf_s(\Delta)+\phi^o_{kn}=\pi kn/N+\phi^o_{kn}$$

where $\phi^o_{kn}$ is an initial phase-offset corresponding to the $n^{th}$ carrier and the $k^{th}$ channel. The values of $\Delta t$ depend on whether the channel spacing is orthogonal or quasi-orthogonal.

Although FIG. 1A and FIG. 1B illustrate an in-phase superposition of carrier signals, this example can be extended to other superpositions of CI. For example, the time offset $\Delta t$ (and the corresponding carrier phase shifts $\phi_{kn}$) for adjacent channels may be applied to CI implementations that do not have in-phase superpositions. The time offset $\Delta t$ (and thus, the phase shifts $\phi_{kn}$) derived in this case are also relevant to CI implementations that process the received carriers separately. When each carrier is processed separately, phase-offset coding (in addition to the phase offsets $\phi_{kn}$ used to separate channels) may be used to minimize the peak of the superposition signal.

The carrier sets 105A, 105B, and 105C have phase offsets corresponding to a pulse-width duration. However, any type of orthogonal (e.g., non-overlapping) or quasi-orthogonal (e.g., overlapping) spacing may be provided. Carrier sets having quasi-orthogonal (or non-orthogonal) spacing may be processed with multi-user (or multi-channel) detection techniques or with any other type of interference suppression.

FIG. 1A and FIG. 1B illustrate several levels of signal decomposition that reduce a complex time-domain signal into simple components. The time-domain pulses may be scaled and positioned to produce a predetermined time-domain signal indicative of an information signal, coding, and at least one transmission protocol. Multiple frequency components may be weighted to produce an information signal having predetermined time-domain characteristics. Similarly, multiple frequency components that comprise the pulses may be selected and weighted to impart predetermined characteristics to the pulses. The scale of the components selected for signal processing can be selected to provide a desired granularity for the information architecture.

Modulation of the pulses, the carriers, or both may be performed over the duration of the signals shown in FIG. 1A and FIG. 1B. Carrier modulation may be performed over a pulse-repetition period, a pulse duration, or any multiple or fraction of either.

Figure 2A:
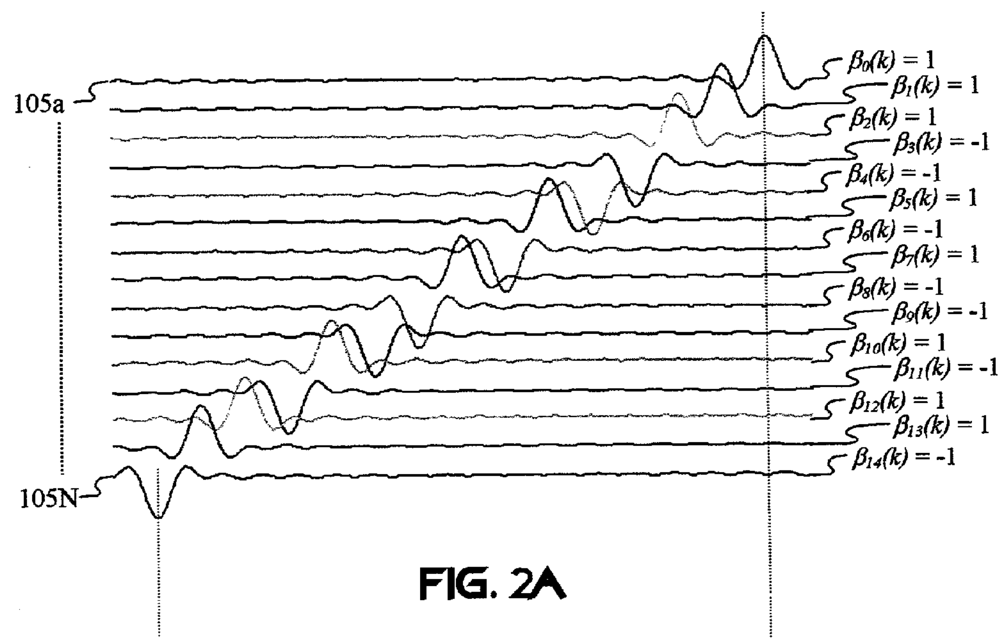
FIG. 2A shows a plurality of carrier signals defined by a range of carrier frequencies and sets of phase offsets, such as phase offsets resulting in a particular time-domain characteristic of a superposition of the carriers.
Figure 2B:
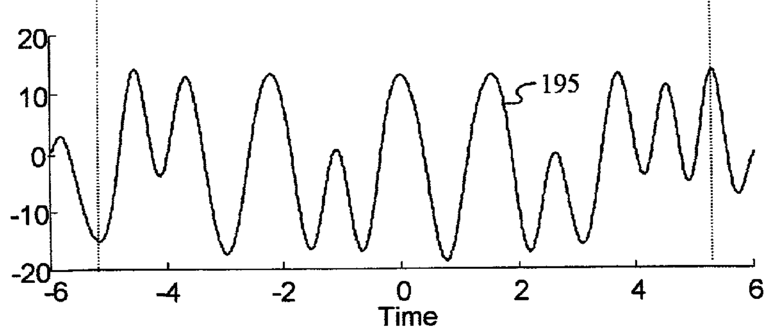
FIG. 2B shows a plurality of carrier signals defined by a range of carrier frequencies, sets of phase offsets, and sets of carrier amplitudes and a superposition of the carriers. Either or both the superposition signal and the set of carriers may be processed for transmission and/or reception.

FIG. 2A and FIG. 2B illustrate how a constant weight applied to each of a plurality of carrier signals (e.g., carrier frequencies or time-offset pulses) generates a periodic binary code (such as a DS-CDMA code) sequence. In this case, each CI pulse is represented by a pulse envelope. A binary code chip $\beta_n(k)$ applied to a pulse envelope is represented by an upright pulse (corresponding to $\beta_n(k)+1$) or an inverted pulse (corresponding to $\beta_n(k)=-1$). CI pulses may include an effective carrier signal bounded by a pulse envelope, as shown in FIGS. 1A, 1B, 1C, and 1D. Polyphase code chips may be represented by phase shifts of the effective carrier. Code chips may be impressed onto carrier signals (e.g., carrier frequencies or time-offset pulses) via any combination of modulation techniques, such as amplitude modulation, phase modulation, frequency modulation, pulse modulation, polarization modulation, etc. The code sequence may be modulated with information symbols over a code (pulse) period, or the information signal may be applied to code weights applied to the carriers during a code interval. Information symbols may include M-ary modulated symbols.

Information modulation applied to each group of carriers may include a relative time offset corresponding to a constant phase offset $\phi^o_{kn}$. Modulation may include any modulation scheme including, but not limited to, pulse-amplitude modulation, amplitude modulation including continuous phase modulation (CPM) and phase shift key, phase modulation including continuous and shift key, frequency modulation including continuous and shift key, time-offset modulation, and/or any differential modulation techniques. Modulated signals may include guard bands, cyclic prefixes, codes, and the like, which are well known in the art.

Known CPM signals include several variations; these include minimum shift keying (MSK) and its variations, e.g., Gaussian pre-filtered MSK (GMSK), superposed quadrature amplitude modulation (SQAM), and staggered quadrature offset raised cosine modulation. Explanations of various types of CPM techniques may be found in the following references: Frank Amoroso and James A. Kivett, "Simplified MSK Signaling Technique," IEEE Transactions on Communications, April 1977, pp. 433-441; Mark C. Austin and Ming U. Chang, "Quadrature Overlapped Raised-Cosine Modulation," IEEE Transactions on CommunicationS, Vol. Com-29, No. 3, March 1981, pp. 237-249; Kazuaki Murota and Kenkichi Hirade, "GMSK Modulation for Digital Mobile Radio Telephony," IEEE Transactions on CommunicationS, Vol. Com-29, No. 7, July 1981, pp. 1044-1050; and J. S. Seo and K. Feher, "SQAM: A New Superposed QAM Modem Technique," IEEE Transactions on CommunicationS, Vol. Com-33, March 1985, pp. 296-300. The invention may utilize MSK signals. However, the use of other variants of MSK and other CPM signals are within the scope and spirit of the invention.

Various types of spread spectrum may be employed on each CI carrier. For example, direct-sequence coding, coherence multiplexing, code-length division multiple access, frequency-modulation sweep, and/or other spread-spectrum techniques may be provided to each carrier. Spread-spectrum coding may be provided to prior to or following modulation.

Figure 3:
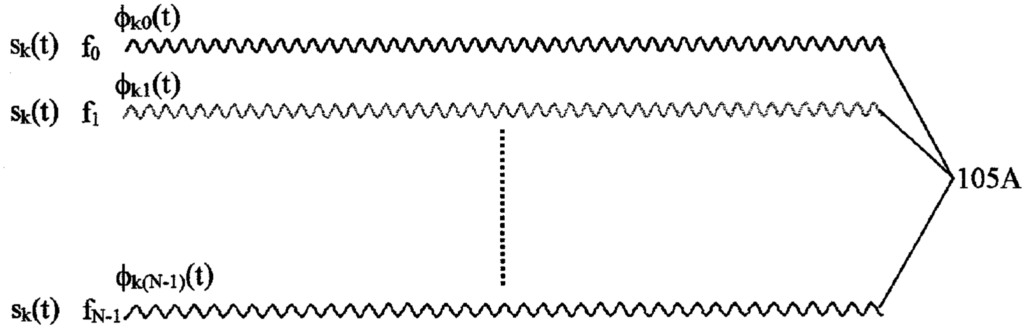
FIG. 3 shows a plurality N of carrier signals that are redundantly modulated with a stream of data symbols $S_k(t)$ associated with a $k^{th}$ channel.

FIG. 3 shows a plurality N of carrier signals that are redundantly modulated with a stream of data symbols $s_k(t)$ associated with a $k^{th}$ channel. Each of the carriers may have a phase: $\phi_{kn}=\phi_{kn}(t)+\phi^o_{kn}$, where (t) denotes a time-dependent phase and $\phi^o_{kn}$, denotes a constant-value initial phase. The time-dependent phase term $\phi_{kn}(t)$ can represent the relative phase variation between a plurality of carrier signals resulting from the carrier signals having different frequencies. The time-dependent phase term $\phi_{kn}(t)$ may include an impressed variation or coding to effect one or more benefits, such as reduced peak power of the superposition signal, enhanced security, improved diversity, and additional multiplexing/demultiplexing capabilities. The constant-valued terms $\phi^o_{kn}$ may include zero and/or non-zero values. The terms, may be selected to provide operational benefits, such as reduced peak power of the superposition signal, coding, and enhanced channelization.

The terms $\phi_{kn}$ may be defined as parts of a code $\Phi_k=\Phi(\phi t, k,n)$ that is a function of one or more elements of a set including phase 0, time t, channel (or user) k, and carrier n. Thus, a redundantly modulated data stream $s_k(t)$ can be represented as having been acted upon by the code $\Phi(\phi, t,k,n)$. A received signal may include a plurality of data streams, each acted upon by various codes $\Phi(\phi t,k,n)$. A received signal can be defined as:

$$R(t)=\sum_{k=k'}^{k''}\Phi_k s_k(t).$$

One possible method for processing a coded data stream includes providing inverse coding to the received signal in order to decode at least one desired data stream:

$$\hat{s}_k(t)=\Phi_n^{-1}R(t).$$

Additional processing may be performed including, but not limited to, distortion compensation, multi-user detection, interference cancellation, filtering, sampling, and/or additional decoding.

Figure 4A:
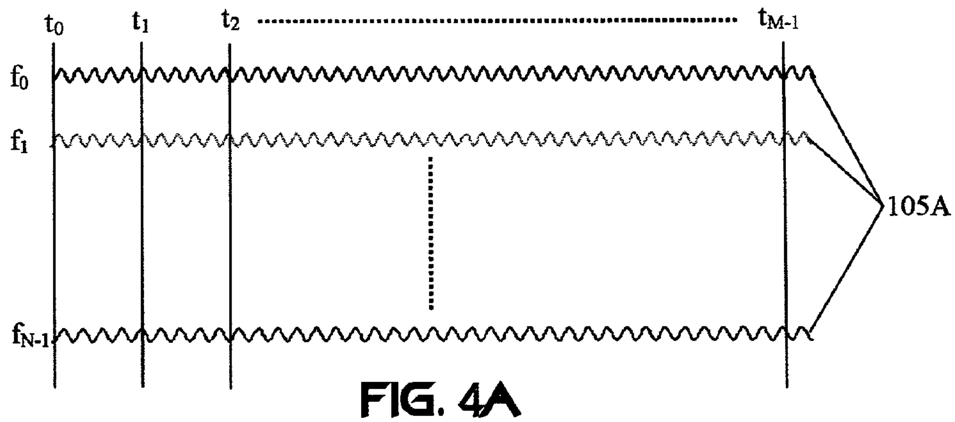
FIG. 4A illustrates the use of different phases and time intervals applied to one set of carrier frequencies to distinguish a $k^{th}$ channel.

FIG. 4A illustrates different phases and time intervals applied to one set of carrier frequencies to distinguish a $K^{th}$ channel from at least one other channel. The set of carriers includes a plurality N of carrier frequencies that are redundantly modulated with a stream of data symbols $s_k(t)$ associated with the $k^{th}$ channel. However, each carrier is modulated in at least one of a plurality of time intervals, and at least some of the symbols $S_k(t)$ of the $k^{th}$ data stream are spread across multiple time intervals. This provides both frequency diversity and time diversity to the $k^{th}$ channel.

Figure 4B:
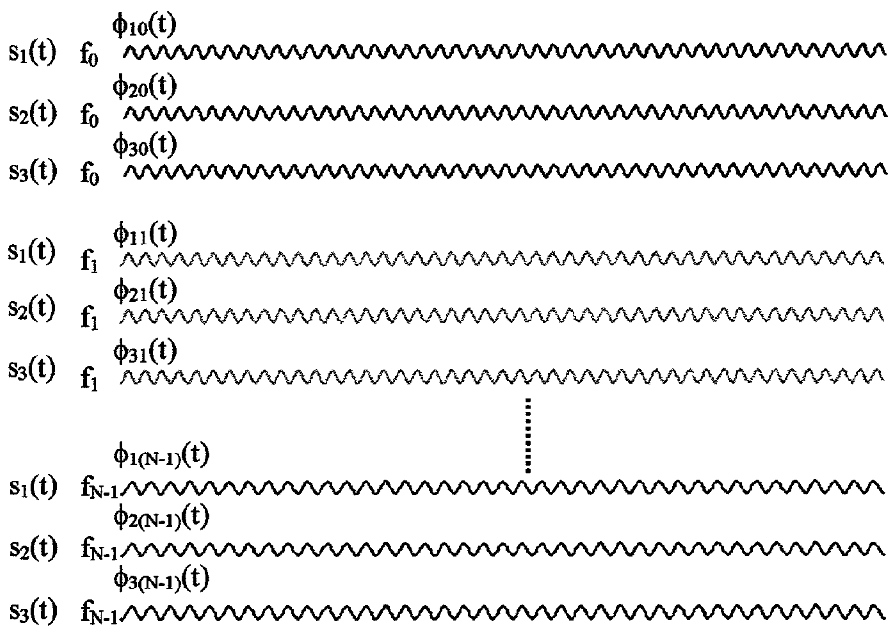
FIG. 4B represents a plurality of data symbols $s_1(t)$, $s_2(t)$, and $s_3(t)$ modulated onto the same carrier frequencies within the same time interval.

FIG. 4B represents a plurality of data symbols $s_1(t)$, $s_2(t)$, and $s_3(t)$ that are each modulated onto the same carrier frequencies within the same time interval. Unlike conventional OFDM, which transmits one data bit per frequency channel per time slot, CI provides orthogonality to multiple data symbols sharing the same frequency channel and time slot. OFDM merely acts as a group of single-carrier channels, whereas in CI, the individual carriers work together to convey data symbols. Each of the CI carriers having an $n^{th}$ frequency $f_n$ has a phase:

$$\phi_{kn}=\phi_{kn}(t)+\phi^o_{kn}$$

where $\phi_{kn}(t)$ denotes a time-dependent phase and $\phi^o_{kn}$ denotes a constant-value initial phase. In this case there are three channels, so k has values of 1, 2, and 3.

An $n^{th}$ carrier frequency of a $k^{th}$ channel may have a time offset $t_{kn}$ where:

$$t_{kn}=t_{kn}(t)+t^o_{kn}.$$

The term $t_{kn}(t)$ denotes a time-varying time offset (or interval start time) and $t^o_{kn}$ denotes a constant-value initial time offset. The time-varying term $t_{kn}(t)$ may represent a plurality of time intervals that are uniformly spaced (e.g., $t_{kn}(t)=m\Delta t_{kn}$, where m=0, 1, 2, . . . , and $\Delta t_{kn}$ is some constant time interval) or non-uniformly spaced. A $k^{th}$ channel may be provided with a phase code $\Phi_k$ and/or a time code $T_k$ wherein phase values $\phi_{kn}$ and/or time values $t_{kn}$ are predetermined or adapted with respect to at least one performance objective, such as reducing peak power, improving a signal-to-interference plus noise ratio, enhancing diversity, providing security, reducing a BER, etc.

Figure 5:
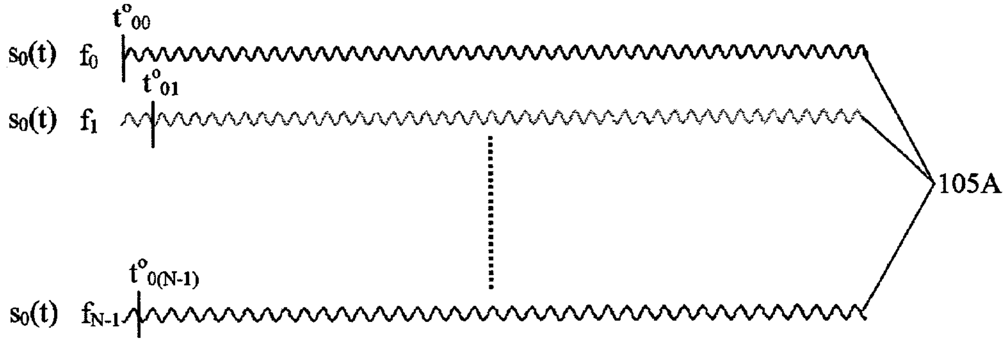
FIG. 5 illustrates a plurality of time-offset carrier signals having different initial time offsets $t^o_{kn}$.

FIG. 5 illustrates a plurality of time-offset carrier signals having different initial time offsets $t^o_{kn}$. Data streams (or any other type of information signal) may be redundantly modulated onto the time-offset carrier signals, either directly or with respect to some spreading code corresponding to time-offsets, phase-offsets, carrier frequency, phase, or the like. The time intervals may have uniform or non-uniform duration. Each time interval typically has a duration of about a symbol interval. However, the time intervals may have durations that are longer or shorter. The time intervals may overlap, adjoin each other, or they may be separated.

One method for demultiplexing a $k^{th}$ channel from a received signal includes compensating for coded time offsets and/or phase offsets and then processing the signal components separately. Each carrier may be processed separately by a matched filter and decision system. Another method involves processing superpositions of the compensated components. The superpositions may be pre-processed with any well-known detection technique, such as matched filtering, down-conversion, envelope detection, Fourier transform, demodulation, decoding, etc. A preferred method for demultiplexing a $k^{th}$ channel from a received signal includes filtering the components of the coded signal and/or the superposition of the components.

Figure 6A:
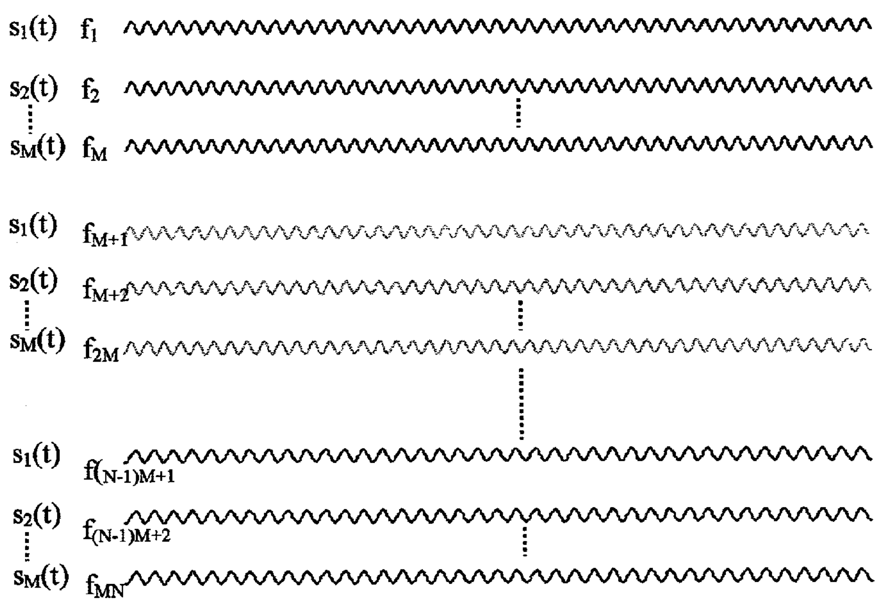
FIG. 6A shows a plurality of carriers corresponding to a plurality M of subchannels each having a plurality N of carriers.

FIG. 6A illustrates a plurality of carriers corresponding to a plurality M of subchannels each having a plurality N of carriers. The carriers shown are uniformly spaced in frequency $f_s$. The total bandwidth of the channel is proportional to $NMf_s$. The bandwidth of a subchannel is related to $Nf_s$. However, the bandwidth of each subchannel may occupy frequency-band portions distributed over a wide bandwidth (e.g., a frequency band approximately equal to $NMf_s$) or over multiple non-contiguous bands.

Figure 6B:
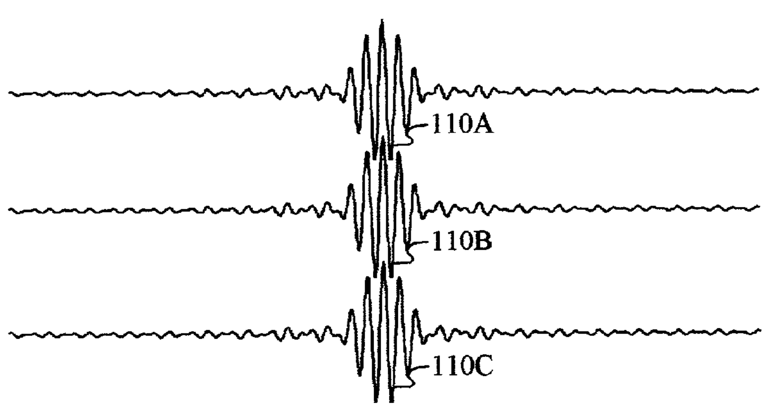
FIG. 6B illustrates a superposition of three subchannels that occupy the same time-domain space.

FIG. 6B illustrates a superposition of three subchannels that occupy the same time-domain space. However, the separability of the time-domain signals into their frequency components provides orthogonality to the signals (and the subchannels). FIG. 6A and FIG. 6B illustrate how a wideband signal can be separated into smaller-bandwidth subchannels that are easier to process in the time domain. The duration of each data symbol in a subchannel is M times the duration that a data symbol would have if its bandwidth occupied the total channel. However, each subchannel can be positioned such that the group of subchannels occupies almost the full bandwidth of the total channel. This enables a group of subchannels to derive substantially the same frequency-diversity benefits of the total channel.

Figure 7:
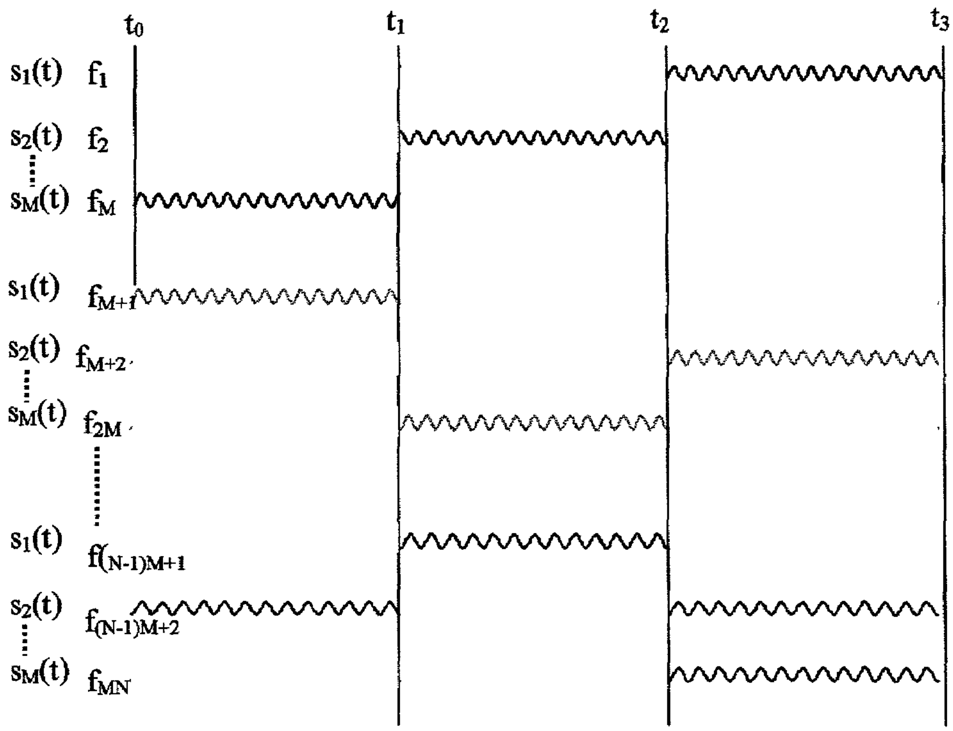
FIG. 7 illustrates a time-offset code used with carrier-defined subchannels.

FIG. 7 illustrates how time offsets may be used simultaneously with carrier-defined subchannels. Modulated carriers corresponding to each subchannel may be decoded relative to a time-spreading code and processed separately or combined to produce a superposition signal. The subchannels may employ other types of coding (such as phase coding) as well. Phase decoding, as well as time-offset decoding, and carrier-frequency selection may be performed to separate subchannels and facilitate processing of the data streams modulated on the subchannels.

Subchannels $S_1(t)$, $s_2(t)$, and $s_M(t)$ are shown having carrier components occurring in three different time intervals. An $m^{th}$ communication channel may be determined by an $m^{th}$ code sequence of carrier frequencies and time slots. For example, a symbol value for subchannel $s_1(t)$ is modulated onto the following carrier frequency-time interval pairs: $f_1$:$t_2$, $f_{M+1}$:$t_0$, and $f_{(N-1)M+1}$:$t_1$. More than one subchannel may use the same set of carrier frequencies and time intervals if different phases are provided. Although FIG. 7 shows uniformly spaced frequencies and time slots, non-uniform spacing may be employed.

A subchannel data stream encoded according to one or more of the techniques described in the specification may be processed at a receiver using one or more decoding techniques. A receiver may shift a plurality of its carriers with respect to a decoding sequence corresponding to one or more transmission channels. The decoded signals may be processed separately or combined to create a superposition signal. Alternatively, the receiver may generate a reference signal based on the code(s) of one or more channels and use the reference signal in a matched filter or equivalent receiver system to process the received signals.

A receiver, such as a CI receiver, may include one or more digital systems and/or algorithms, including, but not limited to, A/D converters, down converters, synthesizers, matched filters, filter banks, loop filters for carrier and/or symbol tracking, resampling filters (e.g., variable bandwidth and variable data rate resampling filters), AGC control loops, DC cancellers, demodulators, soft-decision quantizers, decoders, re-encoders, de-scramblers, de-interleavers, etc.

Figure 8:
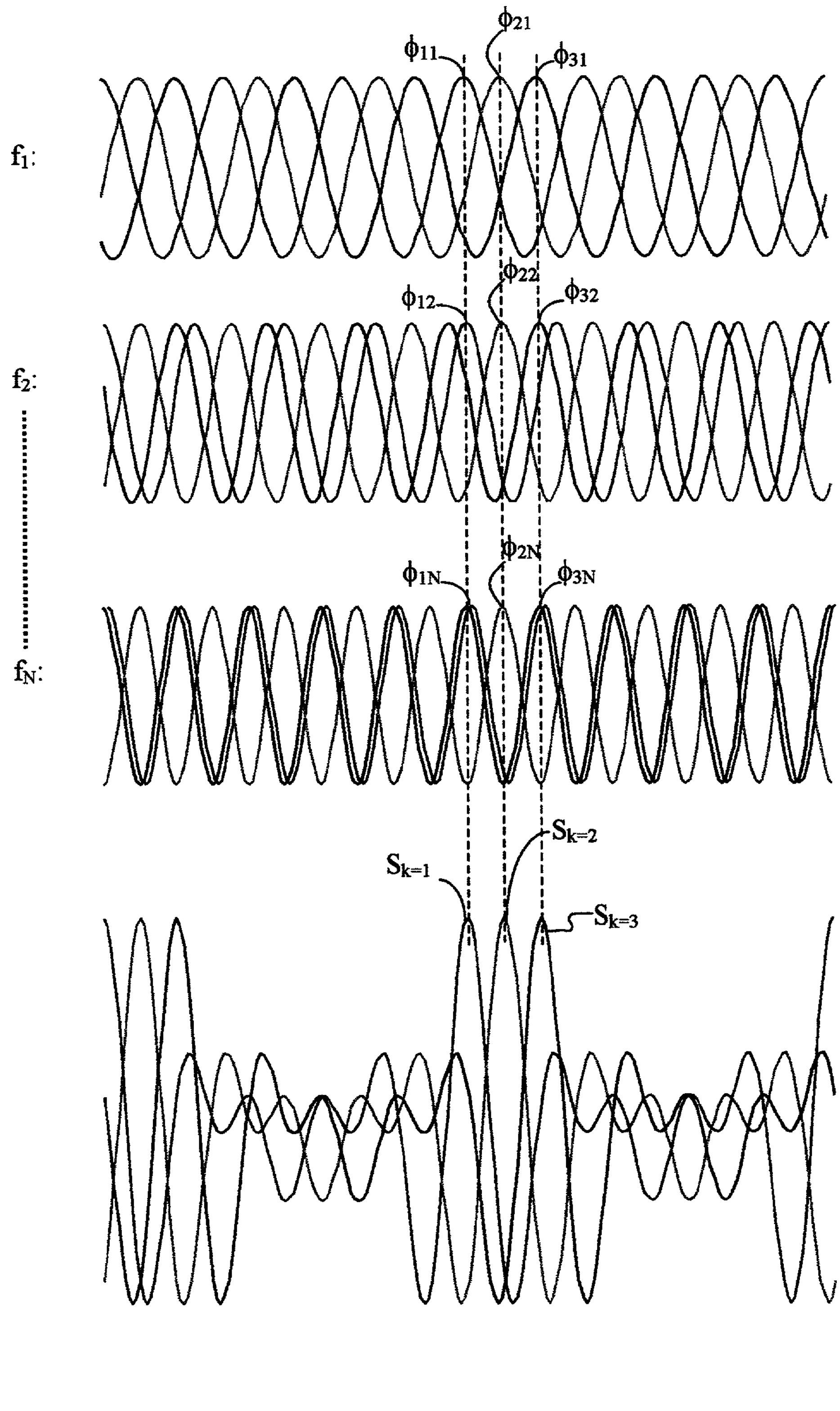
FIG. 8 shows a plurality N of carrier frequencies wherein each carrier frequency $f_n$ (n=1, . . . , N) has a plurality of phased subcarriers.

FIG. 8 shows a plurality N of carrier frequencies. A group of subcarriers is associated with each carrier frequency $f_n$ (n=1, . . . , N). Each subcarrier is distinguished by one of a plurality M of phases $\phi_{mn}$. The subcarriers may be modulated and transmitted by a single transmitter. In this case, multipath effects (which cause frequency-dependent amplitude and phase variations in the carrier frequencies) do not affect the relative phases $\phi_{mn}$ and relative amplitudes of same-frequency subcarriers in each group of subcarriers transmitted by the single transmitter.

Groups of subcarriers transmitted by other transmitters may experience transmitter-specific multipath effects (such as due to corresponding propagation environments, transmitter-impressed multipath and/or coding, and/or different receiver responses to signals transmitted by different transmitters). Transmitter-specific multipath effects may be exploited by the invention to separate interfering groups of subcarriers. For example, spatial processing, beam forming, interferometry, or any other type of appropriate diversity-parameter processing may be performed to separate signals transmitted by a plurality of transmitters.

In a preferred embodiment of the invention, the carrier frequencies are orthogonal. Thus, the carrier frequencies are separable via various signal-separation techniques, such as filtering and correlation. In another preferred embodiment of the invention, the carrier frequencies are non-orthogonal or quasi-orthogonal. Thus, data symbols modulated onto different non-orthogonal carrier frequencies may be separable using multi-user or multi-channel detection between two or more carrier frequencies.

One embodiment of the invention separates a plurality of data symbols modulated onto interfering subcarriers each having a similar carrier frequency $f_n$. For example, filter banks or a plurality of matched filters may be used to provide differing proportions of interfering signals to a multi-channel detector (e.g., a weight-and-sum canceller, matrix diagonalizer, or the like). In this case, the different proportions correspond to different carrier phases $\phi_{mn}$. Other diversity parameters (as well as diversity parameter combinations) may be employed to enable multiple access within a carrier-frequency channel.

A multi-channel detector separates the interfering signals and thus, enables a system capacity that approaches N-M. This corresponds to a bandwidth efficiency of M symbols/Hz. Spatial processing further enhances system capacity. If K spatial sub-channels are created, system capacity may be increased by a factor of K. If an L-ary differential-modulation scheme is employed, system capacity and bandwidth efficiency may be multiplied by the value L. Maximum system capacity CS is expressed by:

$$C_s=N\cdot M\cdot K\cdot L$$

and maximum bandwidth efficiency $e_{BW}$ is expressed by:

$$e_{BM}=M\cdot K\cdot L.$$

Diversity may be exploited to provide capacity and/or signal-quality benefits. In some cases, such as in interference-limited spread-spectrum systems, signal quality and system capacity can be improved simultaneously. Since multipath fading may cause certain frequencies and/or spatial locations to be unusable, the maximum system capacity $C_s$ and bandwidth efficiency $e_{BW}$ may not always be attainable. Redundancy may be employed in one or more diversity spaces to optimize the bit error rate. For example, multiple antennas may be used by the transmitter and/or the receiver to provide spatial redundancy. Similarly, different carrier frequencies may be modulated with the same data symbols.

Redundant modulation may be augmented with coding, such as multiple-access codes used as channel coding to encode data symbols. These codes may include standard binary codes, such as long codes, Gold codes, Hadamard-Walsh codes, etc. The codes may include CI codes or direct-sequence coding derived from any transform operation.

In one embodiment of the invention, the carrier signals shown in FIG. 8 may be redundantly modulated. The different-frequency carriers corresponding to phases $\phi_{11}$, $\phi_{12}$, and $\phi_{13}$ may be modulated with a first data symbol. Phases $\phi_{21}$, $\phi_{22}$, and $\phi_{23}$ may be modulated with a second data symbol. Phases $\phi_{31}$, $\phi_{32}$, and $\phi_{33}$ may be modulated with a third data symbol. This redundancy allows a receiver to select a preferred result from a set of three processes. Thus, fading or interference that substantially degrades one or two of the carrier frequencies does not substantially affect the BER of the received symbols. In one embodiment, the effects of interference and signal distortion at one or more carrier frequencies are distributed substantially evenly to all users such that no user experiences complete debilitation of their channel. In another embodiment, carrier frequencies may be changed to avoid deep fades and/or interference. Carrier-frequency selection and/or adjustment may be performed as a means of power control.

An alternative method for processing the received signals includes correlating the phase-frequency combinations for each data symbol and summing the correlation signals. A data symbol may be modulated (or otherwise impressed) onto a single carrier phase $\phi_{mn}$ corresponding to an $m^{th}$ phase in an $n^{th}$ frequency. A $k^{th}$ data symbol may be modulated onto a $k^{th}$ set of carrier phases $(\phi_{mn})_k$ corresponding to multiple m phases and multiple n frequencies. One or more of the correlation signals may be weighted with a complex weight, a vector of complex weights, or a complex-weight matrix prior to summing.

Each sub-carrier phase within a carrier frequency may experience interference from at least one other sub-carrier phase. In one case, a $k^{th}$ data symbol (or data channel) is redundantly modulated onto multiple carrier frequencies with respect to a $k^{th}$ group of phase shifts $(\phi_{mn})_k$. Subsequent data symbols are redundantly modulated onto the same set of frequencies. For example, a $k^{th}$ data symbol (or data channel) is redundantly modulated onto the same carrier frequencies with respect to a different ($k^{th}$ group) of phase shifts $(\phi_{mn})k'$. The total interference $(I_{k'k})_T$ between the $k^{th}$ data symbol and the $k'^{th}$ data symbol is expressed by:

$$(I_{k'k})_T = \sum_n (I_{k'k})_n$$

where interference between the data symbols is summed over the n carrier frequencies.

Since the interference $(I_{k'k})n$ depends on the relative phase difference $\neq\phi_{mn}=\phi_{mn}-\phi_{mn}$ between the $m^{th}$ and $m^{th}$ phases for an $n^{th}$ carrier frequency, the phases $\phi_{mn}$ may be selected such that the sum of the interferences is zero or very small:

$$(I_{k'k})_T = \sum_n (I_{k'k})_n = 0$$

In another embodiment of the invention, the interference terms may be weighted with complex weight values $w_{mn}$ such that the sum of the interferences is zero or very small:

$$(I_{k'k})_T = \sum_n W_{mn}(I_{k'k})_n = 0$$

Each complex weight value $w_{mn}$ may include a single complex value, a vector of complex weights, or a matrix (or higher-order distribution) of complex weights.

In FIG. 8, a superposition signal $S_k$ corresponds to a $k^{th}$ group of phases $(\phi_{mn})_k$ for a special case in which m=k and the relative phases $\phi_{mn}$ within each n carrier are associated with incremental translations (in time) of the carrier. Thus, carrier phases $\phi_{k1}, \phi_{k2}, \ldots, \phi_{kN}$ are redundantly modulated with a $k^{th}$ symbol $s_k(t)$. In this case, there are three superposition signals $S_1$, $S_2$, and $S_3$ that are centered at times $t_1$, $t_2$, and $t_3$, respectively.

The phases $\phi_{1n}$ of the carrier frequencies $f_n$ that correspond to the first symbol $S_1(t)$ produce a maximum (i.e., a superposition peak) at time $t_1$. Similarly, the second symbol's $s_2(t)$ phase relationships $\phi_{2n}$ provide for in-phase carriers at time $t_2$. The third phase relationships $\phi_{3n}$ provide in-phase constructive combining between carriers at time $t_3$. In this case, the superposition signals $S_1$, and $S_3$ do not overlap and, therefore, are substantially orthogonal in the time domain. Consequently, the phase relationships $\phi_{km}$ of the corresponding component carriers ensure orthogonality between the redundantly modulated symbols $S_k(t)$.

The relative phase of each carrier corresponding to a $k^{th}$ orthogonal superposition signal $S_k$ is related to an integer multiple of the superposition-signal width:

$$\phi_{mn} = \left(\frac{1}{f_s N}\right) 2\pi f_n m$$

where $(1/f_sN)$ expresses the width. The term $f_s$ is the frequency separation and N is the number of carrier frequencies. An $n^{th}$ carrier frequency is expressed by $f_n$.

The time orthogonality of superposition signals (such as the superposition signals $S_1$ and $S_3$) demonstrates one class of orthogonality requirements for phase relationships $\phi_{mn}$. However, the present invention may use orthogonal phase relationships that result in superposition signals that are not orthogonal in the time domain. For example, phase offsets may be provided to each carrier, such as to reduce the peak-to-average power of each superposition signal. Furthermore, various carrier-frequency and/or carrier-amplitude distributions may be used that support orthogonal or quasi-orthogonal phase spaces, but may not provide orthogonality in the time domain.

The use of pseudo-orthogonal coding is well known in spread spectrum and is equally applicable to CI. FIG. 8 also illustrates one form of pseudo-orthogonal phase coding that is illustrated by pseudo-orthogonal time-domain superpositions $S_1$, $S_2$, and $S_3$ of the carrier signals. The relative phase of each carrier corresponding to a $k^{th}$ superposition signal $S_k$ is related to an integer multiple of half the superposition-signal width:

$$\phi_{mn} = \left(\frac{1}{f_s N}\right) \pi f_n m$$

Pseudo-orthogonal phase relationships employed by the present invention do not necessarily have a quasi-orthogonal corollary in the time domain. For example, phase offsets may be provided to each carrier, such as to reduce the peak-to-average power of the superposition signals. Various carrier-frequency and/or carrier-amplitude distributions may be used that support orthogonal and/or pseudo-orthogonal phase spaces. These distributions may or may not be characterized by pseudo-orthogonality in the time domain.

Several embodiments of the present invention use space-frequency processing at either or both a transmitter and a receiver. This processing substantially eliminates inter-symbol interference caused by channel correlations across space (antenna correlation) and time (delay spread). This processing may include one form of CI processing, which decomposes a wide-bandwidth, high data rate communication signal into a plurality of small-bandwidth, low data rate channels without changing the time-domain characteristics of the wideband signal. For example, DS-CDMA may be decomposed into component signals at a transmitter and processed using advantageous parallel-processing and/or narrowband-processing techniques. A CI DS-CDMA signal may be received by a receiver and processed in any of several ways. A received CI DS-CDMA signal may be processed as a conventional DS-CDMA signal. A received signal may be processed with respect to its narrowband components in an array-processing operation or the like. A CI receiver may be used to process CI DS-CDMA components and exploit capacity and signal-quality benefits of CI.

Figure 9A:
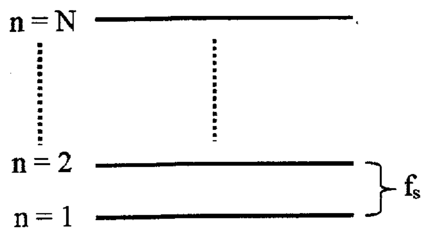
FIG. 9A shows a plurality N of incrementally spaced-in-frequency carrier signals that may be used as an underlying architecture for transmission protocols. Users and/or data channels having symbols that are redundantly modulated on all N carriers can be provided with N orthogonal phase spaces.

FIG. 9A shows an arrangement of N incrementally spaced-in-frequency carrier signals. This case illustrates one set of N carriers capable of having up to N orthogonal phase spaces wherein each of the phase spaces spans the entire set of carriers. The symbol duration $T_s$ is equal to the inverse of the carrier-frequency spacing $f_s$. In a first embodiment of a CI architecture, a single user may use all of the available phase spaces. In a second embodiment, a plurality of users may use the same set of carriers but be assigned to different phase spaces.

Figure 9B:
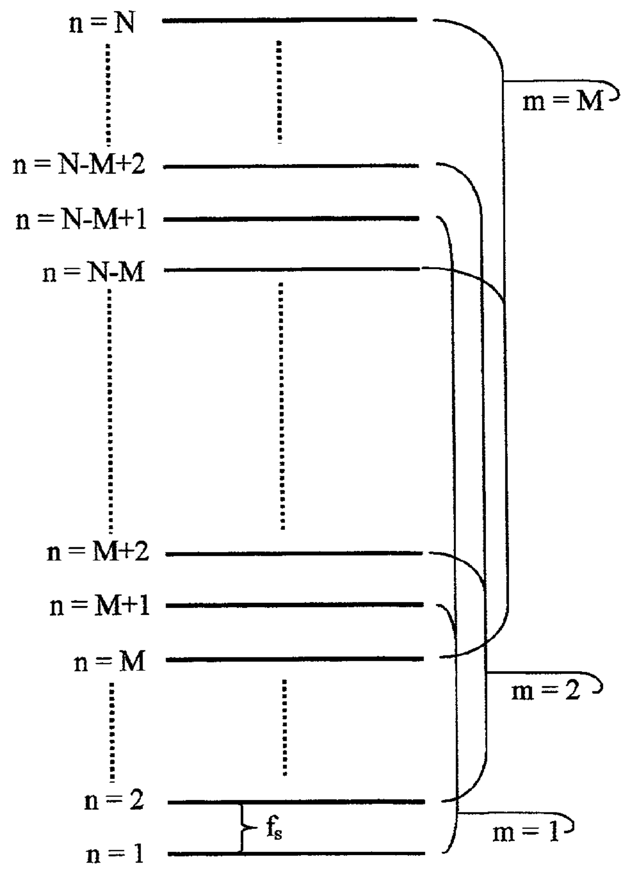
FIG. 9B shows an arrangement of N incrementally spaced-in-frequency carrier signals divided into M sets of carrier signals. Each set may include one or more users and/or data channels. Each set may or may not include a similar number of carriers. The carriers in each set may be incrementally spaced or non-incrementally spaced.

FIG. 9B shows an arrangement of N incrementally spaced-in-frequency carrier signals divided into M sets of carrier signals. In this case, each of the M carrier sets includes N/M carriers. There are N/M orthogonal phase spaces per set of carriers. The symbol duration $T_s$ is equal to the inverse of the carrier-frequency spacing $f_s$. Carrier-frequency spacing in each carrier set may be selected to reduce correlated fading between adjacent carrier frequencies.

In a third embodiment of a CI architecture, each user is assigned to one of the M carrier sets. In one case of this embodiment, multiple users may be assigned to the same carrier set. Each user sharing a particular carrier set may be assigned to one time slot and/or phase space. Alternatively, each user sharing a carrier set may use more than on time slot and/or phase space. In another case of the third embodiment, only one user is assigned to each carrier set and that user can use one or more of the available phase spaces and/or time slots.

In a fourth embodiment of a CI architecture, each user is assigned to a plurality of the M carrier sets. In one case of the fourth embodiment, each user is assigned to the same constructive-interference time slot (or equivalent phase space) for each of the carrier sets to which the user is assigned. In another case of the fourth embodiment, each user is assigned to a different time slot and/or phase space relative to each carrier set. In another case, each user is assigned to a plurality of time slots and/or phase spaces for each carrier set. This plurality of time slots and/or phase spaces may include similar or different time slots and/or phase spaces relative to the different carrier sets.

In a fifth embodiment of a CI architecture, multiple users are assigned to the same time slot(s) and/or phase space(s) relative to each of one or more carrier sets. In this case, a code is applied to each phase space and/or superposition signal to differentiate users. For example, code chips applied to superposition pulses can provide a DS-CDMA signal in the time domain. In another example, the application of code chips to frequencies that comprise a phase space can enable information symbols modulated in that phase space to be separable from other symbols modulated in that phase space with a different code.

One advantage of the class of CI architectures illustrated in FIG. 9B is that it allows a multicarrier protocol consisting of N carriers to be separated into smaller groups of carrier signals that are easier to process. The smaller groups also provide substantially the same frequency-diversity benefits as the full N-carrier architecture. The size of these groups and the carrier frequencies employed by each group may be adapted with respect to system and environment factors, such as fading, distortion, and interference.

Figure 10A:
FIG. 10A shows a single carrier frequency $f_n$ having multiple quasi-orthogonal phases $\phi_{(mn)k}$ that can be used in a quasi-orthogonal phase-space division multiplexing technique.

FIG. 10A shows a single carrier frequency $f_n$ having a set of quasi-orthogonal phases $\phi_{(mn)k}$ used in a quasi-orthogonal phase-space division multiplexing technique. In this case, a $k^{th}$ user is provided with M phase channels. Alternatively, the phase channels may correspond to different users. The advantage of assigning all of the phase channels for a given frequency to a single transmitter is that each of the phase channels undergoes the same multipath effects and interference in a communication channel. Known correlations between the phase channels can be used to help separate interfering symbols transmitted on those channels. However, interference and multipath distortion do not substantially affect correlations between the phase channels.

Figure 10B:
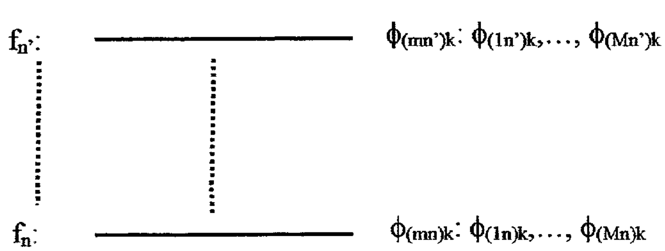
FIG. 10B shows a plurality of carrier frequencies wherein each frequency includes multiple quasi-orthogonal phases.

FIG. 10B shows a plurality of carrier frequencies $f_n$ to $f_n'$ having sets of quasi-orthogonal phases $\phi_{(mn)}$ to $\phi_{(mn')}$. In this case, the number M of phase spaces is greater than the number N of carrier frequencies. Multiple carriers may be used to increase capacity or mitigate the effects of fading and interference via redundant modulation. In one case, the phases of each carrier may be selected with respect to incremental time offsets. In another case, the carrier phases may be incrementally spaced in phase. For example, binary phase-shift key modulation may be implemented with carrier phases spaced throughout an interval of 0 to π. Quadrature shift-key modulation may be implemented with carrier-phase channels throughout an interval of 0 to π/2. Differential amplitude modulation may also be performed in carrier-phases channels.

Coding may be provided to distribute a data symbol over a plurality of carrier frequencies, time intervals, and/or phases. Such coding techniques are commonly employed in OFDM. Similarly, guard bands, cyclic prefixes, and various signal-processing techniques used with OFDM and other multicarrier protocols may be provided to CI signals.

For M>N, multi-user detection is typically used to separate interfering data symbols. A multi-user detector may sample multiple phase offsets $\phi_{mn}$ for each carrier frequency. Sampling may be achieved via matched filtering. For redundantly modulated carriers (i.e., multiple frequency channels modulated with the same data symbol), either or both phase-domain sampling and time-domain sampling may be used. Time-domain sampling may involve combining the modulated carriers to generate superposition signals that can be separated via time-domain multi-user detection. Multi-user detection may include interference cancellation, interference suppression, constellation processing, and/or optimization.

Figure 11:
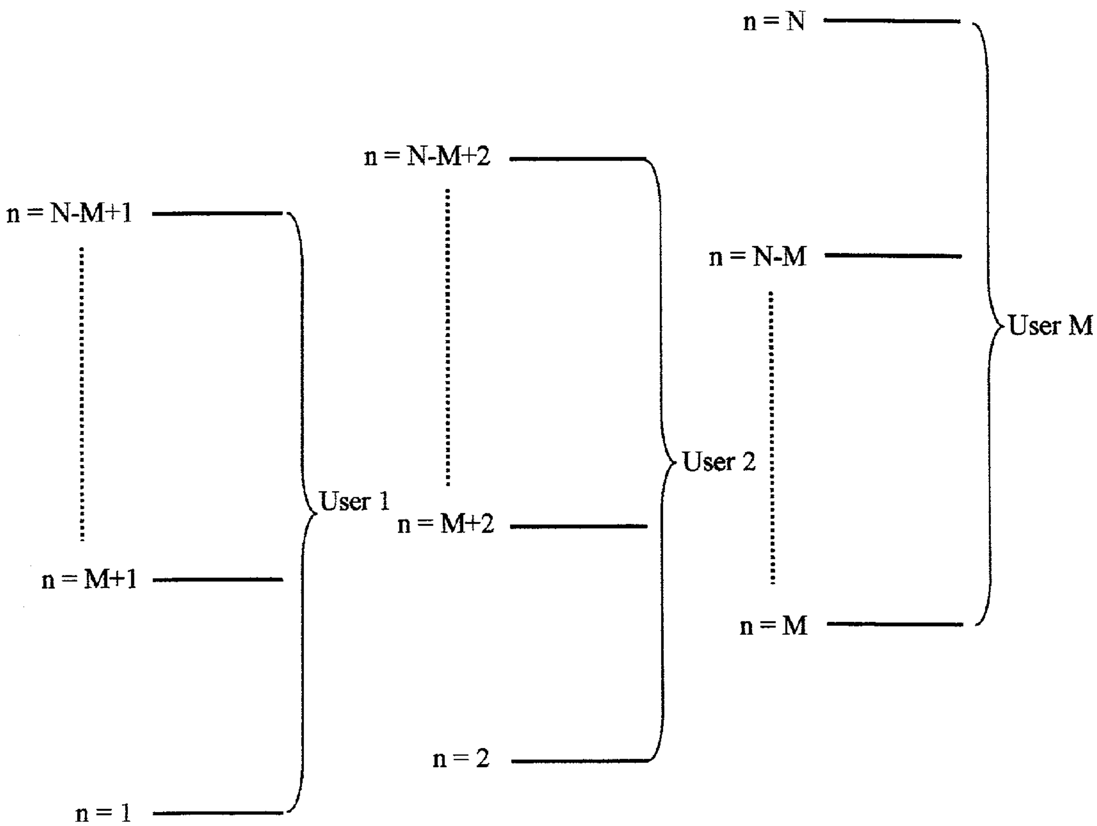
FIG. 11 shows a CI-OFDM signal architecture for a plurality M of users wherein each user is provided with a unique set of carriers.

FIG. 11 shows a CI-OFDM signal architecture for a plurality M of users. Each user is provided with a unique set of carriers. A user may be capable of using all available time slots/phase spaces associated with the set of carriers. Different users may or may not share the same carrier sets. Coding may be provided to distribute each data symbol over a plurality of carrier sets. Other signal-processing techniques associated with OFDM may be incorporated into CI processing. A receiver may employ at least one matched filter to process individual carrier signals or carrier superpositions. A receiver may provide time-domain processing, such as sampling, to received signals. For example, superposition signals may be sampled with respect to predetermined time references and time intervals.

Another form of CI-OFDM assigns a plurality of frequency-diverse carriers to serve as each OFDM carrier. This form ensures that a single carrier is not significantly affected by deep fades and narrowband interference. A further adaptation of this CI-OFDM form allows multiple signals to share each OFDM carrier. Another form of CI-OFDM allows for each OFDM or CI-OFDM carrier to be spread or coded with a CI/DS-CDMA signal. In yet another form of CI-OFDM, each data symbol on each carrier is coded. The codes may include CI codes and/or any other form of coding. Coding may include at least one of a multiple-access code, a spread-spectrum code, a channel code, an encryption code.

Figure 12:
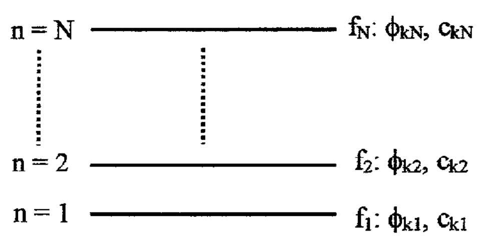
FIG. 12 shows a CI/MC-CDMA architecture in which a $k^{th}$ user having a $k^{th}$ phase space $\phi_{kn}$ is provided with a spreading sequence $c_{kn}$ assigned to each of a plurality N of carriers. The spreading sequence $c_{kn}$ may include binary or polyphase values.

FIG. 12 shows one of many possible CI MC-CDMA architectures. In this case, a $k^{th}$ user having a $k^{th}$ phase space $\phi_{kn}$ is provided with a spreading sequence $c_{kn}$ in which a binary value is assigned to each of a plurality N of carriers. Multi-user detection may be employed to separate interference between the users.

Figure 13A:
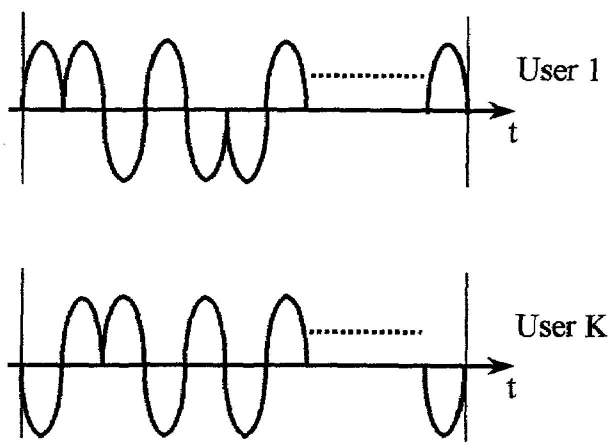
FIG. 13A shows a time-domain representation of a plurality K of DS-CDMA codes generated from a CI architecture. Each chip of each CI/DS-CDMA code is generated from a CI superposition of carriers. Each chip is provided with a binary code value corresponding to a DS-CDMA code.
Figure 13B:
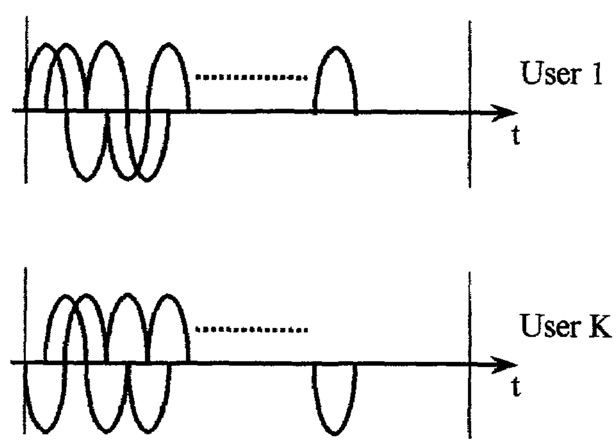
FIG. 13B illustrates chip overlap, which can increase bandwidth efficiency and/or provide additional redundancy. Chip overlap introduces a quasi-orthogonal condition. In the example shown, chip overlap doubles the code length without increasing bandwidth.

FIG. 13A is a time-domain representation of a plurality K of DS-CDMA codes generated from a CI architecture. Each chip of the CI DS-CDMA codes is generated from a CI superposition of carriers. Each chip is provided with a binary code value corresponding to a DS-CDMA spreading code. The chip shape can be adjusted by applying weights to the chip's carriers. In this case, the chips have a distinctive sinc-like shape that allows chip overlap (shown in FIG. 13B). Chip overlap doubles the code length without increasing bandwidth. This can double capacity. Furthermore, CI provides enhanced frequency diversity, narrowband processing capabilities (e.g., spatial processing), and simplified signal processing at both the transmit and the receive sides.

Figure 13C:
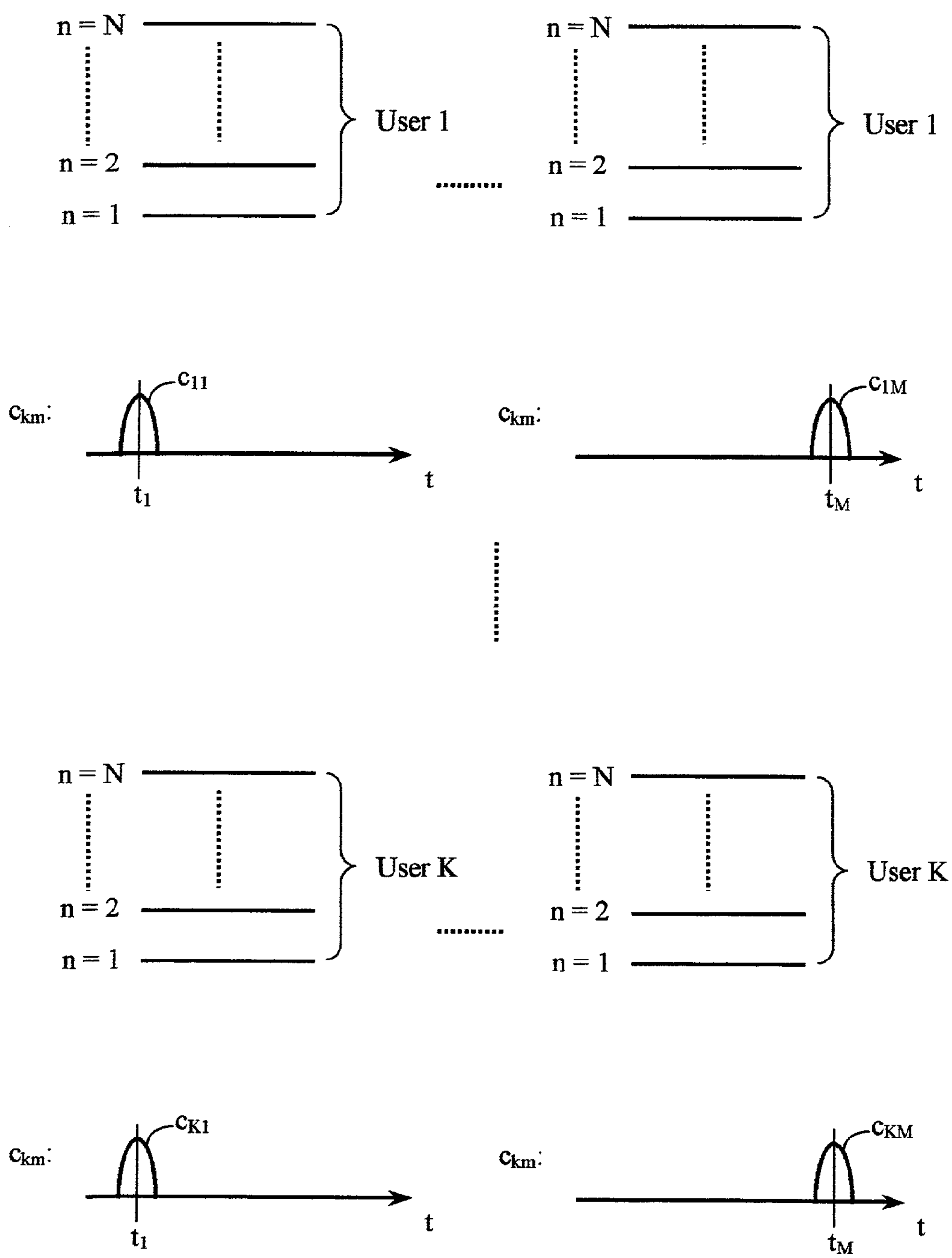
FIG. 13C shows one of many possible carrier architectures for a CI/DS-CDMA system.

FIG. 13C shows one of many possible carrier architectures for a CI DS-CDMA system. A $k^{th}$ user is assigned a plurality M of phase spaces. Each phase space corresponds to a superposition of carriers that provide a chip for the $k^{th}$ user's DS-CDMA code, which has a code length of M. Other users may share the same carriers and phase spaces. However, differences in users' codes provide for separation of the users.

In some applications, as described in Applicant's '992 patent, time-domain and/or frequency-domain shaping may be provided to the component waveforms. In one set of applications, time-domain shaping or windowing provides side-lobe reduction in the frequency domain. Time-domain shaping may also be employed to shape the main lobe. Similarly, frequency-domain shaping or windowing may be provided to shape either or both the time and frequency-domain characteristics of the composite waveforms and/or individual waveform components.

Windows used for either or both time-domain shaping and frequency-domain shaping may be constructed from products, sums, portions, or convolutions of simple windows and functions. Windows may include one or more window types, including, but not limited to, rectangle, triangle, $\cos^{\alpha}(x)$, Hanning, Hamming, Riesz, Riemann, De La Valle-Poussin, Tukey, Bohman, Poisson, Cauchy, Gaussian, Dolph-Chebyshev, Kaiser-Bessel, Barcilon-Temes, Blackman, and/or Blackman-Harris windows.

In some applications, methods of exploiting known ratios of inter-symbol interference between overlapping waveforms (e.g., CI components and/or composite waveforms) may be exploited to separate the waveforms and/or determine symbols modulated on the waveforms. For example, any combination of cancellation filters and equalizers may be employed to mitigate the effects of inter-symbol interference. Inter-symbol interference may include any combination of frequency, time, polarization, code, or spatial overlap.

In one set of embodiments of the invention, individual CI components may be processed to compensate for inter-symbol and/or co-channel interference prior to combining. For example, an equalizer may be provided for each carrier to mitigate inter-symbol interference. An equalizer may follow a matched filter or Fourier transform.

An equalizer may follow a combiner. CI carriers or carrier symbol values, once compensated for inter-symbol interference, may be combined with respect to any CI combining technique. Similarly, equalization may optionally be employed to mitigate the effects of CI pulse or CI symbol overlap. In another set of embodiments, at least one optimal combiner may be employed to mitigate the effects of inter-symbol interference. Optimal combining may employ cancellation, including multi-user and/or multi-channel detection.

Co-channel interference may be removed via cancellation. Thus, cross-coupled canceling filters may be employed to remove co-channel interference and/or inter-symbol interference. Co-channel interference may be compensated with the aid of a multi-user detector.

CI symbol/carrier generation may be performed using any of various appropriate polyphase filters. Polyphase filters employed in the invention may incorporate additional functions, such as, but not limited to, up sampling and interpolation. Similarly, CI signals may be processed in a receiver by one or more polyphase filters, such as at least one polyphase filter adapted to perform matched filtering and down sampling.

Symbols and/or channels having predetermined or otherwise known interference ratios may be transmitted. Transmitted symbols may be intentionally overlapped with respect to time, frequency, space, and/or any other diversity parameters. Transmissions may be distorted by various channel effects (e.g., multipath effects, non-linear channel effects, etc.) to cause interference. In some cases, channel compensation at either or both the transmitter and the receiver can cause inter-symbol and/or co-channel interference. For example, carriers experiencing excessive noise and/or interference levels may be eliminated or discarded, resulting in overlap between adjacent CI symbols or signals. Interference ratios may be determined by any combination of training, pilot-signal processing, optimal combining, blind adaptive processing, as well as other adaptive techniques.

3. CU/DS-CDMA TRANSMITTER OVERVIEW

Descriptions of CI/DS-CDMA transmission and reception are intended to illustrate the nature of CI processing. As these descriptions are intended to convey a basic understanding of CI and its applications to CDMA, they are not intended to suggest particular method or apparatus embodiments. Many embodiments fall within the scope of the invention. Descriptions of CI/DS-CDMA include particular signal-processing techniques to convey an understanding of CI principles rather than suggest any preferred signal-processing methods.

In a CI/DS-CDMA system, a $k^{th}$ user's transmission signal is expressed by:

$$s^k(t) = b_k \sum_{i=0}^{N-1} \beta_i^k h(t - kT_c),$$

where $b_k$ is a data bit for the $k^{th}$ user, $\beta_i^{(k)}$ is an $i^{th}$ value of a spreading sequence corresponding to the $k^{th}$ user, and h(t) represents a CI-based chip. $T_c$ is the chip duration. The data bit $b_k$ is typically a binary or M-ary PSK modulated symbol. The data bit $b_k$ may be represented by other types of modulation.

The spreading sequence $\beta_i^{(k)}$ is typically a direct-sequence code. For example, values of $\beta_i^{(k)}$ may represent a long code, a Walsh code, a Gold code, a Kasami code, a Barker code, etc.

Values of $\beta_i^{(k)}$ may represent a CI code, a wavelet code, or some other type of code or transform. Values of $\beta_i^{(k)}$ may be binary, polyphase, poly-amplitude, or some hybrid.

The CI-based chip h(t) is typically a CI pulse, as described herein. The CI-based chip h(t) may have a similar shape to a conventional DS-CDMA chip, such as a raised cosine, Gaussian, or sinc function. However, unlike conventional DS-CDMA chip shapes, which occupy a continuous bandwidth, CI-based chips h(t) are constructed from narrowband carriers. This enables CI/DS-CDMA to benefit from narrowband processing and exploit frequency-diversity reception. Whereas conventional DS-CDMA chips require a wide, continuous frequency band, CI/DS-CDMA can operate across non-contiguous frequency bands. CI-based chips h(t) may be constructed from closely spaced or sparsely spaced carriers. The carrier spacing may be incremental and/or non-incremental. Carriers may be positioned in multiple non-contiguous frequency bands.

The CI-based chips h(t) can belong to any type of code or transform, such as a wavelet transform. DS-CDMA codes may be constructed with respect to the orthogonal bases defined by a wavelet transform. DS-CDMA codes may be combined with other types of transforms, such as a wavelet transform. In any of these cases, CI may be used as the basis for the chip h(t). The chip duration $T_c$ can depend on the chip spacing. Time-shifted pulses h(t) are orthogonal to each other if they are shifted by some integer multiple of the pulse width:

$$\int_0^{Ts} h(t-pTc)h(t-qTc)\,dt = 0 \;\; (p \neq q).$$

The chips $h(t-iT_c)$ can also be created by phase offsetting each $n^{th}$ carrier of the pulse h(t) by $2\pi n/N$.

Time-shifted pulses h(t) are substantially orthogonal (pseudo-orthogonal) to each other if they are shifted by some half-integer odd multiple of the pulse width. Similarly, corresponding phase shifts made to the CI carriers effect corresponding orthogonality conditions. Although the chip may actually extend over at least one symbol interval, the effective duration as seen in the time domain may be approximately a chip width (orthogonal case) or half of a chip width (pseudo-orthogonal case).

The basic CI chip shape h(t) can be expressed by:

$$h(t) = \sum_{n=0}^{N-1} A(n)\cos(2\pi(f_o + nf_s)t),$$

where A(n) expresses the chip shape in the frequency domain. For example, A(n) may be a frequency-domain window that shapes the time-domain characteristics of the chip h(t). In the most basic case, A(n) is constant and the chip shape h(t) is time-limited to one symbol duration $T_s$. In cases where a repetitive direct-sequence code is required, the chips h(t) in the code may have a much longer duration than the symbol duration $T_s$. In this case, the symbols $b_k$ may time-limit the chip shape h(t). Raised cosines, sinc functions, Gaussian functions, and other chip shapes, including wavelets, may be constructed by choosing an appropriate chip-shaping function, such as A(n) and/or a time-domain window function.

The basic chip shape may also be expressed by:

$$|h(t)| = \left| A \cdot \frac{\sin\left(\frac{1}{2}N2\pi\Delta \mathrm{ft}\right)}{\sin\left(\frac{1}{2}2\pi\Delta \mathrm{ft}\right)} \right|.$$

In the orthogonal case, the $k^{th}$ user's transmission signal can be expressed by:

$$s^k(t) = b_k \sum_{i=0}^{N-1} \beta_i^{(k)} \sum_{n=0}^{N-1} A(n)\cos(2\pi f_o t + 2\pi n f_s(t - iT_c))g(t)$$

where A(n) is an $n^{th}$ value of a window function that may provide a scalar or complex weight to each CI carrier. A time-domain window function g(t) may provide frequency-domain shaping to the chip shape h(t). The function g(t) may be a unit-amplitude rectangular waveform having a duration of $T_s$. The expression for $s_k(t)$ can be written as:

$$s_k(t) = b_k \sum_{i=0}^{N-1} \beta_i^{(k)} \sum_{n=0}^{N-1} A(n)\cos(2\pi f_o t + 2\pi n f_s t - ni2\pi/N)g(t)$$

where $T_c f_s = T_c/T_s = 1/N$. In the pseudo-orthogonal case, the expression for $S_k(t)$ is:

$$s_k(t) = b_k \sum_{i=0}^{2N-1} \beta_i^{(k)} \sum_{n=0}^{2N-1} A(n)\cos(2\pi f_o t + 2\pi n f_s t - ni\pi/N)g(t)$$

The total transmitted signal for K users is:

$$S(t) = \sum_{k=0}^{K-1} b_k \sum_{i=0}^{N-1} \beta_i^{(k)} \sum_{n=0}^{N-1} A(n)\cos(2\pi f_o t + 2\pi n f_s t - ni2\pi/N)g(t)$$

A CI/DS-CDMA transmitter may be defined as any system that generates CI/DS-CDMA signals as defined by either equation for the $k^{th}$ user's transmission signal or the equation representing the total transmitted signal for K users. Equivalently, a CI/DS-CDMA transmitter may be defined as any device adapted to generate one or more DS-CDMA signals made of N separable frequency components.

The CI/DS-CDMA transmission equations represent various mathematical relationships between various components of a transmitted CI/DS-CDMA signal. Accordingly, the transmission equations do not imply any particular order or process for generating CI/DS-CDMA signals. For example, one embodiment of the invention modulates a code sequence with a data stream whereas another embodiment impresses data symbols onto a code sequence during code generation. In one set of embodiments, CI/DS-CDMA carriers are generated by redundantly modulating a harmonic-signal source (such as a pulse generator) with data symbols (such as information-modulated code symbols). In another set of embodiments, individual carriers are modulated (e.g., in an IFFT) to generate CI/DS-CDMA signals.

A CI transmitter may be implemented via many different techniques. The present invention anticipates design variations of CI-based transmitters. A CI/DS-CDMA transmitter, as well as any other CI transmitter, is characterized by the signals generated. In particular, a CI/DS-CDMA transmitter is any device, system, or algorithm capable of impressing information onto a plurality of carriers and adjusting (e.g., weighting) the carriers to provide a superposition signal having predetermined time-domain characteristics. Such time-domain characteristics may include a signal resembling a direct-sequence code.

The superposition signal may be shaped to produce a low peak-to-average-power ratio (PAPR) or crest factor. For example, the individual carriers may be provided with predetermined or adaptive phase offsets to reduce PAPR. The phase offsets may be generated using any combination of deterministic, adaptive, and random processes. One set of embodiments employs Schroeder's method to generate carrier-phase offsets. Similarly, phase offsets may be provided to CI code chips.

The superposition signal may be shaped to produce other signal characteristics, such as predetermined frequency-domain characteristics. In other types of CI-based transmitters, transmitted signals may be shaped with respect to corresponding desired time-domain, frequency-domain, spatial, polarization, and/or any other type of diversity-parameter characteristics.

4. CI/DS-CDMA RECEIVER OVERVIEW

The receiver overview of CI/DS-CDMA signal processing describes particular signal-processing techniques to convey an understanding of CI principles, rather than suggest any preferred signal-processing methods. The mathematical analysis of CI/DS-CDMA signal processing illustrated herein does not necessarily imply any single preferred method or system for implementing the present invention.

In a Rayleigh frequency-selective slow fading channel, each multi-frequency carrier comprising the CI/DS-CDMA signal experiences a unique flat fade. In the simple case where all values of A(n) are unity, the received signal is represented by:

$$r(t)=\sum_{k=0}^{K-1}b_k\sum_{i=0}^{N-1}\beta_i^{(k)}\sum_{n=0}^{N-1}\alpha_n\cos(2\pi f_o t+2\pi n f_s t-ni2\pi/N+\phi_n)g(t)+n(t)$$

where $\alpha_n$ is a gain, $\phi_n$ is a phase offset for an $n^{th}$ carrier of a CI pulse resulting from fading, and n(t) is additive white Gaussian noise. Assuming exact phase synchronization, a decision variable resulting from a received multi-frequency carrier component of each received chip is expressed by:

$$r_{m,n}=\sum_{k=0}^{K-1}b_k\sum_{i=0}^{N-1}\beta_i^{(k)}\alpha_n\cos(\mathrm{nm}2\pi/N-ni2\pi/N)+n_{m,n}$$

Figure 18A:
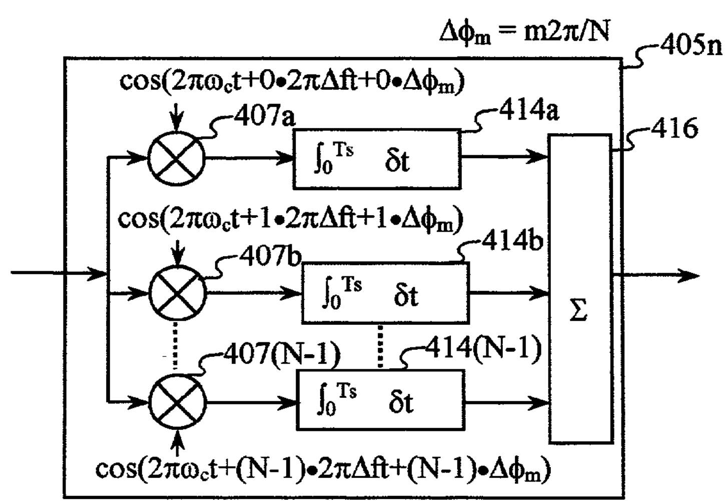
FIG. 18A is a functional representation of one set of embodiments of a CI receiver.

The CI/DS-CDMA receiver for an $l^{th}$ user detects an $m^{th}$ chip at each carrier as shown in FIG. 18A. The $m^{th}$ chip is separated into its N carrier components. Each chip and each carrier contribute a decision variable $r_{m,n}$ corresponding to $$r_{m,n}=b_l\beta_m^{(l)}\alpha_n+b_l\alpha_n\sum_{\substack{i=0\\ i\neq m}}^{N-1}\beta_i^{(l)}\cos(\mathrm{nm}2\pi/N-ni2\pi/N)+\sum_{\substack{k=0\\ k\neq l}}^{K-1}b_k\beta_m^{(k)}\alpha_n+\sum_{\substack{k=0\\ k\neq l}}^{K-1}b_k\alpha_n\sum_{\substack{i=0\\ i\neq m}}^{N-1}\beta_i^{(k)}\cos(\mathrm{nm}2\pi/N-ni2\pi/N)+n_{m,n}$$

The first term represents the contribution from user l, carrier n, and chip m. The second term represents the other N−1 chips of the user l. The third term represents interference due to the $m^{th}$ chip of other users. The fourth term represents interference from user l's other N−1 chips. The fifth term is a zero-mean Gaussian random variable with variance $\sigma_n^2=N_0/2$. The terms, $n_{m,n}$, are correlated across chips, but not across carriers.

The covariance matrix of the vector noise ($n_{0,n}$, $n_{1,n}$, $n_{2,n}$, . . . $n_{N-1,n}$) corresponding to a fixed carrier number n and a variable chip number m is:

$$C_n=\frac{N_0}{2}\begin{pmatrix}1 & \cos(2\pi/N) & \cos(2*2\pi/N) & \dots & \cos((N-1)*2\pi/N)\\ \cos(2\pi/N) & 1 & \cos(2\pi/N) & \dots & \cos((N-2)*2\pi/N)\\ & & \vdots & & \\ \cos((N-1)*2\pi/N) & & & \dots & 1\end{pmatrix}$$

Multi-frequency carrier combining is used to combine the $r_{m,n}$ terms across the carriers, as indicated by the functionality shown in FIG. 18A. This results in frequency-diversity benefits when recreating each chip and removal of the second and fourth interference terms (which represent inter-chip interference).

Orthogonality Restoring Combining (ORC) may be used to remove the second and fourth interference terms. Each $r_{m,n}$ term is scaled by $\alpha_n$ and summed over n to provide a decision variable $R_m$ for an $m^{th}$ chip:

$$R_m=\sum_{n=0}^{N-1}r_{m,n}\cdot 1/\alpha_n$$

However, ORC can result in substantial noise enhancement. Thus, ORC is most suitable for low-noise conditions (i.e., high SNR).

EGC is preferable for low signal to noise. EGC combines the N carrier terms for the $m^{th}$ chip according to:

$$R_m = \sum_{n=0}^{N-1} r_{m,n}$$

MMSEC minimizes the second term and the fourth term and optimizes frequency diversity while minimizing the noise. Using multicarrier MMSEC provides a decision variable $R_m$ for an $m^{th}$ chip:

$$R_m = \sum_{n=0}^{N-1} r_{m,n} \cdot (\alpha_n / (K\alpha_n^2 + N_0))$$

A final decision variable $D_l$ for user l results from a typical DS-CDMA combining technique across chips, which eliminates multi-user interference. Each chip's decision variable $R_m$ is multiplied by an $m^{th}$ spreading code $\beta_m^{(l)}$ and combined:

$$D_l = \sum_{m=0}^{N-1} R_m \beta_m^{(l)}$$

The orthogonal cross-correlation between spreading codes of different users minimizes the multi-user interference.

Although the receiver overview describes decision variables corresponding to each chip and each carrier, preferred embodiments of the invention may process either chips or carriers to derive decision variables. Chip sequences may be processed to provide a decision variable. In one set of embodiments, each carrier may be processed to compensate for channel effects and decode a particular data stream from interfering signals. In another set of embodiments, channel compensation is performed at the carrier level, the carriers are combined, and then the resulting superposition signal is processed in the time domain. The time-domain processing may be supplemented with RAKE reception.

Channel simulations show dramatically improved BER performance when a CI architecture is applied to a conventional DS-CDMA system. Because CI exploits frequency-diversity benefits that are inherent in multicarrier pulse shaping, CI does not require a RAKE receiver.

CI/DS-CDMA receivers may include multi-user detectors (MUDs) that operate in the time domain and/or the frequency domain. MUDs exploit cross correlations to substantially improve data detection. Thus, MUDs can increase channel throughput (e.g., system capacity) of interference-limited systems. MUDs are well known in the art and include various designs, such as optimal combiners (e.g., maximum-likelihood combiners), linear detectors (e.g., correlators, minimum mean squared error detectors), and non-linear interference cancellers (e.g., decision-feedback systems, successive-cancellation systems, Turbo MUDs, etc.).

CI/DS-CDMA MUDs may include space-time and/or space-frequency MUDs that exploit the spatial characteristics of the propagation environment with respect to time and/or frequency. Multi-user detection may be performed with respect to other diversity parameters. A Turbo MUD may be employed that exploits the multiple-access channel and the temporal structure induced by channel coding. A Turbo MUD may iterate between multi-user detection and channel decoding, exchanging soft decisions on symbol information at each iteration. Quantum MUDs may be employed to exploit quantum measurements and the multiple-access channel.

5. CI/DS-CDMA TRANSCEIVER SYSTEM

Figure 14A:
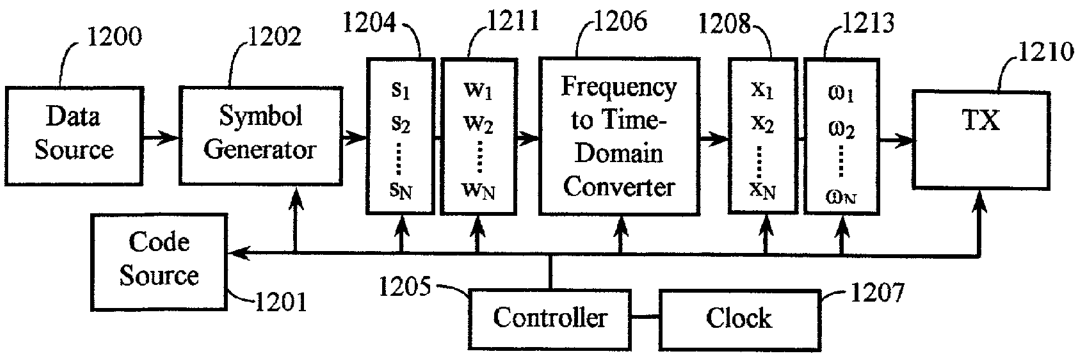
FIG. 14A shows an embodiment of a CI/DS-CDMA transmitter.

FIG. 14A shows components of one embodiment of a CI/DS-CDMA transmitter. A symbol generator 1202 receives at least one input data stream from a data source 1200 and at least one code sequence from a code source 1201. The symbol generator 1202 converts the data bits from the input stream into a plurality N of symbols $s_n$, n=1, 2, . . . , N. The symbols $s_n$ are optionally stored in a register 1204. The symbols $s_n$ may optionally be weighted by a weighting system 1211. The weighting system 1211 applies a plurality of complex weights $w_n$ for channel compensation, channel coding, sub-channel coding, CI-based coding, PAPR reduction, encryption, multiple-access, or any combination thereof.

A frequency-to-time-domain converter 1206 converts a plurality of frequency-domain symbols into at least one time-domain signal. In the case where the converter 1206 is a digital system (such as an IFFT, an IOFFT, a digital filter bank, etc.), the output of the converter 1206 produces digital time-domain signals $x_N'$ that may be stored in a shift register 1208. Optionally, the output signals $x_N'$ may be weighted by some complex-weighting system 1213. Optional complex weights $\omega_{n'}$ may be employed to provide pre-distortion for channel compensation and/or implement some additional coding, encryption, etc. Optionally, the output signals $x_N'$ may be interleaved prior to transmission.

A transmission system 1210 processes the signals $x_{N'}$ for transmission. The transmission system 1210 may provide A/D conversion, amplification, up-conversion, modulation, filtering, and/or any other signal processing typically performed by a transmitter. The transmission signals are then coupled into a communication channel (not shown). A communication channel, as described herein, typically comprises an RF channel. However, a communication channel may also comprise other transmission media, such as modulated laser, waveguide, ultrasound, or fluidic systems. A controller 1205 receives a clocking signal from a clock 1207. The controller 1205 regulates timing and synchronization of operations performed by the components shown in FIG. 14A.

The symbol generator 1202 may perform interleaving and/or channel coding. The code source 1201 may include one or more sets of CI codes that may be used for channel coding, multiple access, spread spectrum, encryption, etc. In one set of embodiments, the code source 1201 is adapted to provide a conventional direct-sequence code to the symbol generator 1202. The symbol generator 1202 generates appropriate carrier weights to provide the CI superposition signal produced by the converter 1206 with appropriate time-domain characteristics of a direct-sequence signal. Similarly, other types of CI-based time-domain signals may be generated using the CI/DS-CDMA transmitter shown in FIG. 14A.

In another set of embodiments, CI codes are generated by the code source 1201. In yet another set of embodiments, one or more direct-sequence and/or CI codes are applied as weights in either or both weighting systems 1211 and 1213. Applied codes may include one or more multiple-access, channel, spreading, and/or encryption codes.

The converter 1206 may perform any type of transform to generate a multicarrier signal. Although the converter 1206 is illustrated as a frequency-to-time converter, other types of converters may be implemented with respect to the definition of a multicarrier signal. In one embodiment, the converter 1206 is a beam-forming system. In another embodiment, the converter includes a multi-port system that conveys each of a plurality of symbols to a different transmitter. The transmitters may be spatially separated. The transmitters may be characterized by different polarizations or otherwise have different transmission characteristics.

The converter 1206 may convey symbols to different types of subcarriers. For example, the symbols may modulate various orthogonal or quasi-orthogonal circular-polarized and/or elliptical-polarized carriers. Orthogonality between different polarized carriers may be characterized by different rotation rates, different directions of rotation, and/or orthogonal (e.g., perpendicular) polarization vectors in two or three dimensions.

The symbol generator 1202 may form data symbols and/or CI carrier weights via orthonormal-basis vectors. For example, if data symbols are generated from an 8-chip Hadamard-Walsh matrix, each of the eight row vectors (i.e., Walsh codes) of the matrix can be expressed by a linear combination of three orthonormal basis vectors:

[1 0 1 0 1 0 1 0]
[1 1 0 0 1 1 0 0]
[1 1 1 1 0 0 0 0]

Different combinations of the basis vectors (e.g., modulo-two additions, multiplications) can provide all eight Hadamard-Walsh codes. Furthermore, since the first four values of each orthonormal-basis vector are identical to the second four values (in the case of the third vector, the second four values are inverted relative to the first four values), only four values need to be stored for each vector. The all-ones vector does not need to be stored. Various matrices, including Hadamard-Walsh matrices, may be represented by a reduced set of vectors, such as orthonormal-basis vectors.

In one set of preferred embodiments, a CI-based signal is provided with symbols modulated onto various phase spaces. FIG. 15A represents carrier phases of a plurality of CI carrier frequencies $f_n$ corresponding to a plurality of orthogonal phase spaces Ps(n'). Orthogonal phase spaces are separated by a pulse width $T_{ps}=1/(f_sN)$ whereas quasi-orthogonal phase spaces are separated by a half pulse width $T_{ps}=1/(f_s2N)$. Each CI carrier frequency $f_n$ is expressed by: $f_n=f_o+nf_s$. At Ps(0), each carrier has an arbitrary phase $\phi_n$.

FIG. 15B shows a matrix that represents contributions of phase-shifted symbol values $s_{n'}$ to each carrier frequency $f_n$ for each of a plurality of phase spaces Ps(n'). The columns correspond to phase spaces and the rows correspond to carrier frequencies $f_n$. Several simplifying assumptions are made with respect to FIG. 15B. The arbitrary phases $\phi_n$ are zero and baseband signal processing is assumed (i.e., the frequency-offset $f_o$ is zero).

Each of a plurality of CI pulses (represented by the orthogonal phase spaces Ps(n')) is modulated with a particular symbol value $s_{n'}$. Each phase space Ps(n') is characterized by a unique set of phase offsets applied to the carrier frequencies $f_n$. Since each phase space Ps(n') is defined by a plurality of phase offsets to the same set of carrier frequencies $f_n$, a symbol $s_{n'}$ applied to one phase space interferes with symbol values applied to at least some of the carrier frequencies $f_n$ in the other phase spaces Ps(n'). In CI, the interfering symbol values cancel each other and the desired symbol values combine coherently when the carriers are combined in a particular phase space Ps(n'). Thus, a combination of symbols $s_{n'}$ and related phase offsets contribute to a complex value $v_n$ associated with each frequency $f_n$. This complex value $v_n$ is the sum of row elements shown in FIG. 15B for a corresponding frequency $f_n$.

The matrix elements shown in FIG. 15B illustrate basic mathematical relationships between carrier frequencies $f_n$ and phase spaces Ps(n') that can simplify transforms between frequency-domain and time-domain signals. For example, given a set of symbol values $s_{n'}$, these mathematical relationships provide carrier-frequency weights that produce a superposition signal with time-domain characteristics corresponding to the symbol values $s_{n'}$.

For a particular frequency bin $f_n$, a corresponding phase-space vector is shown as follows:

$$f_n:[1 e^{i2\pi T_{ps}nf_s} e^{i2\pi 2T_{ps}nf_s} \ldots e^{i2\pi(N-1)T_{ps}nf_s}]$$

This vector represents n full rotations in the complex plane. Each value in the vector corresponds to a particular phase space Ps(n'). Each phase-space value Ps(n') is multiplied by a corresponding data-symbol value $s_n'$. The sum of the data-modulated phase-space values provides an effective complex weight $w_{eff}(n)$ for frequency bin $f_n$. Thus, column vectors (i.e., phase spaces Ps(n') and their corresponding symbol values $s_n'$) are summed to generate the complex values $w_{eff}(n)$ associated with row vectors (i.e., frequency bins $f_n$).

A corresponding inverse transform may be provided. For example, a receiver may measure complex values $w'_{eff}(n)$ corresponding to each carrier frequency $f_n$. The complex values $w'_{eff}(n)$ represent the effective complex weight $w_{eff}(n)$ after it has been distorted by the channel and/or the receiver. Since the phase spaces Ps(n') are easily determined via column vectors of the matrix shown in FIG. 15B, the measured complex values $w'_{eff}(n)$ can be weighted (e.g., shifted) and summed to estimate the symbols $s_n$ transmitted in corresponding phase spaces Ps(n').

The column and row vectors of the matrix shown in FIG. 15B are similar to each other in the absence of symbol values $s_{n'}$. Linear combinations of an orthonormal basis may be used to characterize the column and/or row vectors. For a set of vectors of length N, a linear combination of orthonormal-basis vectors may include modulo-N additions between two or more vectors, vector products, corresponding phase shifts, or equivalent operations. A set of orthonormal basis vectors for FIG. 15B is shown as follows:

$$f_1:[1 e^{i2\pi T_{ps}f_s} {}_{e}{}^{i2\pi 2T_{ps}f_s} \ldots e^{i2\pi(N-1)T_{ps}f_s}]$$

$$f_2:[1 e^{i2\pi T_{ps}2f_s} e^{i2\pi 2T_{ps}f_s} \ldots e^{i2\pi(N-1)T_{ps}2f_s}]$$

$$f_4:[1 e^{i2\pi T_{ps}4f_s} e^{i2\pi 2T_{ps}4f_s} \ldots e^{i2\pi(N-1)T_{ps}4f_s}]$$

The vector corresponding to each $n^{th}$ frequency $f_n$ represents n rotations in the complex plane. In one embodiment, orthonormal vectors representing $n=2^m$ rotations in the complex plane (where m=0, 1, 2, . . . ) are stored in memory. The storage space required for each vector can be reduced by considering vector symmetry. In another embodiment, each orthonormal vector is generated. In one aspect of the invention, the vector representing one rotation in the complex plane serves as the basis to build other vectors, such as the orthonormal-basis vectors.

Figure 14B:
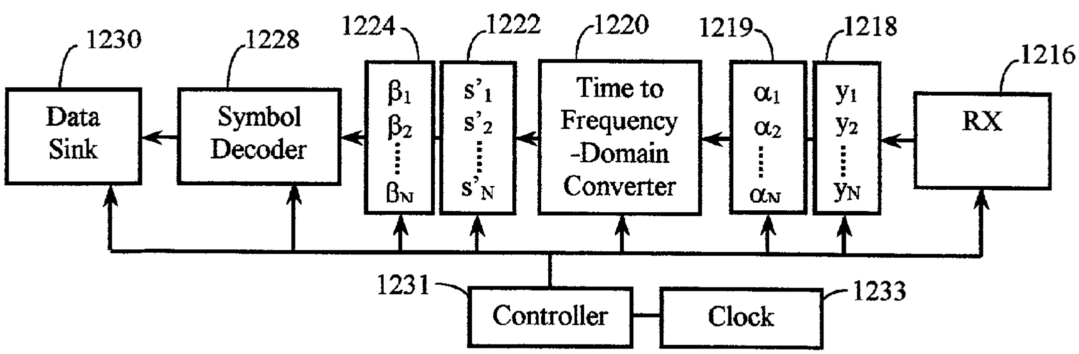
FIG. 14B shows another embodiment of a CI/DS-CDMA transmitter.

FIG. 14B illustrates components of one embodiment of a CI/DS-CDMA receiver. At the receiving end of a transmission link 113, a receiver system 1216 couples transmitted signals from at least one communication channel (not shown). The received signals are typically filtered, amplified, down-converted, and digitized by the receiver system 1216. Reception may include beam forming, any of various types of sub-space processing, space-time processing, space-frequency processing, channel compensation, and/or demultiplexing. The digitized received time-domain signals may optionally be coupled into a register 1218. An optional weighting system 1219 may apply weights to the time-domain signals prior to processing by a time-domain-to-frequency-domain converter 1220.

Each set of N time-domain values in register 1218 is converted via the time-domain to frequency-domain converter 1220 to generate a set of frequency-domain symbols $s'_n$. This transformation is the inverse of the transformation generated by the frequency-to-time-domain transform 1206. The communication link (not shown) will typically attenuate and/or phase shift the signals represented by $x_n$. The received signal values $y_n$ and $s'_n$ usually differ from the transmitted signal values $s_n$ and $x_n$.

A filter bank or Fourier transform may be implemented as a bank of N single-pole filters (i.e., resonators) in which each n filter has a pole at a corresponding $n^{th}$ frequency $f_n$. The invention may employ the Goertzel algorithm, which exploits the periodicity of the phase factors in a DFT, to perform a DFT computation as a linear filtering operation. The Goertzel algorithm is typically preferable when the DFT to be computed has a relatively small number M of values, where $M \leqq \log_2 N$. Similarly, various aspects of the invention that employ periodic phase terms, such as CI coding, CI sampling, OFFT operations, phased-array processing, etc., may employ the Goertzel algorithm to provide filtering.

Each CI data symbol can be obtained by coherently processing corresponding CI components. Preprocessing is typically performed to remove the carrier frequency $f_c$ from the received signal. Each received signal can be processed to form an in-phase/quadrature-phase pair. The processed signals may be compensated for channel effects and/or receiver processing variations. The processed signals may then compressed by a DFT process, such as an FFT.

One or more sinc filters, such as digital sinc filters, may be used to generate CI sub-carrier frequencies. For example, data symbols may be modulated onto individual time-domain sincs or pulses. Filters characterized by periodic time-domain characteristics may be employed to generate multicarrier signals. Similarly, periodic filters may be used to process received CI signals. Various filter shapes, including Gaussian-shaped filters, may be employed.

The frequency-domain symbols $s'_n$ may be stored in a register 1222. An optional complex-weighting system 1224 or an equalizer (not shown) may be used to compensate for attenuations, phase shifts, and/or inter-symbol interference. The frequency-domain symbols $s'_n$ are coupled to a symbol decoder 1228 that may optionally store the symbols $s'_n$ in a buffer (not shown). The symbols $s'_n$ are decoded to generate an estimate of the original data stream. Additional data processing and/or system control may be performed by an optional data sink 1230. The data sink 1230 may include one or more feedback loops, optimal combiners, multi-user detectors, hard-decision systems, soft-decision systems, error-detection systems, and/or error-correction systems.

A system controller 1231 is provided with a clock signal from a clock 1233. The controller 1231 regulates timing of signal-processing operations performed by a plurality of the receiver components. A transceiver may employ the same controller and/or clock for both transmission and reception.

The symbol decoder 1228 may perform inverse coding operations with respect to coding applied at a transmitter. The symbol decoder 1228 may perform adaptive decoding. The symbol decoder 1228 may perform partially blind adaptive coding with respect to transmitted data symbols, codes, and/or channel estimates. The symbol decoder 1228 may be adapted to perform de-interleaving, decoding, adaptive decoding, and/or channel compensation.

The symbol decoder 1228 may generate or otherwise be provided with at least one CI code, binary direct-sequence code, spreading code, channel code, encryption code, time and/or frequency-hopping code, pulse-position modulation code, etc. The symbol decoder 1228 may perform de-multiplexing, de-spreading, and/or converting at least one signal from one phase space to another phase space. The symbol decoder 1228 may decode a CI-based signal, a CI-coded signal, a direct-sequence signal that employs CI codes, a direct-sequence signal implemented with CI chip-shaping, any CI-based signal with channel codes, a signal implemented with CI-based channel codes, a signal implemented with CI codes for any type of multicarrier CDMA, CIMA signals, CI signals coded with phase codes to achieve low PAPR, CI signals provided with signal masking, and/or CI-based and/or CI-coded signals provided with frequency-hopping.

Reference (e.g., despreading) codes are typically set equal to the codes (or complex conjugates of the codes) at the other ends of the link and only maximize the SNR of the decoded signals. In one set of embodiments of the invention, such operation is performed blindly. Transmitted codes may include weights applied at individual transmitter-array elements for spatial processing, channel compensation, etc. Received codes may include weights applied at receiver-array elements to provide spatial processing, channel compensation, etc. Codes may include weights applied to different signal components (e.g., frequencies, polarizations, codes, code chips, and/or any other diversity-parameter values of one or more signals) at either or both the transmitter and the receiver. Either or both coding and decoding operations may be performed using blind-adaptation techniques.

The transmit codes and channel distortions need not be known at the symbol decoder 1228. This simplifies the processing used within the network by allowing use of unknown codes at the transceivers in the network. This also allows the use of adaptively determined codes that are continually optimized to mitigate noise, interference, and/or channel distortion encountered by the transceiver. Reference codes generated at the receiver may be adapted with respect to one or more characteristics of received signals. Transmitted codes generated at the transmitter may be adapted with respect to some reference, pilot, or feedback signal received from the receiver. Either or both the transmitter and the receiver may perform channel estimations that are used to adjust codes.

Preferred embodiments of the invention may use non-blind or calibrated techniques (e.g., least-squares techniques) that use knowledge of the baseband data sequence, channel distortion, and/or codes to develop ideal weights based on optimal signal estimation methods. Other preferred embodiments may use blind or non-calibrated techniques that use more general properties of the data signals to adapt code weights and/or decoding weights. Combinations of these techniques that use known and unknown components of the data signal, the code, and/or the transmission channel can also be used to construct an effective solution. Examples of blind techniques that are particularly useful include constant-modulus, multiple-modulus, and decision-direction techniques. These blind techniques use the message symbol constellation to adapt the decoding weights. A number of methods can be used to adapt multi-element, multi-frequency, and/or any other multi-diversity-parameter weights in or prior to the decoder 1228. Dominant-mode prediction (DMP) methods can exploit known packet arrival times, fading characteristics, or known coding parameters of a multicarrier signal. Code-gated self-coherence restoral (SCORE) methods exploit the known self-coherence (non-zero correlation between the spectrally separated signal components) in the multicarrier signal.

On the transmitter side of a multi-diversity parameter system (e.g., antenna array, multi-frequency, and/or any multi-valued diversity-parameter set having similar or identical sets of interfering signals), directive or retrodirective adaptation methods can be used to either direct returning signals of interest back to the transmit source with maximum power and/or minimum transmitted radio signals (directive mode), or to jointly direct the returning signals-of-interest back to the transmit source with minimum radiation in the direction of interfering sources (retrodirective mode). Processors can be used to accurately measure the received signal-of-interest steering vector (e.g., beam pattern, sub-space pattern, frequency-domain pattern, polarization-domain pattern, etc.) and direct a maximal beam back to the other end of the communication link without knowledge of the received signal-of-interest characteristics (e.g., direction-of-arrival, frequency profile, polarization profile, code, etc.) even though the interference sources completely cover the signal-of-interest passband and packet interval.

In some embodiments of the invention, it is preferable that each CI carrier be sufficiently narrow to allow the distortions in that sub-channel to be modeled by a single phase shift and attenuation. It is also preferable that CI carriers be sufficiently narrow to ensure that a sub channel that is turned off to prevent interference from narrow-band sources does not unduly waste bandwidth beyond that corrupted by the interference source. However, narrow channels increase system latency and the computational complexity of the frequency-domain-to-time-domain transformation and its inverse. Thus, it is preferable to achieve a balance between the benefits and drawbacks of various sub-channel widths. In one set of preferred embodiments, narrower subchannels are employed for frequencies having greater attenuations and/or phase shifts. Wider subchannels are used at frequencies with reduced attenuations and/or phase shifts.

Figure 16A:
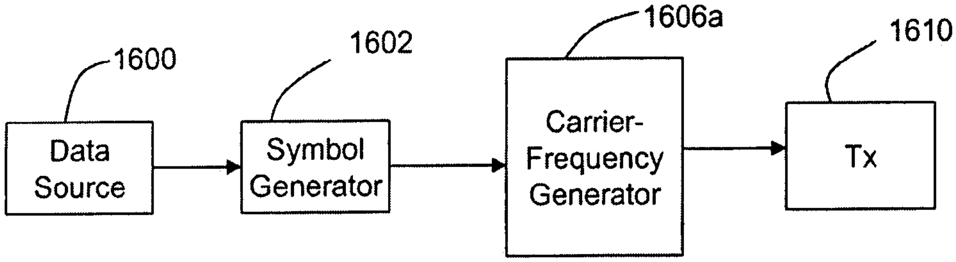
FIG. 16A illustrates at least some of the principle components of a CI transmission system.

FIG. 16A illustrates basic components of a CI transmission system. A data source 1600 supplies a data stream to a symbol generator 1602 that generates symbols relative to the data stream and one or more CI codes, multiple-access codes, spread-spectrum codes, interleaving codes, error-detection codes, and/or channel codes. The symbol generator may generate symbols with respect to a CI/DS-CDMA code. A symbol generator, such as the symbol generator 1602, may be adapted to modulate the symbols. The symbols are modulated with respect to any modulation technique, such as phase modulation, frequency modulation, amplitude modulation, polarization modulation, time-offset modulation, and/or combinations thereof. The symbols are impressed onto carriers generated by a carrier generator 1606*a*.

In one embodiment, the carrier generator 1606*a* produces carrier frequencies that are processed with respect to the symbols. In another embodiment, the carrier generator 1606*a* produces periodic time-domain pulses that are modulated with symbols. The output of a periodic-pulse generator is a multi-frequency signal. However, the symbols used to modulate the pulses reflect the desired time-domain structure of the transmitted signal. Nevertheless, the frequency-domain profile of the transmitted time-domain signals are similar to a frequency-domain signal coded, with corresponding polyphase signals. These frequency-domain characteristics differ from the conventional DS-CDMA frequency-domain structure, which is single carrier.

The modulated carriers are processed by a transmission system 1610 prior to being coupled into a communication channel (not shown). The transmission system 1610 may perform typical signal-processing operations corresponding to various parameters including channel characteristics, required transmission power, transmit frequency, receiver location, acceptable bandwidth, etc. In some embodiments, the carrier generator 1606*a* may perform one or more of the tasks of the transmission system 1610 (e.g., frequency up-conversion). For example, the carrier generator 1606*a* may include harmonic-generation capabilities coupled to a pass-band filter.

Figure 16B:
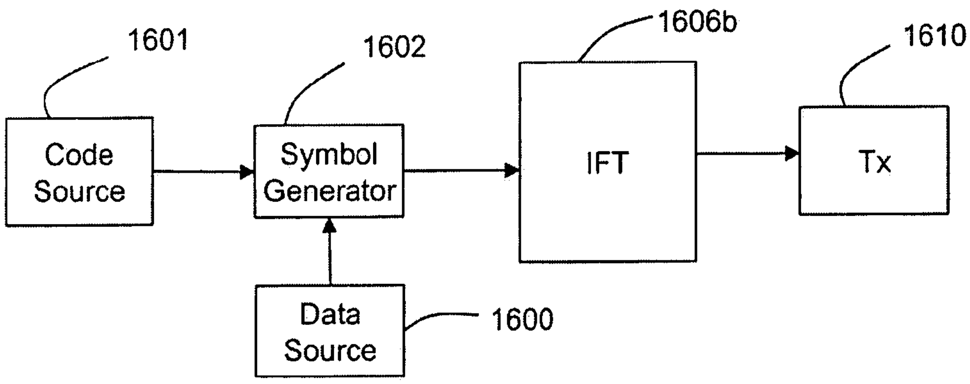
FIG. 16B illustrates another embodiment of a CI transmitter.

FIG. 16B illustrates a more detailed embodiment of a CI transmitter. A code source 1601 is coupled to the symbol generator 1602. In FIG. 16A, the symbol generator 1602 was assumed to provide codes. The carrier generator 1606*b* is illustrated as an inverse Fourier transform (IFT). This is one of many different carrier generators that may be implemented in a CI transmitter.

Figure 16C:
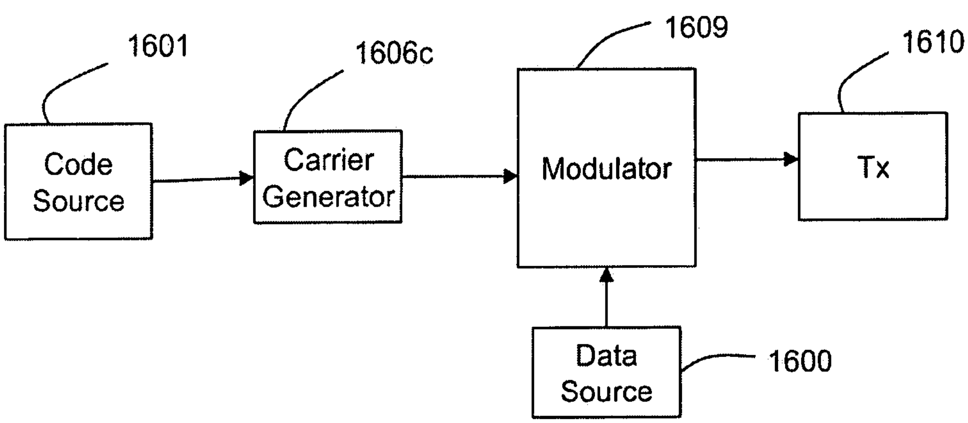
FIG. 16C illustrates an alternative embodiment of a CI transmitter.

FIG. 16C illustrates one particular embodiments of a CI transmitter. The data source 1600 and the carrier generator 1606*c* are coupled to a modulator 1609. The carrier generator 1606*c* produces carriers having properties that reflect one or more input codes generated by the code source 1601. For example, the code source may generate polyphase symbols with respect to a CI code. The code source 1601 may generate symbols with respect to other code types in addition to, or instead of, CI codes.

The modulator 1609 modulates data bits or symbols onto the carriers. Typically, the carrier generator 1606, such as shown in FIG. 16A or 16B (as 1606*a* and 1606*b*, respectively), impresses data symbols onto the carriers. In some embodiments, the symbol generator 1602 may impress data bits or symbols onto code symbols via modulation or a code-generation process.

Figure 16D:
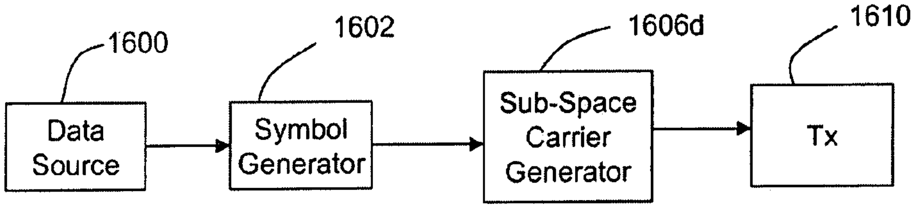
FIG. 16D illustrates basic components of a particular set of embodiments of a CI transmitter.

FIG. 16D illustrates basic components of a particular set of embodiments of a CI transmitter. The carrier generator 1606*d* is illustrated as a sub-space carrier generator. The carrier generator 1606*d* may distribute codes corresponding to each data symbol across multiple transmitters. For example, each transmitter of an array may transmit a different code symbol corresponding to the same data symbol. Preferably, the code symbol is generated from a CI code or CI/DS-CDMA code. Each code symbol may be provided to each of a plurality of transmitters to generate a different beam pattern or sub-space channel corresponding to each code symbol. Other types of subspaces may be employed. Subspaces may be generated from signal polarizations (e.g., linear, circular, and/or elliptical polarizations), signal frequencies, signal phases, amplitude distributions, etc.

Figure 16E:
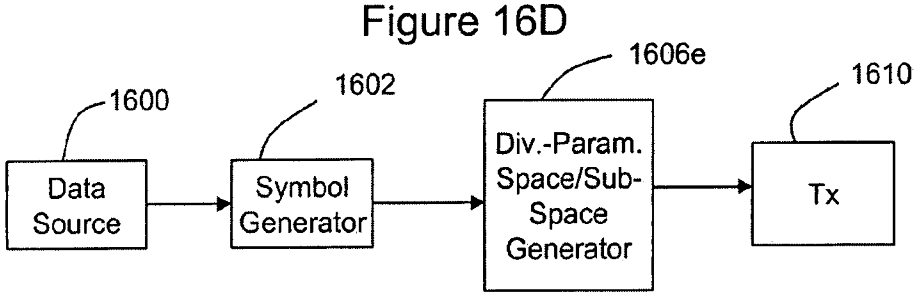
FIG. 16E illustrates generalized components of a broad class of CI transmitters.

FIG. 16E illustrates generalized components of a broad class of CI transmitters. The carrier generator 1606*e* is a system that generates carriers characterized by one or more diversity-parameter values and/or sub-space values.

Different CI codes may be characterized by polyphase projections onto two orthogonal diversity-parameter values. Specifically, in-phase and quadrature-phase magnitudes may be expressed by corresponding signal values impressed onto orthogonal diversity-parameter values or subspaces. For example, in-phase and quadrature-phase values may correspond to values imparted to vertical and horizontal linear polarized signals. Similarly, other orthogonal diversity-parameter values may be used.

CI carriers may be implemented with dynamically changing values imparted to in-phase and quadrature-phase components of any pair of orthogonal diversity-parameter or subspace values. In one preferable set of embodiments, the in-phase and quadrature-phase components are characterized by an orthogonal set of sinusoids. The sinusoids represent sub-carrier modulations. For example, circular polarization results from in-phase and quadrature-phase sub-carrier modulation applied to vertical and horizontal linear-polarized signals. To maintain orthogonality, the frequency spacing $f_s$ between the sinusoidal signals is inversely proportional to the symbol duration. These carriers are then processed to generate superposition signals having predetermined time-domain characteristics.

Generation of a CI-based signal may include providing the superposition of CI carriers with a circular or elliptical polarization. The polarization-rotation rate may be selected with respect to multipath delay profiles to reduce multipath fading. Predistortion of a circular-polarized CI signal may include providing elliptical polarization to the transmitted signal. In one set of embodiments, each CI carrier frequency is expressed as a polarization-rotation rate of a circular-polarized or elliptical-polarized signal. In another set of embodiments, each CI carrier has the same polarization-rotation rate, but may have different phase offsets. In yet another set of embodiments, each CI carrier frequency is provided with a unique polarization-rotation rate. CI codes CI/DS-CDMA, and/or other orthogonal coes may be applied to (linear, circular, elliptical, etc.) polarized signals. Phase coding may be applied in the form of a polarization-phase offset, a frequency-phase offset, or an offset to any other set of diversity parameter-values that indicates a phase offset.

In CI embodiments that employ orthogonal polarization-rotation rates, the polarized signals are processed in the same way as orthogonal carrier frequencies. For example, a receiver adapted to process received polarized CI signals may include a filter bank, a transform processor (e.g., any type of Fourier transform, including an orthogonal-frequency Fourier transform), a correlator, a complex-conjugate processor, and/or a sample-and-add system.

Multi-rate circular polarized signals may be implemented as wavelets. Polarized signals may be used in corresponding wavelet-transform operations. For example, wavelet families may be generated from polarized signals having durations that are inversely proportional to their polarization-rotation rates. Orthonormal wavelet bases may be generated via appropriate selections of scaling factors (i.e., scaling factors that are proportional to each other by powers of two). Wavelet filters may be implemented with circular and/or elliptical polarized signals. Orthonormal wavelet bases, such as polarization-based wavelets, may be used as code chips. Codes, including, but not limited to, multiple-access, spread-spectrum, and channel codes, may be generated from polarization-based wavelet chips. Wavelet chips may be provided with phase offsets to generate code chips, such as CI code chips.

Polarization-based wavelets may be shaped with respect to time-domain filters. Multiple signals having different polarization-rotation rates may be used to construct wavelets via superposition. Polarization-wavelet characteristics, such as shape, effective frequency, duration, etc., can be adjusted by providing weights to the wavelet sub-carriers. Polarization-based wavelet sub-carriers are analogous to CI carriers. Multiple signals having different polarization-rotation frequencies may be combined to construct code chips or other signals having predetermined time-domain characteristics. Weights provided to polarization-based sub-carrier signals may shape desired time-domain characteristics of the superposition signal.

Figure 16F:
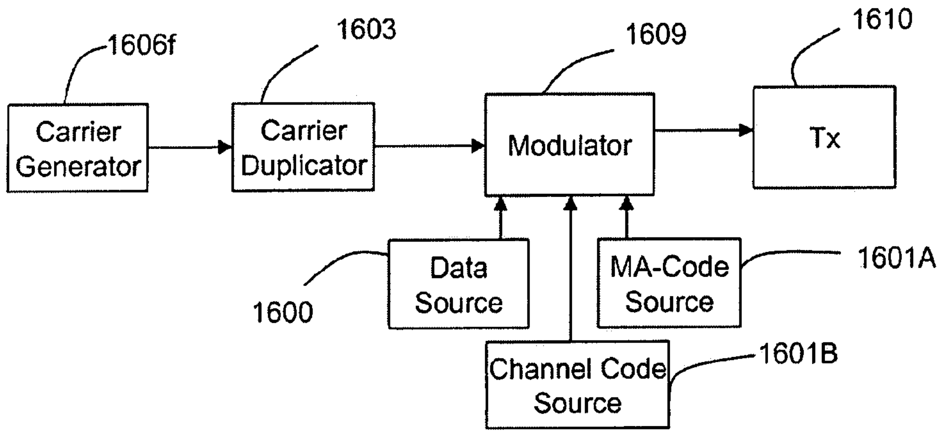
FIG. 16F illustrates basic components of a CI transmitter that impresses at least one data sequence, at least one channel code, and at least one multiple-access code onto a plurality of carriers.

FIG. 16F illustrates basic components of a CI transmitter that impresses at least one data sequence, at least one channel code, and at least one multiple-access code onto a plurality of carriers. A carrier generator 1606*f* generates at least one carrier signal. The at least one carrier signal may be replicated by an optional carrier duplicator. A modulator receives inputs from a data source 1600, a multiple-access-code source 1601A, and a channel-code source 1601B. Optionally, the multiple-access code source 1601A may include a spread spectrum code source.

In one set of embodiments, the multiple access code source 1601A produces a code for a CI/DS-CDMA signal. In another set of embodiments, the multiple access code source 1601A generates a CI code. In another set of embodiments, the channel-code source 1601B generates a CI code.

The modulator 1609 performs any necessary combining of the input signals and impresses the signals onto the carriers. The carriers are optionally processed by a transmission system 1610 that couples the modulated carriers into a communication channel (not shown).

Figure 16G:
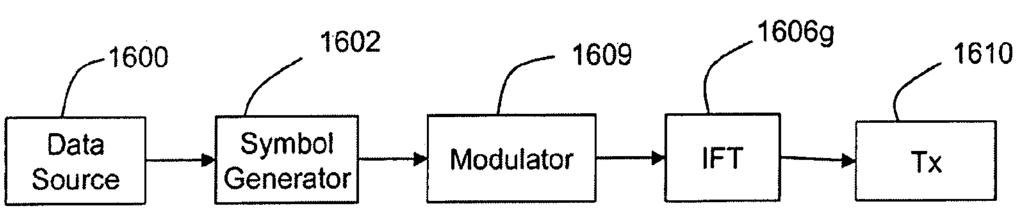
FIG. 16G illustrates another embodiment of a CI transmitter.

FIG. 16G illustrates another embodiment of a CI transmitter. As in FIGS. 16A-16F, FIG. 16G shows basic components of such an embodiment and includes a carrier generator 1606*g* shown in the form of an IFT.

Figure 17A:
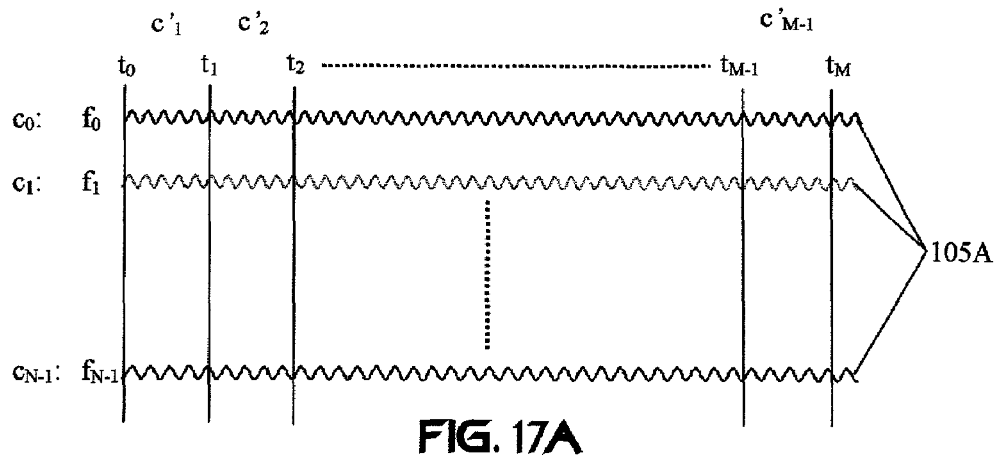
FIG. 17A illustrates how a CI/DS-CDMA signal can be characterized by both time-domain and frequency-domain codes. CI may be characterized by multi-dimensional codes with respect to other combinations of diversity parameters.

FIG. 17A illustrates the multi-dimensional nature of coding provided to a CI/DS-CDMA signal produced by a CI transmitter. CI code chips $c_0, c_1, \ldots, c_{N-1}$ used to modulate individual carrier frequencies produces a carrier superposition a time-domain profile indicative of code chips $c'_0$, $c'_1$, $c'_{M-1}$. The time-domain code may be a conventional direct-sequence code, a channel code, a CI code implemented as a multiple-access, spreading, and/or channel code, or any combination thereof. In one set of embodiments, the frequency-domain code may be a binary direct-sequence code and the time-domain code may be a CI code. In various embodiments of the invention, frequency-domain and/or time-domain chips may be interleaved in the time domain.

Figure 17B:
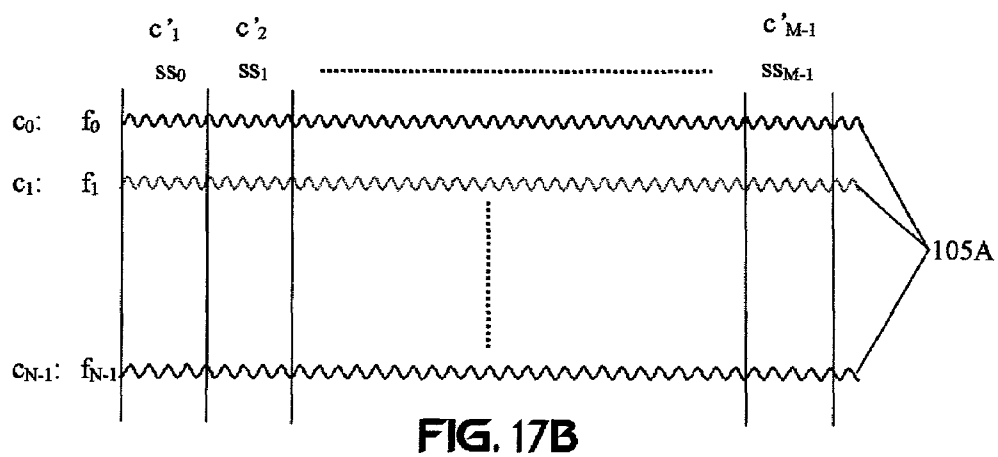
FIG. 17B illustrates a multi-dimensional signal with CI coding.

FIG. 17B illustrates CI coding applied to a multi-dimensional signal. In one set of embodiments, a polyphase CI code $c_0, c_1, \ldots, c_{N-1}$ is applied to a set of carrier frequencies provided to an antenna array. Each data symbol is expressed by a code-chip value $c'_0, c'_1, \ldots, c'_{M-1}$ corresponding to a different orthogonal diversity-parameter value, such as a different subspace. In another set of embodiments, the code-chip values $c'_0, c'_1, \ldots, c'_{M-1}$ are impressed upon carrier superpositions. The code chips $c'_0, c'_1, \ldots, c'_{M-1}$ are expressed as orthogonal values of at least one diversity parameter.

Figure 17C:
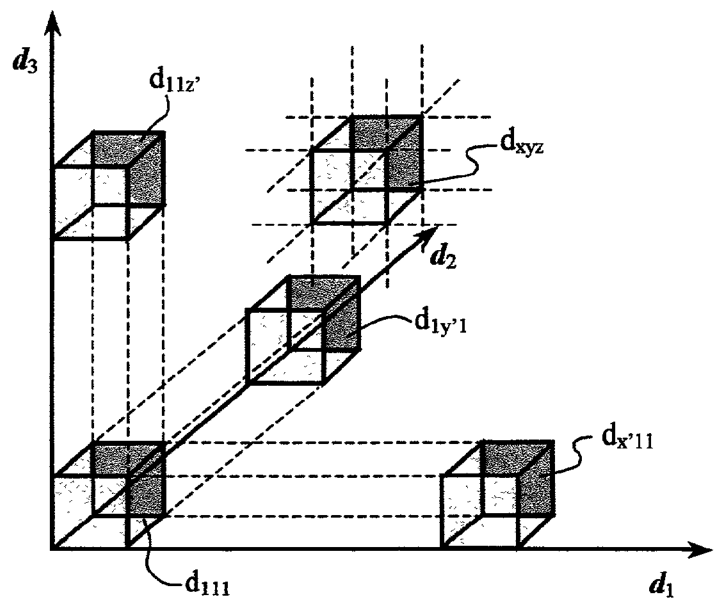
FIG. 17C illustrates a three-dimensional diversity-parameter space that can be modulated or impressed with CI codes.

FIG. 17C illustrates a three-dimensional diversity-parameter space. Each axis represents values of a different diversity parameter $d_n$. Orthogonal values are represented by a three-dimensional diversity parameters $d_{xyz}$. Diversity parameters in the diversity-parameter space may be modulated or otherwise impressed with at least one set of CI codes. One or more diversity parameters may represent a superposition of diversity-parameter values. For example, a time-domain axis or a phase-space axis can represent a superposition of multiple carrier frequencies.

In two dimensions, an instantaneous representation of a conventional stacked-carrier protocol transmitted and received by antenna arrays can be represented by an NXM matrix of subcarriers, where N is the number of frequencies and M is the number of array elements at the receiver. The matrix elements can be modulated with at least one CI code. A CI code may be applied across frequencies (for example, to produce a CI superposition signal or a CI-based MC-CDMA signal), across subspaces, or across both. Time introduces a third axis to produce an NXMXL space. CI code chips may be positioned across frequencies, subspaces, and/or time intervals. Multiple CI codes may be interleaved with respect to any diversity parameters.

A DS-CDMA code (a first dimension) may be modulated by another code (a second dimension). Thus, the first-dimension DS-CDMA code may be regarded as a carrier for the second code. In one embodiment of the invention, a binary-phase (0, $\pi$) DS-CDMA code is modulated with a second pseudo-noise code, such as a PSK code having a magnitude range within some small fraction of $\pi$. Either code may include a CI-based DS-CDMA code and/or a CI code. In another embodiment of the invention, the second code is a coherence-multiplexing code or some other code (e.g., a noise-like code) characterized by one or more code lengths. Similarly, DS-CDMA, CI, and/or CI/DS-CDMA codes may be impressed upon a coherence-multiplexing code, a code-length division multiple access code, or some other noise-like code.

Multi-dimensional codes may include codes derived from channel characteristics between at least one predetermined transmitter-receiver pair. For example, multipath and/or at least some other channel characteristics are typically unique for each transmitter-receiver link. Thus, link characteristics can be used to assign some form of coding to each transceiver. Link-characteristic coding may include CI codes and/or CI-based codes.

6. CI/DS-CDMA ARRAY PROCESSING

Figure 18B:
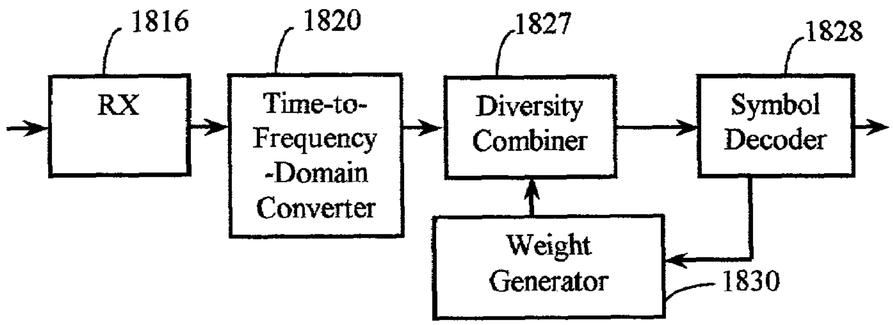
FIG. 18B is a general illustration of a CI receiver, such as a CI/DS-CDMA receiver.

FIG. 18B illustrates components of a CI receiver, such as a CI/DS-CDMA receiver. A receiver system 1816 couples transmitted CI signals from a communication channel. Receiver processing, such as filtering, down conversion, amplification, beam forming, etc., converts the coupled signals into electronic received signals. The received signals are processed in a time-to-frequency-domain converter 1820 that outputs data symbols modulated on the individual carriers. If the receiver system 1816 includes an antenna array and the converter 1820 provides time-to-frequency-domain conversion for each array element, the frequency-domain symbols may include multiple-access and/or multi-channel interference.

Various effects, such as multipath, receiver characteristics, and transmitter characteristics (e.g., array element spacing, beam directionality, spatial gain distributions, etc.), ensure that at least some of the interfering signals can be separated from each other. Diversity, such as spatial diversity, can be used to improve signal quality, increase bandwidth efficiency, or achieve some trade off between improved signal quality and increased throughput.

The interfering signals are coupled into a diversity combiner 1827 that combines the signals to generate desired signals having minimum noise and interference. The signals received by the separate antennas are independently demodulated before being applied to the combiner 1827.

Demodulation, as used herein, may include synchronous demodulation, which may be performed with the aid of carrier and timing information derived from one or more received waveforms. A demodulator may provide one or more additional signal-processing operations, including, but not limited to, channel selection, bandwidth reduction, despreading, resampling, spectral equalization, matched filtering, timing/phase recovery.

The number of spatial sub-channels that can be processed by the combiner 1827 is typically equal to the number of receiver array elements. When CI is used with antenna arrays, array combining systems, and CI diversity combiners may be combined into a single diversity combiner, such as combiner 1827.

A weight-generation system 1830 provides weights to the diversity combiner 1827. An adaptive antenna array may include an MMSE diversity combiner or some other form of optimal combiner. The weight-generation system 1830 may select parameters accurately describing channel characteristics that minimize the mean squared error of the received signal, which decreases the signal error rate, suppresses interference, and maintains signal quality. These parameters may be estimated.

Parameters needed to optimize performance for diversity combining and/or sub-channel processing are typically determined from channel estimates and the instantaneous correlation of the received signals. Channel estimations may employ a multiple-pass system (not shown) to account for past, present, and future channel estimations. Because future references may be determined from a preceding pass, it is possible to refine channel estimations and accordingly achieve better weights. The weight-generation system 1830 may include a parameter estimator (not shown) adapted to process either or both the demodulated received signals prior to decoding and the combined received signal after demodulation and decoding by the receiver.

A symbol decoder 1828 decodes data symbols and provides blocks of undecoded symbols and/or decoded symbols to the weight-generation system 1830. Symbol decoding may include channel decoding, demultiplexing, deinterleaving, error correction, etc. The symbol decoder 1828 may perform iterative decoding. In a CI/DS-CDMA system, the symbol decoder 1828 performs decoding with respect to the impressed DS-CDMA code.

Each received symbol may be evaluated with respect to a minimum mean square error or some other performance measurement. The minimum mean square error is a measure of error probability in a signal based on the mean value of the square of the error, $(y-\tilde{y})^2$, where $\tilde{y}$ is any estimate of y. In general, if y is a random variable having a mean value of $\bar{y}$, then choosing $\tilde{y}=\bar{y}$ minimizes the mean square error. Typically, it is necessary to estimate $\bar{y}$ based on supplied parameters. The accuracy and usefulness of the estimated mean square error is related to the quality of the parameters used in the estimation.

Figure 18C:
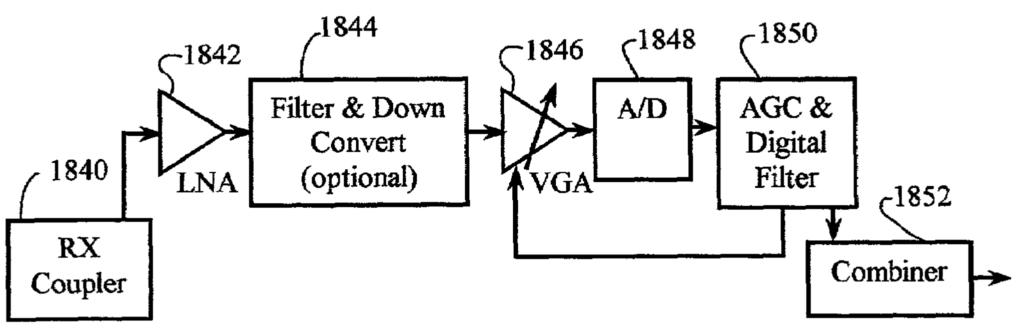
FIG. 18C illustrates one possible set of embodiments of a CI receiver.

FIG. 18C illustrates a CI receiver that represents a set of embodiments of the invention. An input coupler 1840 (such as an antenna) receives signals from a communication channel (not shown). The input coupler 1840 may be coupled to one or more receiver components, such as amplifiers and filters. In particular, a low-noise amplifier 1842 is provided to amplify a received signal. The amplified signal is coupled to an optional filter-and-down-convert component 1844. The component 1844 may include a multi-stage frequency converter (not shown).

A variable-gain amplifier 1846 is shown coupled to an automatic gain control (AGC) and digital filter assembly 1850. An A/D converter 1848 converts the analog gain-adjusted signal to a digital signal. The AGC and filter assembly 1850 separates the digital signal into a plurality of sub-carrier digital baseband signals that are combined in a combiner 1852.

The A/D converter 1848 may optionally include a delta-sigma architecture. One set of delta-sigma architectures employs a feedback loop to provide a suitable over-sampling ratio. The A/D converter 1848 may optionally incorporate at least one band-pass filter in the feedback loop to allow the A/D converter 1848 to sample at an intermediate frequency. For example, the A/D converter 1848 may include a filter bank, such as a signal processor adapted to perform a Fourier transform, wavelet transform, or an equivalent operation.

Various system elements not shown may be incorporated into the receiver and/or the receiver components. For example, one or more synthesizers (not shown) may provide clock and/or local-oscillator signals. The receiver may include one or more phase-lock loops (PLLs) and/or tunable notch filters (not shown). In various embodiments of CI receivers, phase offsets (such as offsets resulting from timing mismatches, channel-induced phase offsets, clock drift, etc.) may be tracked and compensated with a PLL.

A weight generator (not shown) may be provided to calculate and/or apply weights to the subcarriers. Weights may be applied during A/D, filtering, and/or combining operations. Frequency offsets affecting the received signals may be compensated by one or more operations including carrier weighting, MUD, multi-channel detection, frequency translation at either or both the receiver and the transmitter, and adaptable combining. A symbol decoder (not shown) may follow the combiner 1852. The symbol decoder (not shown) may provide soft-decision control to the weight generator (not shown) and may incorporate a feedback loop.

Various combinations of array processing and multicarrier protocols (such as described in U.S. Pat. Nos. 6,128,276, 5,671,168, 5,528,581, 5,973,642, 6,144,711, 6,211,671, and 6,008,760, which are hereby incorporated by reference) may be adapted for use with CI-based protocols to provide unusual improvements to system performance, signal quality, and throughput. CI may be implemented with various array-processing systems and techniques including, but not limited to, layered space time, space-frequency, spatial interferometry, vector-processing, matrix-processing, frequency diversity interferometry, marginal-isolation, beam-forming, interference-nulling, beam-steering, and blind adaptive array processing systems and methods. CI may be introduced to array processing systems and methods, such as described in U.S. Pat. Nos. 5,642,353, 5,592,490, 5,515,378, and 5,471,647, which are hereby incorporated by reference. CI may be implemented in array processing systems that provide any combination of diversity combining and sub-channel processing.

Figure 19A:
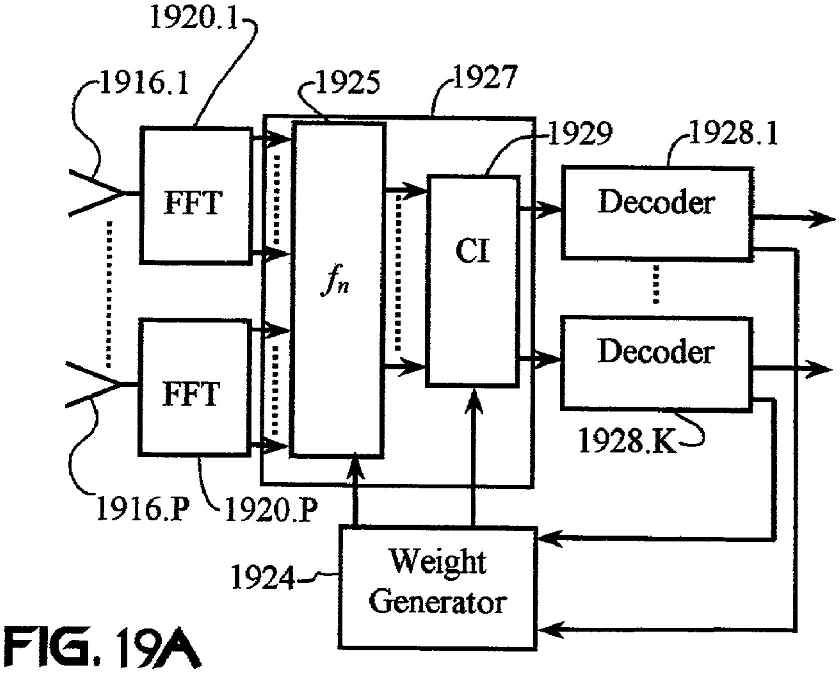
FIG. 19A illustrates an embodiment of a CI receiver array.

FIG. 19A is a basic block diagram of a CI-based receiver implemented with a receiver array. A plurality of array elements 1916.1 to 1916.P are responsive to transmitted CI signals in order to generate a plurality of electronic receive signals. The transmitted signals may be transmitted from multiple, spatially separated, independent transmitters (e.g., mobile transceivers), multiple independent, co-located transceivers, a single transceiver adapted to transmit signals on a plurality of interfering channels, and/or a plurality of substantially co-located transceivers adapted to transmit data symbols on a plurality of interfering channels.

The receive signals are processed by a time-to-frequency converter (such as a plurality of FFTs 1920.1 to 1920.P) that separate the receive signals into a plurality of CI carrier-frequency components. The carrier-frequency components are coupled into a diversity combiner 1927 that includes a frequency combiner 1925 and a CI combiner 1929. The frequency combiner 1925 combines signals received from the FFTs 1920.1 to 1920.P for each carrier frequency $f_n$ to generate at least one signal corresponding to each carrier frequency $f_n$. The frequency combiner 1925 processes the receive signals to provide any combination of receiver performance and frequency reuse. The frequency combiner 1925 may generate a plurality of subchannels for each frequency wherein each frequency sub-channel corresponds to a particular signal frequency transmitted by a particular transmitter.

The CI combiner 1929 processes the multi-frequency signals produced by the frequency combiner 1925 to separate interfering data signals on each frequency sub-channel. The CI combiner 1929 may perform any necessary de-interleaving to compensate for data symbols spread over multiple diversity parameters.

The frequency combiner 1925 and the CI combiner 1929 may be provided with adaptive weights from a weight generator 1924. The weights may be generated with respect to a known training sequence and/or estimates of the received data symbols. For example, a plurality of decoders 1928.1 to 1928.K decode the data signals received from the CI combiner 1929 to generate a plurality of data-symbol estimates. These estimates, as well as confidence measurements, may be used to generate hard or soft decisions from which weights are generated. The process of decoding may include adaptive weighting and/or iterative processing. Decoding may include error-detection coding, error-correction decoding, demultiplexing, despreading, compensation for channel distortions, decryption, etc. The decoders 1928.1 to 1928.K and/or the weight generator 1924 may include a parameter estimator (not shown).

The combiner 1929 may discard signals having one or more frequencies, signals in one or more subspaces, and/or signals from one or more antennas 1920.1 to 1920.P. For example, one or more received signals may be discarded to reduce the effects of noise and/or interference. The combiner 1929 and/or the decoders 1928.1 to 1928.K may include a decision processor (not shown) adapted to evaluate signal characteristics (e.g., power, SNR, SNIR, BER, interference level, channel distortion, etc.) in order to determine which signal(s) to discard. The decision processor (not shown) may update its determination of which signal(s) to discard relative to measured signal characteristics and/or one or more predetermined time intervals.

The decision processor (not shown) may provide a feedback signal to one or more remote transmitters from which signals are received. The feedback signal may include a performance indication of the received signals, channel estimates, and/or a known training sequence that allows the remote transmitter(s) to evaluate the channel. The feedback signal may be provided with control information to adjust or suggest adjustments to signal-transmission characteristics (e.g., signal power, CI carrier frequencies $f_n$, frequency offset $f_o$, frequency spacing $f_s$, number of CI carriers, pulse overlap, beam pattern, spatial gain distribution, signal polarizations, signal phases, interleaving, channel coding, etc.) to compensate for fading, inter-symbol interference, co-channel interference, jamming, etc. These types of transmission-signal adjustments may be made to perform power control, frequency-band adjustments (e.g., bandwidth exchange), link priority, multiplexing, multiple access, link security, throughput adjustments, adaptability to information type (e.g., voice or data), and ensure quality of service.

A diversity combiner (e.g., an MMSE diversity combiner) is used for diversity reception in various systems, such as an adaptive antenna array or a CI receiver. Diversity reception typically reduces or eliminates deep fades caused by multipath phase cancellations (i.e., multipath fading). Diversity combining also produces gain (relative to diversity switching or non-diverse reception) by effectively combining the power of multiple received signals. Diversity combining may be employed to optimize the quality of desired signals that are separated from interfering signals. The SNR (and/or the signal-to-interference ratio) may be maximized in interferometry processes, such as CI and/or array processing. When CI is used with antenna arrays, array and CI diversity combiners may be combined into a single diversity combiner.

Figure 19B:
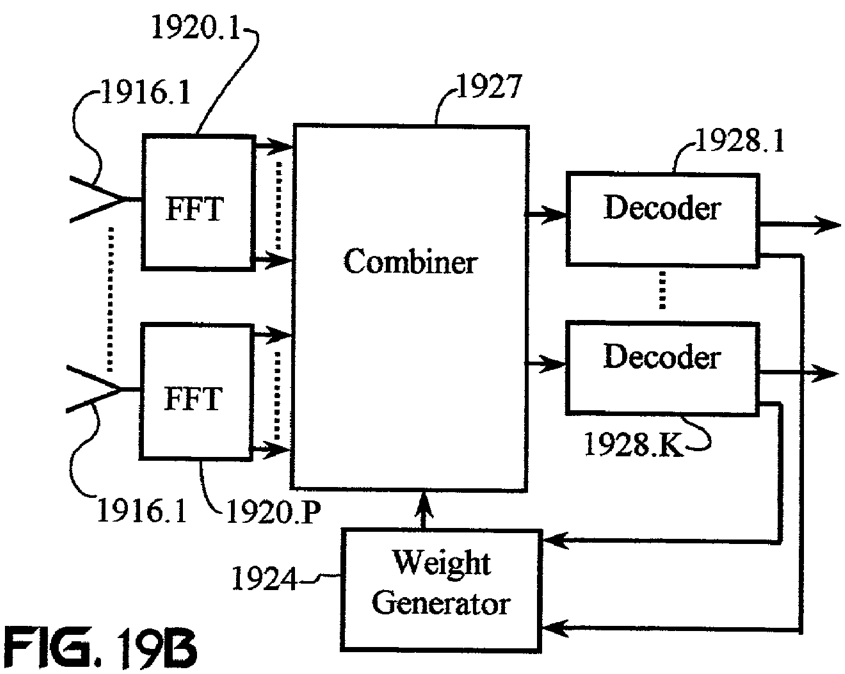
FIG. 19B illustrates an alternative embodiment of a CI receiver array.

FIG. 19B is a basic block diagram of a CI-based receiver having similar system components as those indicated by the same numbering in FIG. 19A. However, the receiver shown in FIG. 19B includes a combiner 1927 that does not have differentiated subsystems, such as the frequency combiner 1925 and the CI combiner 1929 shown in FIG. 19A. Rather, the combiner 1927 is implemented as a combination of the frequency combiner 1925 and the CI combiner 1929. Since array processing and CI combining processes can be similar, it is advantageous to combine these processes for some applications.

Figure 19C:
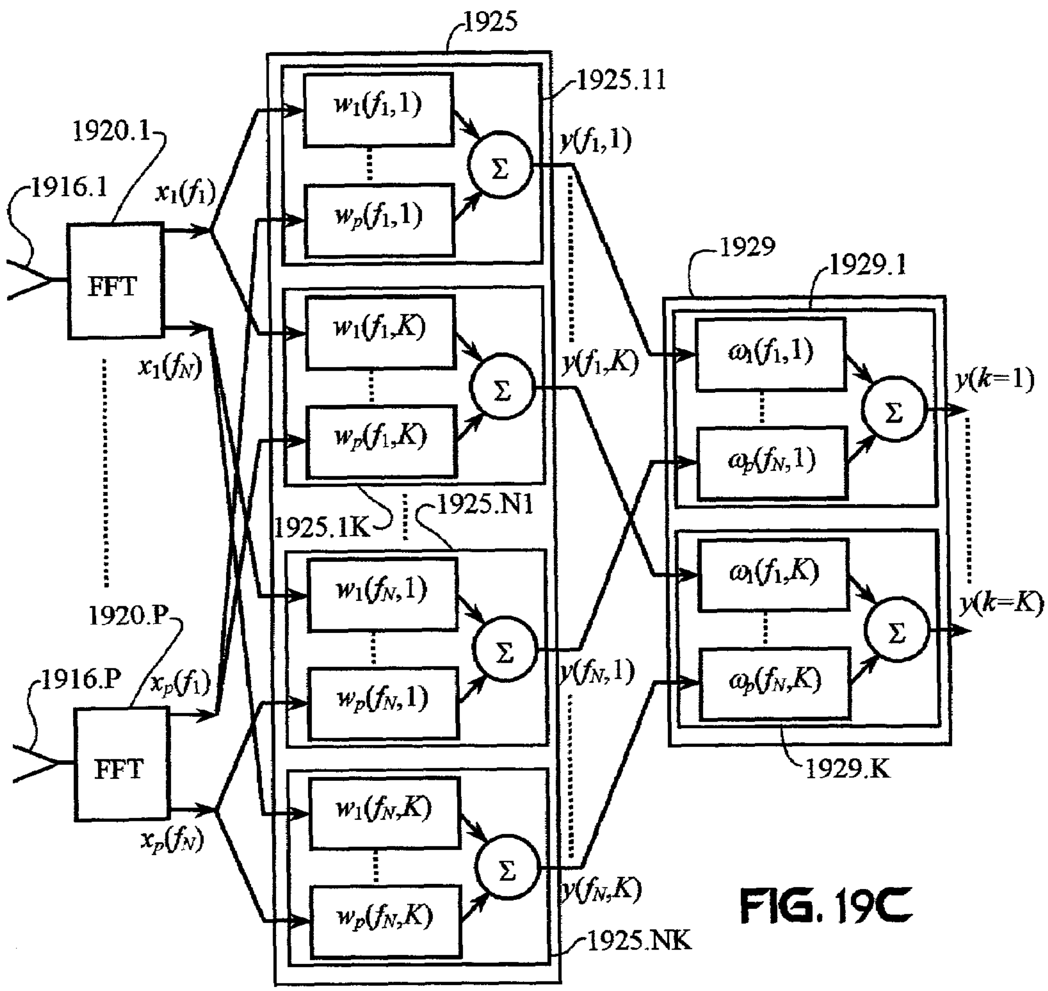
FIG. 19C illustrates an embodiment of the combiner shown in FIG. 19A.

FIG. 19C is a functional illustration of one possible embodiment of the combiner 1927 shown in FIG. 19A. Each FFT 1920.1 to 1920.P separates an input signal from an array element 1916.1 to 1916.P into a plurality of frequency components $f_1$ to $f_n$. For example, the signals produced by FFT 1920.1 include $\{x_1(f_1)$ to $x_1(f_n)\}$. Signals produced by FFT 1920.P include $\{x_p(f_1)$ to $x_p(f_n)\}$.

The frequency combiner 1925 includes a plurality of frequency-subspace combiners 1925.11 to 1925.NK. Combiner 1925.11 generates a frequency-subspace signal $y(f_1,1)$ corresponding to frequency $f_1$ in spatial sub-channel 1. Combiner 1925.N1 generates a frequency-subspace signal $y(f_N,1)$ corresponding to frequency $f_N$ in spatial sub-channel 1. In this particular embodiment of the invention, all of the frequency-subspace signals $\{y(f_1,1) \ldots y(f_N,1)\}$ corresponding to spatial sub-channel 1 are processed in a subsystem 1929.1 of the CI combiner 1929 to produce a CI signal y(k=1). Similarly, a CI signal y(K) is generated by a subsystem 1929.K from a plurality of the $K^{th}$ spatial sub-channel's signals $\{y(f_1,K) \ldots y(f_N,K)\}$ produced by frequency-subspace combiners 1925.1K to 1925.NK. In other embodiments, CI signal components may be distributed across multiple spatial sub-channels, time intervals, and/or other diversity-parameter values.

The frequency-subspace combiners 1925.11 to 1925.NK are provided with complex weights $w(f_n,k)$ to help separate interfering signals into spatial sub-channels. Complex weights $\omega(f_n,k)$ are provided to the CI combiner 1929 to enhance the generation of CI signals y(k). The weights $w(f_n,k)$ and $\omega(f_n,k)$ may be generated with respect to one or more optimal-combining techniques. MMSE, ORC, maximum likelihood, equal gain, and/or other combining techniques may be employed. An iterative weighting process may be employed, such as a process that generates soft decisions and uses feedback. The weights may be generated via blind-adaptive processes.

Figure 19D:
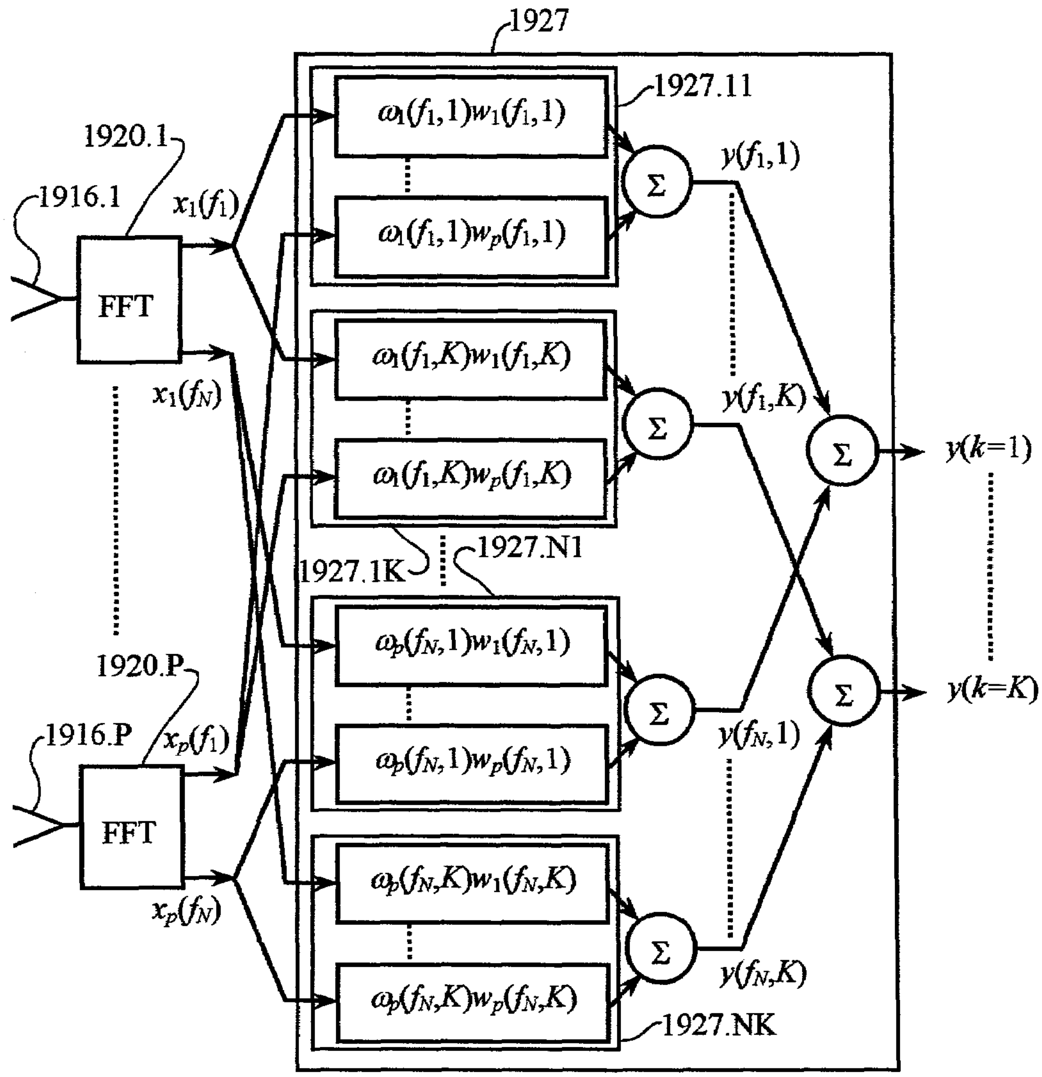
FIG. 19D illustrates an embodiment of the combiner shown in FIG. 19B.

FIG. 19D illustrates one possible apparatus and method embodiment of the combiner 1927 shown in FIG. 19B. A plurality of optimal-combining systems 1927.11 to 1927.NK provide complex weights of $\omega(f_n,k)w(f_n,k)$ to signals output by each FFT 1920.1 to 1920.P. The complex weights $\omega(f_n,k) w(f_n,k)$ optimize sub-channel generation, as well as CI combining. In one possible variation of this embodiment, a weighted carrier or a weighted signal value $y(f_n,k)$ corresponding to a particular carrier frequency and subspace is provided at each optimal-combining system 1927.11 to 1927.NK output. Values $y(f_n,k)$ corresponding to a particular CI signal are combined (e.g., summed). The resulting CI signal may be a CI-based coded signal, such as a CI/DS-CDMA coded signal or a CI-coded signal having a CI-based architecture. In this case, components of a $k^{th}$ CI signal correspond to a $k^{th}$ subspace. However, CI signal components may be distributed over multiple subspaces. Furthermore, CI signal components may be distributed over other diversity-parameter values, such as, but not limited to, time intervals, polarizations (linear and/or circular), and modes.

In one particular embodiment, reflected at least in part by FIGS. 18A-18C and/or 19A-19D, a receiver system may include a multiple-element receiver to generate a plurality of interfering received signals relative to at least a first set of diversity-parameter values. At least one filter band may be provided that is adapted to separate the plurality of interfering received signals into a plurality of carrier interferometry (CI) components relative to at least a second set of diversity-parameter values. A combiner adapted to combine the plurality of CI components with the at least first set of diversity-parameter values to produce a plurality of combined CI components may also be provided. The combiner may be further adapted to combine the plurality of combined CI components with the at least second set of diversity-parameter values to produce at least one estimate information signal.

Figure 20:
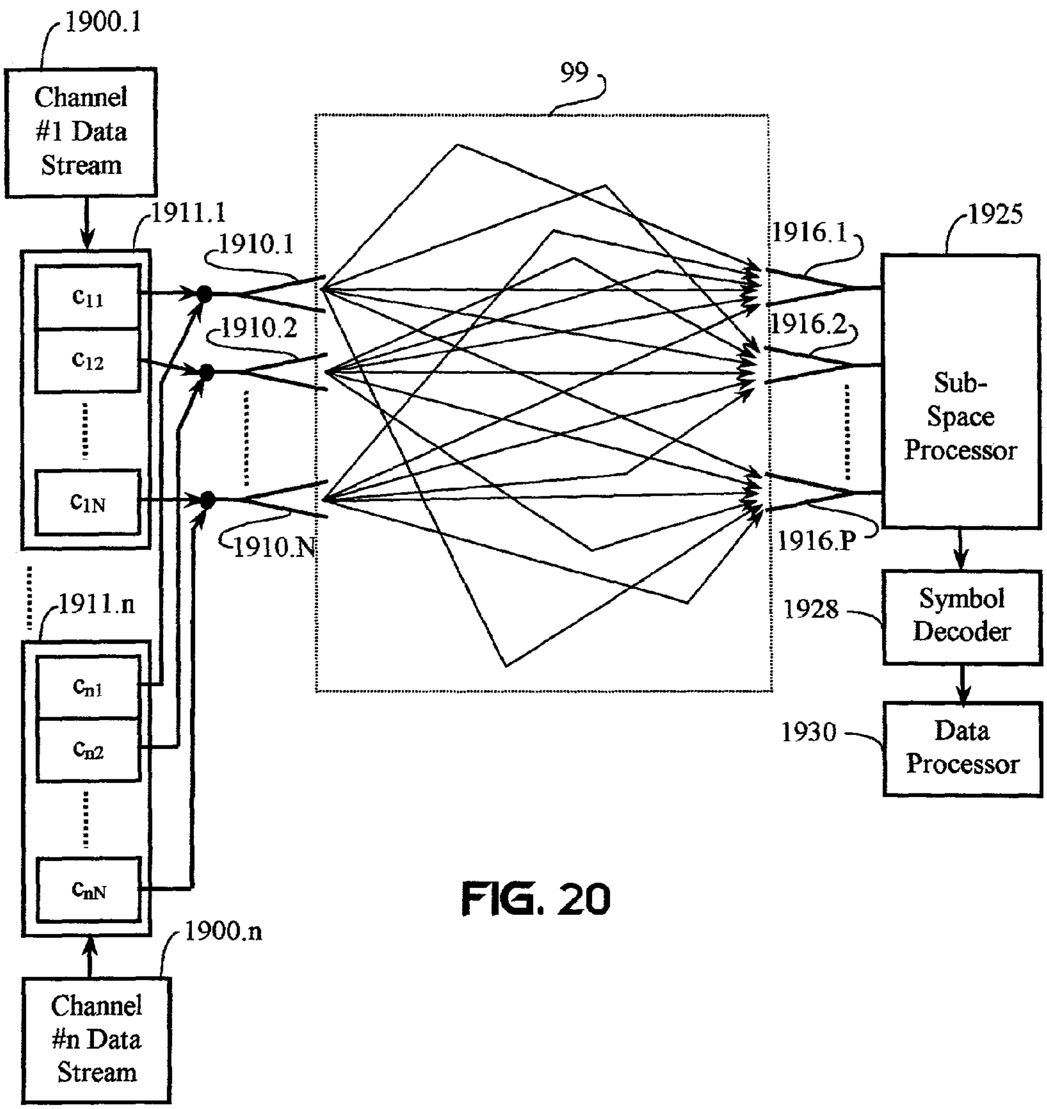
FIG. 20 illustrates a system adapted to transmit CI subspace coded data symbols into a multipath channel and a receiver adapted to process and decode the CI subspace coded data symbols.

FIG. 20 illustrates a system adapted to transmit CI subspace coded data symbols into a multipath channel 99 and a receiver adapted to process and decode the CI subspace coded data symbols. One or more data streams are coupled into the transmitter via one or more data sources 1900.1 to 1900.*n*. Each data stream is encoded with a code (e.g., a CI code or a CI/DS-CDMA code) by at least one coding system 1911.1 to 1911.*n*. Each coding system 1911.1 to 1911.*n* is coupled to a plurality N of transmitter elements 1910.1 to 1910.N that couple the coded data into the communication channel 99.

A plurality P of receiver elements 1916.1 to 1916.P are responsive to the transmitted coded data symbols to provide a plurality of received signals to a sub-space processor 1925. The sub-space processor 1925 processes the received signals into separate sub-space signals. Sub-space processing may include blind-adaptive processing and/or may use known training sequences to generate and/or optimize subspace-processing weights. Various combining techniques, such as, but not limited to, MMSE, EGC, ORC, or maximum-likelihood combining, may be used.

Each subspace value generated by the sub-space processor 1925 may include one or more coded data symbols. The sub-space values are processed in a symbol decoder 1928 that may be integrated with the sub-space processor 1925. The decoder 1928 decodes the coded data symbols. The decoder 1928 may generate a reference code for a matched filter. The decoder 1928 may adjust one or more signal parameters (e.g., phase, amplitude, etc.) of the coded data symbols with respect to a reference code. The decoder 1928 may combine the coded data symbols to separate at least one desired symbol from at least one interfering symbol. Thus, various combining techniques may be employed. The decoder 1928 may include a de-interleaver, a decision system, and/or a feedback loop to perform iterative decoding. Data-symbol estimates generated by the decoder 1928 may optionally be processed by a data processor 1930.

The transmitted signal $x_n(t)$ due to an $n^{th}$ user can be expressed by:

$$x_n(t) = \sum_{i=1}^{B} b_n(i) s_n(t - iT)$$

where $b_n(i)$ is an $i^{th}$ coded data symbol, $s_n(t)$ is a corresponding signaling waveform. The channel impulse response of the $n^{th}$ user is expressed by:

$$h_n(t) = \sum_{l=1}^{L} a_{nl} g_{nl} \delta(t - i\tau_{nl})$$

where $a_{nl}$ is the array response, $g_{nl}$ is the path gain, and $\tau_{nl}$ is the path delay.

A signal received by one of the receiver elements 1916.*p* is expressed by:

$$r_p(t) = \sum_{n'=1}^{n} x_{n'}(t)h_{n'}(t) + \sigma n(t)$$

where n(t) is a noise term. If the receive d signal $r_p(t)$ is processed by a space-time matched-filter receiver, the receiver output $y_n(i)$ is expressed by:

$$y_n(i) = \sum_{l=1}^{L} g_{nl}^* a_{nl}^H \int_{-\infty}^{\infty} r(t)s_n(t - iT - \tau_{nl})\delta t$$

Figure 21A:
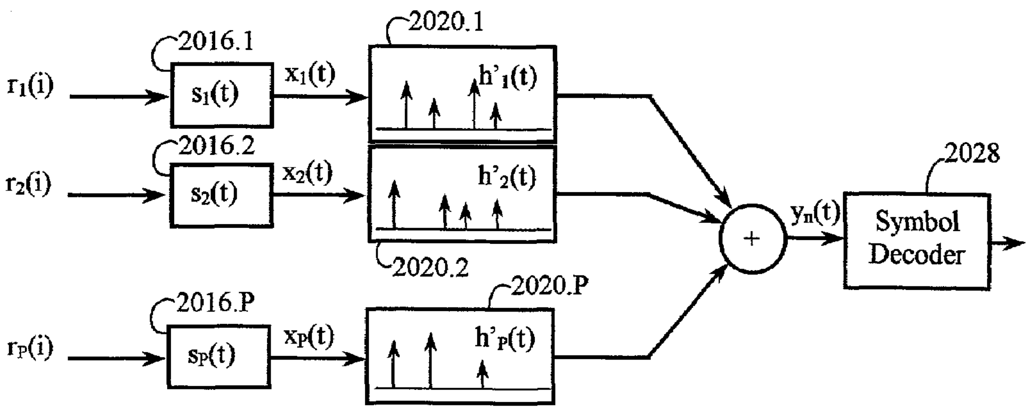
FIG. 21A illustrates an embodiment of a space-time matched-filter receiver of the present invention.

FIG. 21A illustrates an embodiment of a space-time matched-filter receiver of the present invention. A plurality P of received signals $r_1(i)$ to $r_p(i)$ are coupled to a set of demodulators 2016.1 to 2016.P that remove the signaling waveforms $s_n(t)$. A plurality P of matched filters 2020.1 to 2020.P compensate for the space-time effects of the channel 99. Signals corresponding to at least one space-time subspace are combined to generate at least one received coded data symbol $y_n(t)$. For example, the coded data symbols $y_n(t)$ may include CI-coded symbols and/or CI-based coded data symbols. A symbol decoder 2028 processes the coded data symbol $y_n(t)$ to generate at least one data-symbol estimate.

Figure 21B:
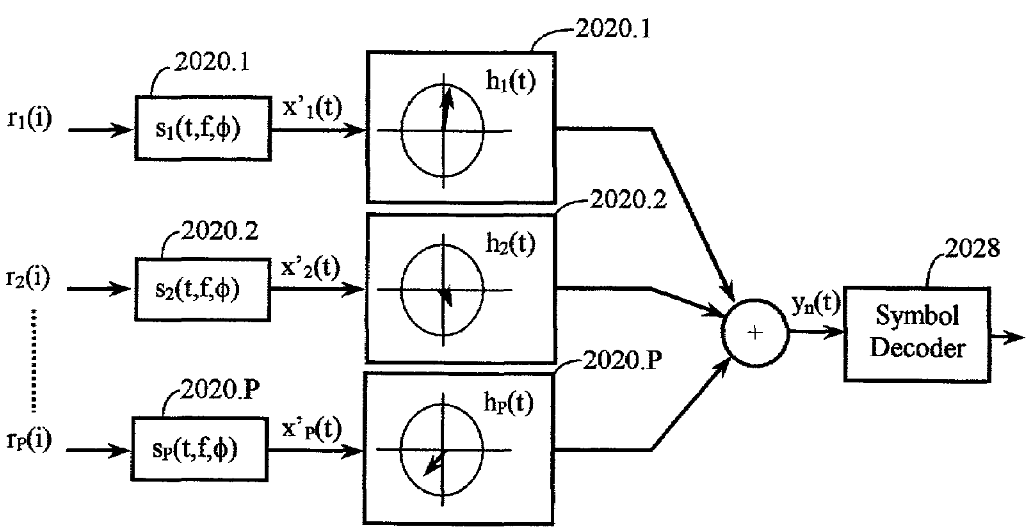
FIG. 21B illustrates an embodiment of a space-frequency matched-filter receiver of the present invention.

FIG. 21B illustrates an embodiment of a space-frequency matched-filter receiver of the present invention. A plurality P of matched filters 2020.1 to 2020.P compensate for the space-frequency effects of the channel 99. Signals corresponding to at least one space-frequency subspace are combined to generate at least one received coded data symbol $y_n(t)$.

Since CI-based signals can be processed by time-domain and frequency-domain receivers, in some cases it can be advantageous to process received signals in both the time domain and the frequency domain. Thus, received CI signals may be processed by separate time-domain and frequency-domain receivers. Alternatively, received CI signals may be processed by a combined time-domain and frequency-domain receiver.

Figure 21C:
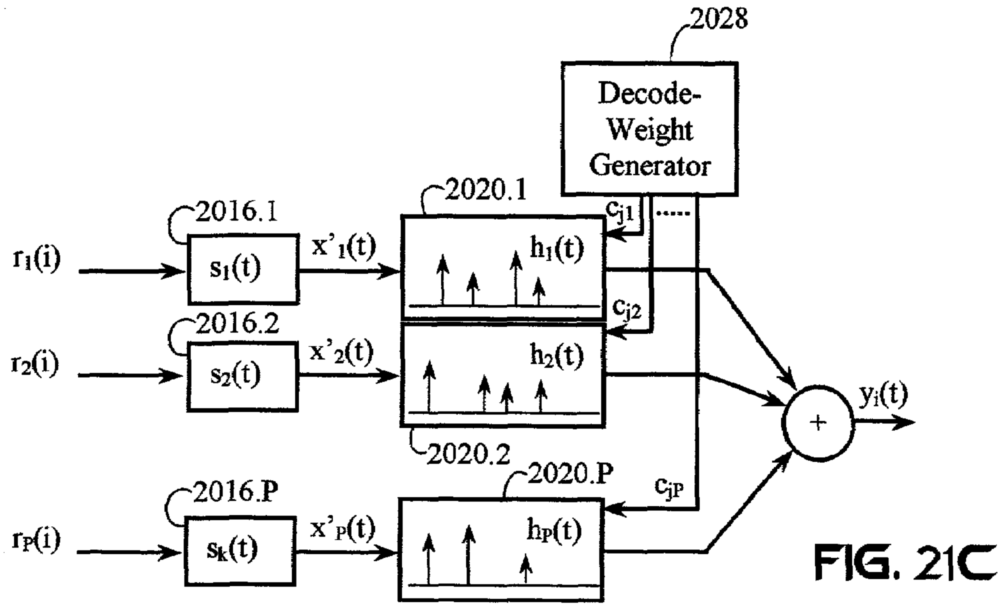
FIG. 21C illustrates a space-time receiver of the present invention.

FIG. 21C illustrates a space-time receiver of the present invention. A plurality of transmitted signals are received and processed by the receiver. The plurality of transmitted signals are coded to carry at least one data stream. Each symbol of a particular data stream is spread over the plurality of transmitted signals. For example, spreading may be performed via CI codes and/or CI/DS-CDMA codes.

The received signals $r_1(i)$ to $r_p(i)$, such as signals received from spatially separated transmitters, have different delay profiles. In a multipath environment, multiple replicas of the transmitted signals are received at different times. The received signals $r_1(i)$ to $r_p(i)$ are coupled to a set of demodulators 2016.1 to 2016.P that remove the signaling waveforms $s_n(t)$.

A reference-code generator 2028 is coupled to a plurality P of matched filters 2020.1 to 2020.P that compensate for the space-time effects of the channel 99. The combination of applying codes to the filters 2020.1 to 2020.P and combining the filtered signals decodes the coded symbols. A $j^{th}$ user's code provides an $i^{th}$ matched filter with the following filter function:

$$h_i'^{-1}(t) = c_{jp}^*(t)h_i^{-1}(t)$$

where $c_{jp}^*(t)$ represents a $p^{th}$ complex-conjugate chip of a $j^{th}$ user's code. Preferably, the filter-function term, $h'^{-1}_i(t)$, is adapted to minimize the effects of noise and/or interference. Codes and/or the filter function, $h_i^{-1}(t)$ may be adjusted to compensate for channel distortion. If the code is a CI code, the system may be designed without code-length constraints. For example, orthogonal CI code lengths may be adapted to a given number of transceiver elements or subset of transceiver elements, whereas Walsh codes are constrained to code lengths of powers of two.

Figure 21D:
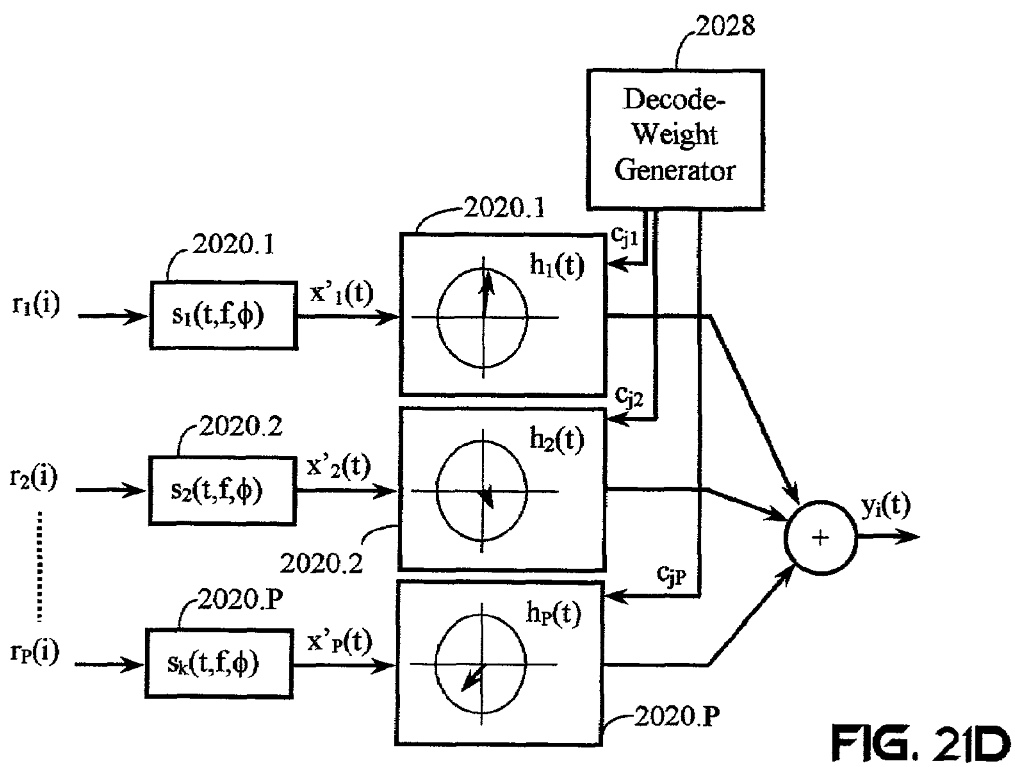
FIG. 21D illustrates a space-frequency receiver of the present invention.

FIG. 21D illustrates a space-frequency receiver of the present invention. A plurality of transmitted signals r(t) are received and processed by the receiver. The plurality of transmitted signals are coded to carry at least one data stream. In one form of space-frequency coding, each symbol of a particular data stream is spread over a plurality of same-frequency transmissions. A particular information signal may be provided with (e.g., modulated by) a code bit associated with each antenna that transmits the signal. In another form of space-frequency coding, an information signal is transmitted on multiple carrier frequencies in addition to multiple antennas. Other forms and variants of space-frequency coding may be performed. In any of these cases, it is preferred that spreading be performed via CI codes and/or CI/DS-CDMA codes.

Figure 21E:
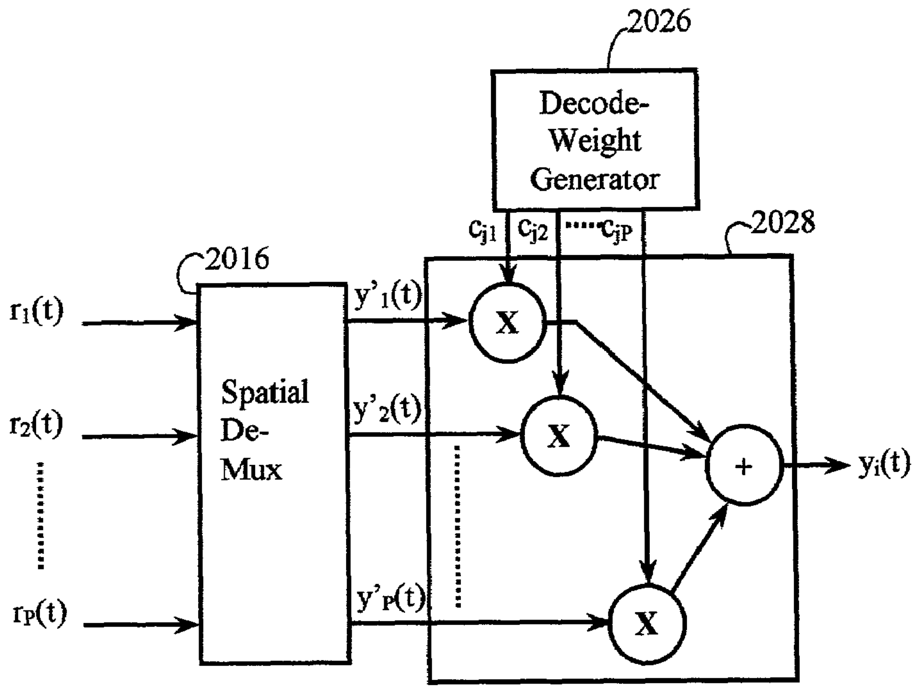
FIG. 21E shows a generalized illustration of a multi-element receiver of the present invention.

FIG. 21E shows a generalized illustration of a multi-element receiver of the present invention. A plurality of interfering transmitted signals r(t) are received and processed by a spatial demultiplexer 2016, which separates a plurality of desired signals $y'_1(t)$ to $y'_p(t)$ from one or more interfering signals. A symbol decoder 2028 processes the signals $y'_1(t)$ to $y'_p(t)$ with respect to code chips $c_{jp}$ generated by a decode-weight generator 2026. The desired signals $y'_1(t)$ to $y'_p(t)$ are weighted and combined with respect to some predetermined combining process, such as MMSE, EGC, ORC, and/or maximum-likelihood combining to generate a data-symbol stream $y_i(t)$. Channel compensation may be integrated into demultiplexing and/or decoding.

Figure 21F:
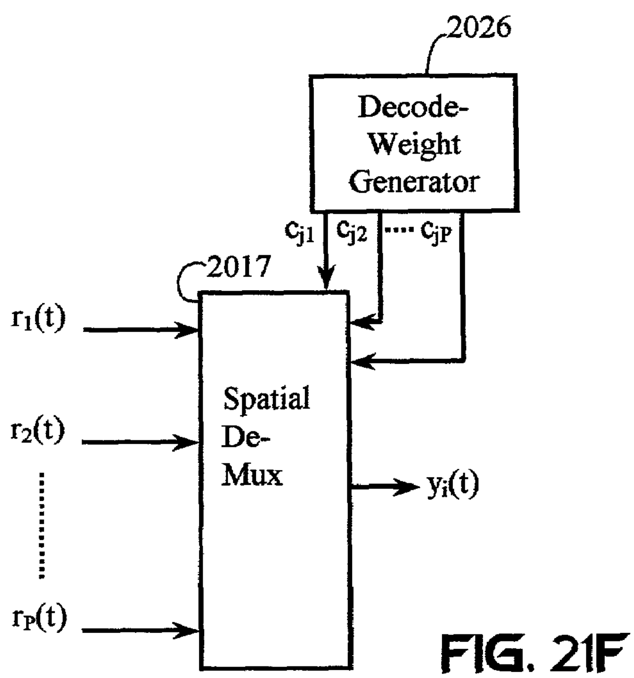
FIG. 21F shows a multi-element receiver of the present invention.

FIG. 21F shows an alternate embodiment of a multi-element receiver of the present invention. A spatial demultiplexer 2017 receives a plurality of interfering transmitted signals r(t) from a communication channel (not shown) and a plurality of code chips $C_{jp}$ generated by a decode-weight generator 2026. The received signals r(t) are weighted and combined to reduce interference from interfering spatial subchannels and/or perform decoding. It is preferable that decoding and coding operations be performed via CI codes and/or CI/DS-CDMA codes.

Figure 21G:
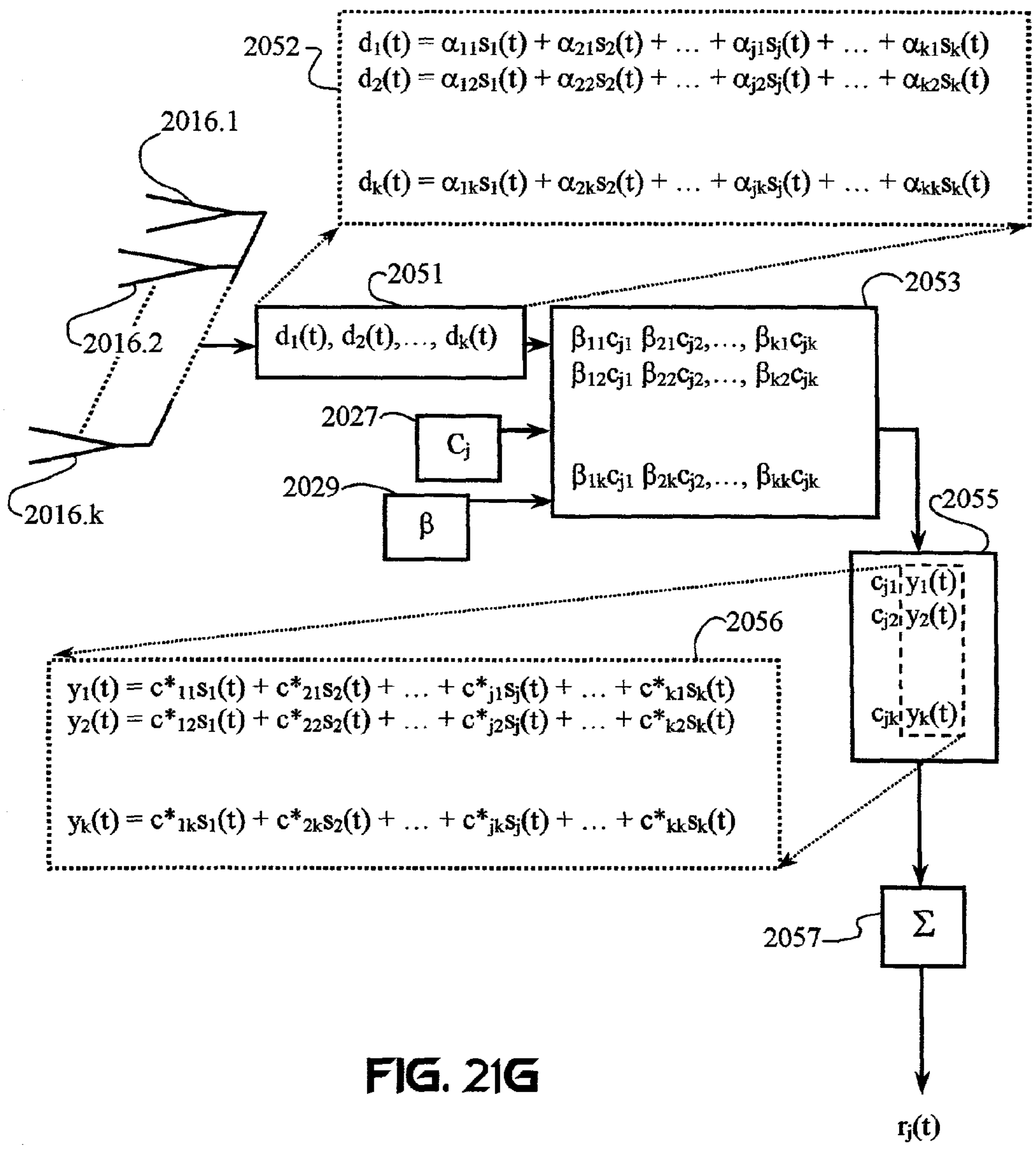
FIG. 21G is a functional illustration of a multi-element receiver of the present invention.

FIG. 21G is a functional illustration of a multi-element receiver of the present invention. Symbols and indices used in the description of this embodiment do not necessarily correspond to the same symbols used elsewhere in the specification.

A plurality k of receiver elements 2016.1 to 2016.*k* provide signals $d_1(t)$ to $d_k(t)$ (illustrated by a received signal set 2051). A breakdown 2052 of the received signals $d_1(t)$ to $d_k(t)$ illustrates a linear combination of transmitted information signals $s_j(t)$ (=1 to k) scaled by complex channel parameters $\alpha_{jk}$ indicative of channel distortion, such as multipath fading, inter-symbol interference, path loss, etc. Noise, although not shown, may be considered to be present in the breakdown 2052 of received signals. The number of transmitted signals $s_j(t)$ in each received signal $d_k(t)$ is preferably less than or equal to the number of received signals $d_k(t)$ (e.g., number of receiver elements) having algebraically unique combinations of the unknown transmitted signals $s_j(t)$.

A code generator 2027 and a subspace-weight generator 2029 provide a k'Xk matrix of weights applied to at least one set of received signals $d_1(t)$ to $d_k(t)$. The value k' represents the number of unknown transmitted signals $s_j(t)$, which may be less than or equal to the number k of received signals $d_1(t)$ to $d_k(t)$. The code generator 2027 provides at least one complex code, such as a $j^{th}$ code $\Sigma c_{jk}$. The subspace-weight generator 2029 provides sub-space weights β that are used to reduce interference between received samples of the transmitted signals $s_j(t)$. The result of applying the sub-space weights β is that the interfering spatial channels are substantially separated. The separated spatial sub-channels are indicated by sub-channel terms $y_1(t)$ to $y_k(t)$ in a dot-product representation 2055 of the signals $d_1(t)$ to $d_k(t)$ with the k'Xk weight matrix. The terms $y_1(t)$ to $y_k(t)$ are represented by a decomposition 2056.

The decomposition 2056 illustrates that a plurality of coded data symbols are present in each subchannel. In fact, after sub-channel processing, each sub-channel term $y_k(t)$ is represented by a linear combination of transmitted signals $s_j(t)$. Thus, the multiplication of each term $y_1(t)$ to $y_k(t)$ by a $j^{th}$ code, $c_{j1}$ to $c_{jk}$, and a subsequent summation process 2057 provides an estimate $r_j(t)$ of the $j^{th}$ transmitted signal $s_j(t)$. Various optimization techniques, including iterative soft-decision techniques, may be employed to reduce the effects of noise and/or interference.

Figure 22:
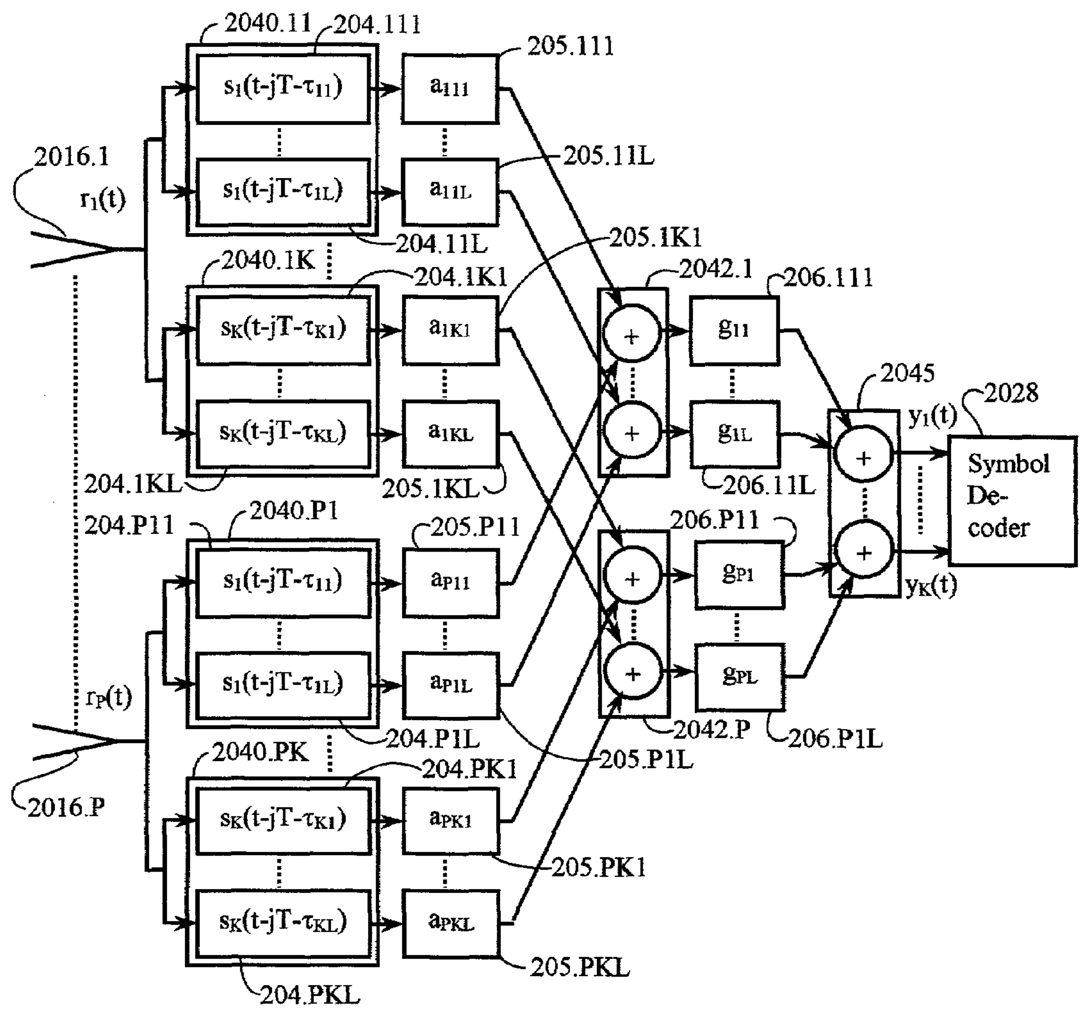
FIG. 22 illustrates an array-processor receiver of the invention that combines space-time processing with space coding.

FIG. 22 illustrates a receiver array processor that provides an additional dimension to coding. A plurality P of receiver elements 2016.1 to 2016.P receive coded transmissions to generate received signals $r_1(t)$ to $r_p(t)$. The received signals $r_1(t)$ to $r_p(t)$ are processed in a plurality of filter banks 2040.11 to 2040.PK. The filter banks 2040.11 to 2040.PK and/or the receiver elements 2016.1 to 2016.P may provide conversion to baseband and/or intermediate frequencies. For example, received signal $r_1(t)$ is processed by K sets of filters 2040.11 to 2040.1K, where K is the number of data channels to be separated. Each filter (such as filter 2040.11) may be a time domain matched filter expressed by a plurality L of delay taps. Digital filters, such as polyphase filters, adapted to perform down sampling may be adapted to perform up sampling.

Filtered signals from different receiver elements 2016.1 to 2016.P for each of the K data symbols are optionally weighted with complex weights 205.111 to 205.PKL. Applied weight values $a_{pkl}$ correspond to at least one of receiver element p, data symbol k, and path l. The weighted signals are combined with summing circuits 2042.1 to 2042.K. The combined signals may optionally be weighted 206.111 to 206.P1L and combined 2045 to produce a vector estimate $y_1(t)$ to $y_K(t)$ of the transmitted data vector. Coding may be integrated into weights $g_{11}$ to $g_{PL}$ and/or weights $a_{111}$ to $a_{PKL}$.

The vector estimate $y_1(t)$ to $y_K(t)$ is optionally processed by a decoder 2028. The decoder 2028 may decode data symbols that are encoded via one or more codes, such as, but not limited to, multiple-access, channel, spreading, encryption, and error-correction codes. Preferably, the codes are CI and/or CI-based codes. Either or both code chips and weights may be adjusted with respect to channel estimation. Code and/or weight adjustments may be made with respect to some optimization process. For example, codes and/or weights may be adjusted to optimize some measurement, such as signal power, SNR, SNIR, etc.

Figure 23A:
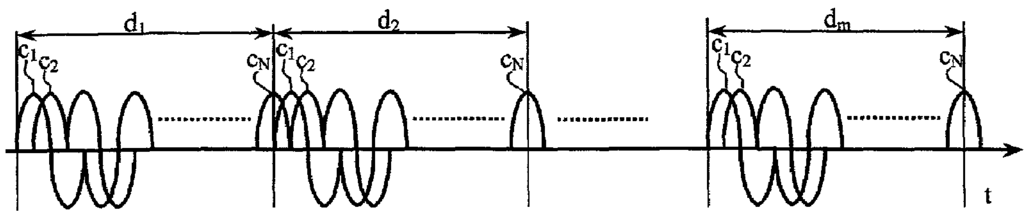
FIG. 23A illustrates one of many possible CI/DS-CDMA signal structures corresponding to a set of apparatus and method embodiments of the invention.

FIG. 23A illustrates one of many possible CI/DS-CDMA signal structures. A repetitive CI pulse structure (such as a CI pulse structure characterized by uniformly spaced carriers) is provided with coding that generates a direct-sequence-like time-domain structure. Polyphase codes may be applied to individual carriers to produce a direct-sequence structure. Alternatively, direct-sequence codes may be applied to the time-domain pulses to produce a direct-sequence structure.

A repetitive direct-sequence code $C_1=\{c_1, c_2, \ldots, c_N\}$ is provided with data symbols $d_1, d_2, \ldots, d_m$. In this case, overlapping pseudo-orthogonal pulses are provided with DS-CDMA codes. The number of carriers is N/2 and the repetition rate is related to the inverse of the carrier spacing $f_s$. The pulses, as well as the direct-sequence periods may overlap.

One or more transmitter elements may transmit the signal illustrated by FIG. 23A. Each of a plurality of transmitter elements may transmit a separate signal component, such as a pulse or a carrier frequency. Phase sweeping may be applied to one or more transmitter elements to achieve spatial-diversity benefits in addition to directionality.

Figure 23B:
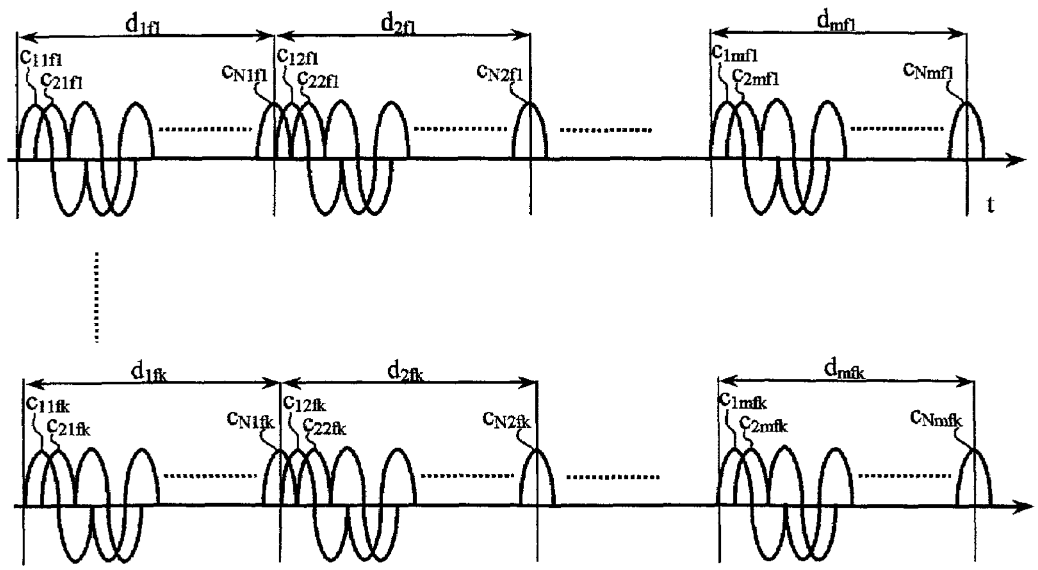
FIG. 23B illustrates signal structures of one set of embodiments of a multi-dimensional CI/DS-CDMA method and apparatus of the invention.

FIG. 23B illustrates signal structures of one set of embodiments of a multi-dimensional CI/DS-CDMA method and apparatus of the invention. A plurality k of coded data streams are used to convey one or more streams of data symbols $d_{mjk}$. For example, an $m^{th}$ data bit $d_{mfl}$ of a first (k=1) coded data stream is provided with an $m^{th}$ N-chip code $C_{mjl}=\{C_{1mfl}, c_{2mfl}, \ldots, c_{N\,mfl}\}$, where f is some diversity-parameter space.

Codes $C_{mfk}$ may differ for different values of m, f and/or k. Similar codes may be used for different data symbols $d_{mfk}$ if it is possible to differentiate between codes due to one or more diversity-parameter values. Multiple diversity-parameter values may be impressed with one or more coded data streams. Multiple diversity-parameter values may be modulated with multiple coded data streams. The interfering data symbols may be separated via any combination of sub-space processing and decoding.

Figure 24:
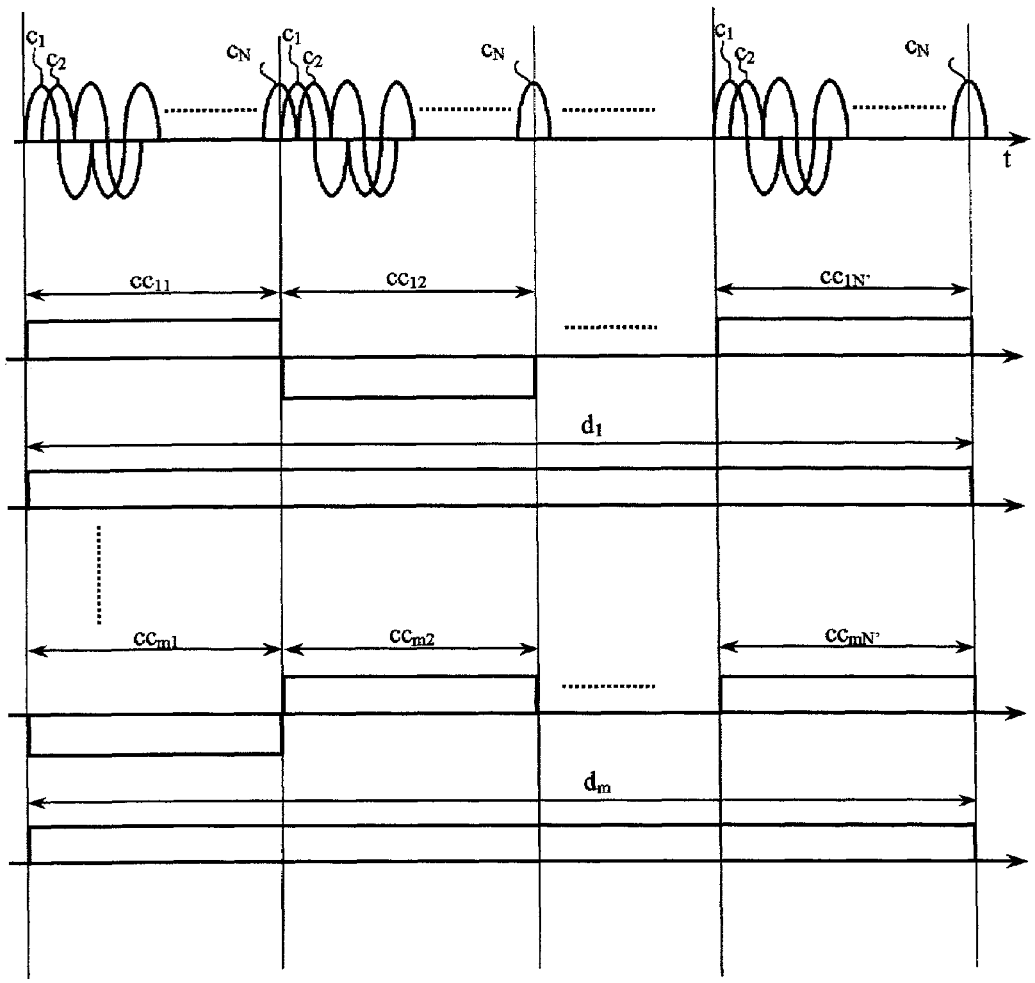
FIG. 24 illustrates a signal structure derived from an alternate set of apparatus and method embodiments of the invention.

FIG. 24 illustrates a signal structure derived from an alternate set of apparatus and method embodiments of the invention. A first-layer direct-sequence code $C_1=\{c_1, c_2, \ldots, c_N\}$ (which may be a CI/DS-CDMA and/or CI code) is provided as a carrier for coded data sequences. For example, an $m^{th}$ data bit $d_m$ is impressed onto a second-layer code $CC_1=\{cc_1, cc_2, \ldots, cc_{N'}\}$ having a duration of a plurality of first-layer code $C_1$ periods. In this case, each code bit $cc_{mN'}$ spans one period of the first-layer direct-sequence code $C_1$. Data symbols and data streams can be separated via differences in either the first-layer-layer code $C_1$ or the second-layer code $CC_1$.

Although transceiver arrays are typically regarded as spatially diverse antenna arrays, any diversity parameter may be used to characterize a transceiver array. The importance of transceiver arrays with respect to many aspects of this invention is particularly directed to the sub-space processing. CI signals may include any sub-space bases as carriers. CI signals may be encoded via sub-space processing and/or spread across multiple sub-space bases.

Sub-space bases, as used herein, refers to any overlapping set of diversity parameters that are processed, such as via interferometry, to produce independent, substantially orthogonal sub-channels are generated. Some sub-space bases include spatial sub-spaces, directional sub-spaces, polarization sub-spaces, temporal sub-spaces, phase sub-spaces, quasi-orthogonal code sub-spaces, quasi-orthogonal wavelet sub-spaces, frequency-band subspaces, CI phase-space subspaces, and any combination of the above-mentioned subspaces.

In-phase and quadrature-phase subspaces may be established, such as via a pair of orthogonal diversity parameters (e.g., perpendicular polarizations, a phase offset of 90 degrees between two signals, orthogonal frequencies, orthogonal codes, orthogonal time intervals, etc.). In-phase and quadrature-phase subspaces may be designated as a pair of orthogonal subspaces. One subspace is used to convey a signal magnitude related to magnitude of an in-phase component and a second subspace is used to convey a signal magnitude representing a quadrature-phase signal magnitude.

Figure 25A:
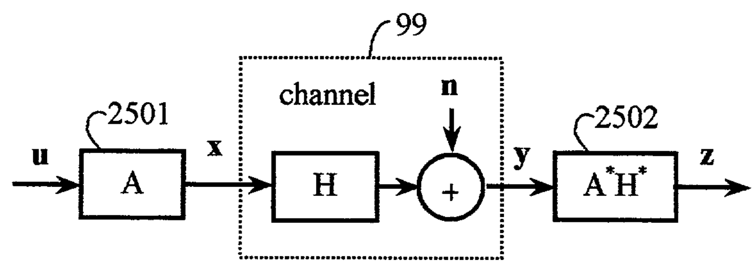
FIG. 25A illustrates a subspace processing method of the present invention.

FIG. 25A illustrates a basic subspace processing method of the present invention. A data-sequence vector u having length N is provided to a transmit filter 2501 before being coupled into a communication channel 99. The channel acts on a transmitted data vector x via an N×N non-singular matrix H and an additive noise vector n having a variance of $N_o/2$. A signal vector y received from the channel 99 is expressed by:

$$y=Hx+n$$

The received signal vector y is processed by a matched filter 2502 to generate an output signal vector z, which is expressed by:

$$z=R_f x+n'$$

where $R_f=H^*H$ and $n'=H^*n$. An estimate of x given z is expressed by:

$$x=R_b z+e$$

where $R_b^{-1}=R_f+(N_o/2)R_{xx}^{-1}$, $R_{xx}$, is the covariance of x, and e is the MMSE error. Additional processing, such as any of various adaptive feedback techniques, may be incorporated at the receiver end.

Although sub-space processing is commonly associated with array processing, the methods of the present invention may incorporate decoding into sub-space processing techniques. In one set of embodiments, sub-space processing and CI combining methods are combined. Sub-space processing may include frequency-diversity interferometry and/or interferometry between one or more sets of diversity-parameter values including, but not limited to, polarizations, codes, modes, phases, and delays.

Figure 25B:
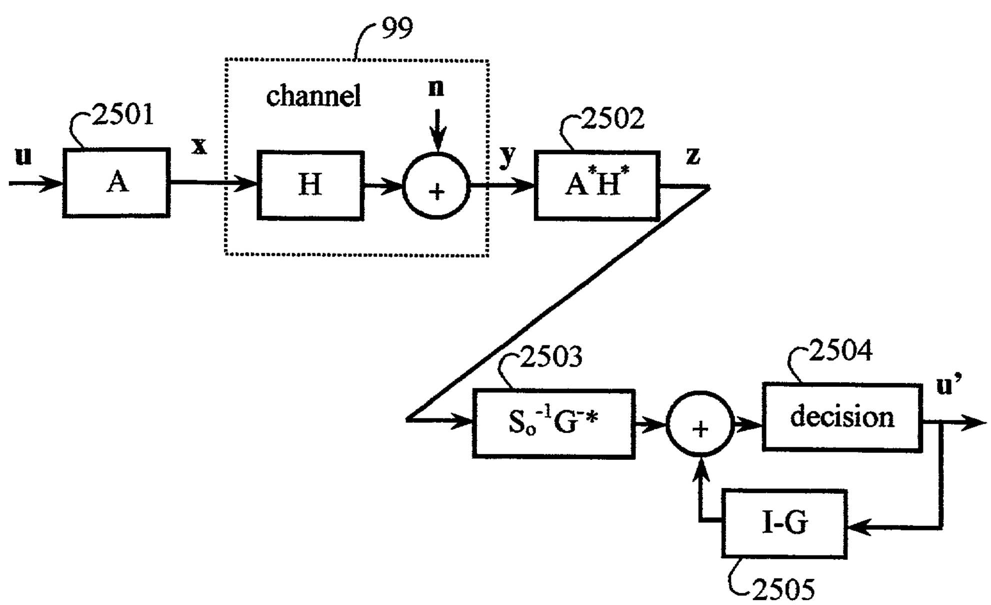
FIG. 25B illustrates an alternative subspace processing method of the present invention.

FIG. 25B illustrates a subspace processing method of the present invention that employs decision feedback. In this case, Cholesky factorization provides:

$$R_f=G^*S_oG$$

where $S_o$ is a diagonal matrix and G is a monic, upper-diagonal matrix. A decision feedback equalizer includes a feed-forward filter 2503, a decision system 2504, and a feedback filter 2505. A decision feedback equalization algorithm that may be used in conjunction with the invention is represented by:

$$\tilde{z}:=S_o^{-1}G^{-*}H^*y$$

for k=0, N−1

$$\hat{x}_{N-k} := \text{decision}\left(\tilde{z}_{N-k} - \sum_{i=1}^{k} g_{N-k,N-k+i}\hat{x}_{N-k+i}\right)$$

end where $g_{ij}$ are elements of G and $\hat{x}_i$ and $\tilde{z}_i$ are elements of $\hat{x}$ and $\tilde{z}$, respectively.

A decision feedback equalizer may reorder the received substreams by rearranging the rows and columns of H. For example, a layered processing approach may be employed. Symbols are detected sequentially and interference from previously detected symbols is subtracted. Received vector elements are weighted to null (or reduce) interference from undetected symbols.

7. CI/DS-CDMA FREQUENCY AGILITY

CI-based signals can mimic the bandwidth characteristics of conventional protocols, such as TDMA (e.g., GSM) and DS-CDMA protocols. Adjacent overlapping CI carriers appear as a continuous spectrum over the bandwidth of the conventional protocol. However, frequency-diversity benefits diminish as the coherence bandwidth of the channel increases.

Figure 26A:
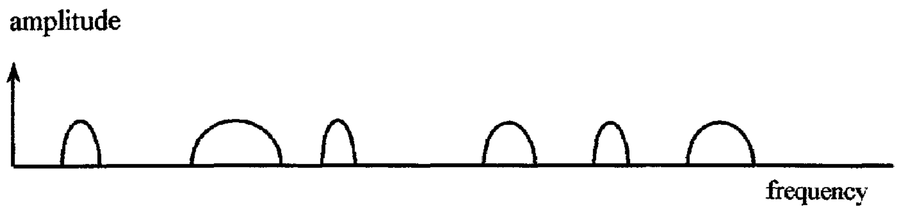
FIG. 26A shows a frequency-versus-magnitude plot of an alternative CI-based protocol.
Figure 26B:
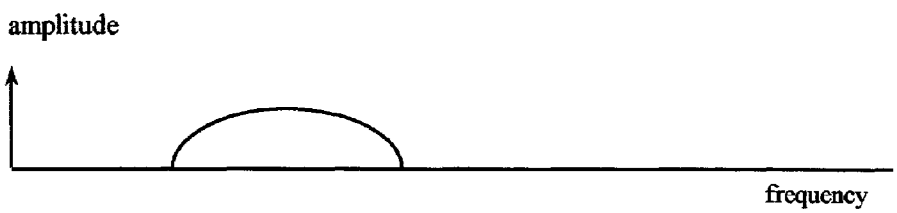
FIG. 26B shows a frequency-versus-magnitude plot of an associated conventional protocol.

FIG. 26A is a frequency-domain plot of an alternative CI-based protocol and FIG. 26B is a frequency-domain plot of an associated conventional protocol. For example, the CI-based protocol may be CI/DS-CDMA and the conventional protocol may be DS-CDMA. The CI/DS-CDMA signal has the same total bandwidth as the conventional signal. However, the CI carriers that characterize the CI-based protocol are distributed non-continuously throughout a given frequency band.

The CI carriers may be predetermined or dynamically chosen to enhance frequency-diversity benefits, compensate for channel distortions, avoid interference, ensure quality of service, adapt to different link priorities, provide for changing data rates, accommodate coding, and/or provide multiple access. The CI carriers may be grouped with respect to available, but not necessarily continuous, frequency bands. The CI carriers may be selected dynamically with respect to changing frequency allocations, different applications, changes in throughput, changing system requirements, different numbers of users, etc.

CI carriers may be selected or adjusted to affect various control procedures, such as, but not limited to, power control, carrier sense procedures, authentication, identification, validation, switching, routing, encryption key transmission, and/or conveying control signals. One or more CI carriers may be adjusted with respect to amplitude, frequency, and/or phase. Other diversity parameters, such as polarization, directionality, etc. may be adjusted.

Figure 27:
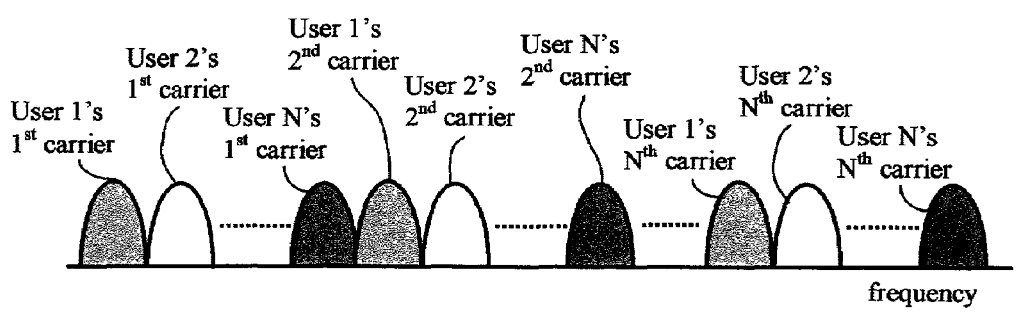
FIG. 27 is a frequency-domain illustration of carrier placements for multiple CI channels. These carrier placements allow the CI channels to benefit from frequency diversity of nearly the entire frequency band.

FIG. 27 illustrates carrier placements for multiple CI channels that simultaneously benefit from frequency diversity of nearly the entire frequency band. Frequency profiles of the CI carriers are arranged such that adjacent carriers correspond to different channels. However, frequency components associated with each channel are preferably positioned throughout a relatively wide frequency band. In one set of embodiments, the aggregate bandwidth of the CI frequency components equals the bandwidth of a corresponding conventional single-carrier signal. Although the aggregate signal bandwidth of the CI-based signal is identical to the bandwidth of the conventional signal, the CI-based signal enables wideband-like frequency diversity benefits.

Variations to carrier spacing and distributions of each user's signals may be made without departing from the scope of the present invention. For example, the carriers of one or more users may overlap. The number of users may be less than or greater than the number of carriers. The relative frequency-domain positioning of users' signals may be changed with respect to time. Carrier frequencies may be positioned uniformly or non-uniformly. Users may simultaneously share one or more carrier frequencies. Carrier frequencies may be selected and/or adjusted with respect to channel conditions, such as interference, distortion, and jamming. Predistortion may be applied to the carriers. Carriers having particular frequencies may be amplified, attenuated, and/or avoided with respect to channel conditions that affect carrier reception or that cause the carriers to impact the performance of some other system.

Figure 28A:
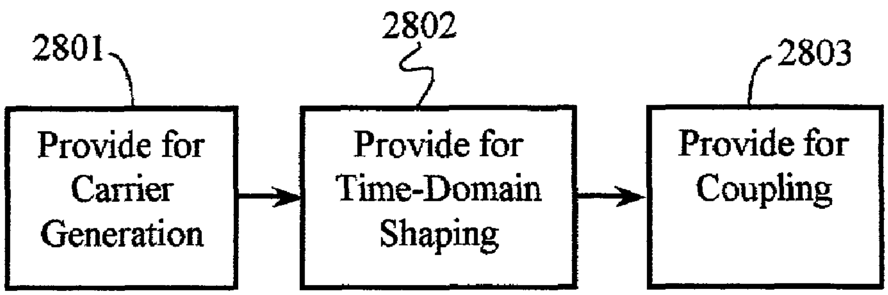
FIG. 28A illustrates a set of methods for generating CI-based signals.

FIG. 28A illustrates a set of methods for generating CI-based signals. Since CI is a multicarrier-based signal architecture, a step of providing for carrier generation 2801 may precede or follow at least one time-domain shaping step 2802. Alternatively, carrier generation 2801 and time-domain shaping 2802 may be combined. A multicarrier signal having a predetermined time-domain profile may be coupled 2803 into a communication channel.

Carrier generation 2801 may include providing for a CI-based multicarrier architecture. For example, carrier generation 2801 may include any method of transforming frequency-domain data symbols into one or more time-domain signals characterized by a multicarrier architecture. Various transformation techniques may be used, including, but not limited to Fourier transforms, wavelet transforms, and Walsh transforms. Various permutations and methods of performing these transforms may be incorporated into the carrier generation step 2801.

Carrier generation 2801 may include the generation of harmonic or non-harmonic carriers. For example, a pulse generator or some other harmonic source may be employed to generate signals having a substantially uniform frequency spacing. A plurality of local oscillators or other signal-generation systems may be coupled together to provide carrier generation. Non-linear devices may be used to generate harmonically rich signals. Various methods involving cross coupling, interferometry, feedback, and/or mode locking may be used to generate multicarrier signals. Alternatively, a wave look-up table may provide an integral part of a carrier-generation step 2801.

Time-domain shaping 2802 may include any combination of pre-processing and post-processing relative to carrier generation 2801 that helps shape the time-domain characteristics of a superposition of carriers. Shaping 2802 may be performed via selection of frequency-bin values in a Fourier transform operation. Consequently, time-domain shaping 2802 may include calculating frequency-bin values. Typically, time-domain shaping includes impressing data symbols onto the carriers. However, data modulation may be performed in the carrier-generation step 2801.

Alternatively, CI codes may be generated without physically generating carriers. Since CI codes are based on relations between carriers, the carrier-generation step 2801 may simply provide one or more basic CI codes. Carrier generation 2801 may include calculating or retrieving complex variations of simple CI codes. Time-domain shaping 2802 may provide data modulation or any other form of signal shaping prior to coupling 2803.

The coupling step 2803 may perform any necessary signal processing to facilitate conveyance by a communication channel. For example, the coupling step 2803 may include filtering, amplification, up-conversion, modulation, etc.

Figure 28B:
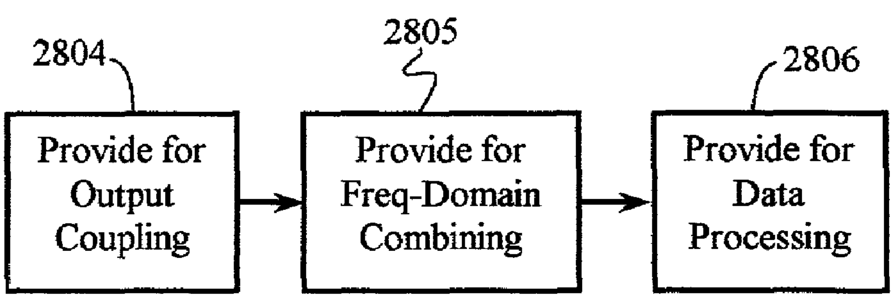
FIG. 28B illustrates a set of methods for receiving one or more CI-based signals.

FIG. 28B illustrates a set of methods for receiving one or more CI-based signals. CI signals are coupled 2804 out of a communication channel and processed in a frequency-domain combining step 2805. Signals produced by frequency combining are optionally passed to a data-processing step 2806.

The coupling step 2804 may include any of various signal-processing steps (not shown) required to convey a received signal into at least one intermediate-frequency or baseband signal. The combining step 2805 may separate received signals into carrier-signal components and provide complex weights to the signal components prior to combining. Various combining techniques may be used, including, but not limited to MMSE, maximum likelihood combining, EGC, zero forcing, etc. The combining step 2805 may employ iterative feedback techniques and/or equalization techniques.

Data processing 2806 may be performed on signals output from the combining step 2805. Various data processing techniques that may be employed include, but are not limited to, demodulation, decoding, symbol estimation, correlation, etc.

Alternatively, the combining step 2804, when performed on a CI-coded signal, may include decoding. For example, combining 2804 may include matched filtering, coherence multiplexing, and/or some complementary signal processing (e.g., phase shifting) provided to the received signal relative to some received or locally generated reference signal.

8. PERFORMANCE OVERVIEW OF CI-BASED PROTOCOLS

CI provides substantial improvements in throughput, power efficiency, and signal quality while maintaining the time-domain characteristics of various multiple-access protocols. Published performance improvements of CI with various conventional multiple-access protocols are summarized as follows:

- In MC-CDMA, CI coding enables a seamless transition between orthogonal and quasi-orthogonal coding. CI codes are capable of supporting twice as many users, doubling network capacity without performance degradation.
- In TDMA, CI coding provides over 10 dB performance gain at probability of errors of $10^{-3}$ CI-TDMA with 2N symbols per burst still outperforms tradition TDMA (with the usual N symbols per burst and using a DFE equalizer) by up to 7 dB at a probability of error of $10^{-3}$.
- In DS-CDMA, CI provides a 14 dB performance improvement at probability of errors of $10^{-2}$. Furthermore, CI applied to DS-CDMA can double the capacity of DS-CDMA while maintaining performance improvements.
- CI-OFDM provides a 10 dB performance benefit over OFDM at a probability of error of $10^{-3}$. CI-OFDM can trade off some of its performance benefit for significant gains in the throughput of OFDM systems. Coded CI-OFDM offers the same throughput as ideal OFDM with the performance of conventional coded OFDM. Furthermore, CI-OFDM eliminates problems of high PAPR.

9. CI CODES

9.1 Basic CI Codes

CI codes, as used herein, may include basic CI codes or advanced CI codes. CI codes are based on mathematical relationships between CI carriers and phase spaces. CI codes can be used as direct-sequence codes, multicarrier codes (e.g., MC-CDMA), etc. Applications of CI codes can be extended to any application of conventional binary direct sequences, including but not limited to, spread spectrum, multiple access, channel coding, encryption, anti jamming, etc. CI codes may be applied across any set of orthogonal or quasi-orthogonal diversity-parameter values or subspaces. Although CI codes can be represented with respect to phase relationships generated by vector precession in the complex plane, the implementation of CI coding can be extended to circular, elliptical, and linear polarizations.

In one set of embodiments of the invention, basic CI polarization codes may be based on vector precession in a two- or three-dimensional polarization plane. Advanced CI codes may be based on basic CI polarization codes. Similarly, vector rotation in a plane or higher-dimension field of other orthogonal bases may be used to generate basic and/or advanced CI codes. The basic family of CI codes (also referred to as basic CI codes) can be generated from an M×M matrix of elements having phases $\phi_{mn}$ described by:

$$\phi_{mn}=2\pi mn/M+2\pi f_o m/f_s M,$$

where m and n are row and column indices, respectively. M may have any positive integer value. The second term in $\phi_{mn}$ is an optional phase shift applied to all terms in a row. The phase-shift value corresponds to a carrier frequency offset $f_o$ and a sub-carrier separation $f_s$. A basic CI code $c_m$ can be a row or column vector consisting of terms:

$$c_m = e^{im\phi'} \sum_{n=0}^{N-1} e^{imn\phi} \hat{n}$$

where $\phi=2\pi/M$ and $\phi'=2\pi f_o/f_s M$.

Some of the CI codes are complex-conjugate pairs. For example, correlations between CI codes are expressed by the following relationship:

$$\text{corr}_{m,m'} = \left(\frac{1}{M}\right) e^{i(m+m')\phi'} \sum_{n=o}^{M-1} e^{in(m+m')\phi}$$

The correlations are non-zero for (m+m')=M.

CI codes may have polyphase and/or multi-magnitude values. A CI code set may include one or more binary code vectors corresponding to at least one conventional binary-phase code. In the case where CI codes include complex-valued chips, the real and imaginary values may be impressed upon different orthogonal parameters. For example, a magnitude corresponding to a real value may be modulated onto an in-phase carrier component whereas a corresponding imaginary value may be modulated onto a quadrature-phase carrier component. Orthogonal components may include, but are not limited to, perpendicular linear polarizations, left-hand and right-hand circular or elliptical polarizations, orthogonal polarization spins, subspaces (e.g., spatial, directional, temporal, phase, polarization, etc.), orthogonal frequencies, orthogonal time intervals, direct-sequence codes, etc. Modulation may include one or more of any modulation type, such as phase modulation, amplitude modulation, frequency modulation, polarization modulation, etc.

Phase shifts corresponding to CI code chips may be impressed upon a single carrier or onto multiple carriers. In one embodiment, phase shifts are impressed relative to a transmitted or locally generated reference phase. In another embodiment, differential phase modulation (DPM) is employed. In one embodiment, DPM may be employed on a single carrier. In another embodiment, DPM is applied to a multicarrier transmission protocol. In one embodiment, each phase shift is conveyed as a phase differential between at least two carriers.

CI codes may be applied to ordinary direct-sequence (e.g., DSSS or DS-CDMA), MC-CDMA, OFDM, coded OFDM, Discreet Multitone, Wavelength Division Multiplexing (WDM), ultra-dense WDM, Multi-tone CDMA, Discreet Wavelet Multitone, Multi-code spread spectrum (such as described in U.S. Pat. No. 6,192,068), or any of the Carrier Interferometry protocols (such as described in Applicant's papers, patents, and patent applications that are incorporated by reference). In the case where CI codes are utilized in a multicarrier transmission protocol, phase-shift coding may be accomplished in any of several ways. Each carrier may be phase shifted with respect to each chip of a CI code chip sequence. Each carrier may be modulated with respect to any single-carrier modulation scheme. Each carrier may be modulated with one or more subcarriers that are encoded with CI code chips. Each carrier may be provided with at least two diversity parameters that are modulated to convey real and imaginary parts of the CI code chips.

Multicarrier signals may be defined by any set of substantially orthogonal diversity-parameter values. These diversity parameters may include, without limitation, frequency, phase space, polarization (including linear, circular, elliptical) in two or three dimensions, mode, code (e.g., DS and/or CI), time, any type of subspace, and any combination of diversity parameters.

The basic CI codes can be combined (with each other or with other direct-sequence codes) to form other families of polyphase and/or poly-magnitude CI codes. In any set of CI codes, the chip sequences may be truncated, appended, rearranged, concatenated, etc., to generate orthogonal or quasi-orthogonal chip sequences. Codes of similar or different lengths may be concatenated. Different chip sequences may be combined in such a way that at least one chip sequence is interleaved with chips from at least one other code.

CI code vectors may be multiplied by other code vectors, including, but not limited to, direct-sequence codes, complementary codes, and/or other CI codes. Groups of CI code chips may be modulated (scaled and/or shifted) with respect to other code chips. For example, a CI code may be overlayed with a long code, a Hadamard-Walsh code, a Barker code, a Gold code, a Kasami code, another CI code, or some other code. CI coding may include multiple levels of coding wherein at least one set of code chips modulates at least one other set of code chips.

The basic CI codes of a particular length form an orthonormal basis. New orthonormal bases can be generated by linearly combining CI codes of a particular length. More advanced permutations of CI codes may also be combined to form orthonormal bases. The orthonormal bases may be multiplied by code chips of other sequences, such as Hadamard-Walsh, Gold, CI, etc.

Data symbols may be mapped to CI codes to effect channel coding. For the purpose of mapping, a set of CI codes may be doubled by including a code set multiplied by the value −1 (e.g., bi-orthogonal codes). CI codes may be used to generate trans-orthogonal (e.g., simplex) codes. Quasi-orthogonal mapping may be performed by phase shifting or scaling the CI codes. A second set of orthogonal CI codes may be generated by rotating the phase of a first code set by $\pi/2$, thus providing in phase and quadrature phase CI codes.

CI codes may be decoded in the same manner in which conventional direct-sequence or multicarrier codes are decoded. A received signal may be correlated with a complex-conjugate code. The received signal may be processed with an FIR filter having coefficients set appropriately to decode a desired signal. The received signal may be sampled and summed. Optionally, samples of the received signal may be weighted prior to being summed to compensate for any of various factors, such as channel effects, transmitter-side encoding (e.g., to reduce PAPR), jamming, etc. Weighting may be performed with respect to one or more optimization processes in which weights are adjusted with respect to some measurement, such as SNR, BER, received signal power, etc.

The received signal may be phase shifted with respect to chip phases of a decoding signal. If a received signal includes multiple samples per chip interval, the chip samples may be time shifted with respect to the chip phases of the decoding signal. In another embodiment, the samples corresponding to each chip are cyclically shifted with respect to a decode chip sequence. Subsequent processing, such as sampling, adding, comparison, quantizing, and/or decision making (hard and/or soft) may be performed to evaluate data symbols measured after the decoding process.

9.2 Advanced CI Codes

Advanced CI codes can involve one or more types of processing applied to basic CI codes. Some examples of advanced CI codes illustrated herein include matrices resulting from processing basic CI codes with code vectors from a Hadamard-Walsh matrix, matrices resulting from vectors derived from Hadamard-Walsh/CI matrices, and expanded CI matrices based on Hadamard-Walsh matrix expansion. The term, advanced CI code, may describe many other forms, variations, and implementations of CI coding.

FIG. 29A shows a conventional 4×4 Hadamard-Walsh matrix $HW_{4\times4}$. A $n^{th}$ row of the matrix is an orthogonal Hadamard-Walsh code vector $HW_{4\times4}(n)$. Each code vector $HW_{4\times4}(n)$ has zero cross correlation with the other code vectors $HW_{4\times4}(n' \neq n)$ and a non-zero correlation with itself.

FIG. 29B shows a basic 4×4 CI matrix, $CI_{4\times4}$. An $n^{th}$ row of the CI matrix $CI_{4\times4}$ denotes a CI code vector, $CI_{4\times4}(n)$. CI matrix (row×column) sizes are not constrained to powers of two. Basic N×N CI matrices may be generated with any value of N.

FIG. 30A shows the 4×4 CI matrix $CI_{4\times4}$ multiplied by values of the first-row Hadamard-Walsh vector, $HW_{4\times4}(1)$. Each column value of vector $HW_{4\times4}(1)$ multiplies a corresponding column of the CI matrix $CI_{4\times4}$. In this case, the vector $HW_{4\times4}(1)$ consists of all ones. Thus, the CI matrix $CI_{4\times4}$ multiplied by $HW_{4\times4}(1)$ produces the original CI matrix, $CI_{4\times4}$.

FIG. 30B shows the 4×4 CI matrix $CI_{4\times4}$ multiplied by values of the second-row Hadamard-Walsh vector, $HW_{4\times4}(2)$. The row vectors in FIG. 30B are the same as the row vectors in FIG. 30A, except that their order in the matrix has been cyclically shifted by two positions.

FIG. 30C shows the 4×4 CI matrix $CI_{4\times4}$ multiplied by values of the third Hadamard-Walsh row vector, $HW_{4\times4}(3)$. The first and third rows of the matrix shown in FIG. 30C correspond to the third and fourth rows of the 4×4 Hadamard-Walsh matrix shown in FIG. 29A. The second and fourth rows of the matrix shown in FIG. 30C are quaternary-phase vectors that do not correspond to either of the two quaternary-phase vectors in the 4×4 CI matrix $CI_{4\times4}$ shown in FIG. 29B. The quaternary-phase code vectors shown in FIG. 29B and FIG. 30C form an orthogonal code set.

FIG. 30D shows the 4×4 CI matrix $CI_{4\times4}$ multiplied by values of the fourth Hadamard-Walsh row vector, $HW_{4\times4}(4)$. The row vectors in FIG. 30D are the same as the row vectors shown in FIG. 30C, except that their order in the matrix has been cyclically shifted by two positions.

FIG. 31A illustrates a selection of the quaternary-phase vectors from the matrices shown in FIG. 30A and FIG. 30C. These vectors form a 4×4 poly-phase code matrix $PC_{4\times4}$ shown in FIG. 31C. The vectors $PC_{4\times4}(n)$ shown in FIG. 31C have zero autocorrelation and zero cross-correlation for code vectors that are not complex conjugates of each other. None of the CI code vectors in $PC_{4\times4}$ include an all-ones vector.

FIG. 31B illustrates a selection of binary-phase vectors from the matrices shown in FIG. 30A and FIG. 30C. These vectors are the components of the basic Hadamard-Walsh matrix $HW_{4\times4}$ shown in FIG. 29A.

FIG. 32A shows an 8×8 Hadamard-Walsh matrix $HW_{8\times8}$ generated from the 4×4 Hadamard-Walsh matrix $HW_{4\times4}$ using the Hadamard-Walsh matrix-expansion technique. This technique uses a $2^{n-1}\times2^{n-1}$ matrix $A_{2^{n-1}\times2^{n-1}}$ to generate a $2^n\times2^n$ matrix $A_{2^n\times2^n}$:

$$A_{2^n\times2^n} = \begin{bmatrix} A_{2^{n-1}\times2^{n-1}} & A_{2^{n-1}\times2^{n-1}} \\ A_{2^{n-1}\times2^{n-1}} & -A_{2^{n-1}\times2^{n-1}} \end{bmatrix}$$

where A is a matrix typically characterized by orthogonal code vectors.

FIG. 32B shows an 8×8 CI matrix $PC4_{8\times8}$ generated from the 4×4 polyphase CI matrix shown in FIG. 31C via the Hadamard-Walsh matrix-expansion technique. Each of the 8 code vectors is a quaternary 8-chip code. The first and third vectors $PC4_{8\times8}(1)$ and $PC4_{8\times8}(3)$ are complex conjugates of each other. Other complex-conjugate pairs include vectors $PC4_{8\times8}(2)$ and $PC4_{8\times8}(4)$, $PC4_{8\times8}(5)$ and $PC4_{8\times8}(7)$, and $PC4_{8\times8}(6)$ and $PC4_{8\times8}(8)$.

FIG. 32C shows an 8×8 CI matrix $CI_{8\times8}$ generated from a 4×4 CI matrix $CI_4X_4$ via the Hadamard-Walsh matrix-expansion technique. Although the Hadamard-Walsh matrix expansion is designed to generate Hadamard-Walsh codes of length $2^n$, this matrix-expansion technique may be used to generate CI codes from any N×N CI-code matrix. The code length N is not constrained to be $2^n$.

The 8×8 CI matrix $CI_{8\times8}$ shown in FIG. 32C includes two binary-phase 8-chip codes (which correspond to the first and second rows of the 8×8 Hadamard-Walsh matrix $HW_{8\times8}$ shown in FIG. 32A), two quaternary-phase code vectors (which correspond to the first and third rows shown in FIG. 32B), and four octonary-phase code vectors including two complex-conjugate pairs $CI_{8\times8}(2)$ and $CI_{8\times8}(8)$, and $CI_{8\times8}(4)$ and $CI_{8\times8}(6)$.

FIG. 33A shows an 8×8 CI matrix $HW_{8\times8}(1)\times CI_{8\times8}$ resulting from multiplication of the 8×8 CI matrix $CI_{8\times8}$ shown in FIG. 32C by the first row vector $HW_{8\times8}(1)$ of the 8×8 Hadamard-Walsh matrix, $HW_{8\times8}$, shown in FIG. 32A. Each value of vector $HW_{8\times8}(1)$ multiplies the corresponding column of the CI matrix $CI_{8\times8}$. In this case, the vector $HW_{8\times8}(1)$ consists of all ones. Thus, the CI matrix $HW_{8\times8}(1)\times CI_{8\times8}$ is identical to the CI matrix $CI_{8\times8}$. The CI matrix $HW_{8\times8}(1)\times CI_{8\times8}$ includes two binary-phase 8-chip codes, $HW_{8\times8}(1)$ and $HW_{8\times8}(2)$, two quaternary-phase code vectors, $PC4_{8\times8}(1)$ and $PC4_{8\times8}(3)$, and two complementary octonary-phase code pairs, $CI_{8\times8}(1)$ and $CI_{8\times8}(1)^*$, and $CI_{8\times8}(2)$ and $CI_{8\times8}(2)^*$.

FIG. 33B shows an 8×8 CI matrix $HW_{8\times8}(2)\times CI_{8\times8}$ resulting from a multiplication of the 8×8 CI matrix $CI_{8\times8}$ by the second row vector $HW_{8\times8}(2)$ in the 8×8 Hadamard-Walsh matrix, $HW_{8\times8}$. The code vectors in matrix $HW_{8\times8}(2)\times CI_{8\times8}$ are identical to the code vectors in matrix $HW_{8\times8}(1)\times CI_{8\times8}$, except the order of the vectors is shifted by four chip positions.

FIG. 33C shows an 8×8 CI matrix $HW_{8\times8}(3)\times CI_{8\times8}$ resulting from a multiplication of the 8×8 CI matrix $CI_{8\times8}$ by the third row $HW_{8\times8}(3)$ of the 8×8 Hadamard-Walsh matrix, $HW_{8\times8}$. The CI matrix $HW_{8\times8}(3)\times CI_{8\times8}$ includes two binary-phase 8-chip codes, $HW_{8\times8}(3)$ and $HW_{8\times8}(4)$, two quaternary-phase code vectors, $PC4_{8\times8}(2)$ and $PC4_{8\times8}(4)$, and two complementary octonary-phase code pairs, $CI_{8\times8}(5)$ and $CI_{8\times8}(5)^*$, and $CI_{8\times8}(6)$ and $CI_{8\times8}(6)^*$.

FIG. 33D shows an 8×8 CI matrix $HW_{8\times8}(4)\times CI_{8\times8}$ resulting from a multiplication of the 8×8 CI matrix $CI_{8\times8}$ by the fourth row $HW_{8\times8}(4)$ of the 8×8 Hadamard-Walsh matrix, $HW_{8\times8}$. The code vectors in matrix $HW_{8\times8}(4)\times CI_{8\times8}$ are identical to the code vectors in matrix $HW_{8\times8}(3)\times CI_{8\times8}$, except the order of the vectors is shifted by four chip positions.

FIG. 33E shows an 8×8 CI matrix $HW_{8\times8}(5)\times CI_{8\times8}$ resulting from a multiplication of the 8×8 CI matrix $CI_{8\times8}$ by the fifth row vector $HW_{8\times8}(5)$ of the 8×8 Hadamard-Walsh matrix, $HW_{8\times8}$. The CI matrix $HW_{8\times8}(5)\times CI_{8\times8}$ includes two binary-phase 8-chip codes, $HW_{8\times8}(5)$ and $HW_{8\times8}(6)$, two quaternary-phase code vectors, $PC4_{8\times8}(5)$ and $PC4_{8\times8}(7)$, and two complementary octonary-phase code pairs, $CI_{8\times8}(3)$ and $CI_{8\times8}(3)^*$, and $CI_{18\times8}(4)$ and $CI_{8\times8}(4)^*$.

FIG. 33F shows an 8×8 CI matrix $HW_{8\times8}(6)\times CI_{8\times8}$ resulting from a multiplication of the 8×8 CI matrix $CI_{8\times8}$ by the sixth row $HW_{8\times8}(6)$ in the 8×8 Hadamard-Walsh matrix, $HW_{8\times8}$. The code vectors in matrix $HW_{8\times8}(6)\times CI_{8\times8}$ are identical to the code vectors in matrix $HW_{8\times8}(5)\times CI_{8\times8}$ except for a cyclic shift of four chip positions.

FIG. 33G shows an 8×8 CI matrix $HW_{8\times8}(7)\times CI_{8\times8}$ resulting from a multiplication of the 8×8 CI matrix $CI_{8\times8}$ by the seventh row vector $HW_{8\times8}(7)$ of the 8×8 Hadamard-Walsh matrix, $HW_{8\times8}$. The CI matrix $HW_{8\times8}(7)\times CI_{8\times8}$ includes two binary-phase 8-chip codes, $HW_{8\times8}(7)$ and $HW_{8\times8}(8)$, two quaternary-phase code vectors, $PC4_{8\times8}(6)$ and $PC4_{8\times8}(8)$, and two complementary octonary-phase code pairs, $CI_{8\times8}(7)$ and $CI_{8\times8}(7)^*$, and $CI_{8\times8}(8)$ and $CI_{8\times8}(8)^*$.

FIG. 33H shows an 8×8 CI matrix $HW_{8\times8}(8)\times CI_{8\times8}$ resulting from a multiplication of the 8×8 CI matrix $CI_{8\times8}$ by the eighth row $HW_{8\times8}(8)$ in the 8×8 Hadamard-Walsh matrix, $HW_{8\times8}$. The code vectors in matrix $HW_{8\times8}(8)\times CI_{8\times8}$ are identical to the code vectors in matrix $HW_{8\times8}(7)\times CI_{8\times8}$, except for a cyclic shift of four chip positions.

FIG. 34A shows a set 16 octonary codes C(n) that result from the multiplication of the 8×8 CI matrix $CI_{8\times8}$ by the rows $HW_{8\times8}(n)$ of the 8×8 Hadamard-Walsh matrix $HW_{8\times8}$. The codes C(n) include at least some of the same code vectors $CI_{8\times8}(n)$ shown in FIG. 33A through FIG. 33H.

FIG. 34B shows auto correlations and cross correlations of the 16 octonary codes C(n) shown in FIG. 34A. The correlation relationships are preferably used to choose orthogonal or quasi-orthogonal code sets from the codes C(n). For example, the codes C(1), C(1)*, C(2), C(2)*, C(4), C(4)*, C(7), and C(7)* form an orthogonal eight-code set. Note that the code pair [C(1), C(1)*] has zero cross correlation with C(2), C(2)*, C(4), C(4)*, C(7), and C(7)* and thus, can be used with these codes to provide orthogonal code sets. Note that code C(1) has a non-zero cross correlation with codes C(1)*, C(5), and C(6)*. Thus, an orthogonal set may include codes C(1) and C(5), for example, and exclude codes C(1)* and C(6)*.

The codes C(3), C(3)*, C(5), C(5)*, C(6), C(6)*, C(7), and C(7)* form another orthogonal eight-code set. Codes C(7), C(3), C(8), C(4), C(1), C(5), C(2), and C(6) form yet another orthogonal eight-code set. Many other code sets are possible.

Figure 35:
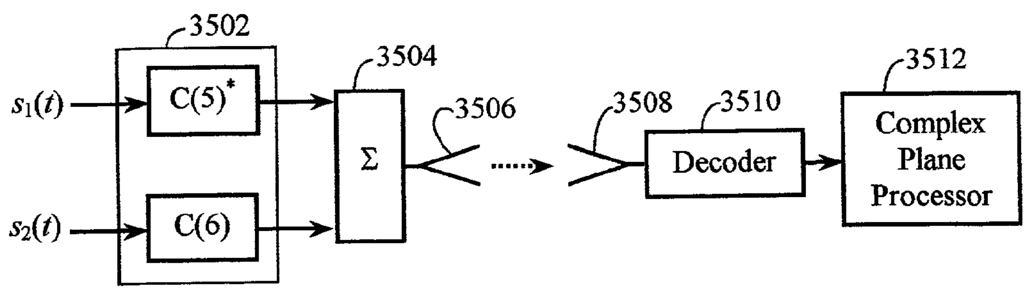
FIG. 35 illustrates a decoding method of the invention in which data transmitted on two codes may be processed with a single despreading code.

FIG. 35 illustrates generalized method and apparatus embodiments of the invention in which data transmitted on two codes, such as codes C(5)* and C(6), is processed with a single despreading code, such as code C(1)*. The cross correlations C(5)*C(1)* and C(6)C(1)* are orthogonal to each other in the complex plane. Thus, throughput of a channel may be increased by increasing the number of codes on the transmit side without having to increase the number of reference codes on the receive side.

A plurality of data streams $s_1(t)$ and $s_2(t)$ are processed by an encoder 3502 to provide at least two coded data streams to an apparatus 3504 that combines (e.g., sums) the coded data streams and conveys the resulting signal to a transmitter 3506. The transmitter 3506 may perform signal processing to facilitate coupling the coded data streams into a communication channel. For example, the transmitter 3506 may perform D/A conversion, up conversion, mixing, filtering, amplification, beam forming, etc.

A receiver 3508 couples transmitted signals from the communication channel. The receiver 3508 may process received signals prior to coupling the signals to a decoder 3510. For example, the receiver 3508 may perform down conversion, mixing, filtering, amplification, A/D conversion, beam forming, multi-user detection, sub-space processing, etc. The decoder 3510 is adapted to perform CI decoding. For example, at least one code (such as code C(1)) is provided to the decoder 3510. The decoder 3510 may perform correlation, shifting, or other matched-filter operations to produce a plurality of decoded signals. If the decoded data signals overlap each other in time (e.g., they exhibit orthogonality or quasi-orthogonality in the complex plane), the decoded data signals are passed to a complex-plane processor 3512 that performs an orthogonalizing process (e.g. multi-user detection) to separate the overlapping data symbols.

A quasi-orthogonal transmission mode provides for transmitting data on at least two codes. Quasi-orthogonal coding may include a plurality of codes (such as codes C(5)*, C(6), and C(1)) having non-zero cross correlations with at least one despreading code, such as code C(1)*. The cross correlation C(1)C(1)* maps into cross-correlation spaces C(5) C(1)* and C(6)C(1)*, thus providing interference. The interference can be removed using any well-known technique, including decision processing, interference cancellation, multi-user detection, optimal combining, etc.

Orthogonal and quasi-orthogonal code sets may be implemented separately or simultaneously. Code sets may include combinations of different M-ary polyphase codes. An M-ary code set may include codes with a code length (i.e., number of code chips) that is less than or greater than M. Code sets may include numbers of codes that are less than or greater than the code lengths. Code sets may include same-length and/or different-length codes.

Although basic CI codes and one family of advanced CI codes are described herein, many other implementations of coding based on CI are clearly anticipated. CI code sets may be selected or manipulated to provide cross-correlation values that are shifted by $\pi/2$. Cross-correlation values may include CI chip values that may be processed accordingly. CI codes may be used to generate bi-orthogonal and/or trans-orthogonal CI code sets. CI codes can be generated from linear combinations of other CI codes. CI code generation can include Hadamard-Walsh matrix expansion, code concatenation, code interleaving, code superposition, and/or weighted code superposition wherein weights are applied to one or more code chips.

CI codes may be generated by multiplying CI codes with other code vectors, such as Hadamard Walsh codes, long codes, Golay codes, Barker codes, Gold codes, Kasami codes, CI codes, etc. A CI code may include at least one set of CI matrix elements, such as a row, a column, a diagonal, and/or matrix elements selected with respect to some predetermined pattern or algorithm.

CI code chips may be cyclically shifted, swapped, or otherwise re-ordered. CI codes may be implemented as multi-level codes with one or more codes that are not necessarily CI codes. Multiple codes including at least one CI code may be interleaved. CI codes may be interleaved with same length or different length codes.

CI codes may be implemented in block coding, convolutional coding, turbo coding, Trellis coding, any other form of channel coding, encryption, multiple-access coding, spread-spectrum coding, peak-power mitigation, etc. CI codes may be implemented with orthogonal coding, quasi-orthogonal coding, bi-orthogonal coding, trans-orthogonal coding, or any combination thereof.

CI codes may be generated by convolving at least one set of CI codes with at least one other set of codes, including one or more of the following: a CI code, a binary direct-sequence code, a channel code, a spreading code, a multiple-access code, etc. CI codes may be provided with one or more parity-check symbols formed by linear combinations of data symbols and/or code chips.

9.3 Comparison of CI to Direct Sequence Spread Spectrum

Figure 36A:
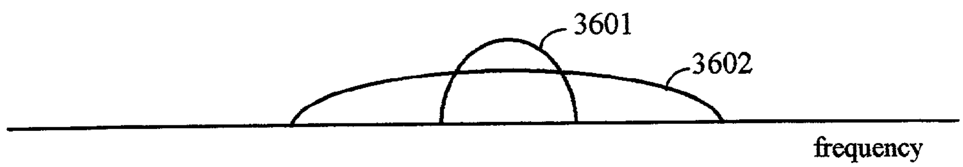
FIG. 36A shows a frequency-domain plot of a data symbol that is converted to a wideband spread-spectrum signal via direct-sequence processing.
Figure 36B:
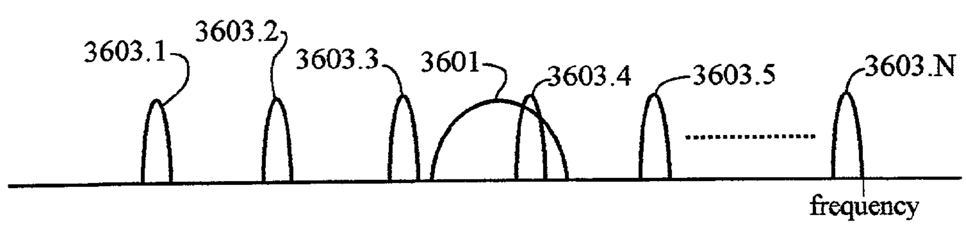
FIG. 36B shows a frequency-domain plot of the data symbol shown in FIG. 36A that is converted to a CI signal having a plurality N of narrowband components.

FIG. 36A shows a frequency-domain plot of a data symbol 3601 that is converted to a wideband spread-spectrum signal 3602 via direct-sequence processing. FIG. 36B shows a frequency-domain plot of the data symbol 3601 that is converted to a CI signal having a plurality N of narrowband components 3603.1 to 3603.N. Although the narrowband CI components are spread across a wide frequency band, the sum of the component bandwidths is approximately equal to the data-symbol 3601 bandwidth. The time-domain characteristics of a superposition of the data symbols 3603.1 to 3603.N can be made substantially identical to the time-domain characteristics of the data symbol 3601 via an appropriate selection of frequencies and complex amplitudes of the data symbols 3603.1 to 3603.N. Multiple frequency/complex-amplitude combinations may be provided that substantially reproduce the data symbol's 3601 time-domain characteristics.

Figure 37:
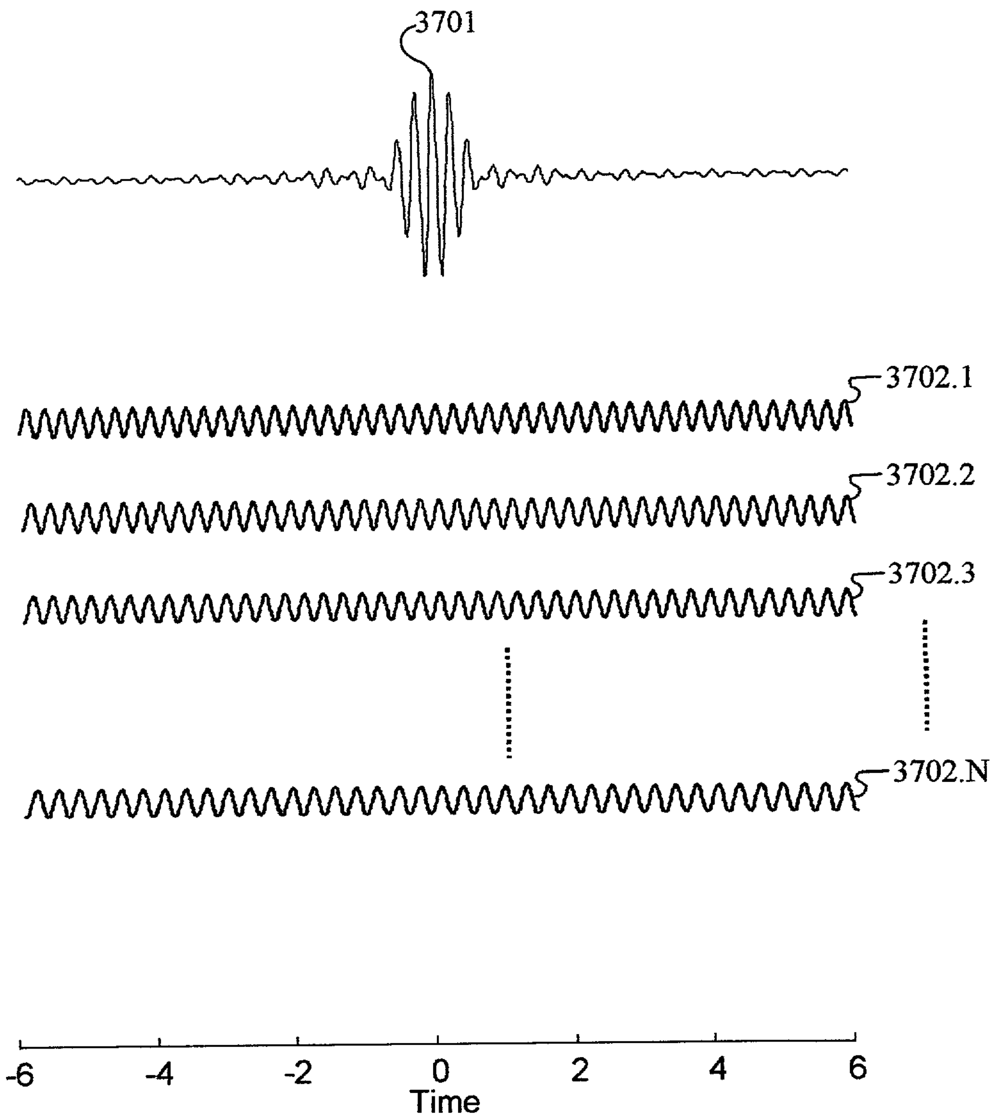
FIG. 37 shows a time-domain plot of a plurality N of narrowband CI components and a data symbol, which can be represented by a superposition of the CI components.

FIG. 37 shows a time-domain plot of a plurality N of narrowband CI components 3702.1 to 3702.N and a data symbol 3701 indicative of a superposition of the CI components 3702.1 to 3702.N. The apparent duration of the data symbol 3701 is relatively small compared to the duration of each CI component 3702.1 to 3702.N.

The definition of spread spectrum (B. Sklar, *Digital Communications, Fundamentals and Applications*, Prentice-Hall, Inc., New Jersey, 1988) includes all of the following requirements:

1. The transmitted signal bandwidth is greater than the bandwidth necessary to transmit the data.
2. Spreading is accomplished by a spreading signal.
3. A receiver uses a replica of the spreading signal to despread a received signal.

The basic implementation of CI is not classified as spread spectrum because it does not satisfy all of the requirements of the definition.

The version of CI processing illustrated by FIG. 36B increases the frequency band over which signal components are distributed, but does not increase the total bandwidth of the transmitted signal. The version of CI processing illustrated by FIGS. 36B and 37 employs more than one "spreading" signal. The data symbols 3601 and 3701 are redundantly modulated onto multiple carriers and thus, are not spread in the conventional sense. A CI receiver may process received CI signals in many different ways. One of these techniques involves correlating the received signal with a despreading signal. The despreading signal may be a complex conjugate of the spreading signal, rather than a replica. Other techniques include, but are not limited to, providing complementary phase shifts to a received CI signal, sampling the received CI signal and summing the samples, summing weighted samples of a received CI signal, and performing an orthogonal transform (such as an orthogonal-frequency Fourier transform).

In at least a few cases, CI/DS-CDMA can be regarded as spread spectrum. A time-domain analysis of a CI/DS-CDMA signal reveals a direct-sequence-like signal even though CI/DS-CDMA is a multicarrier signal. This gives the appearance of a CI signal having been spread with a direct-sequence code. In some implementations of CI/DS-CDMA, CI pulses may actually be spread with a direct-sequence code. Even though time-domain characteristics of a CI signal may be made to appear as a direct-sequence signal, many reception techniques other than generating a code replica may be used to process a received CI/DS-CDMA signal. For example, each CI carrier may be processed with a complex-conjugate code in the frequency domain.

Polyphase CI codes comply with the first two definitions of a spread-spectrum signal. However, a complex-conjugate code, rather than a code replica, is usually required to decode received signals.

Direct sequence describes a spectrum-spreading technique that modulates a data symbol with a pseudo-random noise sequence. A pseudo-random noise sequence is defined by the following attributes:

1. There is an approximate balance between the number of zeros and the number of ones.
2. Various run-length constraints need to be satisfied with respect to sequences of ones and zeros.
3. The correlation of a code with its cyclic shift has approximately the same number of agreements and disagreements.

In the case of CI signals, each data symbol is mapped into a phase space, which corresponds to a set of complex weights. In the simplest case, the complex weights are phase shifts. Basic CI signals make use of orthogonality between different phase spaces in the frequency domain rather than orthogonality between different digital sequences in the time domain. Thus, CI signals are not related to direct-sequence signals.

Figure 38:
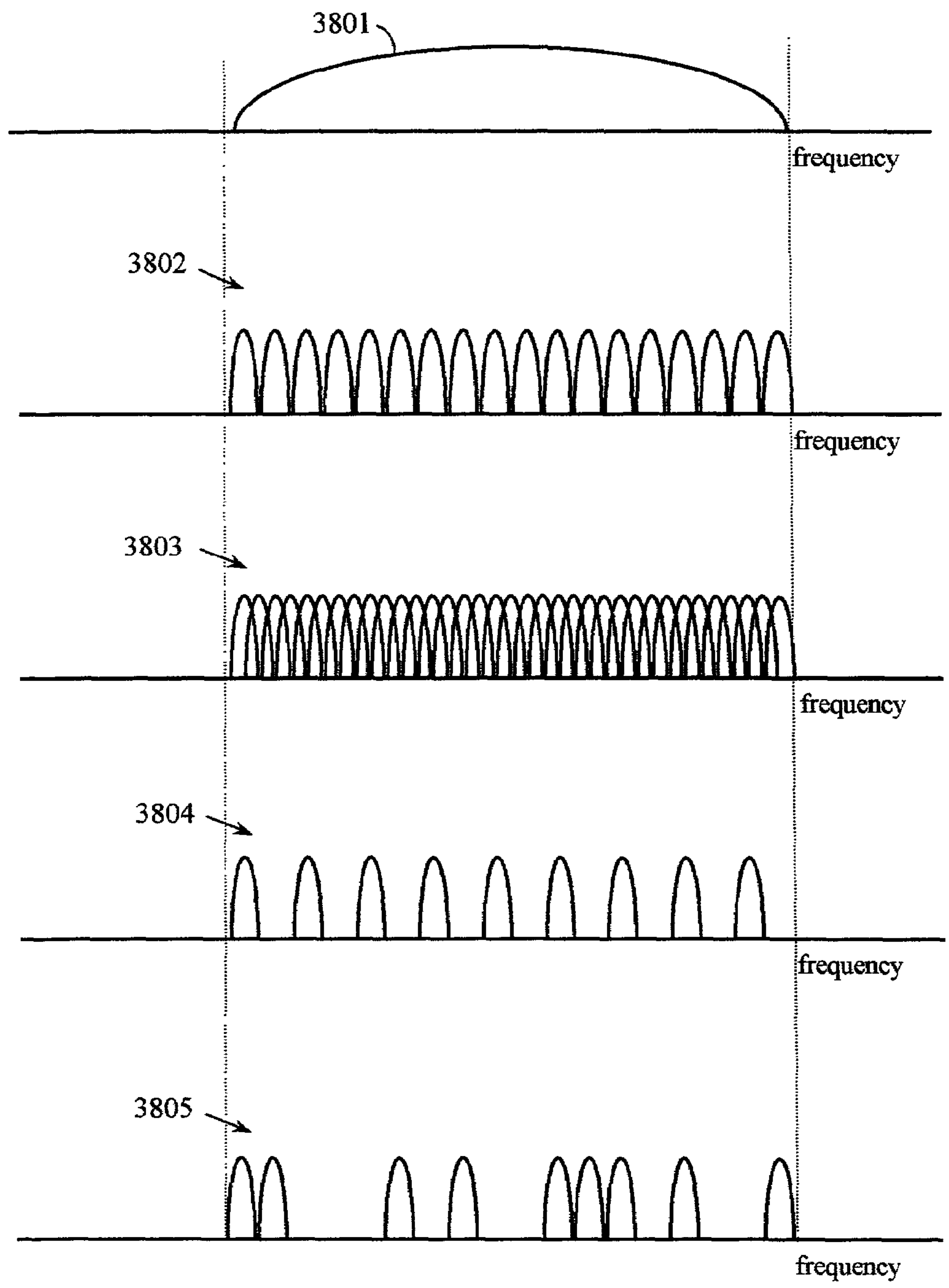
FIG. 38 illustrates frequency-domain characteristics of a typical direct-sequence signal 3801 in comparison to frequency-domain characteristics of a plurality of different CI/DS-CDMA signal types.

CI/DS-CDMA (or CI/DSSS) signals are CI signals and thus, are not direct-sequence signals. FIG. 38 illustrates frequency-domain characteristics of a typical direct-sequence signal 3801 in comparison to frequency-domain characteristics of a plurality of different CI/DS-CDMA signaling types. A CI/DS-CDMA signal may have non-overlapping spectral components 3802 or overlapping spectral components 3803. Spectral components 3804 of a CI/DS-CDMA signal may be uniformly spaced. Alternatively, CI/DS-CDMA spectral components 3805 may be non-uniformly spaced.

CI/DS-CDMA signals differ from digital sequences in that different CI/DS-CDMA signals can occupy the same set of discreet frequency components, whereas orthogonal digital sequences are characterized by occupying a common continuous frequency spectrum. Even though time-domain characteristics of a CI/DS-CDMA signal may be similar to a direct-sequence signal, the spectral characteristics of any of the CI/DS-CDMA embodiments are notably different than a direct-sequence spectrum. This frequency-domain difference indicates an important and fundamental difference between CI/DS-CDMA and DS-CDMA.

Direct-sequence signals are processed in the time domain for both transmission and reception. For example, a Rake receiver is typically used in a direct-sequence system to achieve path-diversity benefits. CI/DSSS signals are advantageously processed in the frequency domain (although they can be processed in the time domain instead of, or in addition to, the frequency domain). Preferably, CI/DSSS signals are frequency-domain processed at the receiver to achieve frequency-diversity benefits.

Polyphase CI codes can be implemented in the same way as direct-sequence codes. However, polyphase CI codes do not conform to the definition of spread spectrum. CI codes are not necessarily pseudo-random codes. Basic CI codes exhibit some randomness. For example, the phases of CI code chips tend to be uniformly distributed over $2\pi$ radians. However, polyphase CI codes typically do not follow the same balance and run-length constraints of a binary direct-sequence code. Furthermore, cyclic shifts of a CI codes can rotate the phase of the correlation between the CI code and its complex conjugate.

In addition to twice the number of orthogonal users, CI codes may be adapted to bi-orthogonal signaling. A set of CI signals may be further partitioned into in-phase and quadrature-phase signals. Various quasi-orthogonal multi-level phase-shift and/or amplitude-shift codes may be used.

9.4 Overview of CI Multiple-Access Coding

Figure 39A:
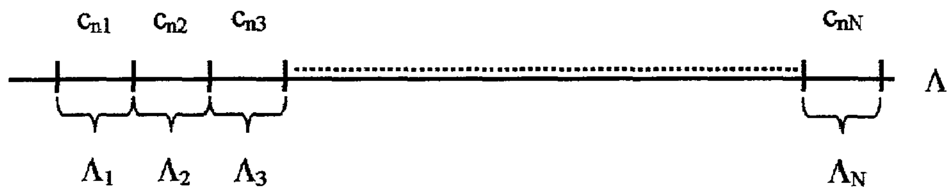
FIG. 39A illustrates a CI code mapped into a plurality of orthogonal diversity-parameter values.
Figure 39B:
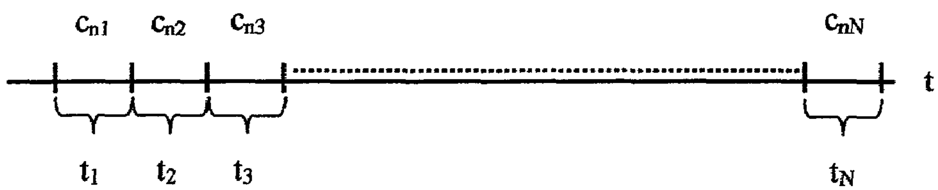
FIG. 39B illustrates a CI code mapped into a plurality of orthogonal time slots.
Figure 39C:
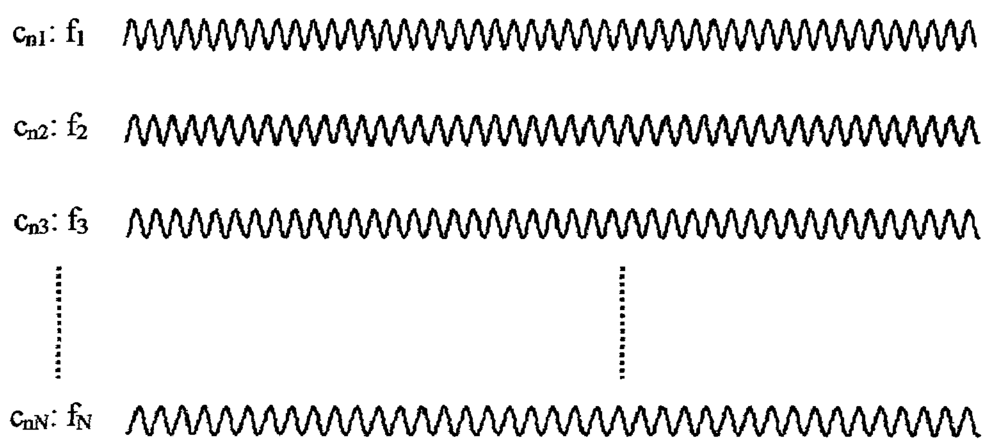
FIG. 39C illustrates a CI code mapped into a set of orthogonal frequencies.

FIG. 39A illustrates a CI code consisting of an $n^{th}$ vector of CI code chips $[c_{n1}, c_{n2}, \ldots, c_{nN}]$ wherein each code chip is mapped into an orthogonal diversity parameter value $[\Lambda_1, \Lambda_2, \ldots, \Lambda_N]$. CI codes may be used in place of direct-sequence coding when the CI code chips are mapped into the time domain, as shown in FIG. 39B. CI codes can resemble MC-CDMA codes when the code chips are mapped onto orthogonal frequencies, as shown in FIG. 39C. The order of the code chips with respect to the frequencies may be changed.

Figure 39D:
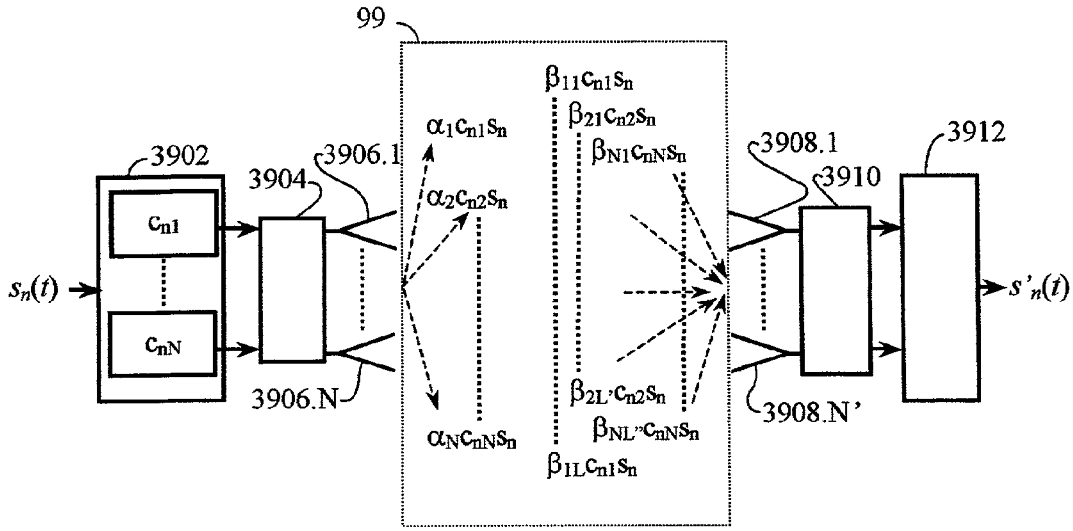
FIG. 39D illustrates a plurality of CI code chips impressed onto a plurality of spatial directions.

CI code chips may be impressed onto different transmit beam patterns or spatial directions, as shown in FIG. 39D. An $n^{th}$ data stream $s_n(t)$ is provided to at least one coder 3902 that encodes each data symbol $s_n(t)$ with respect to a plurality of code chips $c_{n1}$ to $c_{nN}$. Preferably, the code chips $c_{n1}$ to $c_{nN}$ are derived from CI or CI-based codes. The coded symbols are coupled to a beam-forming system 3904 that processes the symbols into signals that are suitable for transmission via a plurality N of transmitter elements 3906.1 to 3906.N. In this case, the transmitted symbols are associated with transmit beam patterns. Each transmitted symbol may be associated with one or more complex spatial gain distributions (indicated by complex vectors $\alpha_n$) that are transmitted into a communication channel 99.

Many different design variations may be provided to the transmission system shown in FIG. 39D. For example, more than one data stream may be coded and transmitted. A plurality of coded signals corresponding to different data symbols may be provided to the same spatial gain distribution. One or more coded data symbols may be provided redundantly to multiple beam patterns. The coder 3902 and/or the beam-forming system 3904 may interleave the coded data symbols in one or more diversity-parameter spaces. The coder 3902 may provide channel coding to the data symbols.

Although the transmit beam patterns may be orthogonal, a multipath environment typically converts each transmit direction into multiple directions of arrival at a receiver, resulting in flat fading, frequency-selective fading, or inter-symbol interference. Sub-space processing may be performed to separate the interfering terms, and thereby orthogonalize the received beam patterns. Similarly, appropriate channel compensation techniques may be performed at the transmitter to help orthogonalize transmissions received by the receiver. The quality of the sub-space channels may vary greatly. However, since coding spreads each multiple-access channel over multiple sub-space channels, sub-space diversity is achieved.

Received spatial-gain patterns are characterized by a plurality of complex vectors $\beta_{nl}$. The vectors may indicate complex amplitudes of multiple (l) paths, directional gain distributions with respect to angles of arrival, complex-values associated with signals collected at each receiver element 3908.1 to 3908.N' over some predetermined time interval, etc. Received signals are processed in a beam-forming system 3910 that may be adapted to perform sub-space processing, diversity combining, multi-user detection, etc.

The received signals may be down converted to baseband or IF prior to, during, or following beam forming. Sub-space values are provided to a decoder 3912 that may be adapted to perform decoding prior to or after optimal combining, multi-user detection, and/or spatial processing. The decoder 3912 may provide additional baseband processing, including, but not limited to, iterative feedback processing, control-signal generation, demodulation, demultiplexing, decision processing, constellation mapping, and/or generating confidence measurements.

Figure 39E:
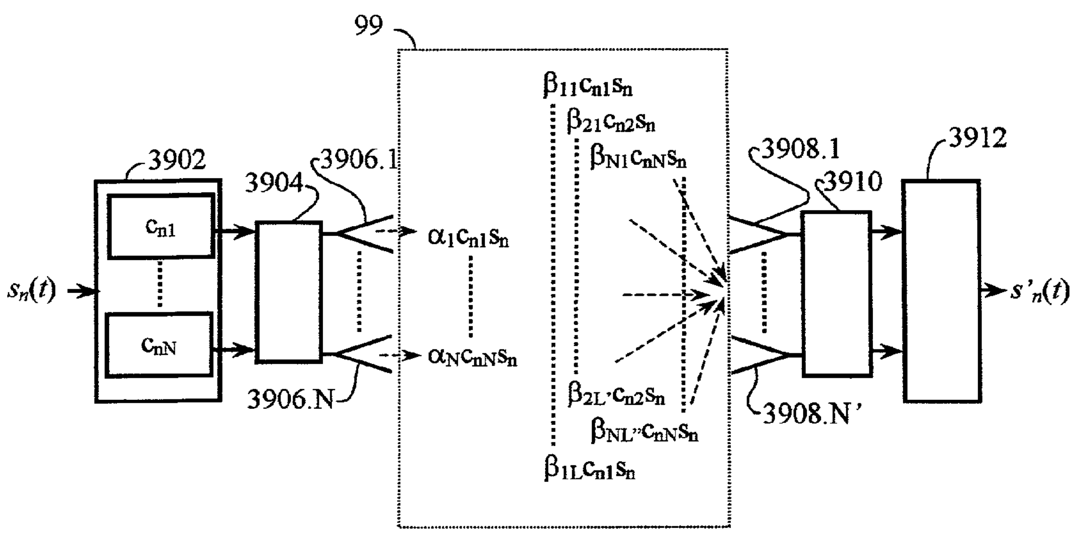
FIG. 39E illustrates CI coding used with a transmitter array such that each code chip corresponding to a multiple-access channel or channel code is applied to an individual spatially separated transmitter element.

CI coding may be provided to a transmitter array 3906.1 to 3906.N, as shown in FIG. 39E, such that each code chip $c_{n1}$ to $c_{nN}$ corresponding to at least one multiple-access channel is applied to an individual spatially separated transmitter element 3906.1 to 3906.N. Sub-space processing at a remote receiver array 3908.1 to 3908.N' separates each code chip of each coded data symbol into spatial sub-spaces. Because the channel quality can vary greatly between subspaces, multiple-access coding is used to spread each user's signal over multiple sub-space channels. Thus, impairment of a small number of sub-space channels does not substantially impair any user's link. Rather, the sub-space channel quality is averaged and provided uniformly to each multiple-access channel.

Figure 39F:
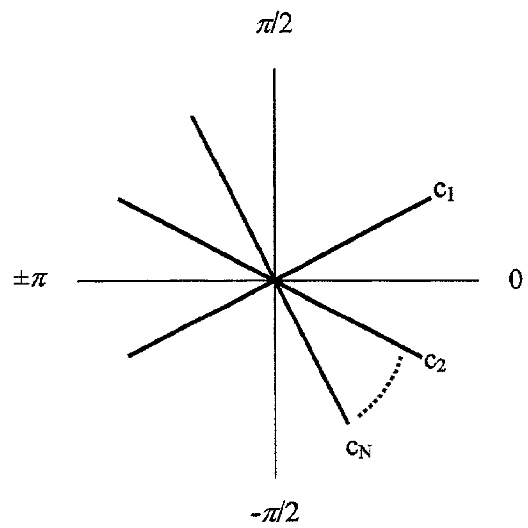
FIG. 39F illustrates CI coding applied to a plurality of linear polarized signals.

FIG. 39F illustrates how multiple-access CI coding can be applied to non-orthogonal diversity parameter values, such as linear polarizations. A receiver (not shown) may orthogonalize interfering linear polarizations to separate CI code chips impressed on each polarization. CI code chips $c_1$ to $c_N$ may be impressed upon other non-orthogonal diversity-parameter values, provided that some sort of multi-channel (e.g., multi-user) detection or subspace processing is performed at the receiver.

Figure 39G:
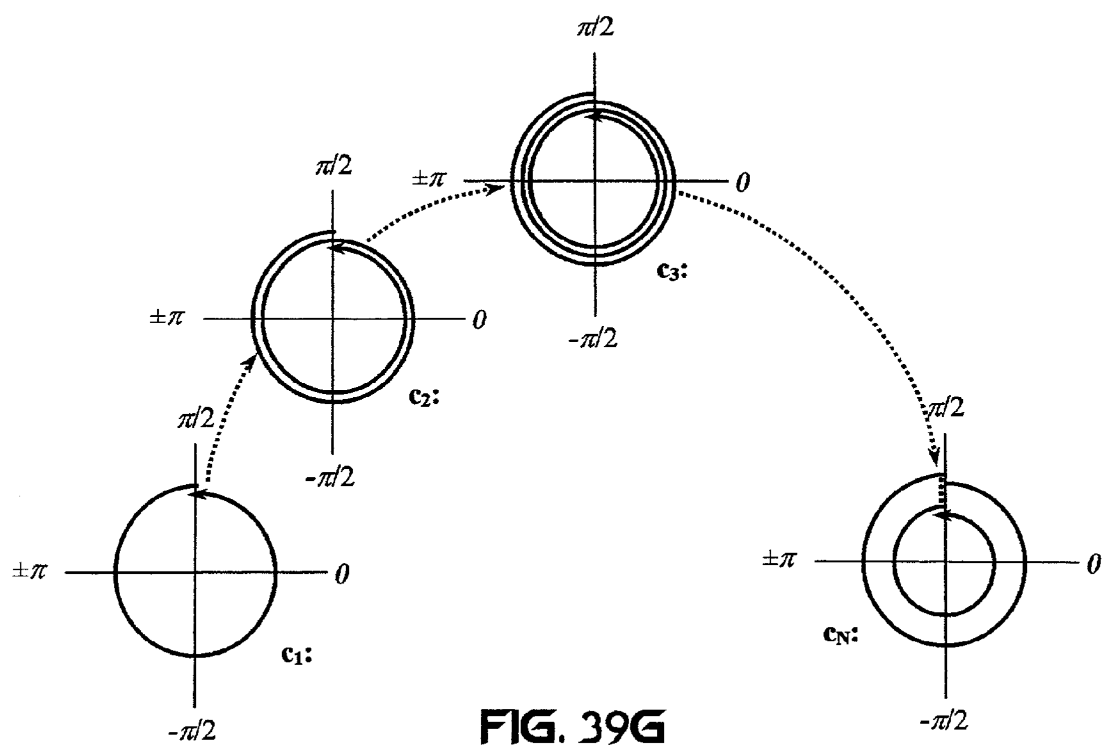
FIG. 39G illustrates CI coding applied to a plurality of circular (or elliptical) polarized signals having different precession rates.

FIG. 39G illustrates how CI code chips $c_1$ to $c_N$ can be impressed onto orthogonal circular (or elliptical) polarizations. In this case, each polarization has an integer number of rotations in a given time interval and thus, are orthogonal over that time interval. Other orthogonal polarizations may include opposite-direction rotations and/or $\pi/2$ phase offsets. Polarization rotations resemble sub-carrier processing. Consequently, circular or elliptical polarizations can be processed in the same way as CI carriers. Orthogonal polarizations may be redundantly modulated. CI phase spaces may be extended to polarization and/or other diversity parameters. Multiple data symbols may be modulated onto each polarization signal and provided with polarization and/or signal phase relationships to orthogonalize the interfering data symbols.

A two-dimensional circular-polarized signal has linear vertical and horizontal components that can be described by in-phase and quadrature-phase sinusoidal functions:

$$A_{vert}=A_o \sin(2\pi f_n t+\phi)$$

$$A_{horiz}=A_o \cos(2\pi f_n t+\phi)$$

In the case where the rotational frequencies $\omega_n=2\pi f_n$ are orthogonal, the frequencies $f_n$ can be expressed by:

$$f_n=f_o+nf_s$$

where $f_o$ is an offset frequency, n is an integer, and $f_s$ is a shift frequency. A symbol modulated onto one or more of the frequencies is provided with a symbol period $T_s$ expressed by:

$$T_s=l/f_s$$

where l is some integer.

In order to illustrate reception of orthogonal circular polarized signals, the value of l is set to one. A circular-polarized receiver provides in-phase and quadrature-phase multiplicative terms to the vertical and horizontal components of the received signal. A received symbol r(t) is evaluated by integrating or summing the receiver output over the symbol period $T_s$:

$$r(t) = \int_0^{T_s}\left(\sum_{n,n'}(A_nA'_{n'}\sin(2\pi f_nt)\sin(2\pi f_{n'}t) + A_nA'_{n'}\cos(2\pi f_nt)\cos(2\pi f_{n'}t))\right)\partial t$$

where $f_n$ is the frequency of the receiver's circular polarization and $f_{n'}$ is the circular-polarization frequency of the received signal. Amplitudes $A_n$ and $A'_{n'}$ correspond to receiver gain and received signal amplitude, respectively.

The expression for r(t) can be separated into two sets of equations corresponding to n=n' and n≠n':

$$r_{nn}(t) = A_nA'_n\int_0^{T_s}(\cos^2(2\pi f_nt) + \sin^2(2\pi f_nt))\partial t$$

$$r_{nn'}(t) = \int_0^{T_s}\left(\sum_{n\neq n'}(A_nA'_{n'}(\sin(2\pi f_nt)\sin(2\pi f_{n'}t) + \cos(2\pi f_nt)\cos(2\pi f_{n'}t)))\right)\partial t$$

The equation for $r_{nn}(t)$ simplifies to the value $A_nA_{n'}T_s$.

Phase modulation or phase misalignment can cause a phase offset $\phi_b$ between the receiver's polarization angle and the angle of the received polarized signal. Any such phase offset $\phi_b$ causes a modulation of the received symbol $r_{nn}(t)$ by a factor of $\cos(\phi_b)$.

The equation for $r_{nn}(t)$ can be simplified to the expression:

$$r_{nn'}(t) = \int_0^{T_s}\sum_{(n-n')}A_nA'_{n'}\cos(2\pi(n-n')f_st)\delta t = \frac{1}{2\pi(n-n')f_s}\left(\sum_{(n-n')}A_nA'_{n'}\sin(2\pi(n-n')f_st)\Big|_0^{T_s}\right) = 0$$

Thus, $r_{nn}(t)=0$ for all non-zero integer values of (n-n'). This illustrates how the multicarrier orthogonality condition can be applied to signals having circular polarization. Similarly, orthogonal sets of elliptically polarized signals may be developed.

9.5 CI Multiple-Access Transceiver

Figure 40A:
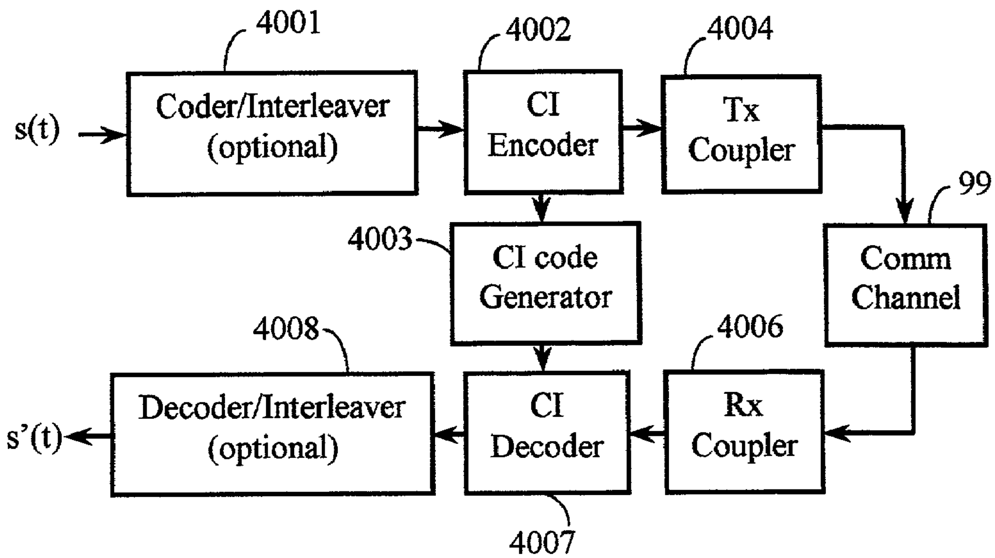
FIG. 40A illustrates basic components of a CI transceiver.

FIG. 40A illustrates a CI transceiver of the invention. An information signal, such as a stream of data bits or data symbols may be processed with an optional coder/interleaver 4001. The coder/interleaver 4001 may perform channel coding, error-correction coding, interleaving, puncturing, and/or any other type of data processing that is typically performed prior to multiple-access or spread-spectrum coding.

Data symbols are coupled to a CI encoder 4002, such as a modulator, that impresses the data symbols onto at least one CI code generated by a CI-code generator 4003. A CI-code generator, such as the CI-code generator 4003, is any algorithm, device, or system adapted to generate CI codes as described and/or defined herein. A CI encoder, such as the CI encoder 4002, includes any algorithm, device, or system adapted to combine, merge, or otherwise impress at least one data symbol onto a plurality of CI code chips. The CI encoder 4002 may impress each CI code chip onto one or more diversity-parameter values prior to or after impressing data symbols onto the CI code. A CI code may be impressed onto at least one IF carrier. The CI encoder 4002 may perform multiplexing. For example, the CI encoder 4002 may encode data streams onto different CI codes. The CI encoder 4002 may employ other diversity parameters on which to multiplex multiple data streams.

The encoded data is coupled to a transmit coupler 4004 that optionally performs carrier-frequency (e.g., RF or optical) processing on the encoded data prior to coupling the encoded data into a communication channel 99. The transmit coupler 4004 may up convert baseband or IF data symbols to RF or optical signals. The transmit coupler 4004 may modulate one or more carriers with the encoded data symbols prior to transmission. The transmit coupler 4004 may impress CI code chips onto one or more sets of diversity-parameter values. For example, the transmit coupler 4004 may include a beam former (not shown).

A receive coupler 4006 couples received signals from the communication channel 99 and converts the signals to some form (e.g., baseband) that facilitates processing by the rest of the receiver portion of the transceiver. The receive coupler 4006 typically performs carrier-frequency processing on the received signals. The receive coupler 4006 may down-convert the received signals to baseband or IF signals. The receive coupler 4006 may perform diversity combining, multi-user detection, sub-carrier processing, interference cancellation, sub-space processing, beam forming, channel characterization, channel compensation, and/or various types of adaptive processing.

The receive coupler 4006 provides CI-encoded data symbols to a CI decoder 4007, such as a demodulator, that also receives an input from the CI-code generator 4003. The CI decoder 4007 extracts or estimates the data symbols encoded with at least one CI code. Received Data symbols are typically distorted by the communication channel 99. Thus, the CI decoder 4007 may include an optimal receiver, a channel estimator, and/or a channel compensator.

Decoded data symbols may be optionally processed in a decode-signal processor 4008. The decode-signal processor 4008 may be integrated with the CI decoder 4007. The decode-signal processor 4008 may include a decision processor (not shown) that generates hard and/or soft decisions. The decode-signal processor 4008 may include a feedback loop (not shown) to the CI decoder 4007 and/or the receive coupler 4006 to adjust processing with respect to one or more signal-quality measurements. The decode-signal processor 4008 may convert decoded data symbols into an information bit stream.

A CI decoder, such as the CI decoder 4007, is any algorithm, device, or system adapted to decode at least one CI-encoded signal. A CI-encoded signal typically is a CI-encoded information-bearing signal. A CI decoder may convolve and/or correlate at least one decode signal with the at least one CI-encoded signal to extract the at least one information signal or at least one estimate of the information signal. A CI decoder may perform hard and/or soft estimates of the information signal. A CI decoder may include multiple decoders and perform an iterative process of conveying soft decisions between the multiple decoders. A CI decoder may perform one or more of the following: de-interleaving, channel decoding, multiple-access decoding, demultiplexing, demodulating, decrypting, channel analysis, channel compensation, despreading, error detection, and error correction.

A CI decoder may provide corrective phase offsets to compensate for non-zero phase signals, channel distortion, phase jitter, and/or phase offsets applied to transmitted signals to achieve some predetermined objective, such as minimizing PAPR, enhancing security, etc.

A decode-signal processor, such as the decode-signal processor 4008, is any algorithm, device, or system that is adapted to process at least one decoded signal. The decode-signal processor may provide hard and/or soft decisions when evaluating the decoded signal. A decode signal processor may include one or more quantizers, comparators, iterative decoders, feedback loops, interference cancellers, optimal detectors, and/or any other devices that contribute to a decision and/or detection process. A decode-signal processor may provide other types of decoding in addition to CI decoding. For example, a decode-signal processor may decode block-encoded signals, convolutional-encoded signals, encrypted signals, turbo-coded signals, compressed signals, etc. The decode-signal processor may perform demultiplexing and/or de-interleaving, if necessary. The decode-signal processor may perform multi-user detection, optimal combining, diversity reception, and/or any other technique designed to enhance signal quality by mitigating the effects of interference, distortion, and/or noise.

Figure 40B:
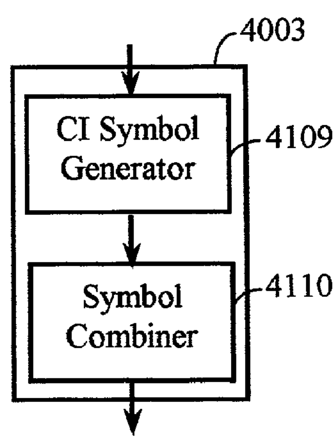
FIG. 40B illustrates basic components of a CI-code generator

FIG. 40B illustrates one embodiment of the CI-code generator 4003. A CI-symbol generator 4109 generates a plurality of CI symbols that are coupled to a symbol combiner 4110. The symbol combiner 4110 groups the CI symbols to generate one or more CI codes.

A CI-symbol generator, such as the CI-symbol generator 4109, includes any algorithm, system, or device adapted to generate a plurality of CI symbols. CI symbols include CI base symbols, which are symbols generated from any integer-number of rotations of a vector through the complex plain. CI symbols may include at least one set of polyphase symbols. CI symbols may be discreet-valued or continuous-valued numbers or functions. CI symbols may be values derived from at least one invertible transform function, such as a Fourier transform, a Laplace transform, a Walsh transform, a wavelet transform, etc. CI symbols may include linear combinations of other CI symbols, linear combinations of CI symbols with other code symbols, CI symbols modulated with code sequences from a predetermined code set including one or more of the following: spread-spectrum codes, multiple-access codes, channel codes, encryption codes, multilevel codes, compression codes, hybrid codes, and CI codes.

A symbol combiner, such as the symbol combiner 4110, includes any algorithm, system, or device adapted to group CI symbols to generate at least one CI-chip sequence. A symbol combiner may append, concatenate, interleave, shift, puncture, or re-order one or more CI symbols sets. A symbol combiner may combine CI symbols with other types of symbols. A symbol combiner may provide a CI chips sequence with at least one parity-check symbol.

Figure 41A:
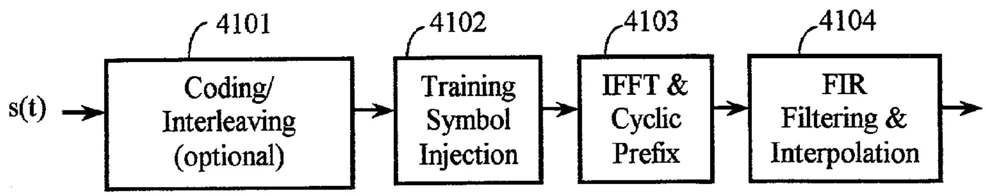
FIG. 41A illustrates general steps of a transmitting method of the present invention.

FIG. 41A illustrates general steps of a transmitting method of the present invention. An information signal s(t) is optionally encoded and/or interleaved 4101. Encoding may include code puncturing. Preferably, coding includes CI or CI-based coding. The coding/interleaving step 4101 may include generating or otherwise acquiring symbol values to be impressed onto multiple carriers. The information signal may be provided with predetermined training symbols in a training symbol injection step 4102. Training symbols may be used for channel estimation, signal-quality estimations, synchronization, etc. An IFFT 4103 or equivalent process impresses the coded data symbols onto a plurality of carriers. Optionally, a cyclic prefix may be added to the coded data symbols. An FIR filtering and interpolation step 4104 is performed prior to preparing the resulting signal for transmission into a communication channel (not shown).

Various steps and systems adapted to perform the steps shown in FIG. 41A may be included in transmission systems and methods pertaining to other aspects and embodiments of the invention. Furthermore, various signal-processing steps that are typically performed in transmission systems may be included herein. For example, pre-equalization steps and/or systems may be included in the transmitter embodiments shown in FIG. 41A. An array processing step (not shown) may be performed, such as after FIR filtering and interpolation 4104. Alternatively, array processing may be integrated into the coding 4101, IFFT 4103, and/or FIR filtering 4104 steps.

Figure 41B:
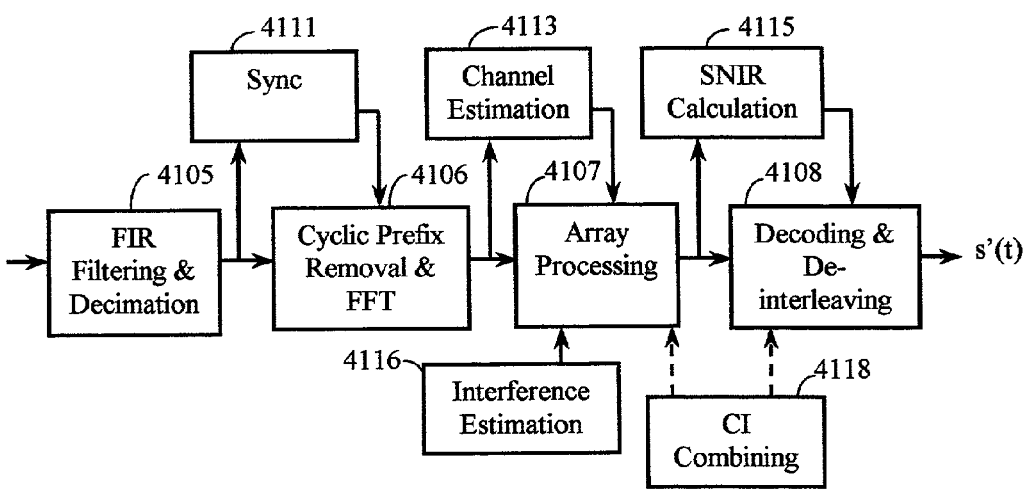
FIG. 41B illustrates general steps of a receiving method that may be performed in conjunction with the transmitting method illustrated in FIG. 41A.

FIG. 41B illustrates general steps of a reception process of the present invention. One or more transmitted signals are coupled out of a communication channel (not shown) and provided to an FIR filtering and decimation step 4105. Filtered signals may be processed in a synchronization step 4111 to control the timing of various reception processes, such as, but not limited to a cyclic prefix removal and FFT step 4106. Complex-amplitude values associated with individual carrier frequencies, such as estimates obtained via known training symbols and/or unknown data symbols, may be used in a channel-estimation step 4113. The channel estimation step 4133 can facilitate the generation of weights (e.g., array-processing and/or CI combining weights).

Array processing 4107 is performed to achieve some preferred combination of system capacity (i.e., sub-channel generation) and signal quality (i.e., diversity combining). For example, array processing may include spatial interferometry multiplexing and/or any other form of array processing. Array processing 4107 may be assisted by an interference-estimation step 4116. A CI combining step 4118 may be performed in conjunction with the array-processing step 4107 and/or a decoding and de-interleaving step 4108. Alternatively, either or both the array-processing step 4107 and the decoding and de-interleaving step 4108 may perform CI combining 4118. The decoding and de-interleaving step 4108 performs any necessary deinterleaving of data symbols received from the array-processing step 4107 prior to, or following decoding. Decoding may include channel, multiple access, spread spectrum, encryption, and/or other decoding processes.

10. CI CHANNEL CODING

Figure 42:
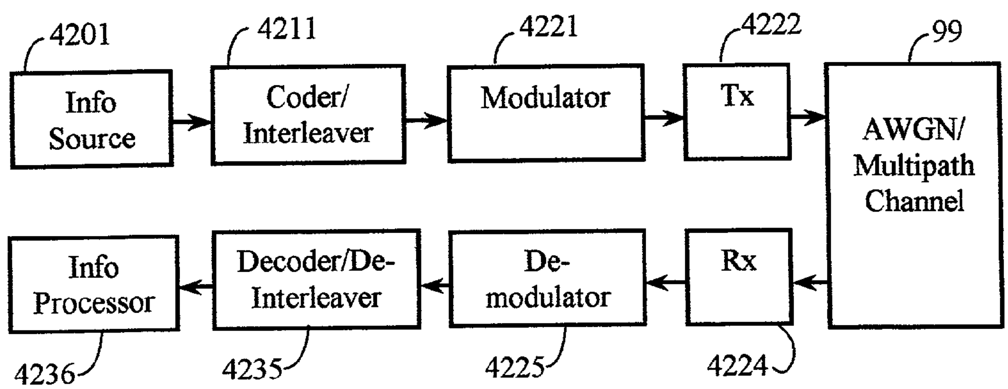
FIG. 42 shows basic components of a CI transceiver.

FIG. 42 shows a system diagram of a CI transceiver. An information source 4201 provides data symbols to a CI coder/interleaver 4211. A modulator 4221 is adapted to modulate the coded symbols onto one or more carriers that are transmitted by a transmitter 4222 into a communication channel 99. The channel 99 may be characterized by AWGN and/or multipath. Similarly, other types of channel distortion may be considered. A receiver 4224 couples the transmitted signals from the channel 99. A demodulator 4225 retrieves symbols from the received signal. A CI decoder/de-interleaver 4235 decodes (and deinterleaves, if necessary) the received symbols into information symbols that are optionally processed in an information processor or sink 4236.

Channel coding provides signal transformations that are designed to improve communication performance by enabling transmitted signals to better withstand the effects of various channel impairments (e.g., noise, fading, interference). CI channel coding may include waveform coding and/or structured sequences. CI waveform coding (such as CI, Trellis code modulation, convolutional CI coding, CI turbo coding, M-ary signaling, orthogonal coding, bi-orthogonal coding, trans-orthogonal coding, etc.) transforms waveforms to make them less subject to error. CI-structured sequences transform a data sequence into one or more sequences having structured redundancy. Redundant data symbols or bits are used for detecting and/or correcting errors.

CI coding may include replacing a data set with an orthogonal codeword set. In one embodiment, the decoder may multiplex multiple coded data symbols together by providing an orthogonal codeword set. An orthogonal CI codeword set may be selected such that each codeword vector has zero projection onto all other CI codeword vectors except for its complex conjugate. The receiver's decoder 4235 may include multiple matched filters (or equivalent systems or algorithms) that output zero unless a corresponding encoded data symbol is received.

The bandwidth requirements for bi-orthogonal CI codes are half of the requirements for comparable orthogonal codes. Bi-orthogonal codes have slightly better performance over orthogonal codes because antipodal signal vectors have better distance properties than orthogonal signals. Trans-orthogonal (e.g., simplex) codes, when compared to orthogonal and bi-orthogonal codes, require the minimum SNR for a particular symbol error rate. Channel codes may be overlaid onto multiple-access codes. Depending on the processing gain of the multiple-access codes, channel coding may not require additional bandwidth.

In one embodiment, the coder 4211 maps data symbols to CI code words using a look-up table. In another embodiment, the CI code words are generated with respect to each data symbol. Code-word generation may be performed with a CI code generation matrix G. All CI codes of a given set of CI code words can be constructed from a combination of linearly independent code vectors that form the CI code generation matrix G.

Although code generation is described with respect to basic CI codes, orthonormal basis vectors and a corresponding CI code generation matrix may be constructed for advanced CI codes. Each code in a basic CI code set can be defined by a different number of full rotations in the complex plain. For example, an orthonormal basis for a set of 64 basic CI codes can be defined by the CI code generation matrix:

$$G = \begin{bmatrix} C(\text{rotations} = 1) \\ C(\text{rotations} = 2) \\ C(\text{rotations} = 4) \\ C(\text{rotations} = 8) \\ C(\text{rotations} = 16) \\ C(\text{rotations} = 32) \end{bmatrix}$$

where C(rotations=m) is a code vector corresponding to:

$$C(m)=e^{im\Phi'}(1, e^{im\Phi}, e^{i2m\Phi}, \ldots, e^{i(N-1)m\Phi})$$

Since this basic CI code set is totally defined by G, the coder 4211 needs to store only k rows of G instead of the $2^k$ vectors of the CI code. Furthermore, since the first half of the each row vector C(m) of G is the same as the second half (except C(1)'s first and second halves differ by a factor of −1), the coder 4211 and decoder 4235 need only store one half of each row vector C(m).

A CI receiver may perform error detection using any of several techniques. Symmetry relationships between the first and second halves of a received code can be exploited to determine whether an error occurred. Other relationships between code symbols may be used to provide error detection and/or correction. For example, adjacent CI code symbols (except for the all-ones code) are typically not identical. Depending on the code, the values of adjacent code symbols change in a predetermined way. For example, adjacent code chips of the basic code C(m) differ by $e^{1m\Phi}$.

A parity-check matrix H (defined by the equation, $GH^T=0$) can be used to test whether a received vector is a member of a codeword set. The decoder 4235, upon detecting an error, may perform forward error correction and/or request a retransmission. Preferably, the decoder 4235 estimates the transmitted code vector using some sort of optimizing strategy, such as the maximum-likelihood algorithm. The receiver may erase ambiguous signals. The decoder 4235 may implement error correction that corrects erasures or corrects erasures and errors simultaneously.

It is preferable that the coder 4211 select codes that maximize the Hamming distance between codes. An advantage of using CI polyphase codes is that they provide a superior Hamming distance compared to binary codes. For example, an (n,k)=(8,3) binary code has an n-tuple space of $2^n=2^8=256$ binary words, of which $2^k=23=8$ are code words. An octonary-phase (m=8) (8,3) code has an n-tuple space of $2^{mn}=264$ octonary words. The fraction of words that are code words decreases dramatically with increasing values of m. When a small fraction of the n-tuple space is used for code words, a large Hamming distance can be created.

CI codes may be processed as cyclic codes, which are described in many prior-art references, such as B. Sklar, *Digital CommunicationS, Fundamentals and Applications*, Prentice-Hall, Inc., New Jersey, 1988. For example, components of a CI code vector $C=(C_0, C_1, \ldots, C_{N-1})$ can be treated as coefficients of a polynomial U(X), as follows:

$$U(X)=u_o+u_1X+U_2X^2+\ldots+u_{N-1}X^{N-1}$$

where $X=e^{i2\pi nk/N}$, and where k is the order of the code: k=0, 1, . . . , N−1. Well-known cyclic code processing may then be performed.

Figure 43A:
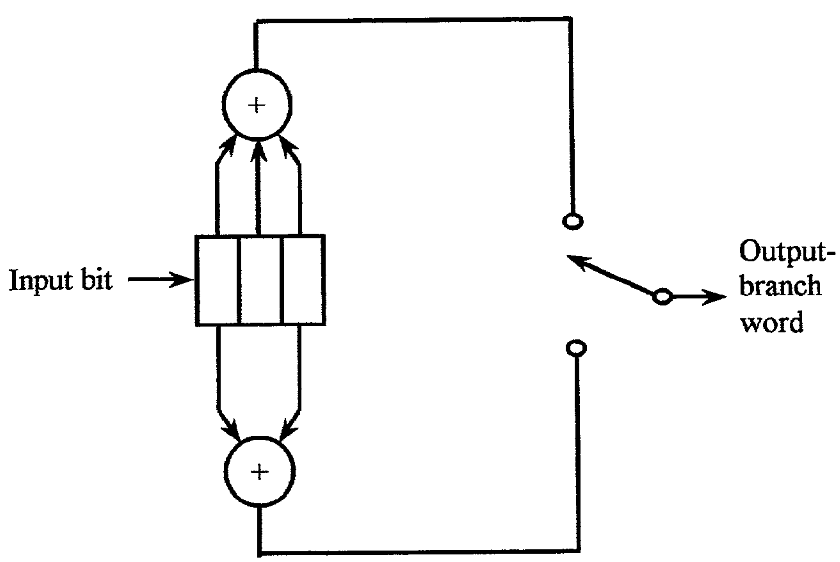
FIG. 43A shows a (2,1) polyphase (M-ary) convolutional encoder with constraint length K=3.

FIG. 43A shows a (2,1) polyphase (M-ary) convolutional coder with constraint length K=3. There are n=2 modulo-M adders. The code rate k/n is ½. The coder 4211, when implemented with a convolutional coder, may include phase shifters or a tapped delay line to effect phase shifts. The function of the polyphase convolutional encoder can be expressed with an M-ary trellis diagram shown in FIG. 43B. A decoding process involves choosing a path through the trellis with respect to optimizing some performance metric, such as a likelihood or log-likelihood metric. There are many possible paths that are not shown in FIG. 43B. The decoder 4235, when implemented as a convolutional decoder, may include phase shifters or a tapped delay line to effect phase shifts. The decoder 4235 may convert received signals to polyphase or modulo-M symbols prior to decoding in a microprocessor (not shown).

The decoder 4235 may be configured to discard paths that are not good candidates for the maximum likelihood sequence. Thus, the decoded path is chosen from a reduced set of possible paths. This reduces the decoding complexity. Any of several algorithms may be used to provide approximate solutions to the maximum likelihood decoding problem, including sequential and threshold algorithms. A convolutional decoder may include a Viterbi, sequential, and/or a feedback decoder.

The coder 4221 may include an interleaver and the decoder 4235 may include a de-interleaver. Interleaving a coded message before transmission and de-interleaving after reception causes bursts of channel errors to be spread out in one or more sets of diversity-parameter values. This allows the decoder 4235 to handle bursts of errors as random errors.

Interleavers typically make use of time diversity. However, other diversity parameters may be exploited instead of, or in addition to time. For example, interleaving may be performed across one or more diversity-parameter values of each transceiver, such as frequency, polarization, phase space, beam direction, code, mode, etc. Interleaving may be exploited across multiple receivers. For example, subspaces (spatial and/or non-spatial) may be exploited for interleaving.

The demodulator 4225 may make a hard decision as to the value of a received symbol and pass that value to the decoder 4235. The demodulator 4225 may provide the decoder 4235 with an unquantized or over-quantized (quantization level>M) value to the decoder 4235. Sending an over-quantized value to the decoder 4235 is equivalent to sending a measure of confidence along with a code-symbol value. The decoder 4235 may include multiple decoders (not shown) that provide soft-decision variables to each other in an iterative fashion to optimize decoding performance.

FIG. 43C illustrates polyphase channel coding that may be provided by a CI channel coder coupled to a modulator adapted to perform high-level (e.g. M-ary) modulation. The codes illustrated in FIG. 43C provide for channel coding without increasing the bandwidth of the transmission signal. In this case, a plurality of code values of a code vector 4303 (which represents a CI-encoded superposition of data symbols $d_1$ to $d_N$ 4301) may be expressed as symbols $w_n$ characterized by a higher-order constellation of symbol values $W_n$ (n=1, . . . , N) compared to the data symbol values $d_1$ to $d_N$.

The code vector 4303 may be generated from a product of a data-symbol vector 4301 with a CI code matrix. In this example, contributions of data symbol −1 to the code vector 4303 are determined by CI code values in a corresponding column 4312 of a CI code matrix. The code value $w_n=-2i$ is an expression (e.g., a sum) of a linear combination of weighted data symbols expressed by a scalar product of the data-symbol vector 4301 with a row 4311 of the CI code matrix. Although binary data symbols 4301 are shown, the data symbols $d_1$ to $d_N$ may be expressed by higher-order modulations.

In the case of basic CI coding (i.e., CI code values $C_{nn'}=1$ for n=1 or n'=1), symbol $w_1$ may be used as a simple parity check of the data symbol values $d_1$ to $d_N$. Other parity checks may be represented by the other symbol values $w_n$. The parity checks may be used in error detection and/or symbol estimation. Parity checks may be part of an iterative optimization process that employs a multi-step methodology (e.g., turbo decoding) to reduce the effects of noise and/or interference. Data-symbol redundancy may be provided in CI channel coding via any additional form of channel coding (e.g., Trellis coding, convolutional coding, block coding, etc.). Quasi-orthogonal spaces (i.e., orthogonal positions or codes provided by pulse overlapping in CI pulse-shaping) may be used to convey coded and/or otherwise redundant data symbols.

In one set of embodiments, the symbol values $w_n$ may be characterized by a set of phases. In another set of embodiments, the symbol values $w_n$ may be characterized by a set of multi-level amplitudes and phases. In some embodiments, the symbol values $w_n$ may be characterized, at least in part, by modulo-N combining of a plurality of coded data symbols. Symbols $w_n$ may be provided by any combination of generating (e.g., combining sets of coded symbols) and acquiring (e.g., selecting values from a look-up table) symbol values.

CI channel decoding may employ Trellis decoding, such as illustrated by FIG. 43D. Any of various Trellis decoding algorithms, such as the Viterbi algorithm, may be employed. Alternatively, one or more types of correlation or matched-filtering algorithms may be performed to provide data-symbol estimates. In some applications, the symbols $w_n$ may be combined to provide estimates of the data symbols. For example, each data-symbol estimate may be generated by providing at least one set of phase shifts (i.e., a phase-space vector) to the symbols $w_n$ and combining the phase-shifted symbols $w_n$. Noise estimates may be generated using any combination of expected data-symbol values $d_1$ to $d_N$, code values $w_n$, and parity-check values (e.g., $w_n$). Noise estimates may be generated with respect to measurement parameters associated with redundant sets of CI-encoded data symbols. Noise estimates and/or data-symbol estimates may be generated iteratively. For example, noise and/or data-symbol estimates may be adjusted or selected and evaluated with respect to probability of error using any combination of signal-quality measurements.

Figure 44A:
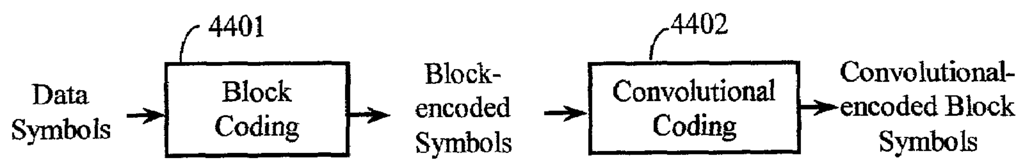
FIG. 44A shows an embodiment of a CI coder that includes at least one block coder and at least one convolutional coder.

FIG. 44A shows a possible embodiment of the coder 4211. A block coder 4401 encodes input data symbols with at least one block code. The block encoded symbols are then encoded in a convolutional coder 4402 to generate convolutional-encoded, block-encoded data symbols.

Figure 44B:
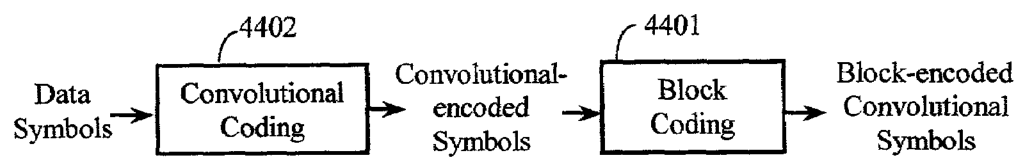
FIG. 44B shows an alternative embodiment of a CI coder that includes at least one block coder and at least one convolutional coder.

FIG. 44B shows a convolutional coder 4402 and a block coder 4401 switched in order with respect to the coder shown in FIG. 44A. The output signal is a block-encoded, convolutional-encoded data sequence. One or more interleavers (not shown) may be provided in FIGS. 44A and/or 44B. The interleavers may be provided before or after either or both the block coder 4401 and the convolutional coder 4402.

Figure 45A:
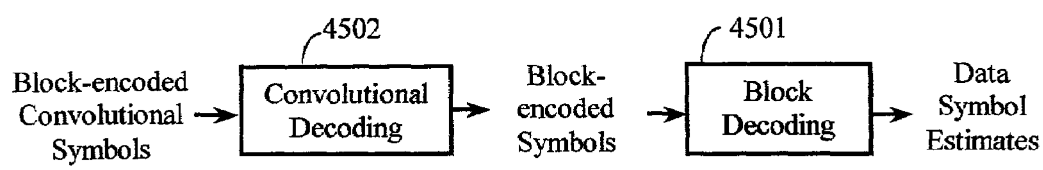
FIG. 45A shows a decoder corresponding to the coder shown in FIG. 44A.
Figure 45B:
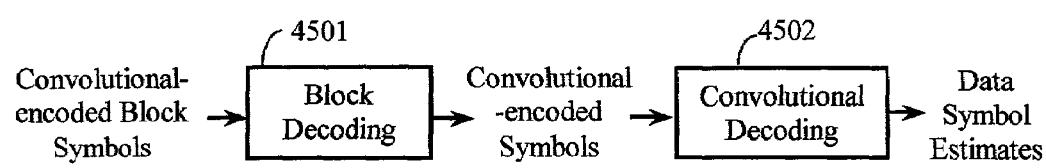
FIG. 45B shows a decoder corresponding to the coder shown in FIG. 44B.

FIG. 45A and FIG. 45B illustrate possible embodiments for the decoders corresponding to the coders shown in FIG. 44A and FIG. 44B, respectively. Similarly, one or more de-interleavers (not shown) may be provided to the decoders with respect to any interleaver provided to the coders.

Figure 46:
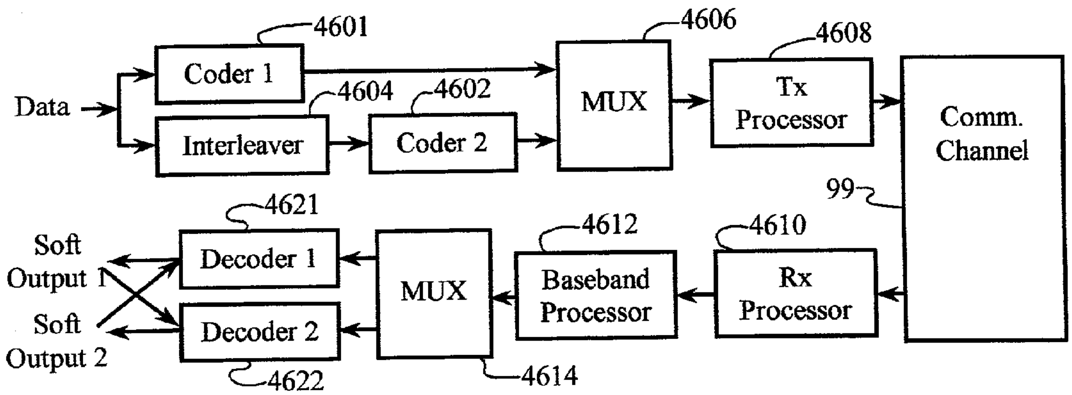
FIG. 46 illustrates basic components of a turbo coder/decoder system that may be used to process CI codes.

FIG. 46 illustrates basic components of a turbo coder/decoder system that may be used to process CI codes. A data sequence is encoded with at least two error-correction codes applied by at least two coders 4601 and 4602. The data sequence is interleaved by an interleaver 4604 prior to encoding by the second coder 4602. The coded data symbols are multiplexed together into a single symbol stream that may be processed by a transmit processor 4608 before being coupled into a communication channel 99.

Received signals from the communication channel 99 are optionally processed by a receiver processor 4610. Basic received signal processing tasks, such as amplification and filtering, may be performed by the receiver processor. A baseband processor 4612 may include a matched filter and sampler or some other systems or software adapted to convert the received signals into a symbol stream. A demultiplexer 4614 demultiplexes the resulting symbol stream into two symbol streams. Each symbol stream is processed in one of a plurality of decoders, such as decoders 4621 and 4622.

Turbo coding combats random and burst errors by combining error-correction coding and interleaving. A first code encodes a data stream. A second code encodes an interleaved version of the data stream. Each decoder 4621 and 4622 provides de-interleaving (if necessary) and decoding. The output of one decoder 4621 aids the other decoder 4622 in an iterative fashion. Soft outputs from each decoder 4621 and 4622 are provided to the other decoder 4622 and 4621. Soft outputs indicate reliability of a symbol estimate produced by a decoder. A soft-decision value produced for each bit in a symbol includes an estimate of the symbol and the relative probability of a particular bit having a particular value. Preferably, the first soft decision is produced by the decoder 4621 or 4622 provided with the highest signal strength. The resulting soft-decision variable typically has higher reliability and, thus, reduces the number of iterations.

The codes applied by the coders 4601 and 4602 may be CI codes. The multiplexer 4606 and demultiplexer(s) 4614 may perform CI processing and/or sub-space processing. Different coded symbols may be multiplexed onto different CI carriers, different CI phase spaces, different subspaces, etc. The coded symbols may be coded with respect to some multiple-access code as part of the multiplexing procedure. Preferably, the multiple-access code spreads the symbols to provide the decoders with diversity benefits. Multiple-access-encoded symbols may be spread across different diversity-parameter values. For example, CI and/or binary-phase codes can spread a signal across a broad frequency band, multiple time intervals, multiple subspaces, etc. This spreading can provide the coded symbols with diversity benefits, thus reducing the number of decoding iterations.

The demultiplexers 4614 may include an optimal combiner (not shown). The demultiplexer 4614 may include other types of receivers and receiver components including, but not limited to, a multi-user detector, an interference canceller, a spatial interferometry demultiplexer, and/or any diversity-parameter beam former, including a spatial beam former. The demultiplexers 4614 may be provided with soft-decision values from either or both of the decoders to facilitate optimal reception. Variations to the function of the demultiplexers 4614 may be provided with respect to SNR, BER, and/or probability of error, as determined by the soft-decision values.

CI codes may be implemented in various types of channel coding. In one set of embodiments of the invention, one or more data symbols $s_n(t)$ are mapped into a plurality of CI symbols represented by CI carrier weights $w_n(t)$.

Figure 47A:
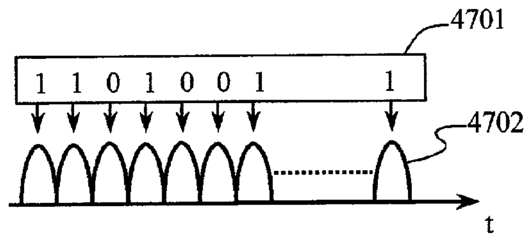
FIG. 47A illustrates a set of data symbols and a plurality of CI pulses that are adapted with respect to a plurality of data symbols.
Figure 47B:
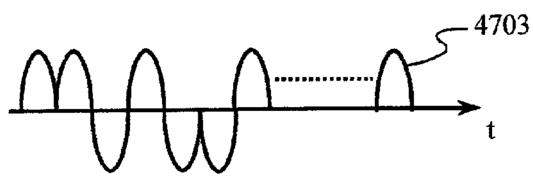
FIG. 47B illustrates a modulated CI pulse stream generated by impressing data symbols onto a CI pulse stream.
Figure 47C:
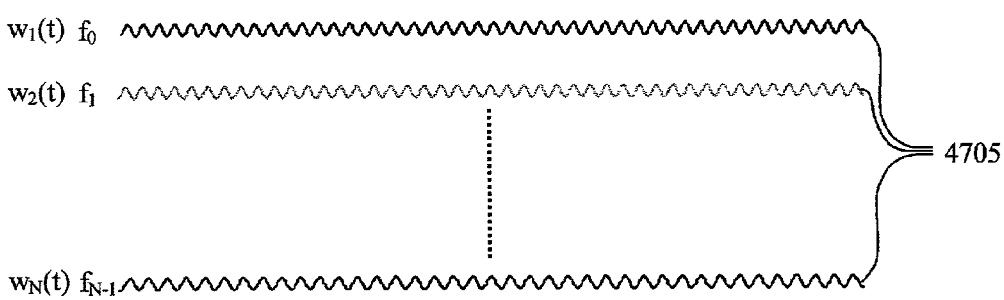
FIG. 47C illustrates CI carrier components of the modulated CI pulse stream shown in FIG. 47B.

FIG. 47A illustrates a set of data symbols 4701 that are impressed onto a plurality of CI pulses 4702. FIG. 47B illustrates a modulated pulse stream 4703 resulting from impressing the data symbols 4701 onto the pulse stream 4702. FIG. 47C illustrates a plurality of CI symbols represented by a plurality of CI carrier weights $w_n(t)$. A superposition of the carriers 4705 produces the modulated pulse stream 4703.

The data symbols 4701 may be binary symbols (as shown) or symbols derived from a more complex alphabet. The CI pulse stream 4702 may include overlapping and/or non-overlapping pulses. The pulses of the pulse stream 4702 may be uniformly and/or non-uniformly positioned in time. Data symbols 4701 may be impressed onto the pulses via any type of modulation, including amplitude modulation, frequency modulation, phase modulation, time-offset modulation (e.g., pulse-position modulation), polarization modulation, or any combination thereof.

The CI carriers 4705 may be characterized by overlapping and/or non-overlapping carriers. The carriers 4705 may be uniformly and/or non-uniformly spaced-in-frequency carriers. The weights $w_n(t)$ corresponding to the carriers 4705 depend on the carrier frequencies. The weight values $w_n(t)$ also depend on any carrier frequency amplitude profiles, such as may be provided to shape the time-domain pulses and/or provide for frequency-domain shaping. Similarly, weight values $w_n(t)$ depend on any phase coding provided to the carriers, such as to reduce the PAPR of the pulses.

In one set of embodiments of the invention, data symbols $s_n(t)$ are literally impressed onto CI pulses. The CI carriers are processed to provide carrier weights $w_n(t)$. In another set of embodiments, data symbols $s_n(t)$ are impressed onto non-CI signals that are decomposed into CI carrier components to provide carrier weights $w_n(t)$. In yet another set of embodiments of the invention, the descriptions of CI carrier processing are merely a representation of a mathematical process that derives CI symbols $w_n(t)$ corresponding to a given set of data symbols.

The CI symbols can optionally be interleaved prior to being impressed onto a plurality of diversity-parameter values. In one embodiment of the invention, the CI symbols are transmitted as a serial symbol stream. In another set of embodiments, CI symbols are transmitted in parallel. For example, CI symbols may be transmitted on multiple frequencies, multiple subspaces, etc. Various combinations of diversity parameters and serial and/or parallel processing may be implemented.

Each CI symbol $w_n(t)$ corresponding to a particular data set $s_n(t)$ {n=1, . . . , N} may convey the same plurality of data symbols $s_n(t)$. Interferometry between the CI symbols $w_n(t)$ enables the data symbols $s_n(t)$ to be extracted. If some of the CI symbols $w_n(t)$ are corrupted or lost, the encoded data symbols $s_n(t)$ can still be recovered with minimal degradation. This type of CI coding enables error correction without increasing bandwidth requirements or reducing throughput. Furthermore, CI coding combined with quasi-orthogonal pulse shaping enables simultaneous benefits of error-correction enhancement and increased throughput.

Figure 48:
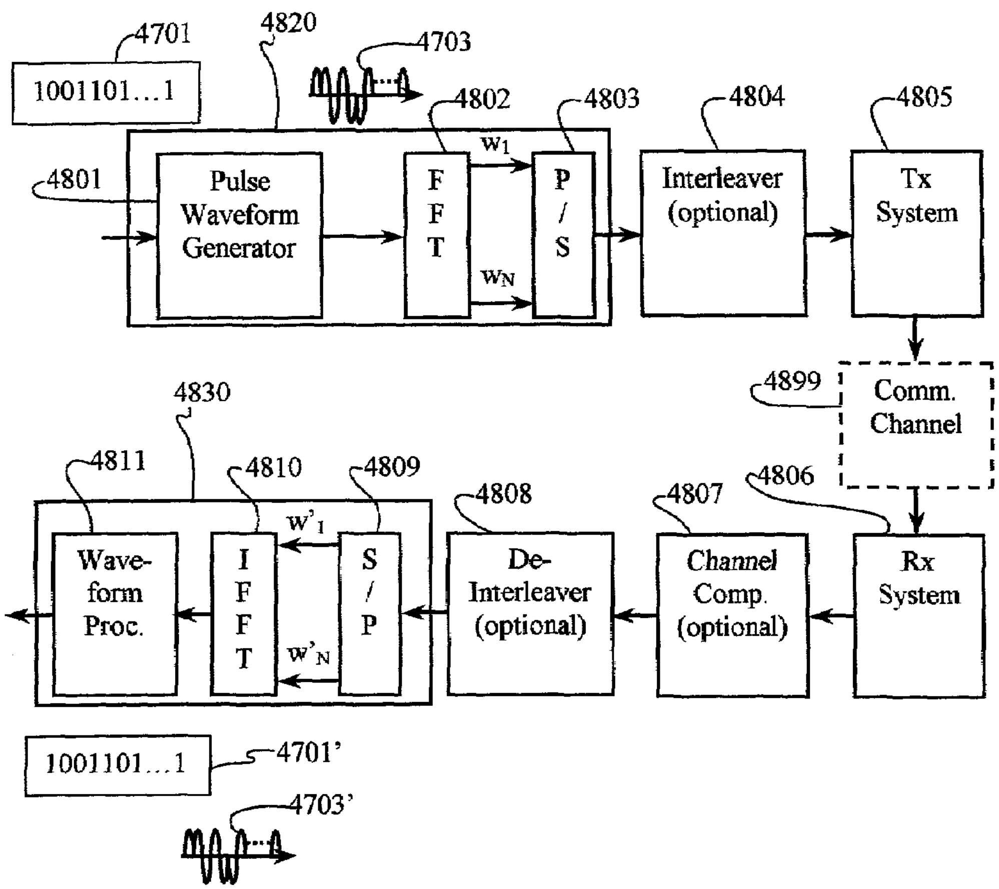
FIG. 48 shows a CI encoding system coupled to a transmitter and a CI decoding system coupled to a receiver.

FIG. 48 shows one of many possible embodiments of a CI-code transmitter and a CI-code receiver. A set of data symbols 4701 is processed by a CI symbol generator 4820. The CI symbol generator 4820 may incorporate any system design that processes received data symbols to generate at least one set of CI symbols. In this case, a pulse waveform generator 4801 processes input data symbols $s_n(t)$ to produce a plurality of modulated CI waveforms 4703 that are processed with a Fourier transform 4802 into a plurality of CI symbols $w_n(t)$. An optional parallel-to-serial converter 4803 provides a serial symbol stream output from the CI symbol generator 4820.

Optionally, the CI symbols $w_n(t)$ may be interleaved by an interleaver 4804 prior to being provided to a transmission system 4805. The transmission system 4805 may perform modulation, multiple-access processing, multiplexing, coding, D/A processing, spreading, frequency conversion, filtering, amplification, and/or beam forming prior to coupling transmission signals into a communication channel 4899.

A receiver couples transmitted signals from the communication channel 4899 into a receiver system 4806. The receiver system 4806 may perform beam forming, amplification, filtering, down conversion, despreading, decoding, demultiplexing, multiple-access processing, demodulation, A/D processing, data storage, and/or other typical receiver processing techniques. Received signals may optionally be processed by a channel-compensation system 4807. If necessary, received signals may be deinterleaved in a deinterleaver 4808 prior to processing by a CI signal processor 4830.

The CI signal processor 4830 receives a set of samples that may include distortion and/or interference resulting from propagation through the channel 4899. The CI signal processor 4830 processes the samples, which may directly or indirectly be in the form of CI symbols. In this case, a serial-to-parallel converter 4809 prepares a serial input for inverse-Fourier processing 4810 followed by waveform processing 4811. The waveform processor 4811 may sample a time-domain waveform resulting from a combination (e.g., a superposition) of CI symbols or waveforms represented (e.g., weighted) by CI symbols.

Figure 49:
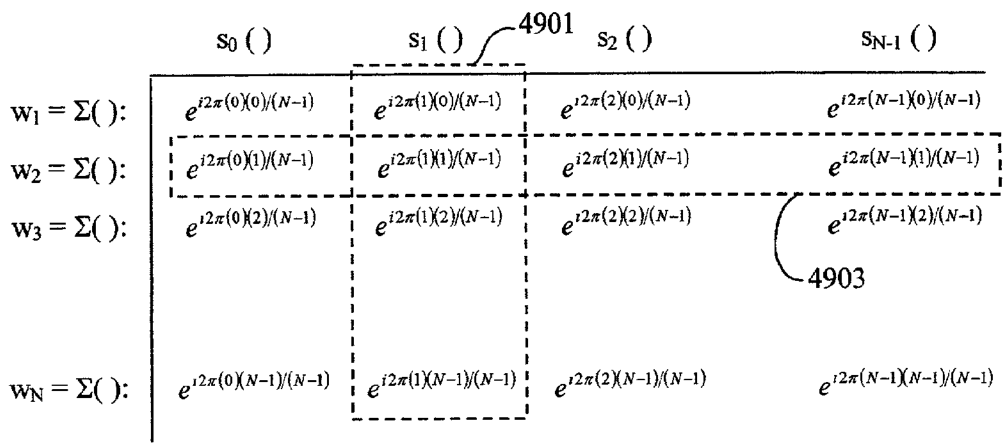
FIG. 49 illustrates relationships between basic CI symbol values $w_n$ and data symbols $s_n$ processed with CI code chips to produce the CI symbol values $w_n$.

FIG. 49 illustrates the relationship between CI symbol values $w_n$ and data symbols $s_n$. CI code chip values are arranged in columns with respect to phase spaces, such as phase space (column) 4901. As shown previously, a phase space is analogous to a pulse position. The phase spaces (i.e., pulse positions) may be orthogonal or quasi-orthogonal. Thus, the number of CI symbols $w^n$ may differ from the number of data symbols $s_n$. Each data symbol value $s_n$ is impressed upon a phase space such that each set of CI code chip values expresses the value of the corresponding data symbol $s_n$. Each code-chip value is analogous to a complex weight applied to a particular CI carrier such that a superposition of the carriers produces a CI waveform bearing the data symbol value $s_n$ at a particular pulse position.

A CI superposition waveform bearing multiple data-symbol/pulse-position characteristics can be created by applying weights to CI carriers that correspond to sums of carrier weights for each data-symbol/pulse-position. Similarly, each CI symbol, such as symbol $w_2$, may be represented as a sum of a row of data-bearing CI code chips, such as row 4902.

Decoding may include any appropriate inverse of the coding operation represented by FIG. 49. For example, to extract an $n^{th}$ data symbol value $s_n$ from a vector of received CI symbol values w, the complex conjugate of a vector of the $n^{th}$ phase space (or CI code) values, $w^*_n$, may be correlated with the received CI symbol vector w. Alternative equivalent decoding processes may be performed. The decoding process may be performed with respect to one or more combining techniques, such as, but not limited to, MMSE, EGC, maximum likelihood combining, or any combination thereof. Decoding may include turbo decoding, Trellis decoding (e.g., Viterbi decoding), block decoding, etc.

Figure 50:
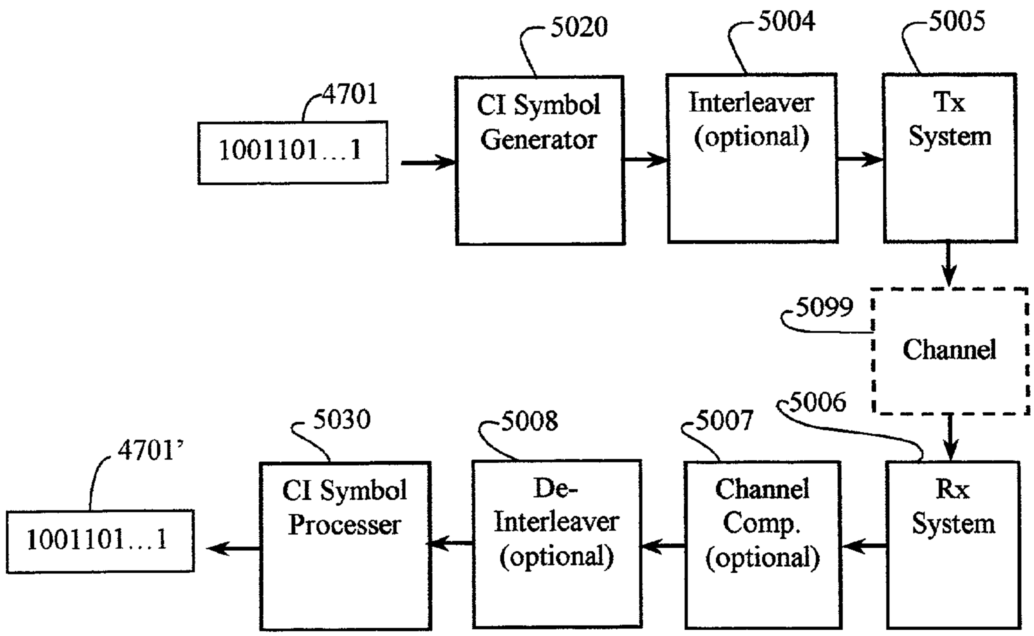
FIG. 50 shows a block diagram of basic components used in a CI coding system and a CI decoding system.

FIG. 50 illustrates basic components of a CI coding system and a CI decoding system. A data symbol stream 4701 is processed by a CI symbol generator 5020 that outputs a plurality of CI symbol values $w_n$ representing a coded version of the data symbols $s_n$. The symbols $w_n$ may optionally be interleaved by an interleaver 5004 prior to being prepared for transmission into a communication channel 5099 by a transmission system 5005. The symbols $w_n$ are typically multiplexed onto one or more diversity-parameter spaces prior to being transmitted.

A receiver system 5006 couples transmitted signals from the channel 5099, performs any necessary processing, such as filtering, amplification, demultiplexing, de-spreading, decoding, and/or beam forming, prior to outputting an IF or baseband digital signal. Optionally, channel compensation 5007 may be performed to mitigate effects of channel distortion and/or interference. Any necessary de-interleaving processes 5008 may be performed prior to processing by a CI signal processor 5030.

The CI signal processor 5030 processes received CI symbols $w'_n$ to produce data-symbol estimates 4701'. The data-symbol estimates 4701' may be output to additional signal-processing systems (not shown).

The CI symbol generator 5020 converts a predetermined number of input data symbols $s_n$ into a plurality of CI code symbols $w_n$. This conversion may involve summing information-modulated CI code chips. A first step in a CI symbol generation process involves generating code chips and/or acquiring code chips stored in memory or received from an input data stream. In some applications, code chips may be generated from a reduced set (e.g., an orthonormal basis) of code chips or vectors. Various methods for generating CI code chips are described throughout the specification. In some applications, code chips or orthonormal bases codes may be received over a communication link.

A second step in a CI symbol generation process involves impressing at least one data symbol $s_n$ onto at least one set of code chips. The code chips may be multiplied, phase shifted, modulated, or otherwise impressed with data symbol values $s_n$. The code chips represent a phase space, such as a pulse position. Optionally, the code chips may be provided with phase offsets with respect to some PAPR-minimizing code or encryption code.

A third step in a CI symbol generation process involves combining the code chips to produce CI code symbols $w_n$. FIG. 49 illustrates how rows of CI code chips are combined to produce CI code symbols $w_n$. Predistortion may be performed by providing channel-compensation weights to the CI code symbols $w_n$.

The CI signal processor 5030 processes received CI symbols $w'_n$ to produce data-symbol estimates 4701'. A first step in a CI signal processing method includes generating code chips and/or acquiring code chips stored in memory or received from an input data stream. Code chips may be generated from a set of orthonormal codes or a subset of chips comprising one or more orthonormal codes.

A second step in a CI signal processing method includes correlating at least one vector of the code chips with a vector of the received data symbols $w'_n$. The correlation process may include a scalar multiplication between the code-chip vector and the received data-symbol vector followed by integrating (e.g., summing) the products. Another embodiment of correlation includes adding together selected samples over a predetermined sample interval. Additional processing may be performed to produce estimates of the transmitted data symbols.

The CI signal processor 5030 may perform various types of combining, such as weighted combining as part of an MMSE, EGC, maximum likelihood, or any other measurement-based optimization process. The CI signal processor 5030 may perform channel compensation. The CI signal processor 5030 may perform various receiver-processing functions, as described throughout the specification.

10.1 Overview of CI Channel Coding in a Multiple-Access System

In channel coding, a sequence of symbols from a first alphabet is represented by one or more symbols from a second alphabet. In general, an alphabet of order $M=2^N$ is required to represent the $M=2^N$ possible unique binary symbol sequences of N symbols each. A signaling system that represents an N-element binary symbol sequence using a symbol alphabet of order $M=2^N$ is typically referred to as M-ary signaling. In M-ary signaling, the equivalent binary data rate R is the symbol rate S multiplied by the number of bits per symbol N (i.e., R=S*N). The number of bits per symbol N is $\log_2 M$.

For each data symbol presented to a transmitter, the transmitter generates a corresponding symbol waveform selected from a set of discrete symbol waveforms. The symbol waveform is then transmitted over a communications channel to be received by at least one receiver. Each transmitted symbol waveform is subject to distortion and noise that can make the received symbol waveform differ from the original transmitted symbol waveform. Consequently, it is necessary to decide which symbol of the discrete set of known symbols was most likely transmitted. This decision is performed in the receiver. The receiver output is a symbol sequence selected from the known set of symbols that represents the best estimation of the transmitted symbol sequence.

The receiver synchronizes each received symbol waveform with a coherent integration interval. In the absence of correct synchronization, the symbol content of the received waveform can be misinterpreted. Synchronization can be lost due to multipath effects, such as fading and inter-symbol interference.

One approach that mitigates the effects of inter-symbol interference is to use M-ary orthogonal signaling with code waveforms that are a factor of $\log_2 M$ times longer than each data symbol. Just as M-ary signaling with an orthogonal modulation format (such as MFSK) improves the probability-of-bit-error performance, waveform coding with an orthogonally constructed signal set, in combination with correlation detection, provides the same improvement. Since the waveforms are orthogonal, each data symbol's waveform has no projection onto the waveform of any other data symbol. If the symbol duration of the code waveforms is much longer than the multipath delay spread, the effect of the multipath is reduced. Consequently, each data symbol is more easily distinguished from other data symbols.

In one form of CI signaling, each data symbol is constructed from a superposition of narrowband component waveforms. The superposition of the CI waveforms ensures orthogonality in the time domain with respect to other CI component-waveform sets that are phase shifted with respect to an integer-multiple shift of a full or half pulse duration. If the duration of the component waveforms is much longer than the multipath delay spread, the effect of the multipath is reduced. CI waveforms can be supplemented with an antipodal signal set to form a bi-orthogonal signal set. Trans-orthogonal CI waveforms may be generated. CI waveforms may be adjusted to provide the superposition signal with in-phase and quadrature-phase values, thus, enabling additional orthogonal waveform codes.

Multiple-access coding uses one or more code orthogonality properties to separate users. Certain types of channel coding can use one or more code orthogonality properties to separate data symbols. Thus, coding used for multiple access (e.g., CIMA, CI/DS-CDMA, CI multiple-access codes, etc.) can also be used to encode data symbols and/or increase processing gain of a spread-spectrum system by increasing the effective duration of each data symbol. Furthermore, forms of CI coding may be combined with direct-sequence coding and/or any type of channel coding. Such combinations may be made to produce various benefits, including multi-level coding, increased processing gain, improved channel coding, enhanced multiple access, and/or variable-rate communications.

CI codes used in higher-order signaling alphabets are more flexible than conventional binary codes, such as Walsh codes, which are constrained to lengths of $2^n$. CI-coded data symbols may be co-modulated with a DSSS waveform, CI-based waveform, or any other type of multicarrier, frequency-hopped, or chirped waveform. One objective of this type of co-modulation is to effectively increase processing gain for a given data rate without increasing the spread spectrum transmission bandwidth. Similarly, conventional coding techniques (such as DSSS, conventional channel coding, non-orthogonal signaling, Hadamard-Walsh coding, etc.) may be combined with CI-based waveforms (CI-TDMA, CI/DS-CDMA, CI/MC-CDMA, CI-OFDM, etc.) to increase the processing gain of a CI-based communication system. Processing gain in a CI system is usually related to the number of carriers on which a data symbol is modulated, whereas frequency diversity is related to the frequency band(s) in which CI carriers are distributed. Processing gain may be provided with respect to time-domain (e.g., direct-sequence) encoding of the data symbol.

One preferred embodiment of the invention employs mutually orthogonal polyphase CI waveforms that can be synchronously modulated upon a spread-spectrum code. All transitions of both the polyphase CI waveforms and the spread-spectrum waveforms occur simultaneously with a transition of a common clock signal. The clock-signal frequency may be selected to support the finest possible pulse structure in each polyphase and spread-spectrum waveform. The finest pulse structure that can occur in a waveform determines the bandwidth of the waveform. Therefore, the clock rate establishes the bandwidth of the waveform. As long as a waveform signal transition occurs at a clock edge, a multiplicative composite of a polyphase CI and spread-spectrum waveform will not require additional bandwidth beyond the bandwidth of its two constituent waveforms. Consequently, polyphase waveforms having a bandwidth less than or equal to the bandwidth of the DSSS waveform can be used without any increase in bandwidth of the polyphase/DSSS composite waveform.

In another preferred embodiment, the orthogonal signal set is supplemented with an antipodal signal set to form a bi-orthogonal signal set, further increasing the data rate achievable at a given DSSS or CI processing gain. Other embodiments include differential phase-shift key (DPSK) polyphase codes, CI-Walsh coding, differential CI-Walsh coding, coherent and/or non-coherent M-ary phase-shift keying combined with orthogonal polyphase and/or CI signaling within a single symbol; and differentially encoded coherent phase shift keying across two symbols, with orthogonal signaling within a symbol.

Although CI is commonly provided for multiple access, CI may also be used to encode data symbols. In another preferred embodiment, each of a plurality of data symbols is mapped into a weighted sequence of carrier waveforms. Preferably, the weighted sequences are orthogonal or quasi-orthogonal to each other. The weighted sequence of subcarriers may be MC-CDMA signals. Preferably, the weighted sequence includes a sequence of CI signals. The weighted sequences may be further characterized by a superposition of waveforms having a time-domain structure similar to direct-sequence or polyphase signals. The superposition of waveforms may be provided with a low PAPR.

FIG. 23A illustrates a time-domain relationship between each of a plurality of data symbols $d_1, d_2, \ldots, d_m$ and multiple-access or spread-spectrum code chips $c_1, c_2, \ldots, c_N$. The code chips are illustrated as shaped, overlapping chips. However the chips may be non-overlapping. Any form of chip shaping may be employed, such as raised cosine, sinc, and/or CI chip shaping. A $k^{th}$ user modulates each data symbol onto at least one period of its corresponding code. The code may be a binary code (e.g., a direct-sequence code) or a polyphase code (e.g., a CI code). In addition to a multiple-access and/or spreading code, each data symbol may be encoded with a channel code.

FIG. 23B illustrates time-domain relationships between multiple user data streams and associated orthogonal channel codes used to modulate each symbol in each data stream. A $k^{th}$ user transmits at least one data symbol $d_{mjk}$ (where m is a data-symbol number in a particular code-period, f is a particular frame having a duration of at least one code period, and k is a user number that references a particular user) on at least one chip sequence $C_{mfk}$. The codes may be assigned with respect to any number of parameters, including data-symbol number m, frame number f and/or user number k. The channel code duration is typically the same as the multiple-access code duration. The channel code bandwidth is typically less than or equal to the bandwidth of the multiple-access or spreading code $C_{mfk}$. Channel codes may be derived from the same set of codes used for multiple access. Each chip sequence is shown as a plurality of time-domain chips $C_{nmfk}$, where n indicates a chip position relative to other chips in the code. Although the chip waveforms are illustrated as overlapping waveforms, non-overlapping waveforms may be employed. Any form of chip shaping may be provided, including, but not limited to, raised cosine, sinc, and/or CI chip shaping.

Each user may transmit data symbols in the same time interval by using different multiple-access codes. A single user may be provided with more than one multiple-access code, thereby increasing the effective bandwidth of that user's communication channel. A user may use a different multiple-access code and/or channel-code set relative to each adjacent data symbol. A particular user may transmit multiple symbols in a given time interval by using multiple orthogonal channel codes. A user may transmit multiple data bits per symbol by employing an M-ary modulation scheme, such as QAM, QPSK, etc.

FIG. 24 shows relative symbol durations between a user's data symbols $d_1, d_2, \ldots, d_m$, channel-code symbols $cc_{mn'}$, (where n'=1, 2, . . . , N'), and direct-sequence or CI-code symbols $c_1, c_2, \ldots, c_N$ for a channel code having a longer duration than the direct-sequence or CI code. A $k^{th}$ user transmits one data symbol $d_m$ corresponding to a particular channel code in one channel-code period. Multiple data symbols $d_m$ may be transmitted simultaneously by employing multiple simultaneous channel codes. Each channel-code symbol $cc_{mn'}$ has the same duration as the direct-sequence or CI-code period. Each data symbol $d_m$ is spread over multiple direct-sequence or CI-code periods. A particular user may employ multiple direct-sequence and/or channel codes to increase throughput or reduce probability of error. In one embodiment of the invention, there is at least a one-to-one correspondence between channel codes and data symbols. In another embodiment, data symbols, such as binary or M-ary data symbols, are impressed upon individual channel codes. Similarly, multiple-access codes may comprise different levels of code granularity. For example, wideband codes may provide spreading or inter-cell isolation, whereas relatively narrowband codes may provide intra-cell orthogonality.

Although the channel-code symbols $cc_{mn'}$ and the data symbols $d_m$ are shown as rectangular symbols, these symbols may be shaped in the time domain. For example, the symbols may be shaped with respect to some form of chip shaping, such as raised cosine, Gaussian, sinc, and/or CI chip shaping. The symbols may simply be tapered in the time domain. Frequency-domain windowing may be employed to provide a predetermined time-domain chip profile. Either or both the channel-code symbols $cc_{mn'}$ and the data symbols $d_m$ may convey M-ary signals, such as polyphase, multi-magnitude, or hybrid signals.

Figure 51:
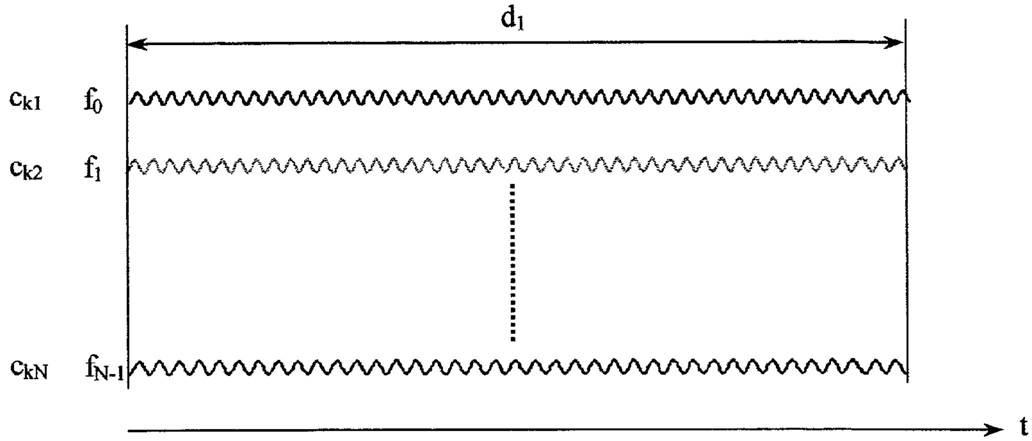
FIG. 51 illustrates channel-code chips $c_{nk}$ used to map a data symbol $d_m$ to multiple carrier frequencies.

FIG. 51 illustrates channel-code chips $c_{nk}$ (where n indicates a chip position relative to other chips in a code vector and k is a user number that references a particular user) and a data symbol $d_m$ applied to multiple carrier frequencies in a multiple-access system. The channel-code chips $c_{nk}$ map at least one data symbol $d_m$ to multiple frequencies. The code vector may be a direct-sequence code, a CI code, or any other appropriate symbol alphabet.

In one set of embodiments of the invention, the channel-code chips have the same duration as the data symbol $d_m$. A multiple-access code used herein preferably has the same code length (i.e., the same number of carriers). In one embodiment, frequency-domain multiple-access coding is provided to the carrier frequencies as MC-CDMA, CIMA, or any other frequency-domain multiple-access coding. In another embodiment of the invention, multiple-access coding is provided in the time domain in the form of direct-sequence coding, CI coding, and/or TDMA. In yet another embodiment of the invention, modulation on each carrier frequency is characterized by multi-tone CDMA or multicarrier direct-sequence CDMA. In another set of embodiments of the invention, multiple-access coding is characterized by CI/DS-CDMA and FIG. 33 indicates CI carriers for a particular CI/DS-CDMA code or code chip.

Multiple channel codes may be used simultaneously as a means for multiple access or increased throughput. Data symbols may be encoded with respect to an alphabet defined by the possible channel codes. Data symbols may be encoded with respect to modulation of the channel codes. Data symbols may be encoded with respect to a combination of a channel-code alphabet and impressed modulation.

Figure 52:
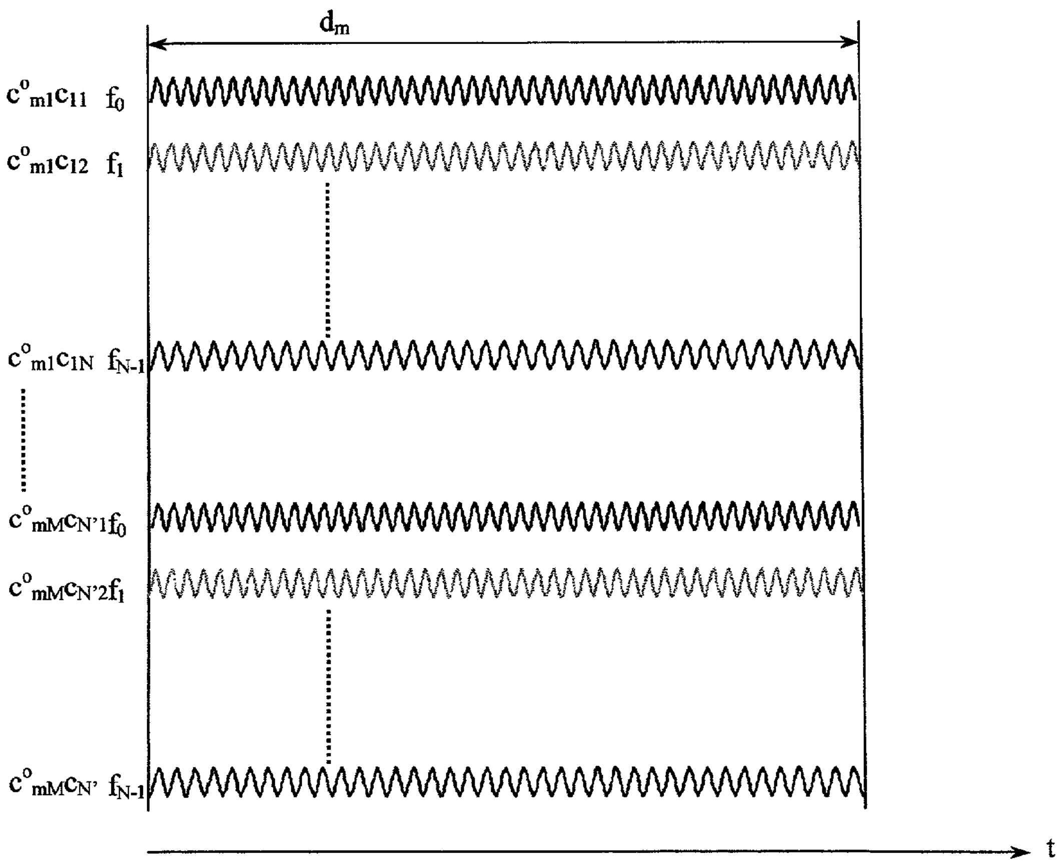
FIG. 52 illustrates an application of multi-level coding of the present invention.

FIG. 52 illustrates an application of multi-level coding of the present invention. A plurality N' of communication channels are indicated by frequency-domain code vectors $C_1=[c_{11}, c_{12}, \ldots, C_{1N}]$ to $C_{N'1}=[c_{N'1}, c_{N'2}, \ldots, c_{N'N}]$. In a given time interval, a data symbol $d_m$ may be transmitted on each channel. In one embodiment of the invention, at least one super-code vector $C^o=[c^o_1, \ldots, c^o_{M=N'}]$ is applied across the frequency-domain code vectors $C_1$ to $C_{N'}$. Each frequency-domain code vector $C_n$ is multiplied by a super-code chip $c^o_m$. Super-code vectors are preferably orthogonal or quasi-orthogonal with respect to each other. A particular super-code vector may correspond to a channel code or a multiple-access channel. Super codes may be changed relative to some predetermined time interval, such as the duration of a data symbol $d_m$.

Figures 53, 54A:
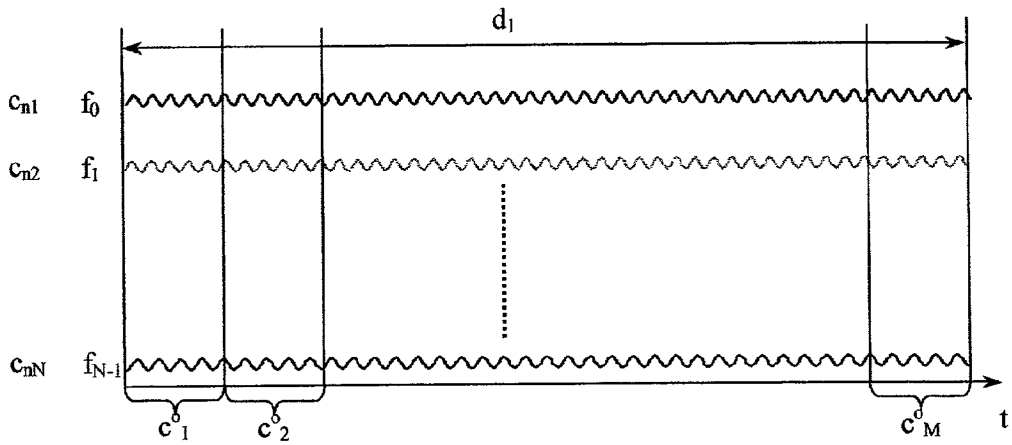
FIG. 53 illustrates a multi-level coding method of the invention that spreads a data symbol over multiple frequencies and time intervals.

FIG. 53 illustrates a multi-level coding method of the invention that spreads a data symbol $d_m$ over multiple frequencies $f_0$ to $f_{n-1}$ and time intervals t. An $n^{th}$ multiple-access channel or a channel code is defined by a code vector $C_n=[c_{n1}, c_{n2}, \ldots, c_{nN}]$. The code vector C, may be an MC-CDMA code, a CI code, a CIMA code, etc. A super-code chip $c^o_m$ from some super-code vector $C^o=[c^o_1, c^o_M]$ of length M multiplies the code vector $C_n$ over some predetermined time interval t. Preferably, the time interval t is some integer multiple of the normal symbol duration $T_s=1/f_s$, where $f_s$ is the frequency separation between carrier frequencies. The super-code vector $C^o$ spreads a data symbol Dm over M time intervals t. The super-code vector $C^o$ is preferably one of a family of orthogonal or quasi-orthogonal code vectors. In one embodiment of the invention, each super-code vector may represent a particular data symbol. In another embodiment of the invention, each super-code vector represents a multiple-access channel.

FIG. 54A illustrates a method of sub-channel coding. Chips $[c_{n1}, c_{n2}, \ldots, c_{nN}]$ of at least one code $C_n$ are provided to a plurality N of subchannels, such as spatial sub-channels. The code sequence $C_n$ provides a data symbol or multiple-access channel with sub-channel (e.g., sub-space) diversity. If a small number of the subchannels have poor link quality, the integrity of the coded data symbol or channel is not significantly compromised. The effects of inter-symbol interference can be reduced by a multicarrier implementation, such as OFDM or some CI-based technique. Inter-symbol interference may be mitigated by spreading and/or interleaving each data symbol $d_m$ in the time domain.

Figure 54B:
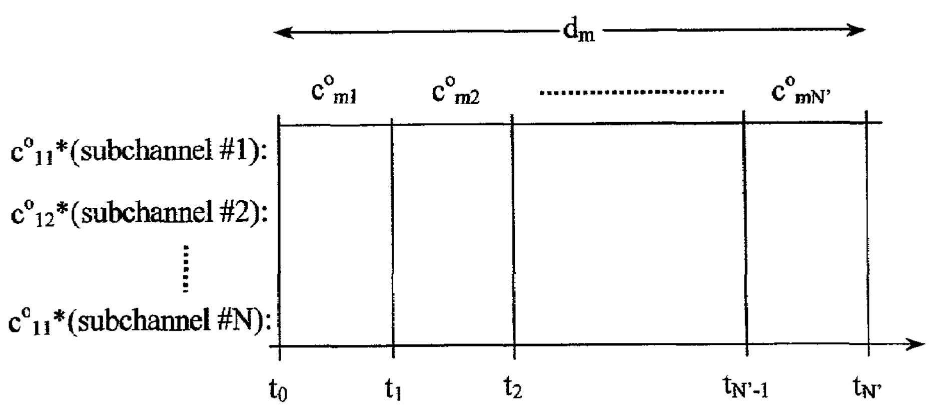

FIG. 54B shows a subchannel coding technique combined with time-domain coding. Super codes $C^o$ may be applied to orthogonal bases, such as subchannels, sub-channel codes, CI codes, direct-sequence codes, and/or any orthogonal or quasi-orthogonal diversity-parameter values. In this case, at least one super code $C^o$ is applied to a particular sub-channel code $C_n$ over multiple time intervals. The application of the super code $C^o$ increases data symbol $d_m$ duration. Alternatively, a super code $C^o$ may be applied in the frequency domain to provide frequency diversity.

Super codes may provide channel coding and/or multiple-access coding. Although non-overlapping time intervals, frequencies, and subchannels are illustrated in the preferred embodiments, coding for multiple access and channel coding may be applied to any orthogonal or quasi-orthogonal diversity-parameter values.

10.2 CI Channel Coding Systems

The following descriptions of transmitters and receivers adapted to perform CI channel coding reference functional diagrams that correspond to systems and methods of the invention.

Figure 55:
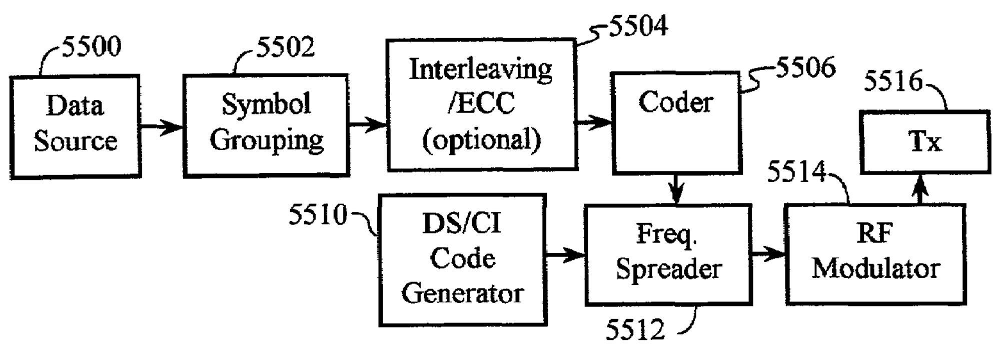

FIG. 55 shows an embodiment of a transmitter adapted for combined channel coding and multiple access. A data source 5500 provides a stream of data bits to a symbol processor 5502. The symbol processor 5502 groups the data symbols to generate a sequence of data words wherein each data word represents a symbol value. The symbol values may be processed via error-correction coding and/or interleaving by an optional error-correction coder 5504.

Error correction coding may be performed with Reed-Solomon codes, hybrid Reed-Solomon/binary codes, erasure codes, turbo codes, CI codes, etc. Error correction coding typically involves providing some sort of parity-check symbols to the data symbols. Bi-orthogonal coding has the extra requirement of correcting the binary element of the data. Interleaving may be performed to reduce the problems associated with error bursts. Error correction may be aided by changing the direct-sequence code on each symbol in order to randomize the effect of multipath on each symbol. In several preferred embodiments, the effects of multipath are mitigated by using CI. Either or both forward error correction and automatic re-transmission request may be performed.

A coder (or CI coder) 5506 translates the input data into symbol waveforms. The coder 5506 may modulate an appropriate phase change between the symbols. Modulation can take the form of minimum-shift keying or any other continuous-phase modulation. The coder 5506 may incorporate coherent M-ary PSK or M-ary DPSK. The coder 5506 may translate the input data with respect to a stored set of waveforms. The coder 5506 may select a corresponding logic in a waveform generator (not shown). For bi-orthogonal or differentially bi-orthogonal coding, phase inversion may be performed by complementing the symbol waveforms.

A frequency spreader 5512 combines the symbol waveform(s) with a direct-sequence or CI waveform generated by a DS/CI code generator 5510. The frequency spreader 5512 may include some sort of combining device, such as an exclusive OR logic gate or equivalent device. The output of the frequency spreader 5512 is processed by an RF modulator 5514 that provides an RF transmit signal that is optionally processed and coupled into a communication channel by a transmitter 5516.

The order of modulation provided by modules 5510, 5512, and 5514 may be changed. RF modulation 5514 may be implemented in stages and include IF processing and associated filtering. RF modulation 5514 may include any form of direct conversion including frequency-conversion techniques of the present invention. Various modules may be coupled to the DS/CI code generator 5510. For example, the data source 5500, the error-correction coder 5504, and/or the coder 5506 may be coupled to the DS/CI code generator 5510 to impress data, error-correction coding, and/or channel coding into the direct-sequence and/or CI codes generated by the DS/CI code generator 5510.

Figure 56:
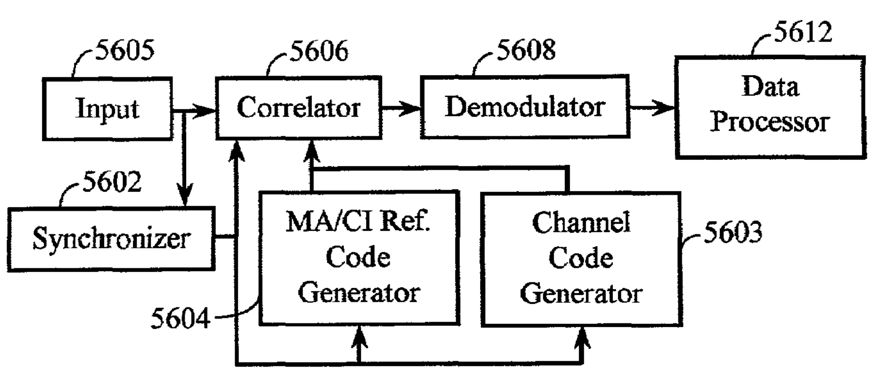

FIG. 56 illustrates a receiver corresponding to one embodiment of the invention. An input data sequence is provided to a correlator 5606. A synchronizer 5602 controls the timing of various receiver components, including the correlator 5606, a multiple-access/spread-spectrum reference-code generator 5603, and a channel reference-code generator 5604. Various implementations of the correlator 5606 may be provided. Optional components not shown in FIG. 56 may include time-tracking, synchronization-detection, level-control, a delay-lock loop, a comparator, and threshold detection-systems.

The synchronizer 5602 may include a matched filter, an aided-acquisition correlator, and/or a threshold-detection circuit. Synchronization typically involves two primary steps. Acquisition involves bringing the spreading signals into coarse alignment. Tracking involves continuously maintaining optimal fine alignment via feedback.

A demodulator 5608 performs a maximum likelihood decision or some other approximation that determines which orthogonal waveform(s) was (were) transmitted. The correlator 5606 provides the demodulator 5608 with a number M of correlation values corresponding to the M-ary signal input to the correlator 5606. Any phase-shift data impressed upon the orthogonal waveforms can be demodulated by the demodulator 5608 via comparison with at least one phase reference.

Demodulated data symbols are coupled to a data processor 5612. After demodulation, each demodulated signal is decoded for errors if error-correction coding is employed. The data symbols are then processed to form a bit stream. The data processor may include an optimal-combining receiver, a multi-user detector, an interference canceller, a decision processor, and/or one or more feedback loops to control receiver function in response to some performance measurement, such as BER, SNR, probability of error, received signal power, etc.

Systems and methods of the invention may be characterized by various modes of operation. Mutually orthogonal binary waveforms or other signal alphabets may be synchronously modulated onto one or more CI-based signals. Synchronous modulated implies that transitions of the channel-code waveforms (i.e., the signal alphabets) and the multiple-access or spreading waveforms occur simultaneously. Thus, channel-code waveforms having a bandwidth less than or equal to the bandwidth of the multiple-access or spreading waveforms do not increase the bandwidth of the composite waveform.

In one embodiment, orthogonal binary waveforms are modulated onto at least one CI-code waveform. In another embodiment, orthogonal waveforms are modulated onto at least one signal having a CI-based sub-layer. Another set of embodiments includes modulating a signal set, such as one or more orthogonal waveforms, onto a CI/DS-CDMA waveform.

Orthogonal or quasi-orthogonal CI codes may be synchronously modulated onto one or more waveform sets. In one embodiment, at least one CI code set or CI-encoded information signal is modulated onto a wave set of at least one CI code. Another embodiment includes modulating CI-coded waveforms onto any type of spread-spectrum or multiple-access waveform. One particular set of embodiments includes modulating at least one CI-coded waveform onto at least one CI/DS-CDMA code set.

In one set of embodiments, the DS/CI code generator 5510 and the multiple-access/spread-spectrum reference-code generator 5603 are adapted to generate CI-based signals, such as CI codes or CI-based multiple-access signals. CI-based signals include CI/DS-CDMA signals, which can have binary or polyphase chip sequences. CI-based signals may include any type of CI sub-carrier architecture, such as signals characterized by orthogonal circular (and/or elliptical) polarizations. In these embodiments, the coder 5506 and the channel reference code generator 5604 are adapted to generate one or more waveforms indicative of a signal alphabet, such as a set of orthogonal, bi-orthogonal, or trans-orthogonal waveforms. Waveforms generated by the coder 5506 may include binary, polyphase, and or continuous-phase signals. The coder 5506 may generate conventional channel codes that are then modulated onto CI-based signals.

In another set of embodiments, the DS/CI code generator 5510 and the multiple-access/spread-spectrum reference-code generator 5603 are adapted to generate conventional spread-spectrum or multiple-access waveforms, such as any of various binary chip sequences. In these embodiments, the coder 5506 and the channel reference code generator 5604 are adapted to generate one or more CI-based signaling alphabets. CI-based signaling alphabets may include one or more CI codes. A CI-based alphabet may include any signaling alphabet constructed from a superposition of CI signals.

A pulse-shaping filter may be provided to the DS/CI code generator 5510 or the RF modulator 5514. The DS/CI code generator 5510 and the multiple-access/spread-spectrum reference-code generator 5603 may be adapted to provide a different code to each adjacent symbol in a sequence of symbols. Error-correction coding may be employed to further reduce error rates. Coherent or non-coherent detection may be performed at the receiver.

11. CI RECEIVER PROCESSING FOR SINGLE-CARRIER SIGNALS

In one aspect of the invention, a received single-carrier or multicarrier signal is decomposed into a plurality of orthogonal, overlapping carrier components. These components can then be processed to obtain benefits of parallel processing and frequency-domain processing. The selection of carrier components may depend on one or more signal characteristics, channel characteristics, and/or receiver characteristics. Methods and systems adapted to decompose a received signal into CI components may be adapted to other embodiments and aspects of the invention described herein. For example, a wideband single-carrier signal may be decomposed into a plurality of narrowband CI components to facilitate array processing.

Various embodiments of CI are characterized by a mapping process performed by a receiver that maps time-domain samples of a high-bandwidth signal into a parallel set of low-bandwidth, long-duration symbols. FIG. 57A shows a frequency-domain profile 5701 of a high-rate digital transmission represented by a time-domain profile 5710 shown in FIG. 57B. The time-domain profile 5710 may be more accurately characterized by Gaussian or raised-cosine symbols.

The wideband signal spectrum 5701 may be decomposed into a plurality N of narrowband signals 5702, as shown in FIG. 57C. However, if the narrowband signals 5702 do not overlap in the frequency domain, some of the received signal energy (and thus, a substantial amount of the information) is lost. The lost signal energy is illustrated by a plurality of gaps 5703 between the narrowband signal spectrum 5702 and the wideband signal spectrum 5701.

A preferred embodiment of the invention provides for decomposition of a received signal into a plurality of overlapping narrowband carrier signals. FIG. 58A illustrates N modulated orthogonal carrier components. When a received signal is decomposed into carrier components, each carrier frequency f is associated with a complex-valued symbol $v_n$. In this case, a sample period $T_s=1/f_s$ provides overlapping frequencies $f_n$ that are incrementally spaced with a frequency separation of $f_s$ between adjacent carriers.

The sample period $T_s$ is a predetermined time interval in which samples are collected and processed, such as in a Fourier transform operation. This duration $T_s$ specifies a set of frequencies $f_n$ that are orthogonal to each other. How the samples collected within each sample period $T_s$ are processed (e.g., selected and/or weighted) determines a receiver's sensitivity to particular frequencies.

Each carrier signal appears to be modulated with a complex data symbol $v_n$ that is actually a complex-weighted superposition of a plurality of data symbols $s_m$. Each symbol $v_n$ has a symbol period of $T_s=1/f_s$. A corresponding frequency spectrum in FIG. 58B shows the N frequency components. Depending on the particular embodiment of the invention, the carriers may or may not be incrementally spaced in frequency. Subsets of the modulated carriers may or may not overlap. An $n^{th}$ symbol $v_n$ corresponding to an $n^{th}$ carrier frequency $f_n$, which results from a superposition of complex weighted $w_{np}$ data symbols $s_m$, is expressed by:

$$v_n=\Sigma_{n,m=1}w_{nm}s_m$$

The vector representations $v_n$ may be combined and processed using matrix operations to separate the data symbols $s_m$. Appropriate techniques involving any combination of estimation, optimization, interferometry, and/or cancellation may be used to separate the data symbols $s_m$.

FIG. 58C illustrates N' modulated carrier components. In this case, N'>N. Thus, the frequency separation $f'_s$, of the carriers is smaller thank. Consequently, the symbol $v_n$ period $T'_s$ is longer than $T_s$. The frequency separation $f'_s$ and the symbol period $T'_s$ are expressed by the following equations:

$$f'_s=f_sN/N'$$

$$T'_s=f_sN/N'$$

A frequency-domain spectrum of the carrier components shown in FIG. 58C is shown in FIG. 58D.

A transmission method of the invention provides a transmitter with a multicarrier signal having selected frequency components intended to facilitate separation and processing of the received data symbols. On the receive side, factors that may play a part in selecting carrier frequencies as part of a decomposition process include number of parallel operations, duration and frequency of sampling, and transformation characteristics between transmitted symbols $u_p$ and received carrier symbols $v_n$.

FIG. 58E exemplifies a spectral profile selected for a particular communication channel. Information signals are transmitted and/or received in a plurality of spectral ranges 5811, 5813, 5815, and 5817. The following spectral ranges are avoided: a spectral range 5812 allocated to another user, application, or system, a spectral range 5814 experiencing a deep fade, and a spectral range 5816 experiencing jamming or interference. A transmitter may be adapted to avoid transmitting in undesirable spectral ranges. A receiver may be adapted to avoid receiving signals in undesirable spectral ranges. In either case, the desired spectral ranges may be decomposed into CI carriers.

FIG. 59A illustrates a method of generating CI carriers as part of a transmission process. A channel-estimation step 5901 characterizes the communication channel and identifies desirable and undesirable spectral regions. Channel estimation may be performed with respect to multiple channels. Channel estimation may be performed with signals received from remote transceivers. Alternatively, remote transceivers may perform channel estimation and communicate those estimates to the local transceiver.

CI carriers are generated in a CI carrier generation step 5905 based on channel estimates. Pre-transmission processing 5906 is performed prior to transmitting 5907 the carriers into a communication channel. Pre-transmission processing 5906 may include predistortion, A/D conversion, modulation, multiplexing, multiple-access processing, up conversion, amplification, filtering, coding, beam forming, etc.

FIG. 59B illustrates a method of generating CI carriers as part of a receiving process. A channel-estimation step 5901 characterizes the communication channel and identifies desirable and undesirable spectral regions. Channel estimation may be performed with respect to multiple channels. Channel estimation may be performed with the aid of signals received from remote transceivers. Alternatively remote transceivers may perform channel estimates and communicate those estimates to the local transceiver.

A received signal is decomposed 5904 into a plurality of CI carriers. Carrier properties, such as frequency selection, frequency spacing, and complex weighting are selected, at least in part, with respect to the channel estimates. Optionally, the carriers may be processed before being combined in a combining process 5906. The combining process 5906 may be directed by channel estimates. Combining 5906 may be performed using any appropriate optimal-combining technique, such as MMSE combining. Alternatively, other combining techniques may be used. The combined signals are then conveyed to a receiving process 5908 that may further process the combined signals.

Decomposition of a received signal into narrowband CI components permits low-speed, parallel processing. In addition to simplifying demodulation of a high-rate signal, CI carrier processing can simplify many data-processing applications (such as error detection, error correction, virus detection, verification, decoding, and/or other security protocols) that typically require high-rate processing. This simplification is enabled by slower data-processing requirements. The combining of multiple low-speed processes produces high aggregate data rates. Similar benefits can be provided to other signal-processing operations, such as interference mitigation, noise mitigation, correlation, matched filtering, coding/decoding, beam forming, etc.

FIG. 60A illustrates a CI receiver adapted to process received single-carrier signals. Single-carrier signals include a single carrier signal modulated with an information signal, a single unmodulated carrier, and/or any received multicarrier signal that can be processed as a single-carrier signal.

A single-carrier receiver of the invention includes an orthogonal-frequency filter 6001 coupled to an optimal combiner 6002. Additional signal-processing units (not shown), such as one or more decoders, formatters, beam formers, demodulators, demultiplexers, despreaders, channel compensators, etc., may be coupled to the combiner 6002. The orthogonal-frequency filter 6001 shown in FIG. 60A includes an optional filter 6010, a sampler 6011, and a digital filter 6012, such as a Fourier transform processor.

The orthogonal-frequency filter 6001 is adapted to receive at least one input single-carrier and/or multicarrier signal. The input signal may be processed prior to being coupled into the orthogonal-frequency filter 6001. For example, a signal received by a receiver system (not shown) coupled to a communication channel (not shown) may be amplified, filtered, demultiplexed, demodulated, modulated, and/or down converted prior to being coupled into the orthogonal-frequency filter 6001. Optionally, the receiver system (not shown) may perform beam forming, interference cancellation, despreading, demultiplexing, channel compensation, multiple-access processing, A/D processing, and/or D/A processing.

The input single-carrier signal may optionally be processed by the filter 6010. The filter 6010 may include a passband filter, such as to provide anti-aliasing. The filter 6010 may include one or more filters, such as low-pass, high-pass, and/or notch filters. The filter 6010 may be adapted to select one or more communication channels, reject interference, compensate for channel distortion, and/or avoid deep fades.

The sampler 6011 performs digital sampling. A sampler, such as the sampler 6011, may include one or sample-parameter controllers (not shown) to select and/or adapt sample parameters, such as sample rate, sample width, sample duration, sample interval, sample shape, and/or sample weights. The sampler 6011 may optionally be integrated into a filter, such as the digital filter 6012. The selection and/or adaptation of various sample parameters can be performed to affect the frequency response of the orthogonal-frequency filter 6001. Furthermore, the sampler 6011 may optionally include a digital filter (not shown) to provide a predetermined frequency response.

One advantage of a digital receiver system includes the ability to adapt the sample rate to operate over a wide range of data rates. An adjustable anti-aliasing filter combined with an adjustable-rate sampler may be provided to appropriately process a wide range of input signal bandwidths. Alternatively, a fixed sample rate and static analog filter may be combined with a digital system adapted to use multi-rate signal processing algorithms to accommodate a predetermined range of signal bandwidths and sample rates.

The sampler 6011 may include one or more samplers. Samples may be stored in a storage system (not shown). Samples may be processed (e.g., selected, weighted) prior to, or following storage. The sampler 6011 may include one or more quantizers (not shown), such as noise-rejecting quantizers.

The digital filter 6012 may include one or more filters to process samples produced by the sampler 6011. The filter 6012 may include a filter bank. The filter 6012 may include any type of signal processor adapted to perform a Fourier transform operation. For example, the filter 6012 may perform one or more FFTs, DFTs, and/or OFFTs. The filter 6012 may include one or more filters with simple delays and/or sophisticated filters having complex amplitude and phase responses.

FIG. 60B illustrates a CI receiver embodiment adapted to process received single-carrier signals. The single-carrier receiver includes an orthogonal-frequency filter 6001 coupled to an optimal combiner 6002. The orthogonal-frequency filter may 6001 include one or more optional analog filters 6010.1 to 6010.N, one or more samplers 6011.1 to 6011.N, and one or more integrators 6012.1 to 6012.N. The numbers of analog filters 6010.1 to 6010.N, samplers 6011.1 to 6011.N and integrators 6012.1 to 6012.N may differ from each other.

The analog filter(s) 6010.1 to 6010.N may select one or more frequency channels. Similarly, the sampler(s) 6011.1 to 6011.N, and/or integrator(s) 6012.1 to 6012.N may select one or more frequency channels. A plurality of samplers may be coupled to a single analog filter. A plurality of samplers, such as samplers 6011.1 to 6011.N, may be provided by a single sampler that collects samples and a selector (not shown) that selects collected samples to provide different samples rates and/or sample intervals. The integrators 6012.1 to 6012.N may include combiners (e.g., adders), accumulators, and/or storage devices.

FIG. 61 illustrates basic components of a repeater that converts a received signal into overlapping, orthogonal CI components, processes the components, and recombines the processed components prior to transmitting the combined components. The repeater includes an orthogonal-frequency filter 6101, a sub-carrier processor 6102, and an inverse orthogonal-frequency filter 6103.

The orthogonal-frequency filter 6101 is a filter that is adapted to decompose a received signal into a plurality of CI components. The filter 6101 may down convert the received signal into one or more baseband and/or IF signals. Various methods of down conversion may be performed, such as mixing, passband sampling, or any appropriate zero-intermediate-frequency process. The down-converted signals may be converted to digital signals in an A/D process prior to, during, or following down conversion. The sub-carrier processor 6102 may be adapted to filter one or more CI components, or otherwise mitigate noise and/or interference. The processor 6102 may perform channel compensation of transmitted and/or received signals. The processor 6102 may perform pre-distortion processing. The processor 6102 may be adapted to perform various data-processing applications.

The inverse orthogonal-frequency filter 6103 may be adapted to combine the processed signals prior to transmitting the signals into a communication channel (not shown). The filter 6103 optionally performs amplification. The filter 6103 may include an up sampler, an inverse Fourier transform, an up converter, a filter bank (such as a reconstruction filter bank), an amplifier, a D/A converter, an array-processing system, and/or any other appropriate pre-transmission system or device.

FIG. 62 illustrates basic components of a CI receiver coupled to a plurality of array elements 6200. The array elements 6200 may include one or more RF processors (not shown) adapted to perform RF-signal processing, such as amplification and filtering. An orthogonal-frequency filter bank (OFFB) 6201 is adapted to separate one or more single-carrier signals generated by the array 6200 into a plurality of CI carriers. A CI carrier may be a modulated carrier signal or a complex value related to at least one information signal value in a particular CI carrier band. One or more filters in the OFFB 6201 may be coupled to each element of the array 6200. The OFFB 6201 may be adapted to perform typical front-end processes, such as, but not limited to, A/D conversion, down conversion, demodulation, and channel selection.

Various signal processing functions may be applied to the CI carrier signals in an optional processor 6202. These processes may include one or more of the following; channel compensation, interference mitigation, carrier weighting, multi-user detection, demodulation, demultiplexing, despreading, A/D conversion, down conversion, beam forming, interferometry, matched filtering, convolution, and decoding. The CI components are combined in a combiner 6203. The combiner 6203 may perform one or more types of signal combining, including optimal combining.

FIG. 63 illustrates basic components of a matched-filter CI receiver adapted to process received single-carrier signals. Received single-carrier signals are processed in a down converter 6301. Down-converted signals are digitized in an A/D converter 6302 prior to being processed in an OFFB, such as an FFT 6303. In some applications, the A/D converter 6302 and the down converter 6301 may be embodied by an anti-aliasing filter (not shown) and a passband sampler (not shown).

The FFT 6303 separates the received single-carrier signal into a plurality of CI component signals that are correlated with a plurality of reference component signals. A CI reference generator 6310 generates the reference component signals and provides the signals to a correlator 6304. The correlator 6304 output may be coupled to one or more additional signal processing systems (not shown).

An embodiment of the CI reference generator 6310 includes a single-carrier reference-signal generator 6311 coupled to an OFFB, such as an FFT 6312. The FFT 6312 separates the single-carrier reference into a plurality of reference component signals.

The correlator 6304 may include a plurality of matched filters (not shown) adapted to process each CI component signal/reference component signal pair. In one embodiment, the FFT 6303 may be provided with a processor (such as the processor 6202 shown in FIG. 62) to compensate for channel effects and/or interference. In an alternative embodiment, a processor and a combiner (such as the processor 6202 and the combiner 6203 shown in FIG. 62) are coupled between the FFT 6303 and the correlator 6304, and the CI reference generator 6310 is adapted to generate a single-carrier reference signal. The correlator 6304 is adapted to correlate the processed and combined received signal with the reference signal.

FIG. 64A illustrates a CI receiving method adapted to process a single-carrier signal. Received signals are optionally down converted 6401 to one or more baseband or IF signals. Down conversion 6401 may include anti-aliasing filtering and passband sampling. Down conversion 6401 may include selecting and/or adjusting sample widths and/or integration times. Down-converted signals may optionally be filtered 6402. Filtering 6402 may include channel selection.

A received single-carrier analog signal is converted to a digital signal in an A/D conversion step 6403. The digital samples are provided to an OFFB step 6404 that separates the digital signal into a plurality of CI carriers or CI-carrier values. The carriers or carrier values are optionally processed in a processing step 6405 before being combined in a combining step 6406. Processing 6405 and combining 6406 may be characterized by optimal combining. The processing step 6405 may include one or more of the following; channel compensation, interference mitigation, noise mitigation, weighting, multi-user detection, demodulation, demultiplexing, despreading, A/D conversion, down conversion, beam forming, interferometry, matched filtering, convolution, and decoding.

FIG. 64B illustrates basic steps of a CI reception method. A received single-carrier signal is decomposed into a plurality of CI components in a decomposition step 6410. The received signal may be an analog or a digital signal. An analog signal is typically decomposed into a multicarrier analog signal or a plurality of complex values representing carrier values. A digital signal may be decomposed into a plurality of analog carriers whose superposition represents time-domain characteristics of the digital signal. The received signal may be a multicarrier signal. However, the decomposed carriers do not need to correspond to the received carriers.

The decomposed signal components may be processed in an optional processing step 6411 prior to combining 6412. Various processing and combining steps may be performed, as described throughout the specification.

FIG. 64C illustrates basic steps performed by a CI receiver. Channel estimation 6420 is performed using blind adaptive techniques and/or training signals. Channel selection 6421 is performed based on channel estimation and/or multiple-access considerations. Received signals are decomposed 6422 into CI component signals, which may optionally be processed in one or more processing steps 6423. The CI components signals are combined in a combining step 6424.

12. SOFTWARE-DEFINED IMPLEMENTATION OF CI SYSTEMS

The primary issue facing the wireless communication industries is how to use the available spectrum most efficiently given current channel conditions and user demands. Existing wireless systems do not address this issue effectively because the physical-layer functionality is fixed while channel conditions and network traffic can change rapidly.

Recently, the concept of an adaptable network based on software-defined transceivers has been introduced. However, the implementation of this concept has been limited by conventional technologies. Currently, software-defined radio is limited to unsophisticated switching schemes between dedicated hardware components, thus, providing only a primitive form of interoperability between only two or three transmission protocols.

One of the goals of software-defined networks is to enable a more dynamic organization of resources. In order to achieve this goal, software radio should enable dynamic adaptations of all communication layers, including the physical layer, which is typically implemented in hardware. As a result of the limitations of conventional radio technologies, prior-art software radio development is directed primarily toward interoperability problems resulting from different cellular standards. The implementation of CI-based technologies provides the adaptability and low complexity necessary to implement a software-defined solution for wireless networking.

CI systems and methods described herein have applicability to wireless and guided-wave systems including, but not limited to, base stations, mobile transceivers, fixed subscriber units, routers, gateways, patches, and repeaters. Adaptable CI implementations of the invention may include providing communication between devices that utilize different transmission standards. CI systems may provide associated control operations, such as identifying a particular transmission protocol used by a particular device, reserving channels for transmission, monitoring channel use (including channel reservation and channel release), requesting data transmissions and/or state information from remote devices, attaching tags to data streams for identification and/or access control, and providing instructions to remote transceivers to adjust or control processing, transmit status information, and/or identification.

A CI-based software radio can extend adaptive link-layer techniques to the physical layer. This enables more efficient use of the spectrum by dynamically adjusting physical-layer characteristics to current channel conditions, network traffic, and application requirements. CI can significantly improve wireless network performance and functionality by adapting to different requirements for bandwidth, error rate, latency, link priority, and security.

Embodiments of a CI-based communication system may include interactive capabilities between the physical layer and higher layers such that a response to changing conditions and operational requirements can be directed to an appropriate physical-layer function. For example, a base station in a mobile wireless network can dynamically create channels depending on the number of mobile units in its coverage area and their service requirements. When additional units enter the area, system bandwidth can be assigned accordingly.

In ad-hoc networks, base station functions (e.g., routing, power control, synchronization, geo-location services, etc.) may be distributed among subscribers and repeaters. CI is an ideal technology for mitigating multipath effects, which can be particularly sever in ad-hoc networking environments. The performance benefits of CI can be used to greatly reduce subscriber-unit emissions for those units that perform routing and relay functions. CI can also be used to adapt base-station and access-point functions to maintain link quality and perform load balancing (e.g., managing power budgets for devices acting as routers and relays, managing system spectrum allocations, and adjusting cell boundaries to adapt to changing user demands, power budgets, and spectrum use.

Bandwidth can be dynamically allocated to up-stream and down-stream channels depending on network traffic characteristics. Units requiring real-time or broadband services may be assigned to dedicated channels, whereas units having bursty data requirements may be assigned to a shared channel.

The proposed CI network adjusts time-domain and frequency-domain characteristics of transmissions by applying weights to the CI carriers. Thus, CI carriers can be processed to produce signals having various physical-layer characteristics:

- Multiple-access protocols (e.g., DS-CDMA, TDMA, OFDM, MC-CDMA)
- Channel codes
- Modulation types (e.g., phase modulation, frequency modulation, amplitude modulation, time-offset modulation, etc.) and modulation levels (e.g., binary, M-ary)
- Multiplexing (e.g., TDM, FDM, CDM)
- Formatting (e.g., frame length, headers, payload length, etc.)
- Source coding
- Frequency agility (e.g., frequency hopping, variable aggregate bandwidth, frequency selectability, etc.)

Conventional software-based radios can provide adaptability to different communication standards. However, conventional software-based systems have the associated complexity of performing many physical-layer and related processes via separate functional processes. This complexity necessitates multiple processors, resulting in greater system cost and complexity than conventional hardware-based systems.

Alternatively, a CI-based software-defined radio simultaneously performs many processing functions via sub-carrier selection and weighting. The selection of CI carrier frequencies and the application of weights consolidates many of the physical-layer processes, which are typically performed in multiple stages using different signal-processing techniques.

FIG. 65 illustrates how basic physical-layer functions can be combined into three processes: CI carrier and weight calculation 6511, CI carrier selection 6512, and CI carrier weighting 6513. A selection of appropriate carriers and the application of carrier weights can provide basic physical-layer transceiver processes, such as formatting and source coding 6501, encryption 6502, channel selection 6503, channel coding 6504, multiplexing 6505, modulation 6506, spread-spectrum processing 6507, and multiple-access processing 6508. In one set of embodiments, the physical-layer processes are performed via software-controlled processes. Optionally, A/D conversion 6509 and frequency conversion 6510 may be performed via harmonic and/or sub-harmonic processes 6515. A/D conversion 6509 may be integrated into frequency conversion 6510 and/or Fourier processes 6514.

CI-based systems process wideband signals as a superposition of narrowband signals. In addition to enabling slow, parallel processing, which facilitates the implementation of software-based processing and simplifies the required microprocessor architecture, a CI transmitter can process carriers to improve performance in the following ways:

Apply pre-distortion weights to compensate for multipath fading.

Eliminate carriers having deep fades and/or high interference.

Adapt to different spectrum allocations.

Operate across non-contiguous frequency bands.

Achieve wideband frequency-diversity benefits for a narrowband data channel.

Similarly, a receiver can process received CI carriers in the following ways to achieve various performance and system benefits:

Apply post-distortion weights to compensate for multipath fading.

Disregard carrier frequencies having deep fades and interference.

Filter noise and/or interference on each carrier.

Perform multi-user detection to mitigate interference.

Perform space-frequency processing to achieve spatial diversity and/or enhance bandwidth efficiency.

Various sub-layer processes may be implemented in software. This enables a CI-based system to be reprogrammed such that various processing functions (e.g., pulse shaping, sub-carrier selection, sub-carrier weighting, coding, modulation, power control, spatial processing, multiplexing, multiple access, combining, decision, feedback, process control, etc.) can be adapted to different applications and system requirements.

FIG. 66 illustrates an embodiment of a CI-based software-defined radio. A software implementation of a CI-based transceiver may include one or more signal processing hardware components 6603.1 to 6603.*j* and one or more CI-based signal processing software components 6601.1 to 6601.*i*. The software components 6601.1 to 6601.*i* may reside on one or more of the hardware components 6603.1 to 6603.*j* or on one or more additional hardware components that are not shown. For example, the software components 6601.1 to 6601.*i* may reside on a computer main frame or a workstation. At least one of the hardware components 6603.1 to 6603.*j* may be coupled to at least one of the software components 6601.1 to 6601.*i* by at least one interface 6602. The interface 66021 may optionally couple together hardware and/or software components.

The software components 6601.1 to 6601.*i* may include at least one local and/or remote computer program adapted to process signals received from the hardware components 6603.1 to 6603.*j*. The software components 6601.1 to 6601.*i* may include one or more application programs for performing digital signal processing. One or more software components 6601.1 to 6601.*i* may provide control signals to one or more hardware components 6603.1 to 6603.*j* to select, adapt, or alter signal processing. The interface 6602 may include a bus or network (not shown). The interface 6602 may include one or more radio interfaces.

The hardware component(s) 6603.1 to 6603. j typically include a transmitter and/or receiver system, and a storage medium (e.g., disk drive, tape drive, CR Rom, DVD, flash memory, or any other storage device) for storing application programs and data. Hardware and/or the software may perform A/D conversion, as necessary. In some applications, modulation and/or demodulation may be performed digitally with any combination of software 6601.1 to 6601.*i* and hardware 6603.1 to 6603.*j* components.

In one set of embodiments of the invention, control signals are provided to the hardware components 6603.1 to 6603.*j* over one or more communication channels normally processed by the software radio. For example, a software component (such as at least one of the software components 6601.1 to 6601.*i*) residing at a remote receiver location may receive signals transmitted by the radio, process the received signals, and convey some control information in the data stream (e.g., in a header or pilot channel) to the hardware components 6603.1 to 6603.*j*. Much of the signal processing in a radio network may be performed by a single processing system (such as a base station) to reduce the cost and complexity of mobile transceivers. Alternatively, signal-processing operations may be distributed throughout the network in a way that balances processing and/or communication-resource (e.g., spectrum use) loads.

One or more software components 6601.1 to 6601.*i* may be replaced to provide different signal processing and/or control features. In another set of embodiments of the invention, software is uploaded to a remote transceiver via one or more communication channels normally processed by the software radio. This simplifies software updates and enhances signal-processing versatility of the network.

Conventional software-based radios can provide adaptability to different communication standards. However, conventional software-based systems have the associated complexity of performing many physical-layer and related processes via separate functional processes. This complexity can necessitate multiple processors, resulting in greater system cost and complexity than conventional, substantially hardware-based, systems.

Alternatively, CI-based software-defined radio simultaneously performs many processing functions via sub-carrier selection and weighting. CI-based protocols greatly exceed the performance (e.g., throughput, system capacity, bandwidth efficiency, power efficiency, probability of error, interference mitigation, and range) of any conventional software radio while enabling backward compatibility with all conventional transmission and multiple-access protocols. Furthermore, CI provides a framework to migrate all transmission protocols to a common high-performance platform that is suitable for all applications.

FIG. 67 illustrates basic baseband-processing components of a CI transceiver. A transmit data stream is processed by an encoder/interleaver system 6710 that provides parallel data streams to an IFFT processor 6711. In-phase and quadrature-phase transmit signals are generated by either the IFFT processor 6711 or one or more subsequent signal-processing systems (not shown).

Received data signals are separated into sub-carrier components by an FFT processor 6721. Sub-carrier values are combined by a combining system 6722 prior to being decoded in a decoder/de-interleaver system 6723. Various control signals may be generated throughout the receiver processing operations. For example, performance measurements (e.g., BER, SNR, SNIR, etc.) of received data symbols may be used to adjust various operations, such as combining. Received data symbols may be used to adjust gain control of either or both of the transmit side and the receive side of the transceiver. The combining system 6722 may generate control signals to adjust the function of the encoder/interleaver system 6710 and/or the decoder/de-interleaver system 6723. Similarly, other control schemes that are well known in the art may be performed by the transceiver.

In a CI transceiver, the combiner 6722 may analyze one or more signal characteristics (e.g., bit rate, modulation type, modulation characteristics, symbol constellation, processing gain, and directionality), one or more link characteristics (e.g., priority, security requirements, quality of service requirements, application requirements, information type, spectrum use, channel separation, coverage, and network topology), and/or one or more signal measurements (e.g., SNR, SNIR, probability of error, BER, soft decisions, signal power, Doppler effects, phase jitter, channel estimation, and synchronization). Based on this analysis, the combiner 6722 may be adapted to select and/or adapt one or more transceiver systems and/or functions described throughout the specification. Various processing characteristics that the combiner 6722 may select and/or adapt include filter parameters, channel selection, interference filtering, channel compensation, sample rates, sample widths, number of samples per sample interval, sample-interval duration, sample selection, sample grouping, decimation, quantization, synchronization, local oscillator amplitude, reference signal phase, gain, detector threshold, constellation, processing gain, modulation, demodulation, multiplexing, demultiplexing, multi-user detection, multiple access, formatting, source coding, beam forming, null steering, interferometry, combining technique, waveform shaping, coding, and/or system resource allocation (e.g., CPU use, memory, spectrum, power, etc.).

Software may be used to adapt the basic baseband-processing components to constraints imposed by the propagation environment, network load, quality of service, link priorities, differentiated security requirements, spectrum-use regulations, power constraints, latency requirements, interference, and jamming. Furthermore, the baseband-processing components shown in FIG. 67 may be adapted to provide additional processing functions, such as up conversion, down conversion, and demodulation.

In CI-based systems, as well as in software radio, modulation parameters (e.g., type of modulation, modulation level, etc.) may be adjusted with respect to one or more constraints, such as bandwidth efficiency, probability of error, latency per bit, and power consumption. Coding may be controlled with respect to similar parameters including probabilities for detected and/or undetected errors. Code control may include selecting and/or adjusting any combination of code types, individual codes, code lengths, code generation, and decoding. A unique aspect of CI is that it enables modulation and coding-related constraints to be addressed via sub-carrier selection and weighting, thus, reducing or obviating the need for adjusting modulation and coding parameters.

FIG. 68 illustrates transmission methods 6810 and reception methods 6820 of the present invention. Steps within the methods 6810 and 6820 can be regarded as functional blocks or systems within a CI transceiver. Various systems and methods not shown are implied. For example, various steps and components may be synchronized. Synchronization may include open loop and/or closed loop transmitter synchronization. Phase synchronization may be performed via phase-locked loops. Synchronization can include carrier synchronization, sub-carrier synchronization, symbol synchronization, frame synchronization, and/or network synchronization. Filtering, amplification, as well as other signal-processing steps and systems may be included within the steps shown in FIG. 68.

Signals from an information source (not shown) are provided to a formatting step 6801 followed by a source-encoding step 6802. Encoded signals are encrypted 6803 and provided with channel coding 6804 before being multiplexed 6805. A modulation step 6806 is performed before spreading 6807 and multiple-access processing 6808. A transmission step 6809 processes and transmits the resulting signals into a communication channel 99.

Transmitted signals are coupled out of the channel 99 in a reception step 6819. The received signals are processed in a multiple-access step 6818. The signals are despread 6817, demodulated 6816, and demultiplexed 6815 prior to channel decoding 6814. The decoded signals are decrypted and processed in source decoding and formatting steps 6812 and 6811 before being coupled to an information sink (not shown).

In one set of embodiments, at least some of the steps illustrated in FIG. 68 and their corresponding system components can be combined. In other set of embodiments, one or more of the steps and corresponding system components may be omitted. For example, essential transmitting steps include formatting 6801, modulation 6806, and transmission 6809. Essential receiving steps include reception 6819, demodulation 6816, and formatting 6811. All other steps shown in FIG. 68 are optional.

The formatting step 6801 may process a source signal (e.g., data, a message, an information signal) to make it compatible with digital signal processing. Data, a message, or an information signal describes a signal whose spectrum extends from (or near) d.c. up to a finite value. This is also referred to as a baseband or low-pass signal.

FIG. 69A illustrates how digital, text, and analog signals are formatted for different information signals. Digital information is typically passed through to a waveform-encoding step 6824. However, in some applications, digital information may be reformatted. Text information is first encoded into a sequence of bits in an encoding step 6823. Groups of k bits may be combined to form symbols from an alphabet of $M=2^k$ symbols.

An analog signal is sampled in a sampling step 6821 to produce a discrete pulse-amplitude-modulated waveform. Sampling 6821 can include impulse sampling, natural sampling, sample and hold, over sampling, under sampling, as well as any other form of sampling. Preferably, sampling 6821 is provided as part of a CI-based method or system. For example, CI sampling, orthogonal frequency Fourier transforms, and/or other CI-based procedures or components may include at least one sampling method or system. An anti-aliasing filter (not shown) may be provided prior to sampling. Post filtering may be performed following sampling 6821 to remove aliased signal components. The sampled signal is passed to a quantizer 6822 prior to being coded 6823.

Pulse-code modulated (PCM) symbols may be generated from quantized pulse amplitude modulated signals. Analog signals are sampled and uniformly or non-uniformly quantized to one of L levels. Each quantized sample is then digitally encoded into a length $\log_2 L$ codeword. PCM waveform types include non-return-to-zero, return-to-zero, phase-coded, and multi-level binary. Different waveform types within each PCM classification, as well as other PCM waveform types, may be generated by providing appropriate weights to CI carriers. Similarly, multi-level signals may be generated by appropriate CI-carrier weighting.

Pulse-shape selection is typically based on various parameters, including spectral characteristics, feasibility of synchronization, interference and noise immunity, and implementation costs and complexities. Various pulse shapes, including raised cosine, sinc, etc., can be provided by appropriately weighting CI carriers. Roll-off factors can be controlled by adjusting CI carrier weights. Uniformly weighted CI carriers result in a sinc-like function. Various windowing techniques may be used to generate CI superpositions having predetermined time-domain characteristics.

Pulse overlapping may be performed, such as to generate substantially orthogonal symbol positions, information-channel positions, and/or multiple-access channels. Pulse overlapping may be performed via appropriate CI carrier weighting. Pulse overlapping may also be performed via suitable time-domain delay and overlapping methods. Although pulse overlapping is shown with respect to CI signals, any pulse shapes may be overlapped. Furthermore, pulse shapes may be adjusted to reduce interference between overlapping pulse shapes.

Source coding 6802 forms efficient descriptions of information sources that improve the SNR for a given bit rate or improve the bit rate relative to a given SNR. Source coding can include differential pulse code modulation, block coding, synthesis/analysis coding, and/or redundancy-reducing coding. CI can easily be integrated into all types of coding. CI also provides diversity benefits that reduce signal degradation due to noise, interference, and distortion. CI diversity benefits can simultaneously enhance throughput and SNR. CI codes include multicarrier-based direct-sequence CI codes, polyphase CI codes, poly-amplitude CI codes, or any combination thereof.

The encryption step 6803 provides link privacy and user authentication. Various data-encryption techniques may be integrated into a CI carrier weighting process. Furthermore, various physical-layer encryption techniques may be used. For example, DSSS and FHSS can provide some security while enabling processing gain and multiple access. CI direct-sequence and frequency-hopping code security may be enhanced by adjusting code sequences, code lengths, or a combination of physical signal parameters and/or processes used to encode and/or encrypt information.

Diffusion describes a process of smoothing out statistical fluctuations in a transmission signal. For example, the pseudo-random nature of some direct-sequence codes provide a Gaussian-like energy distribution in the frequency domain. CI may be used to effect diffusion by minimizing PAPR, enabling high processing gains, and lowering spectral power densities by spreading information signals across non-contiguous frequency bands.

Channel coding 6804 improves communication link performance by enabling the transmitted signals to better withstand the effects of various channel impairments, such as fading, noise, and interference. Channel coding 6804 may include channel estimation, which can be performed by processing the complex carrier amplitudes of received CI signals. Channel coding 6804 may be implemented by applying appropriate weights to CI carriers to generate predetermined time domain channel codes. Similarly, CI carrier weighting may be performed to generate signals having other predetermined diversity-parameter characteristics.

Waveform coding may utilize CI codes. For example, waveform codes may include orthogonal and/or bi-orthogonal CI codes. Similarly, trans-orthogonal or simplex CI codes may be used. CI coding may also be combined with higher-order (M-ary) modulation to provide waveform coding in bandwidth-limited channels (i.e., where bandwidth expansion is not possible). For example, Trellis-coded CI modulation may be used. Structured sequences add parity digits to data such that the parity digits can be employed for detecting and/or correcting specific error patterns. Error-correcting codes (e.g., forward-error correction or error detection codes) may be based on CI coding. CI coding may be applied to block coding and convolutional coding. Polyphase CI codes may be implemented as cyclic codes.

The multiplexing step 6805 controls a user's access to a fixed communication resource. Multiplexing provides the means to efficiently allocate portions of the communication resource to a number of users. Basic multiplexing and multiple-access techniques include frequency division, time division, code division, space division, and polarization division. Each of these techniques can be performed in a CI-based system by appropriate selections and/or adjustments of CI carriers.

CIMA can be represented as a type of multiplexing based on interferometry division. Although CIMA resembles code division multiple access because its phase spaces can be regarded as polyphase codes (particularly, time-domain CI codes), CIMA can be adapted to CDMA, TDMA, and frequency division multiple access.

The modulation step 6806 involves choosing a modulation type to achieve a desirable balance between various objectives, such as maximizing throughput, minimizing probability of error, optimizing bandwidth efficiency, improving SNR, and reducing system costs and complexity. Modulation may be coherent or non-coherent. Modulation may be analog or digital. Modulation may include phase modulation, amplitude modulation, frequency modulation, or any of various hybrid modulation techniques. Modulation may include continuous-phase modulation.

Modulation is provided in a CI-based system by modulating one or more CI carrier values. CI may be referred to as a form of multicarrier modulation. For example, phase modulation is provided to a CI superposition signal by phase-modulating the individual carrier components. Amplitude modulation is performed by adjusting one or more CI carrier amplitudes. Frequency modulation may be performed by any combination of selecting CI carrier frequencies and adjusting the carrier values.

The spreading step 6807 may include redundantly modulating data symbols over a plurality of carriers. Frequency-domain spreading may be provided via conventional direct-sequence coding and/or CI coding. This type of coding may be generated by any combination of selecting and adjusting the CI carriers. CI carriers may be selected to span discontinuous frequency bands, avoid interference and/or jamming, and/or mitigate the effects of multipath fading.

Multiple access 6808 may include any number of polling and access algorithms. For example, carrier sense or token ring multiple access techniques may be employed. Physical layer multiple access is preferably employed at the CI-carrier level. Framing can involve providing a predetermined number of symbols in a fixed time interval. In CI systems, framing can be performed by selecting a number of CI carriers that is related to the number of symbols in a frame. The frequency separation between carriers may be related to the inverse of the frame duration. Data symbols are positioned in the frame via carrier weighting, which may be adjusted at frame-duration intervals.

Headers, trailers, training sequences, payload segments, and other symbol groupings (even discontinuous groupings) may be regarded as subframes and processed in the same way as frames are processed. In one set of embodiments, subframes may be processed and then combined temporally. In another set of embodiments, each subframe may be processed as a subset of carriers. In yet another set of embodiments, each subframe is processed simultaneously as a calculation or application of weights to at least a subset of CI carriers. The calculations or weights are combined to generate an aggregate carrier-weight set that generates a superposition signal indicative of the frame. Higher-than-physical-layer techniques are typically performed by systems that may provide control signals to adjust carrier weighting and/or selection to implement the physical-layer controls for multiple access.

The transmit step 6809 may preprocess the modulated signals to optimize the signals for transmission in the channel 99. Basic components of a transmitter typically include a frequency up-conversion stage, a power amplifier, and an output coupler (e.g., an antenna). The transmit step 6809 may include selecting or adjusting transmitted signal frequencies to mitigate interference, reduce the effects of channel distortion, provide power control, and/or conform to spectrum allocations. The transmit step 6809 may provide carrier weighting for beam forming or other spatial interferometry applications. The transmit step 6809 may filter or predistort the transmitted signals. The transmit step 6809 may further include one or more adaptation steps (not shown) that provide for adjustment of transmission and/or transmit-signal characteristics based on feedback or blind adaptive processing.

The receive step 6819 couples transmitted signals out of the channel 6819 and optionally converts the received signals into a form that facilitates IF and/or baseband processing. Basic components of a receiver include an input coupler for receiving signals from the channel 99, a low-noise amplifier, and a down-converter stage that down converts received signals to IF or baseband. The receive step 6819 may include selecting or adjusting received signal frequencies to mitigate interference, reduce the effects of channel distortion, provide channel selection, and/or optimize some performance measurement. Weights may be applied to received signals for beam forming, spatial interferometry, and/or optimal combining. The receive step 6819 may include adaptive processing and/or probing techniques that adjust one or more physical parameters of the received signals. The receive step 6819 may generate commands based on channel estimates to control transmission characteristics of a local or remote transmitter.

The multiple-access step 6818 selects one or more signals by processing CI carriers. Alternatively, conventional demultiplexing techniques can be used. A CI superposition signal has similar time-domain characteristics as a conventional single-carrier signal.

Frequency-division demultiplexing can be performed by selecting predetermined CI carriers following a Fourier transform or other filtering operation. Code-division demultiplexing can be performed by frequency-domain decoding. Demultiplexing in the spatial domain can involve providing weights to carriers from each of a plurality of receiver elements to separate desired signals from interfering signals. Similarly, spatial processing can be performed via frequency-diversity interferometry.

Time-division demultiplexing can be performed by matched filtering, orthogonal frequency Fourier transforms, or equivalent signal-processing techniques applied to CI carriers. An advantage of CI-based reception of time-domain signals is that each symbol is processed over a time interval that is substantially longer than the apparent symbol (e.g., pulse) duration. The symbols are also processed in parallel. These signal-processing advantages enable the adaptation of conventional parallel processing to CI systems. Low-speed parallel processing also facilitates the implementation of software-based applications (such as error detection, error correction, authorization, verification, and other security-related applications) for high-speed communication networks.

The despreading step 6817 can involve spread-spectrum decoding and/or carrier selection and grouping. Decoding can take the form of code-division demultiplexing. Since CI carriers corresponding to a particular channel or user can be distributed over one or more frequency bands, carrier selection follows a filtering operation that separates a received CI signal into its carrier components.

The demodulation step 6816 may include coherent or non-coherent detection. Detection may include sampled matched filtering, envelope detection, differential detection, correlation, etc. These techniques can be performed with respect to individual carriers or with respect to a superposition of the carriers. In some cases, an orthogonal sample-and-sum operation can provide filtering and demodulation.

The demultiplexing step 6815 can be provided to the CI carriers in a combining step. Channel decoding 6814, as well as other steps in the receiver 6820 may include carrier selection, time interval selection (e.g., integration period), weight generation, carrier weighting, and/or combining.

The decryption step 6813 provides any necessary physical-layer and/or data-layer decryption. Physical layer decryption may include carrier-frequency selection, spread-spectrum decoding, carrier-phase decoding, time-base decoding (e.g., pulse-position decoding, time-hopping decoding, space-time decoding, etc.), signal de-masking, polarization decoding, and/or any other diversity parameter related decoding. Data-layer decoding may be performed via carrier processing. For example, a data decryption key may be translated into complex carrier weights that are provided to CI carriers or signal values derived from the carriers. Alternatively, data decryption may be performed following CI carrier processing.

The source-decode step 6812 and/or the formatting step 6811 reduces a received waveform to a set of numerical values. This operation can be performed with a linear filter coupled to a sampler. Similarly, a matched filter or correlator may be used. Signal detection provides a comparison of the value set to a threshold level or a constellation of values.

FIG. 69B illustrates different embodiments of the formatting step 6811 relative to the type of information being processed by the receiver 6820. Signals processed by a waveform detector 6831 are output for formatting 6811. The formatting step 6811 passes digital information, performs decoding 6832 for textual information, and provides an additional step of low-pass filtering 6833 for analog information. The formatted information may be provided to an information sink (not shown).

A receiver may process a received signal by one or more detection schemes, including matched filtering, optimal combining, and multi-user detection. CI can be used in one or more of these detection schemes. In one example, CI sampling provides a simplified form of matched filtering. Formatting 6811 may include source coding and decoding processes, such as block coding, synthesis/analysis coding, redundancy-reducing coding, etc. CI coding may be used in source coding and decoding processes.

13. CI SAMPLING

Principles of CI may be applied to many different types of signal processing. In one set of embodiments of the invention, sample values are collected and processed according to mathematical principles of CI. In one aspect of the invention, correlation and filtering (such as matched filtering) may be performed without multiplication. In another aspect of the invention, various types of spectrum analysis and synthesis may be performed to provide a substantial reduction or elimination of complex multiplications and/or additions. In another aspect of the invention, phase and/or amplitude adjustment is provided to the samples to compensate for interference, noise, and/or channel distortion (such as multipath effects).

Applications of CI to sampling include processing received CI carrier signals and/or separating a received signal into a plurality of orthogonal CI signals. The process of decomposing a signal into one or more orthogonal carrier components involves selecting an appropriate sampling interval (i.e., symbol duration $T_s$) relative to the carrier-frequency separation $f_s$. Similarly, various CI techniques for generating CI-based signals include selecting a symbol duration $T_s$ corresponding to the carrier-frequency separation $f_s$.

FIG. 70 shows three orthogonal waveforms 7001, 7002, and 7003 separated in frequency by integer multiples of a separation frequency $f_s$. In some cases, the waveforms 7001, 7002, and 7003 may be sub-carrier modulations. Similarly, the waveforms 7001, 7002, and 7003 may be characterized by orthogonal circular (or elliptical) polarization spin frequencies. Data symbols may be impressed onto each waveform within a symbol interval $T_s=1/f_s$. The symbol interval and/or adjacent intervals may include guard intervals and/or cyclic prefixes, which are well known in the art.

In order to separate a data symbol modulated on a particular waveform from interference contributed by other waveforms, the set of waveforms is first sampled at a sampling frequency $f_{sample}$ that equals a desired waveform frequency $f_n$, or some harmonic or sub-harmonic thereof. The desired waveform's frequency $f_n$ can be expressed as:

$$f_n=f_o+nf_s$$

where $f_o$ is a base or carrier frequency and n is some integer. In this case, frequencies of the adjacent waveforms can be expressed as:

$$f_{n\pm1}=f_o+(n\pm1)f_s$$

A number N of samples are represented in FIG. 70 by equally spaced time intervals 7010.0 to 7010.N corresponding to an integer multiple of a desired waveform's period. In this example, the sample intervals 7010.0 to 7010.N intersect the peaks of a desired waveform. However, the sample intervals 7010.0 to 7010.N intersect the other waveforms at various parts of their cycles. An important aspect of the invention involves selecting the time interval (or symbol duration $T_s$) over which samples are combined. The symbol duration $T_s$ defines the frequency spacing $f_s=1/T_s$ of orthogonal waveforms. When N samples collected over a period $T_s$ are combined, a desired signal can be separated from interfering signals modulated on orthogonal waveforms.

One type of sampling that may be performed with CI sampling methods (as illustrated in FIG. 70) is known as under sampling, which is described by the well-known Passband Sampling Theorem. An improvement provided by CI sampling consists of combining samples obtained during one or more symbol intervals $T_s$ to separate at least one desired symbol from symbols impressed on other waveforms.

The following explanation illustrates a simple case in which symbols are demodulated from one particular sub-carrier frequency in the presence of other sub-carrier frequencies. In this case, $f_{sample}=f_n$. FIG. 71A is a normalized complex-plane representation of how the sampling rate $f_{sample}=f_n$ relates to the desired waveform's frequency $f_n$. Since $f_{sample}=f_n$, the samples always occur on the same part of the complex plane, such as on the real axis at 1. The number of samples $N_s$ per symbol interval $T_s$ is expressed by:

$$N_s=f_{sample}T_s=(f_o+nf_s)/f_s$$

The number of samples per waveform period $(1/f_n)$ is 1.

FIG. 71B and FIG. 71C are normalized complex-plane representations of how the sampling rate $f_{sample}$ relates to frequencies of the adjacent waveforms. The number of samples per period of the adjacent waveform having frequency $f_{n-1}$ can be expressed as:

$$N_{n-1}=\frac{f_{n-1}}{f_{sample}}=1-\frac{f_s}{(f_o+nf_s)}$$

FIG. 71B shows each subsequent sampled value shifted by:

$$\phi_{n-1}=-\frac{f_s}{(f_o+nf_s)}2\pi\text{ radians.}$$

Since there are $N_s=(f_o+nf_s)/f_s$ samples per symbol interval $T_s$, the vector samples fill one full rotation of the normalized complex plane, as shown in FIG. 72. Thus, the vector sum of the samples is zero.

The number of samples per period of the adjacent waveform having frequency $f_{n+1}$ can be expressed as:

$$N_{n+1}=\frac{f_{n+1}}{f_{sample}}=1+\frac{f_s}{(f_o+nf_s)}$$

FIG. 71C shows that in the complex plane, the sampled values shift by an amount:

$$\phi_{n+1}=\frac{f_s}{(f_o+nf_s)}2\pi\text{ radians.}$$

The $N_s$ samples collected throughout the symbol interval $T_s$ also precess through one full rotation of the complex plane, but in the opposite direction. The vector sum of these samples (also represented by FIG. 72) is zero.

The number of samples per period of any adjacent waveform having a frequency $f_{n\pm n'}$ can be expressed as:

$$N_{n\pm n'}=\frac{f_{n\pm n'}}{f_{sample}}=1\pm\frac{n'f_s}{(f_o+nf_s)}$$

In the complex plane, the sampled values shift by an amount:

$$\phi_{n\pm n'}=\pm\frac{n'f_s}{(f_o+nf_s)}2\pi\text{ radians.}$$

$N_s$ samples collected throughout the symbol interval $T_s$ precess through n' rotations of the complex plane and cancel unless $f_{n\pm n'}$ is an integer multiple of $f_n$. The case in which $f_{n\pm n'}=mf_n$ (where m is some integer) can be avoided by providing appropriate frequency adjusting to either or both signal frequencies and sample frequencies. Thus, the vector sum of the samples is zero.

In one aspect of CI sampling, orthogonal frequency channels are easily separated using only sampling and adding processes. One application of this invention includes frequency-division demultiplexing. Coherent CI sampling may be performed by receivers designed for multicarrier transmission protocols, including CI, OFDM, and MC-CDMA.

In-phase and quadrature-phase samples may be generated by sampling at a quarter-wave offset to the sampling period of a first set of samples. FIG. 73 illustrates two sets of samples having the same desired frequency and a π/2 phase offset between them. Both in-phase and quadrature-phase samples of a particular frequency produce the same vector sum of zero for orthogonal frequencies when samples collected over a corresponding time interval $T_s$ are combined.

Any appropriate sampling method may be used to generate in-phase and quadrature-phase samples for the purpose of this invention. In one embodiment, a delay offset is provided to one of two identical timing signals used to trigger a sample-and-hold circuit. In another embodiment, a high-rate timing signal is used to trigger a sample-and-hold circuit and then undesired samples are discarded before combining. In another set of embodiments, an input signal may be under sampled and the in-phase and quadrature-phase samples may have a π/2 phase offset relative to at least one desired frequency components $f_n$. A combining process may include adding and/or subtracting samples. A combining process may optionally include weighting.

FIG. 74A illustrates the combined values of 110 CI samples for each of 400 frequencies in intervals of one cycle per symbol period $T_s$. Since the sampling rate is 110 samples per symbol period $T_s$, non-zero sums occur at 110 cycles-per-symbol intervals. All other integer cycles-per-symbol frequencies correspond to integer-valued rotations around the complex plane that sum to zero.

FIG. 74B illustrates the combined values of 110 CI samples for each of 800 frequencies spaced at 0.05 cycles-per-period intervals and centered at 110 cycles per symbol period. The sums corresponding to non-integer cycles-per-symbol frequencies have non-zero values.

FIG. 74C illustrates a plot of sums of samples collected at a particular sample frequency for different sampled signal frequencies. The sums are from a plurality of samples collected over a given symbol interval $T_s$. The signal frequencies are centered at 110 cycles per symbol and extend 8 cycles per symbol on both sides of the center frequency.

A center peak 7400 may correspond to a signal frequency that is a harmonic or sub-harmonic of the sample frequency. Zero values, such as illustrated by zero-crossing positions 7401 to 7407, occur at integer cycles-per-symbol frequencies relative to the center frequency. The zero-crossing positions, such as positions 7401 to 7407, indicate frequencies that are orthogonal to the center frequency. When generating orthogonal sub-carrier frequencies, it is desirable to position the frequencies at zero crossings, such as illustrated in FIG. 74C. The zero-crossing positions depend on the symbol interval $T_s$ over which the samples are combined, and thus, can optionally be adjusted with respect to adjustments to the symbol interval $T_s$.

FIG. 74C also illustrates contributions of various frequencies to the combined samples. Signals modulated onto frequencies that are not centered at zero-crossing positions contribute non-zero values to the combined samples. In some spectrum-analysis applications, samples that are combined at one or more sample frequencies may be weighted and/or combined with samples collected at one or more different frequencies. Zero-crossing positions, as well as side-lobe height and main-lobe width can be selected and/or adjusted by providing appropriate complex weights to the samples.

FIG. 75 illustrates sums of samples collected at a particular sample frequency $f_n$ for different sampled signal frequencies. A peak 7500 occurs when the sampled signal frequency equals the sample frequency $f_n$. The sum at sample frequency $f_n$ is represented by FIG. 76A, which illustrates each sample as a normalized vector mapped in a complex plane. Because the sample and sampled signal frequencies are equal, each sample coincides with the same location of each period of the sampled signal. In this case, all the vectors map onto each other in the positive real axis (i.e., +1), resulting in totally constructive combining.

A first zero crossing 7501 is illustrated in FIG. 75. The sampled signal frequency equals the sample frequency $f_n$ plus one cycle-per-symbol duration. Thus, the sampled signal frequency $f_{n+1}$ is orthogonal to the sample frequency $f_n$. The sample sum at $f_{n+1}$ is represented by a complex-plane mapping illustrated in FIG. 76B. Because the sample frequency $f_n$ and the sampled signal frequency $f_{n+1}$ differ, the sample values intersect different parts of the sampled signal. Since the frequencies $f_n$ and $f_{n+1}$ are orthogonal and differ by one cycle per symbol duration, the sample values map to uniformly spaced vectors over a unit circle. This results in a vector sum of zero.

A first side-lobe peak 7502 illustrated in FIG. 75 corresponds to a sampled signal frequency that equals the sample frequency $f_n$ plus one and one half cycles per symbol. The sampled signal frequency $f_{n+1.5}$ is not orthogonal to the sample frequency $f_n$. The vectors representing the sample values fill one and one half rotations throughout the complex plane. The vectors in the one-half plane shown in FIG. 76C combine substantially constructively to produce the side-lobe peak 7502. Since approximately two-thirds of the vectors are distributed uniformly throughout one rotation (and thus, cancel), the side-lobe peak 7502 is substantially lower than the main-lobe peak 7500.

A second zero crossing 7503 is represented by a vector mapping illustrated in FIG. 76D. The sampled signal frequency equals the sample frequency $f_n$ plus two cycles per symbol. Thus, the frequencies $f_n$ and $f_{n+2}$ are orthogonal and the sample values map to vectors uniformly distributed around two full unit circles in the normalized complex plane. In this case, the vectors shown in FIG. 76D overlap other vectors.

A second side-lobe peak 7504 corresponds to a sampled signal frequency that equals the sample frequency $f_n$ plus two and one half cycles per symbol. Four fifths of the corresponding vectors are mapped over two rotations in a normalized complex plane and thus, cancel. The remaining vectors are distributed over a half rotation in the complex plane, as illustrated by FIG. 76E. The vector sum produces the peak 7504, which is lower than the first side-lobe peal 7502.

Additional zero crossings and side-lobe peaks, as well as other sums, may be represented by the vector-mapping techniques previously described herein. These techniques may be used to describe, as well as construct, signals having similar characteristics. For example, CI signals, array beam patterns, diffraction patterns, and other types of interference patterns may be described by vector maps and/or constructed using processes that correspond to vector mapping.

FIG. 77A is a functional diagram that illustrates one aspect of coherent CI sampling as it applies to several apparatus and method embodiments of the present invention. The general nature of the functional diagram is the basis of a large number of embodiments of this aspect of the invention.

An input signal $\Sigma s_n(f,t)$ includes multiple signal components having orthogonal frequencies. Other diversity parameters of the components may also be orthogonal. In some cases, orthogonal frequencies may refer to polarization spin frequencies, subcarrier modulation frequencies, array pattern scan frequencies, direct sequence code repetition rates, and/or frequencies that characterize cyclic properties of any other diversity-parameter values.

The input signal is processed in a sampler 7701, which is a device or process that samples an input signal with respect to one or more diversity parameters. In one set of embodiments, the sampler 7701 uses at least one reference timer signal $\tau$ to produce samples in the time domain. The reference timer signal(s) $\tau$ may be generated internally or externally with respect to the sampler 7701. The sampler 7701 may generate one or more sets of samples with respect to one or more diversity parameter values (e.g., timing signals, carrier frequencies, etc.).

In one embodiment, each set of samples corresponds to a different sampling rate. In another embodiment, a first set of samples is collected with respect to one sampling rate $f_{sample}$ and additional sample sets are generated as subsets of the first set. Thus, the subset frequencies $f_{sample}(n)$ are less than the sampling rate $f_{sample}$. In at least one embodiment, the sampler 7701 may sample the input signal at a sampling frequency $f_{sample}$ corresponding to one or more frequencies of the input signal. In at least one embodiment, the sampler 7701 may under sample and/or over sample one or more signal components of the input signal.

Samples from the sampler 7701 are input to a combiner 7702. The combiner 7702 is adapted to sum or otherwise combine two or more samples. The combiner 7702 combines at least one set of samples that corresponds to at least one symbol interval $T_s$. The symbol interval $T_s$ is provided with respect to the relationship $T_s=1/f_s$ such that at least one data symbol on at least one carrier can be separated from interfering data symbols on one or more carriers that are orthogonal to the desired carrier(s). Thus, the process of summing the selected samples over a predetermined symbol interval $T_s$ provides for filtering of orthogonal carriers that are not aliased by the sampling process. In some applications, sampling and summing may be performed to decompose a single-carrier signal into a plurality of predetermined CI carriers. In other applications, a received multicarrier signal may be decomposed into a different set of carrier signals or carrier-signal values.

The sampler 7701 and/or combiner 7702 may include a storage device (not shown) to store samples before combining them. The combiner 7702 may separately combine subsets of samples and/or it may combine all of the samples together. An output signal $s(f_n, t)$ represents the combined samples output by the combiner 7702. In one embodiment, the value of the output signal corresponds to at least one frequency components of the input signal and the sampling frequency $f_{sample}$. The sampling frequency $f_{sample}$ may have the same value as $f_n$, a harmonic off, or a sub-harmonic of $f_n$ in order to extract the value(s) of the input signal associated with $f_n$ particular, this combination of sampling and combining can be used to demodulate data symbols impressed on one or more frequencies $f_n$ without requiring complex digital processing.

The sampler 7701 and/or the combiner 7702 may include a weighting device (not shown) capable of applying weights to the samples and/or sums of the samples. The weights may be complex valued. In some embodiments, weight values may be provided by shifting or otherwise adjusting the order of the samples. These weights may be used to compensate for channel effects and/or signal coding. An optimal-combining process may control the weights to enhance reception of desired signals in the presence of noise and/or interference.

The combiner 7702 may preferentially weight and/or combine certain combinations of samples with respect to the waveform and/or coding of the received signal. Weights may be applied to the received samples to compensate for any mismatch between the sampling frequency $f_{sample}$ and the frequency $f_n$ of at least one desired signal component. If a desired frequency component is over sampled, some of the samples may be disregarded to enhance reception (e.g., improve SNR, SNIR, BER, probability of error, etc.) of the desired signal.

Although FIG. 77A illustrates one type of CI sampling that is useful for separating data symbols impressed on multiple orthogonal frequency channels, variations to this method and apparatus may be employed. Furthermore, CI sampling may be used to separate data symbols modulated onto other orthogonal diversity parameters, such as polarization, time, spreading code, phase space, subspace, angle of arrival, etc.

FIG. 77B illustrates a functional diagram for an apparatus and method of the present invention. An input signal $\Sigma s_n(f,t)$ may include multiple signal components characterized by frequencies that are orthogonal. Alternatively, the input signal $\Sigma s_n(t)$ may include one or more single-carrier signals. The input signal $\Sigma s_n(ft)$ is processed by a sampler 7701 that includes in-phase and quadrature-phase sampling units 7701I and 7701Q, respectively. The sampler 7701 receives at least one pair of timing signals $\tau(\mathbf{0})$ and $\tau(\pi/2)$ having a relative phase offset of $\pi/2$. Each pair of timing signals $\tau(\mathbf{0})$ and $\tau(\pi/2)$ may correspond to a different CI carrier frequency $f_n$. Thus, a timer (not shown) may perform appropriate frequency-dependent processing to produce quarter-wave phase offsets $\pi/2$. Each sampling unit 7701I and 7701Q generates a plurality of samples at one or more sample frequencies $f_{sample}$.

The samples are combined in a combiner 7702. In this case, the combiner 7702 includes in-phase and quadrature-phase combining units 7702I and 7702Q. Sample sets corresponding to one or more symbol intervals $T_s$ are combined. In one embodiment, the samples are combined separately with respect to at least one predetermined sample frequency over at least one predetermined symbol interval $T_s$. In another embodiment, the samples are combined without respective to any periodic sampling frequency. Samples may be selected at random, pseudo-random, or otherwise non-periodic intervals. Combining may be coherent or non-coherent.

The combiner 7702 outputs in-phase and quadrature signals $S_I(t)$ and $s_Q(f_n,t)$ that may optionally be processed in at least one signal processor 7703. The in-phase and quadrature-phase signals $S_I(f_n,t)$ and $S_Q(f_n,t)$ correspond to one or more frequency components $f_n$ and symbol values occurring in time interval $T_S$. Optionally, these signals may be combined coherently or non-coherently in the processor 7703. In one embodiment, the processor 7703 generates an output signal $s(\phi,A,n,t)$ having a particular phase $\phi$ and amplitude A corresponding to a CI carrier frequency $f_n$ and a symbol interval $T_s$. The phase $\phi$ and/or amplitude A may be used to identify a transmitted symbol. Phases $\phi$ may be represented by time offsets. Alternatively, or additionally, phases $\phi$ and amplitudes A may be processed to characterize the propagation channel and generate receiver and/or transmitter channel-compensation weights. In other embodiments, the processor 7703 may produce a modulated signal that may optionally be demodulated.

Various method and apparatus embodiments of the invention are summarized by the following functional descriptions:

1 Type 1: Sampling orthogonal carrier frequencies.

An input signal including a set of orthogonal carriers is sampled at one or more sample rates $f_{sample}$ that include at least one CI carrier frequency $f_n$ and/or some subharmonic thereof.

The samples are summed (or otherwise combined) over at least one symbol interval $T_s$.

In the case where multiple sample rates $f_{sample}$ are employed, samples corresponding to each sample rate $f_{sample}$ may be combined separately. Sampling and/or summing may include accumulating or storing the samples. If samples are collected at multiple frequencies $f_{sample}$, the samples may be separated with respect to sample frequency $f_{sample}$ before being stored and/or combined. In one set of embodiments, samples corresponding to a particular sampling frequency $f_{sample}$ are preferably summed separately from samples corresponding to other sample frequencies. Samples collected at multiple frequencies $f_{sample}$ may be sorted, arranged, rearranged, shifted, or stored in a predetermined order.

Sampled values may be stored in a predetermined order and the stored values may be further sampled, selected, or rearranged prior to combining. Any type of signal having orthogonal carrier (or sub-carrier) frequencies may be CI sampled, including OFDM, MC-CDMA, CIMA, CI, circular polarized, Discreet Multitone, FDM, WDM, ultra-dense WDM, MC DS-CDMA, and multi-tone signals. The orthogonal carrier frequencies may be up converted or down converted in frequency prior to sampling. Combined samples may be multiplied by a complex weight. Similarly, samples may be weighted prior to combining.

2 Type 2A: Sampling a CI Signal.

The phase of each sample frequency $f_{sample}$ is set to at least one particular phase space.

Samples collected at each sample frequency $f_{sample}$ are summed over at least one symbol interval $T_s$.

One or more of the sums are multiplied by a complex weight (optional).

Sums corresponding to a particular phase space are summed.

A decision process determines symbol value(s) associated with each phase space.

3 Type 2B: Sampling a CI Signal.

The phase of each sample frequency $f_{sample}$ is set to at least one particular phase space.

Samples at all sampling frequencies $f_{sample}$ for the particular phase space are summed over at least one symbol interval $T_s$.

A decision process is used to determine what symbol(s) was modulated onto each phase space.

4 Type 2C: Sampling a CI Signal.

The phase of each sample frequency $f_{sample}$ is set to a particular phase space or set of phase spaces. For example, in-phase (I) and quadrature-phase (Q) samples may be collected.

Samples collected at each sampling frequency $f_{sample}$ are summed over at least one symbol interval $T_s$. I and Q samples may be summed separately.

One or more of the sums are multiplied by a complex weight (optional).

Magnitude and/or phase for each frequency $f_{sample}$ is determined from the corresponding sum(s).

A decision process determines on or more symbol values associated with each frequency $f_{sample}$.

A decision process may determine the value associated with each phase space (optional).

Multiple phase spaces may be evaluated in parallel. The sample frequencies $f_{sample}$ may include one or more subharmonics of the orthogonal carrier frequencies $f_n$. The sample frequencies $f_{sample}$ may include subharmonics of one or more of the orthogonal carrier frequencies $f_n$. Each sample frequency $f_{sample}$ may include harmonics of one or more of the orthogonal carrier frequencies $f_n$. The process of summing the samples may be preceded by selecting or discarding some of the samples.

5 Type 3: Deriving Low-Rate Samples from a Set of Samples Collected at a Higher Rate.

A received waveform is sampled at some high sampling rate $f_h$.

Samples are selected with respect to at least one desired sample phase and at least one desired sample frequency $f_l$, where $f_l<f_h$. Samples corresponding to a desired sampling rate (or some harmonic or subharmonic thereof) are selected. Selective decimation may be performed.

The selected samples are summed.

A decision process is optionally provided to determine what symbol(s) was modulated onto at least one frequency, at least one phase space, or any combination thereof.

Type 3 CI sampling may result in slightly poorer precision (due, at least in part, to quantization error) compared to other types of CI sampling. However, the reduced complexity of using a single sampling frequency $f_h$ can be weighed against the slight performance degradation (which appears to be negligible for relatively high sample rates $f_h$). Sample weights may depend on proximity of actual samples (corresponding to $f_h$) to desired samples (corresponding to $f_l$).

Groups of samples may be selected. For example, samples straddling a desired sample point may be combined. Samples may be discarded if they do not fall within a predetermined proximity to desired sample points. For example, only sample points that are within some time period of the desired samples may be summed. Samples may be selected to minimize probability of error, SNR, BER, signal-to-interference, SNIR, or optimize some other performance measurement that characterizes the quality of the estimated data symbols. The received signal may be up converted or down converted prior to sampling. Sampling may be integrated into a down-conversion process, such as passband sampling. In any of the CI sampling cases, a received signal may be filtered prior to or following sampling.

FIG. 78A shows part of a coded CI waveform 7800 that may be processed using a CI algorithm, such as an algorithm based on the Type 3 CI sampling method. The waveform 7800 shown is distorted relative to a multipath channel distortion model. The signal is constructed from 10 carriers having a frequency spacing of $f_s$=100 kHz. The algorithm samples the received CI waveform at 10 MHz to generate 100 sample points across the 10-μsec symbol interval $T_s$. Typically, more than 100 sample points would be generated across a symbol interval $T_s$. In this case, there are 10 phase spaces and thus, 10 symbols occurring within the symbol interval. Alternatively, quasi-orthogonal pulse shaping may be used to provide up to 20 symbols.

The algorithm collects samples from the sampled waveform corresponding to the phase spaces and the 10 frequencies associated with each phase space. The most appropriate of the 100 sample points is selected for each sample of each phase-space/frequency combination. The selection of sample sets to be summed may be performed only once. The combinations may be used for subsequent sets of samples as long as the sample rate and the desired phase-space/frequency combinations are not changed. Samples corresponding to each phase space are summed to provide a signal representing one of the transmitted symbols. As the granularity of the sampling (i.e., the sample frequency $f_h$) is increased, greater precision is achieved with respect to measuring received data symbols. FIG. 78B shows a table that illustrates 10 transmitted data symbols and the corresponding non-normalized received signal for each of the 10 phase spaces.

Individual sample values may be added or subtracted depending on the part of a desired waveform cycle with which they correspond. This adaptation is implied by the term combining, as used herein. Samples having low values typically have relatively low SNRs. Accordingly, some applications may remove samples having values below a predetermined threshold. In some combining embodiments, sample values may be weighted with respect to a multi-level step function. The step function typically has the same frequency (and possibly phase) of at least one desired carrier signal. The step-function levels may approximate (either closely or roughly) the desired waveform's amplitude. Appropriate weighting and/or selection processes are also implied by the function of combining for both channel compensation and step-function processes.

Although impulse sampling is illustrated herein for simplicity, various forms of sampling may be provided, such as sample and hold. Other sampling techniques may be employed within the scope of the invention. Natural sampling (such as described in B. Sklar, *Digital CommunicationS Fundamentals and Applications*, Prentice-Hall, Inc., New Jersey, 1988, which is incorporated by reference) involves multiplying a band-limited waveform by a pulse train or switching waveform. Sample widths may be provided to collect substantial amounts of the received waveform energy. In some applications, sample widths may be on the order of half the wavelength of a desired waveform in a multicarrier signal. In other applications, sample widths may be approximately half the wavelength of a predetermined CI waveform component into which a received signal is processed. In some applications, sub-harmonic (i.e., passband) sampling may be performed to provide a combined down-conversion/filtering operation. Furthermore, the sampling processes disclosed herein may be integrated into Fourier or similar transform operations.

In one set of embodiments, signals are filtered with respect to at least one orthonormal basis by inputting a multicarrier signal (defined by the at least one orthonormal basis) into a processor (not shown) adapted to correlate the input signal with a sum of values pertaining to the at least one orthonormal basis. This process is distinguishable from combining correlations of the input signal with various values of the orthonormal basis. Various types of orthonormal bases may be used, such as wavelet, Fourier, Hadamard-Walsh, Laplace, and Lorentz, as well as other orthonormal bases.

14. CI OFFT

The Fourier transform of a time-domain signal into its frequency-domain components is expressed by:

$$X(f)=\int_{-\infty}^{\infty}x(t)e^{i2\pi ft}\,\delta t.$$

The corresponding discreet Fourier transform (DFT) equation is expressed by:

$$X(f_n)=\sum_{k=0}^{K-1}x_k e^{-i2\pi f_n k t_o}$$

where K is the number of time-domain samples collected over a period of $T_s=Kt_o$. Several simplifications can be made when orthogonal frequencies are processed. The orthogonal frequencies $f_n$ are expressed by:

$$f_n=f_o+nf_s$$

and the sampling period is $T_s=1/f_s$.

When orthogonal frequencies are sampled and processed with a DFT, a value in a particular frequency bin $f_n$ corresponds to time-domain samples $x_k$ multiplied by complex values $e^{i2\pi f_n k t_o}$. Since multiplication with a complex value is computationally intensive compared to most signal-processing operations, it is desirable to replace complex multiplications with simpler operations, such as adding and shifting. This is accomplished by replacing the complex value $e^{i2\pi f_n k t_o}$ (or any sinusoid representing a component of the complex value) with at least one periodic step function $\Gamma(t,f_n,\phi)$ having frequency $f_n$. For example, a periodic two-level step function having at least one predetermined $\phi$ is expressed by:

$$\Gamma(t,f_n,\phi)=\begin{cases}-1(\cos(2\pi f_n t+\phi)<0)\\+1(\cos(2\pi f_n t+\phi)>0)\end{cases}$$

Other types of step functions may be used. For example, step-function values do not need to be constrained to values of ±1. Step functions having more than two levels may be employed. Step functions may have multiple phases $\phi$. For example, in-phase and quadrature-phase step functions may be employed.

The step function $\Gamma(t,f_n,\phi)$ can be expressed as a sum of harmonic sinusoids. For example:

$$\Gamma(t,f_n,\phi)=\sum_{n=1,3,5,\ldots}\frac{\sin(2\pi f_n t+\phi_n)}{n}.$$

FIG. 79A illustrates two periods of a step function 7901 constructed from a superposition of 100 odd-harmonic sinusoids generated with respect to the step function $\Gamma(t,f_n,\phi)$. FIG. 79B illustrates a portion of a Fourier transform 7910 of the step function 7901. The Fourier transform 7910 shows 13 of the 100 component frequencies and their relative magnitudes on a logarithmic scale.

The step functions $\Gamma(t,f_n,\phi)$ are used in place of the periodic complex values $e^{i2\pi f_n k t_o}$ to simplify the DFT of a signal. This improvement is suggested by the DFT equation, which shows that the complex multipliers $e^{i2\pi f_n k t_o}$ corresponding to frequency bin $f_n$ are periodic with respect to $f_n$. In one set of preferred embodiments, the sampled signal is band-limited such that only the $f_n$ frequency component of the step function $\Gamma(t,f_n,\phi)$ contributes to values of $X(f_n)$ in the orthogonal-frequency Fourier transform (OFFT) equation shown as follows:

$$X(f_n)=\sum_{k=0}^{K-1}x_k\Gamma(t,f_n,\phi)$$

The OFFT equation is similar to the DFT equation in its ability to quantify values in particular frequency bins. The OFFT is simpler than other Fourier transform techniques because it replaces the complex values $e^{i2\pi f_n k t_o}$ with step-function values, such as +±1, which can be implemented in an adding process. Thus, the OFFT replaces complex multiplies with additions.

In the orthogonal-frequency case, the continuous form of the OFFT is the CI Orthogonal-Frequency Fourier Integral, or CIOFFI:

$$X(f_n)=\int_0^{1/f_s}\cos(2\pi f_{n'}t+\phi_{n'})\Gamma(t,f_n,\phi)$$

where the cosine term represents at least one of the received carriers having frequency $f_{n'}$. Assuming equality between all phase $\phi_n$, and $\phi$ values, the continuous-form OFFT can be expanded as:

$$X(f_n)=\frac{1}{2\pi f_{n'}}\left[\sin 2\pi f_{n'}t\,\Big|_0^{1/4f_n}-\sin 2\pi f_{n'}t\,\Big|_{\frac{1}{4f_n}}^{\frac{3}{4f_n}}+\ldots+\sin 2\pi f_{n'}t\,\Big|_{\frac{1}{4f_n}+\frac{2n-1}{2f_n}}^{0}\right]$$

and simplified to:

$$X(f_n)=\frac{1}{2\pi f_{n'}}\sum_{k=0}^{K-1}(-1)^k\sin\frac{2\pi n' y}{n}\Big|_{\frac{-1}{4}+\frac{k}{2}}^{\frac{1}{4}+\frac{k}{2}}$$

where y is a dimensionless variable. Further simplification yields:

$$X(f_n)=\frac{1}{\pi f_{n'}}\sin\frac{\pi n'}{2n}\sum_{k=0}^{K-1}(-1)^k\cos\left(\frac{\pi n' k}{n}+\phi_m\right)$$

The phase term $\phi_m$ indicates the possibility of a phase-modulated information signal or a phase-space channel.

When the OFFT sample frequency $f_n$ equals the received carrier frequency $f_{n'}$ (e.g., n=n'), the OFFT equation reduces to:

$$X_{n=n'}(f_n)=\frac{1}{\pi f_n}\sum_{k=0}^{K-1}(-1)^k\cos(\pi k+\phi_m)$$

For each value of k, a $\pi$ rotation of the vector (represented by the cosine term) is flipped by the −1 term. Thus, each $k^{th}$ vector maps onto a vector direction defined by the phase term $\phi_m$. Consequently, the terms of the OFFT that correspond to n=n' combine constructively.

When the OFFT sample frequency $f_n$ does not equal the received carrier frequency $f_{n'}$ (e.g., n≠n'), the OFFT equation is written as:

$$X_{n\neq n'}(f_n)=\frac{1}{\pi f_n}\sin\frac{\pi n'}{2n}\sum_{k=0}^{K-1}(-1)^k\cos\left(\frac{\pi n' k}{n}+\phi_m\right)$$

For simplicity, it may be assumed that the number of samples K collected is approximately some integer multiple of the sampled signal's cycles per symbol interval. The approximation works well for large numbers of samples. Similarly, K can simply be set to some integer multiple of the sampling frequency $f_n$. Each value of $X_{n\neq n'}(f_n)$ is a constant-valued vector having an incremental angular offset of $\pi n/n'$. After an integer number of full rotations, the sum of the K vectors is substantially zero. Thus, the terms of the OFFT that correspond to n≠n' combine destructively.

For $f_o=0$, and n≠n', constructive combining occurs under the following conditions:

$$n=(2m+1)n'\quad m=1,2,3,$$

The ranges of sampling and carrier frequencies can be expressed by a start frequency $f_i$ and an end frequency $f_f$:

$$f_i=f_o+0f_s=n_o f_s$$

$$f_f=f_o+(n-1)f_s=(n_o+n-1)f_s$$

where the value of $n_o$ may be integer or fractional. This sets boundary conditions on n and $n_o$ according to the following equation:

$$n<2n_o$$

Alternatively, the boundary conditions may be exploited in such a way as to perform Fourier transform operations via under sampling.

FIG. 80A is a frequency-domain representation that indicates a sampling frequency 8000, which is a frequency component of a step function. In this case, the frequency component 8000 is a start frequency f that is orthogonal to a plurality of received frequency components 8001 to 8006. Frequency component 8006 is designated as an end frequency $f_f$. If a received frequency component 8010 is a harmonic or subharmonic of a step-function component (such as frequency 8000), an OFFT or CI-sampling process that incorporates frequency 8000 is non-zero. Thus, OFFT and CI sampling may utilize harmonic and/or sub-harmonic frequencies relative to at least one frequency component of a sampled signal.

In one embodiment of the invention, it is preferable to provide for band limiting of a received signal such that only one frequency component of the applied step function has a non-zero OFFT or CI-sampling result. A step-function component and a received signal component may be related as harmonics or subharmonics. In another embodiment of the invention, the step function is adapted (e.g., filtered) to a given signal's frequency band.

FIG. 80B illustrates a frequency distribution of an alternate embodiment of an OFFT. Data symbols are redundantly modulated onto a plurality of uniformly spaced carrier frequencies, such as frequencies 8000, 8010, and 8020. CI sampling or an OFFT are provided with respect to one or more step-function frequencies that equal one or more of the frequencies 8000, 8010, and 8020. Alternatively, the step-function frequencies include one or more harmonics and/or subharmonics of the frequencies 8000, 8010, and 8020. One or more additional step functions may be employed in an OFFT or CI-sampling process corresponding to another set of frequencies (such as frequencies 8001, 8011, and 8021) that are orthogonal to the first set of frequencies 8000, 8010, and 8020.

FIG. 81 shows three sinusoidal waves 8101, 8102, and 8103 having uniformly spaced frequencies $f_1$, $f_2$, and $f_3$, and a step function 8111 having a frequency equal to the frequency $f_1$ of wave 8101. The value of a frequency bin from a discreet Fourier Transform is represented by:

$$y_p = \sum_{k=0}^{K-1} x_k e^{-i2\pi kp/K}$$

In an OFDM system that employs BPSK modulation, the frequency-bin values are ±1. Similarly, other modulation schemes may be processed. A simpler way to determine these values is to replace the exponential term in the above function with a step function. This eliminates the need for complex multiplications. The value of a frequency bin from the improved Fourier Transform is:

$$y_p = \sum_{k=0}^{K-1} x_k \Gamma[\tau_n = 1/f_n]$$

where the values of the step function are $\Gamma[\tau_n=1/f_n]=\pm 1$. The step-function values vary with respect to the cycles of an $n^{th}$ frequency, $f_n$.

In FIG. 81, the step function 8111 is set in phase with the wave 8101 having frequency $f_1$. In one embodiment of the invention, a value corresponding to frequency bin $f_1$ is obtained by adding and/or subtracting the sampled waveforms in a manner indicated by the step function 8111. The contributions to frequency bin $f_1$ due to each of the three frequencies $f_1$, $f_2$, and $f_3$ are exemplified by sums of one thousand sample values shown as follows:

$f_1=637.5046$ $f_2=-0.9994$ $f_3=-0.1402$

The value corresponding to bin $f_1$ is positive or negative depending on the BPSK data value of the wave having frequency $f_1$.

Each frequency is expressed by:

$$f_n = f_o + n f_s$$

where $f_o$ is an offset frequency and $f_s$ is a shift frequency. In some cases it was found that by increasing $f_o$, the values corresponding to undesired bins were reduced. Various mathematical relationships involving $f_o$, $f_s$, and/or n may be used to enhance the magnitude of the ratios of desired values to undesired values.

In order to measure complex values for each bin, in-phase and quadrature-phase step functions are used:

$$\mathrm{Re}(y_p) = \sum_{k=0}^{K-1} x_k \Gamma[\tau_n = 1/f_n, \phi = 0]$$

$$\mathrm{Im}(y_p) = \sum_{k=0}^{K-1} x_k \Gamma[\tau_n = 1/f_n, \phi = \pi/2]$$

In order to sample CI waves at a particular phase space $\phi_m$, a set of step functions corresponding to each of the carriers for that particular phase space may be used:

$$C_m = y_p(\phi_m) = \sum_{n=1}^{N} \sum_{k=0}^{K-1} x_k \Gamma[\tau_n = 1/f_n, \phi = \phi_m]$$

The values obtained for each frequency bin may optionally be multiplied by one or more complex weights $w_n$ prior to combining in order to compensate for fading and/or interference:

$$C_m = y_p(\phi_m) = \sum_{n=1}^{N} W_n \sum_{k=0}^{K-1} x_k \Gamma[\tau_n = 1/f_n, \phi = \phi_m]$$

Without, the complex weight $w_n$, the result is similar to a simple matched filter that is matched to a CI pulse.

FIG. 82 shows a step function 8211 of a particular phase space superimposed over three sinusoidal waves 8201, 8202, and 8203 characterized by different phases of the same frequency $f_n$. A first sinusoid 8201 has the same phase as the step function 8211. The other two sinusoidal waveforms 8202 and 8203 contribute interfering terms to the desired value obtained in frequency bin $f_n$ from the first waveform. Similarly, at other frequencies, waveforms corresponding to interfering phase spaces (such as waveforms 8202 and 8203) contribute interfering terms. However, the sum of bin values over all of the frequencies corresponding to a desired phase space results in destructive combining of the interference from other phase spaces and constructive combining of the desired signal.

The table shown in FIG. 83 illustrates the summed values of three frequency bins of a three-carrier signal generated for a desired phase space and for the two remaining undesired phase spaces. A set of quasi-orthogonal phase spaces may be employed. However, this results in some cross correlation between the first set and the second set of phase spaces.

FIG. 84 illustrates basic components of a CI-OFFT receiver. A received signal is optionally processed by a band limiting filter 8401 to limit the frequency band of the signal. The band limiter 8401 may act as an anti-aliasing filter and/or a channel selector. Received signals are processed by a sampler 8402 adapted to generate one or more sample sets with respect to step-function characteristics provided by a step-function generator 8408. The step-function generator 8408 may control one or more sampling parameters of the sampler 8402, such as sample width, sample shape, number of samples, sampling interval, sample grouping, sample-set size, etc. Sample parameters may be adapted to provide filtering.

Samples generated by the sampler 8402 may optionally be stored in a storage device 8403, such as computer memory. A selector/accumulator 8404 selects and groups samples in a combining process. A symbol-interval selector 8409 may control selection criteria, such as symbol duration $T_s$ and number of samples per symbol interval. The symbol duration $T_s$ corresponds to a particular number of step-function periods over which samples are combined. In an OFFT process, the combination of symbol durations and step-function periods are adapted to decompose a received signal into orthogonal components. The resulting signals may optionally be coupled to a processor 8405 adapted to perform one or more receiver processes. In some cases, the orthogonal components may be combined in a combiner (not shown).

In an alternative embodiment of the invention, the sampler 8402 provides unformatted samples to the selector/accumulator 8404. The selector/accumulator 8404 is adapted to generate one or more sample sets with respect to step-function characteristics provided by the step-function generator 8408. In this case, the selector/accumulator 8404 may control symbol duration $T_s$ (i.e., carrier separation $f_s$) and step-function frequency (i.e., carrier selection). The selector/accumulator 8404 may optionally provide weights to the samples (such as to adapt to step-function levels, compensate for channel effects, mitigate interference, perform demodulation, and/or provide for any other signal-processing objectives). The selector/accumulator 8404 may optionally discard or replace sample values that exceed and/or fall below a predetermined threshold power level.

The principles of the OFFT may be applied to any algorithmic or numerical implementation of a Fourier transform. Computations in OFFT algorithms and/or inverse-OFFT algorithms may exploit symmetry and/or periodicity properties of one or more step functions, such as step function $\Gamma(t)$. Such computations used to simplify transform operations are known as divide-and-conquer techniques. Any of various types of radix-2 and/or radix-4 algorithms may be employed in OFFTs and/or inverse OFFTs. The principles described herein may be applied to or adapted to any of the fast Fourier transforms. The principles described herein may be applied to any inverse Fourier transform.

The principles of CI Sampling and it applications to digital filtering are fundamental in nature. Step functions (which may take the form of integrators, accumulators, recursive structures, adders, storage systems, etc.) or equivalent functions having harmonic content are used to process band-limited signals. Step-function processing is simpler to implement in the time domain than sinusoid-based processing. Band limiting allows step functions having appropriate harmonic content to replace sinusoids in a variety of signal-processing applications. Accordingly, CI sampling may be implemented in a variety of algorithms and applications, including, but not limited to, sigma-delta modulation, correlation, convolution, resonant filters, sinc filters, invertible transform operations, frequency conversion, filter banks, and analysis/synthesis filters.

15. INVERSE CI-OFFT

In an inverse CI-OFFT process, data symbols are impressed onto one or more carrier signals by generating time-domain symbols that are summed relative to a function representing a sum of a plurality of values pertaining to at least one orthonormal basis. In one embodiment, the orthonormal basis values in the function's sum include only one carriers in a multicarrier signal. In another embodiment, the orthonormal basis values in the function's sum include more than one carrier in the multicarrier signal.

In one specific example of the invention, data symbols are impressed onto one or more carrier frequencies of a multicarrier signal by combining one or more information symbols relative to a step function having one or more frequencies. The periodicity of each step function preferably corresponds to a frequency of the multicarrier signal. In some applications, the multicarrier frequencies correspond to one or more harmonics of one or more step functions.

Step-function values may include at least two of the following set of normalized values: 1, 0, and −1. Alternatively, the step function values may be derived from a constellation of more than two values. Step-function values may be incremental or non-incremental.

FIG. 85 illustrates a plurality of five-level step functions 8501 to 8509. The step-function frequencies are orthogonal over the interval shown. FIG. 86A illustrates a pulse 8601 resulting from a superposition of the step functions 8501 to 8509. In one case, high-frequency components of the superposition pulse 8601 may be filtered using a low-pass filter (not shown) to produce a filtered baseband pulse 8602 illustrated in FIG. 86B.

Step functions may be modulated with at least one information signal to produce an information-modulated pulse. In one application, each step function is modulated (or otherwise impressed) with at least one information signal. The step functions may be modulated via CI coding. In one example, the step-function carriers are provided with a plurality of interfering information signals and the carriers are combined to produce a plurality of superposition pulses that characterize each of the information signals. In some applications, the carriers may be provided with phase offsets (for example, to enhance security and/or reduce PAPR) prior to combining. Low-frequency and/or high-frequency components of the combined signals may be selected and/or removed via filtering. In one set of applications, selection of high-frequency components of the combined signals may provide for frequency up-conversion.

FIG. 87A illustrates a combined signal 8701 resulting from a superposition of a plurality of step functions having a frequency offset $f_o$. FIG. 87B illustrates a low pass filtered superposition signal 8702 after high-frequency components have been removed from the combined signal 8701.

FIG. 88A illustrates a superposition pulse 8801 generated from a plurality of binary step functions (not shown). FIG. 88B illustrates a filtered superposition pulse 8802 generated by low-pass filtering the pulse 8801.

FIG. 89A illustrates a functional embodiment of an inverse CI-OFFT system of the invention. Information symbols from an input information stream are modulated by a modulator 8901 onto a plurality of step functions generated by a step-function generator 8904. The step functions may be weighted by an optional weight generator 8905 prior to being combined in a combiner 8902. The step functions may be weighted to provide coding (such as to provide carrier-phase offsets and/or to implement a direct-sequence type of coding), compensate for channel distortion, generate array-processing weights, or perform any other physical-layer processing. The combined signal may be filtered to provide a band-limited signal and/or provide for frequency up-conversion. The filtered signal is optionally provided to a transmission system (not shown) for coupling into a communication channel.

FIG. 89B illustrates an alternative functional embodiment of an inverse CI-OFFT system. A weight generator 8911 is adapted to provide weights to a step-function generator 8912. The weights characterize at least one information signal. Optionally, the weights may be adapted to other physical-layer parameters, such as coding, channel compensation, array-processing weights. The weighted step functions are combined in a combiner 8913 and filtered by a filter 8914 prior to being coupled to a transmission system (not shown).

FIG. 89C illustrates yet another embodiment of a functional embodiment of an inverse CI-OFFT system of the invention. An information stream is processed by a serial-to-parallel converter 8921. The information symbols are combined in a combiner 8922 with respect to a plurality of functions, such as provided by a step-function generator 8924. Optionally, the information symbols may be weighted and/or combined with respect to weights provided by a weight generator 8925. The combined signals are processed by a filter 8923 prior to being coupled to a transmission system (not shown).

The methods and systems illustrated with respect to OFFT techniques (including inverse CI-OFFT) may be interpreted in many different ways. Signals may be generated and combined in many different ways with respect to OFFT techniques. Data symbols may be processed in many different ways that are analogous to step-function generation and combining techniques associated with OFFT techniques.

16. CI-BASED WAVELETS

In B. B Hubbard'S *The World According to Wavelets* (2nd edition, A K Peters, Ltd., Natick, Mass., 1998), which is hereby incorporated by reference, the FFT is described as "the modern algorithm that has most transformed our society." Gilbert Strang states "whole industries are changed from slow to fast by this one idea." The primary advantage of the FFT is that it reduces the computational complexity relative to the DFT. For example, the FFT reduces the number of complex multiplications from $N^2$ to NlogN. CI applications to Fourier transforms, as described herein, provide even more substantial reductions in complexity.

The Fourier transform provides a useful interpretation of the many physical phenomena. For example, the realization that an elementary particle does not simultaneously have a precise position and a precise momentum is a natural consequence of Fourier analysis. One of the principle arguments supporting wavelets is that Fourier analysis is poorly suited for brief signals or signals that change in time. Drawbacks to Fourier analysis are based on the observation that since the building blocks of Fourier analysis are sines and cosines that oscillate for all time, Fourier analysis is not effective in describing signals having changing frequencies.

A windowed Fourier transform may be used to analyze a signal in both time and frequency by detecting frequencies of the signal in each of a plurality of time segments. The windowed Fourier transform replaces the Fourier transform's sinusoidal wave with a product of a sinusoid and a window function that is localized in time. However, small windows are blind to low-frequency components of the signal and large windows do not provide adequate time resolution.

Many parallel interpretations can be made between the Fourier transform and other transforms. For example, the discreet wavelet transform is analogous to the DFT. Consequently, aspects of the present invention pertaining to Fourier transforms can be extended to variations of the Fourier transform and other transforms as well. Transforms and inverse transforms that may be used in conjunction with the present invention include, but are not limited to, Abel, Bessel, Fourier, Haar, Hadamard, Hankel, Hartley, Hilbert, Hough, Laplace, Mellin, Radon, Slant, Walsh, Wavelet, and Weber transforms.

The wavelet transform replaces the Fourier transform's sinusoidal waves with a wavelet-window family generated by translations and dilations. The continuous wavelet transform (CWT) is expressed by:

$$\gamma(s,\tau)=\int f(t)\Psi_{s,\tau}^*(t)dt$$

The CWT equation illustrates how a function $f(t)$ is decomposed into a set of wavelet basis functions $\Psi_{s,\tau}(t)$. Optionally, the wavelet basis functions $\Psi_{s,\tau}(t)$ may be expressed by one or more sets of CI basis functions. The variables s and $\tau$ are scale and translation, respectively. The inverse wavelet transform is given by:

$$f(t)=\int\int\gamma(s,\tau)\Psi_{s,\tau}(t)d\tau ds$$

The wavelets are generated from a single basic wavelet by scaling and translation:

$$\Psi_{s,\tau}(t)=\frac{1}{\sqrt{s}}\Psi\left(\frac{t-\tau}{s}\right)$$

When discreet wavelets are used to transform a continuous signal, the result is a series of wavelet coefficients. It is preferable that the discreet wavelets behave like an orthonormal basis. Selection of the basic wavelet can make discreet wavelets substantially orthogonal to their dilations and translations:

$$\int\Psi_{j,k}(t)\Psi_{m,n}(t)dt=\begin{cases}1, & j=m,\ k=n\\ 0, & \text{otherwise}\end{cases}$$

An arbitrary signal can be constructed from a sum of the orthogonal wavelet basis functions weighted by wavelet transform coefficients:

$$f(t)=\sum_{j,k}\gamma(j,k)\Psi_{j,k}(t)$$

A set of orthogonal code vectors can be obtained from rows and/or columns of the matrix $\Psi_{j,k}(t)$.

In addition to using the orthogonal wavelet basis to define orthogonal code vectors, the orthogonal basis functions may be defined as carriers in the definition of CI. For example, multiple orthogonal basis functions may be modulated with the same data symbol with respect to one or more CI codes. Multiple CI encoded data symbols may each modulate the multiple orthogonal basis functions with respect to an orthogonal phase space. In this context, a phase space is defined as a set of signal parameters (such as phases) that allow signals impressed onto the same set of carriers to be separated via interferometry.

CI can provide a multicarrier basis to wavelets. Thus, CI can be used to provide multi-resolution analysis to analyze one or more signals at different frequencies with different resolutions. CI-based pulses can be used to provide good time resolution and poor frequency resolution at high frequencies and good frequency resolution and poor time resolution at low frequencies. This approach is useful when the signal being analyzed has high frequency components for short durations and low frequency components for long durations.

A CI-based wavelet is represented by a superposition of finite-duration CI waveforms, such as sinusoids. The duration of a CI wavelet may equal the symbol duration $T_s=1/f_s$ or some fraction of $T_s$. Wavelet functions with different regions of support that are used in a transformation process can be derived from one a CI-based function. Translation is related to phase space, as a pulse position is defined by a unique set of sub-carrier phases. Scaling is related to the inverse of a CI pulse's effective carrier frequency $f_{eff}$. The effective carrier frequency $f_{eff}$ may be adjusted by appropriate selection and/or weighting of individual CI carrier frequency $f_n$, or selection of the offset frequency $f_o$. Similarly, the CI-based mother wavelet may be changed simply by adjusting carrier selection and/or carrier weighting. Because wavelets can be expressed as a linear combination of CI sub-carriers, various sub-carrier groups may be used as basis vectors for wavelets.

CI wavelets having various scales and translations are multiplied with a signal being analyzed. The product is nonzero where the signal falls in the region of support of the wavelet, and it is zero elsewhere. Each product represents a superposition of correlation values of a given set of CI subcarrier basis functions having complex weights corresponding to a particular CI wavelet. By shifting the wavelet in time, the signal is localized in time, and by changing the scale, the signal is localized in effective frequency The wavelet transform has good time and poor frequency resolution at high frequencies, and good frequency and poor time resolution at low frequencies. However, a high-frequency (i.e., small scale) CI-based wavelet can be decomposed into a plurality of narrowband sub-carrier components to provide high frequency resolution. Similarly, multiple low-frequency (i.e., large scale) wavelets can be combined relative to at least one predetermined phase space to provide a superposition signal characterized by high time resolution.

Required sampling rates correspond to CI sub-carrier frequencies. At lower frequencies, the sampling rate can be decreased, which saves a considerable amount of computation time. Nyquist's sampling rate is the minimum sampling rate that allows the original continuous time signal to be reconstructed from its discrete samples. Discretization can be done in any way without any restriction as far as the analysis of the signal is concerned. If synthesis is not required, even the Nyquist criteria does not need to be satisfied. The restrictions on the discretization and the sampling rate become important if, and only if, the signal reconstruction is desired.

FIG. 90 illustrates a wavelet 9000 constructed from a plurality of CI carriers, such as CI carriers 9001 to 9007. CI carriers may be used to construct any wavelets, including, but not limited to, Morlet, Mexican hat, Meyer-Lemarier', Daubechies, and Malvar wavelets. CI wavelets may include various types, including continuous, discreet, frame, orthogonal transform, quasi-orthogonal transform, and bi-orthogonal transform wavelets.

In the case of a continuous transform, any function having a zero integral can be a wavelet. A feature of orthogonal CI carriers that is exploited by the present invention is that each carrier has a zero integral. Thus, the CI carriers can be implemented as sinusoidal basis functions for any wavelet.

Orthogonal wavelets are a special case of discreet wavelets. Orthogonal wavelets provide a representation of a signal without redundancy and lend themselves to fast algorithms. CI-based wavelets can be orthogonalized with respect to phase space, scaling, and/or frequency shift. Orthogonal CI wavelets may share the same carriers and the carrier phases may allow the wavelets to be orthogonal. CI carrier weights may be adjusted to generate different wavelet types, adjust scaling, and/or provide time shifts. CI-based wavelets can also be processed via fast algorithms, including FFTs, OFFTs, wavelet transforms, and CI sampling algorithms.

FIG. 91 illustrates a Morlet wavelet packet 9100 that represents a superposition of CI carriers, such as CI carriers 9101 to 9107. In conventional wavelet systems, a wavelet packet represents a product of a wavelet and an oscillating function. The wavelet part is responsive to abrupt changes and the oscillating function reacts to regular oscillations. The packet width, frequency, and position can each be varied independently. The CI packet 9100 width can be varied by adjusting CI carrier 8602 weights. The oscillating function in the CI wavelet packet 9100 may be represented by an effective carrier frequency $f_{eff}$. Techniques for selecting and adjusting the effective carrier frequency $f_{eff}$ are described throughout the specification. In some applications, a carrier-frequency offset $f_o$ may be provided to the CI carrier frequencies $f_n$ to select or adjust the effective carrier frequency $f_{eff}$. The CI packet 9100 position can be shifted by shifting the carrier phase space.

FIG. 92A illustrates three overlapping CI pulses 9201, 9202, and 9203. The oscillations in the pulses 9201, 9202, and 9203 have frequencies $f_1$, $f_2$, and $f_3$, respectively. The pulses 9201, 9202, and 9203 combine to provide a superposition signal 9210 shown in FIG. 92B characterized by an approximately linear frequency ramping from $f_1$ to $f_3$.

The oscillation in a CI pulse is referred to as an effective carrier. The effective carrier frequency $f_{eff}$ is related to the weighted average of carrier frequencies that comprise the CI pulse. The amplitude of pulse 9201 is near its maximum at time $t_1$, whereas the amplitudes of pulses 9202 and 9203 are near zero. Thus, the oscillation frequency of pulse 9210 is approximately $f_1$ at time $t_1$. The amplitude of pulse 9201 tends toward zero and the amplitude of pulse 9202 approaches its peak value as the time approaches $t_2$. Thus, the oscillation frequency of pulse 9210 smoothly transitions from $f_1$ to $f_2$ over the time period of $t_1$ to $t_2$. The amplitude of pulse 9202 drops toward zero and the amplitude of pulse 9203 increases over the period of $t_2$ to $t_3$. Consequently, the oscillation frequency of pulse 9210 smoothly transitions from $f_2$ to $f_3$.

FIG. 92C illustrates a plurality of CI carriers 9220 to 9229 that combine to generate the superposition signal 9210 shown in FIG. 92B. The carriers 9220 to 9229 are characterized by predetermined frequencies, frequency separations, magnitudes, and phases necessary to produce a superposition signal (such as signal 9210) having predetermined transient features. In some applications, time-varying weights may be applied to the carriers.

A first group of carriers 9220, 9221, 9222, and 9223 combine to generate a portion of the superposition signal 9210 that is characterized by frequency $f_3$. A second group of carriers 9224, 9225, and 9226 combine to generate a portion of the superposition signal 9210 that is characterized by frequency $f_2$. A third group of carriers 9227, 9228, and 9229 combine to generate a portion of the superposition signal 9210 that is characterized by frequency $f_3$. Transition regions of signal 9210 between the frequencies $f_1$, $f_2$, and $f_3$ are characterized by varying proportions of superposition signals relative to the carrier groups. In some cases, one or more carrier sets may provide non-negligible contributions across most of a superposition signal and/or to a plurality of non-contiguous sections of a superposition signal.

Time offsets of various features of the superposition signal 9210 are characterized by one or more carrier phase offsets. The scale of the superposition signal corresponds to a scale factor associated with the carriers. Amplitude variations in the superposition signal 9210 may correspond to a set of carrier phases and/or magnitudes. Consequently, time offsets and scales in wavelet processing can be represented by corresponding CI carrier phase offsets and/or amplitudes. Correlation values corresponding to particular wavelets (indicated by scale, offset, and wavelet type) may be converted to correlation values corresponding to one or more predetermined CI carriers. A wavelet interpretation of transmitted and/or received signals may be conveyed as a CI interpretation. Conversely, CI interpretations may be converted to wavelet interpretations.

FIG. 93 illustrates a conversion between a set of wavelet parameters $(\tau_n,s_n)$ to a set of CI parameters $(f_n,w_n)$. A wavelet 9301 is characterized by a time offset $\tau_n$ and a scale $s_n$. The wavelet 9301 is also characterized by a superposition of CI carriers 9302 having predetermined frequencies $f_n$ and corresponding carrier weights $w_n$.

In some applications, a correlation value associated with a particular wavelet may be expressed by a set of weighted carriers. If multiple wavelets are generated from the same set of carriers, each wavelet correlation value maps into the same set of carriers. Each of the corresponding carrier weights can be derived from a superposition of weighted wavelet correlation values. Prior to superposition of the weighted wavelet correlation values used to generate a carrier weight corresponding to a particular carrier frequency $f_n$, each wavelet correlation value is weighted with the carrier weight $w_n$ of carrier frequency $f_n$, associated with the corresponding wavelet.

FIG. 94A illustrates a CI-based wavelet (i.e., superposition signal) 9400 characterized by a high time resolution (i.e., a narrow time-domain signal). FIG. 94B illustrates a plurality of narrowband CI carriers 9401 to 9407 that are components of the superposition signal 9400 shown in FIG. 94B. FIG. 94C is a frequency-domain illustration of the carriers 9401 to 9407 shown in FIG. 94B. Each frequency-domain component 9401 to 9407 is characterized by high frequency resolution (i.e., a narrow frequency-domain signal). Consequently, a CI-based wavelet provides the means to perform analysis with high resolution in both the time and frequency domains.

The inverse relationship between time and frequency illustrated by the Fourier transform exemplifies the Heisenberg Uncertainty Principle. However, interferometry methods of the present invention exploit phase space to circumvent the inherent resolution trade offs between coupled measurements, such as time and frequency. Consequently, the interferometry techniques of the present invention may be extended to various probability-distribution applications. These applications may include various types of sensing and analysis.

FIG. 95A illustrates a portion of a particular signal 9500 characterized by multiple frequencies and transient signal characteristics. Each of a plurality of narrowband CI signals 9501.1 to 9501.N shown in FIG. 95B is correlated (or similarly processed) with the signal 9500 to provide a plurality of correlation values $c_1(f_1)$ to $c_N(f_N)$.

Each correlation value $c_1(f_1)$ to $c_N(f_N)$ provides a measure of correlation between the signal 9500 and one of the CI signals 9501.1 to 9501.N. In some applications, each narrowband CI signal 9501.1 to 9501.N includes in-phase and quadrature-phase components. Similarly, the correlation process may include in-phase and quadrature phase processing. The correlation values $c_1(f_1)$ to $c_N(f_N)$ may include any combination of in-phase and quadrature-phase correlation values. In some cases, each correlation value $c_1(f_1)$ to $c_N(f_N)$ may include separate in-phase and quadrature-phase components.

FIG. 95C illustrates a superposition signal 9502 resulting from a sum of the CI signals 9501.1 to 9501.N. The superposition signal 9502 is characterized by a pulse bounded by a narrow time interval $\Delta t=t_2-t_1$. A $\Delta t$-width signal 9503 illustrates the portion of the signal 9500 that contributes substantially to a correlation value resulting from a correlation between superposition signal 9502 and signal 9500.

An $n^{th}$ correlation value $c_n(f_n)$ characterizes the presence of a corresponding narrowband frequency component $f_n$ over a relatively long time interval $t'_1-t'_2$. The correlation values $c_1(f_1)$ to $c_N(f_N)$ may be combined to produce a combined correlation value $c(t_1:t_2)=\Sigma c_n(f_n)$. When the correlation values $c_1(f_1)$ to $c_N(f_N)$ are combined, contributions of signal 9500 outside of the time interval $\Delta t=t_2-t_1$ substantially cancel. Contributions of signal 9500 within the time interval $\Delta t=t_2-t_1$ combine substantially in phase.

In some applications, complex-valued weights may be provided to the correlation values $c_1(f_1)$ to $c_N(f_N)$ prior to combining. The weights may be provided to select predetermined time intervals $\Delta t$, time-interval width, and/or effective superposition signal 9502 shape. The correlation values $c_1(f_1)$ to $c_N(f_N)$ may be generated with respect to some filtering function, such as an FFT.

A CI-based wavelet may be provided with the transmission and/or reception benefits of a multicarrier signal. CI processing, as described throughout the specification and in the documents incorporated by reference, may be performed with respect to CI-based wavelets.

FIG. 96A illustrates one aspect of the invention in which wavelet parameters (such as scale factors, translations, and/or wavelet type) are modulated or otherwise impressed onto CI signals for transmission. The wavelet parameters are generated 9601 or otherwise acquired prior to being used to shape a CI waveform in a step of providing CI symbols with wavelet parameters 9602. The wavelet parameters may be used to shape one or more CI superposition signals and/or adjust CI symbols that are conveyed on one or more diversity parameters. The CI signals are processed for transmission 9603. This processing 9603 typically includes preparing a baseband or IF signal for coupling into a communication channel. The transmission-processing step 9603 may include predistortion processing, channel selection, coding, interleaving, up conversion, filtering, amplification, mixing, and/or any other processes typically performed prior to transmission.

FIG. 96B illustrates an alternative method of transmitting wavelet parameters over a communication channel. Wavelet parameters are provided in a wavelet-generation step 9601. The wavelet parameters are converted to CI carrier weights using an appropriate wavelet-parameter-to-CI-carrier-weight conversion 9604. The wavelet parameters may be CI encoded. The CI symbols representing the wavelet parameters are processed in a transmission-processing step 9605 prior to being coupled into a communication channel (not shown). In this case, the CI weights may be conveyed via CI transmission signals or any other form of transmission signaling.

FIG. 96C illustrates yet another method of conveying wavelet parameters as a CI-based signal. Wavelet parameters are provided (i.e., generated and/or acquired) in a wavelet-generation step 9601. The wavelet parameters or wavelets generated with respect to the wavelet parameters are converted to CI waveforms in a conversion step 9606. The CI waveforms are processed in a transmission processing step 9603 prior to being coupled into a communication channel.

In digitally implemented CI systems, synthesis of a superposition of the various modulated carriers may be performed via a mathematical transformation that generates a sequence of numbers representing the amplitude of the signal as function of time. For example, a superposition signal may be generated by applying an inverse Fourier transformation to a symbol vector generated from CI symbols to be transmitted. Similarly, the symbols are recovered at a receiver using the corresponding inverse transformation. In addition to receiving and separating multicarrier signals with a filter bank, a transceiver can perform transmit-side operations (e.g., modulation, multiplexing, etc.) using a digital filter bank.

The computational workload inherent in synthesizing and analyzing a multicarrier signal is related to the number of subbands. For example, if fast Fourier transforms are employed, the workload is of order NlogN, where N is the number of sub-bands. Similar relationships exist for other transforms. Thus, in some applications it is advantageous to minimize the number of subbands. Sub-band selection may be made with respect to channel estimation. For example, characteristics, such as coherence length, may be used to optimize sub-channel (i.e., CI carrier) bandwidth(s) and spacing. Other technical considerations, such as interference, transmitter complexity, receiver complexity, transceiver power, transmitted power density, etc., may be used to determine sub-channel parameters.

At the receiver, the signal from the communication link may be decoded by a plurality of finite impulse response (FIR) filters that are matched to the transmitted waveforms. Synchronization errors between the transmitter and receiver may be corrected with weights determined from transmitted training signals. The receiver may include a phase-compensation circuit that includes a second bank of FIR filters that measure the amplitude of each carrier after the signal has been phase shifted.

Various types of filter banks may be implemented. For example, filter banks may be constructed with narrow-band lapped transforms. Any type of matched filter and/or correlator may be implemented. The decomposition of a signal into frequency subbands may be performed by a tree-structured filter. Such a filter includes two or more levels of filter banks that can be adapted to implement a time-domain to frequency-domain transformation. To implement a variable-channel-width system, a transformation that breaks the available frequency band into subbands of differing width is required. This may be performed using a non-uniform filter-bank transform.

The reverse transformation can be performed by an analogous filter bank. A multi-level tree filter may perform the frequency-domain to time-domain transformation. The symbols to be sent on the finer subbands are first combined using a first set of synthesis filters to provide signals representing the larger subbands. These symbols, together with those from other bands, are then combined by a synthesis filter to provide the time-domain signal that is sent on the communication link.

FIG. 97A illustrates a CI reception method of the invention. A generation step 9701 provides for the generation of a plurality of CI carriers. The carriers are correlated with at least one receive signal to produce one or more correlation values in a correlation step 9702. An optional combining step 9703 may be provided to combine a plurality of correlation values.

In the generation step 9701, CI carriers may be provided with in-phase and quadrature-phase components. The CI carriers may be provided with one or more phase spaces. The CI carriers may be provided with complex weights to compensate for channel distortions. Carrier weights may be provided to compensate for interference. In some applications employing receiver arrays, carrier weights may be provided for beam forming. In any of these cases, the carrier weights may be adaptive.

The correlation step 9702 may include correlating each CI carrier with one or more received signals. In one set of embodiments, the correlation step 9702 may be adapted to provide correlation between a superposition of the CI carriers and the received signal. Superpositions of the CI carriers may take the form of one or more wavelets. CI carrier weights may correspond to various wavelet scales, translations, and/or shapes (i.e., wavelet types). The CI-based wavelets may include orthogonal wavelets.

In some embodiments of the invention, the received signal may be separated into CI carriers prior to correlation. Carrier weights may be provided to received-signal carriers to compensate for interference and other channel effects. Carrier weights may be provided for beam forming. Correlation, or equivalent processes, may be performed via equivalent processes, including, but not limited to, summing samples over a predetermined time interval, weighting and combining samples, sample-and-accumulate processes, etc.

FIG. 97B illustrates an alternative CI reception method. A received signal is decomposed into a plurality of CI components in a decomposition step 9711. The CI components may be processed in an optional channel-compensation step 9712. Processing may include providing complex weights to the CI carriers. The CI components are correlated with a CI reference in a correlation process 9713 or some equivalent process. In the case in which multiple correlation values are generated by the correlation process 9713, the values may optionally be combined in a combining process 9714. Combining may include providing weights to the correlation values.

FIG. 97C illustrates steps of a CI reception method. A decomposition step 9721 provides for decomposition of at least one received signal into a plurality of frequency components, such as CI signals. The decomposition step 9721 may provide a plurality of oscillating signals characterized by predetermined frequency and bandwidth values. The frequency components may be characterized by complex values that indicate magnitude and phase. The frequency components may include orthogonal and/or quasi-orthogonal components. The frequency components may include overlapping and/or non-overlapping components.

Channel compensation weights may optionally be provided to one or more frequency components in a channel-compensation step 9722. CI weights may optionally be provided to the components in a weighting step 9723. CI weights may be provided to the frequency components to select a particular phase space in a combining step 9724. The combining step 9724 may include adaptive combining.

Adaptive reception and transmission techniques pertaining to CI wavelets (as well as CI in general) may be based on blind-adaptive frequency-domain reception. Various reception techniques may be employed to exploit frequency selectivity that affects multiple carriers in a multipath environment. The technique is blind in the sense that transmitted carrier symbols (e.g., carrier weights) may be unknown. Received carrier symbols may be estimated without calibration and feedback. In one set of receiver embodiments, optimal combining (i.e., an optimal beam pattern in the frequency domain) is based on certain statistical properties of the received signals. Optimal combining is performed by solving an optimization equation.

FIG. 98 illustrates a CI transceiver of the invention. A receiver system 9801 couples a transmitted signal out of a communication channel (not shown). One or more typical receiver-side signal processing techniques (including filtering, mixing, down conversion, amplification, A/D conversion) may be performed on the received signal. A filter bank, such as an FFT 9802, separates the received signal into a plurality of frequency components. The components are provided with weights in a receiver weighting system 9803. The weights may include one or more types of weights, such as channel-compensation weights, decoding weights, demultiplexing weights, MUD weights, array-processing weights, wavelet-processing weights, etc. The weighted carriers are combined in a combiner 9804. The combined signals may be processed in a data processor 9805. The data processor 9805 may be part of a blind-adaptive processor 9806 that is adapted to generate and/or adapt weights relative to one or more performance parameters, including channel estimates, confidence measures, data estimates, signal power, probability of error, BER, SNR, and SNIR.

In one embodiment of the invention, the blind-adaptive processor 9806 is adapted to process a plurality of information-bearing CI symbols produced from a plurality of carriers. The processor 9806 may work in conjunction with the combiner 9804 to combine the carriers and estimate transmitted data. The combining process may include wavelet processing. The processor 9806 may work in conjunction with the data processor 9805 to provide a channel estimate based on the data estimate. The processor 9806 may employ a time-varying channel-estimation filter (not shown). The processor 9806 provides channel compensation to the received CI carriers and/or symbols. Channel compensation may be based on a statistical characterization of interference, such as a covariance matrix.

In some applications, the processor 9806 may provide pre-distortion weights to transmitted carriers. A data stream is optionally processed by a transmit data processor 9807. The data processor 9807 may perform wavelet processing. A transmitter weighting system 9808 is adapted to weight data symbols provided to frequency bins of a frequency-domain-to-time-domain converter, such as an IFFT 9809. Time-domain signals generated by the IFFT 9809 are provided to a transmission system adapted to prepare the time-domain signals for transmission into a communication channel.

Wavelets, such as CI wavelets, may be used to convey data symbols, code symbols, etc. Symbols may be conveyed via phase shifts, amplitudes, frequencies, polarizations, or any suitable combination of modulation techniques. Orthogonal wavelets, such as wavelets orthogonalized by scaling and/or time offsets, may be used to convey different data symbols and/or different communication channels. CI-based wavelets may be orthogonalized via each wavelet's effective carrier frequency. Data symbols may be spread over multiple orthogonal wavelets via some appropriate form of coding, such as direct-sequence and/or CI coding.

In some applications, quasi-orthogonal wavelets, such as overlapping wavelets, may be used to convey data symbols and/or communication channels. Methods of processing overlapping wavelets may be performed in the same manner as that overlapping CI waveforms (e.g., CI pulses) are processed. Processing may include either or both time-domain and frequency-domain processing.

Wavelets may be provided with coding using one or more coding techniques. In one set of applications, each code uses the same wavelets. A code may be provided as a set of phase shifts (e.g., a polyphase CI code or a binary-phase direct-sequence code) or some other diversity-parameter values applied to the wavelets. An orthogonal channel may consist of a set of codes applied to orthogonal or quasi-orthogonal wavelets. In one set of embodiments, the wavelets may each have the same duration with orthogonal effective carrier frequencies applied to the wavelets relative to some code.

In an alternative set of embodiments, each code is composed of a plurality of wavelets having different scales (e.g., durations). The order of the wavelets determines each code. In a special case, each code chip has the same duration. The number of wavelets representing each chip depends on the duration of the particular wavelet compared to the duration of the chip. Orthogonal wavelets may be provided wherein the wavelet scales are related by multipliers that are powers of two.

17. CI ADAPTABILITY

The present invention increases flexibility and adaptability by providing scaling of operating parameters and/or signal characteristics in a CI system. FIG. 99 illustrates a control circuit 9901 adapted to process one or more system requirements 9911 and, optionally, one or more channel characteristics 9912. The control circuit 9901 provides adjustment to one or more CI parameters 9902 in a CI transceiver 9903. CI parameter adjustment and/or selection affects one or more transceiver operating parameters 9921.

The control circuitry 9901 may scale a transmitted bit rate by scaling the CI symbol duration, the number of carriers, the carrier spacing, and/or the number of bits per symbol per carrier. This permits the scaleable CI system to operate in various communications environments requiring various operating parameters and/or characteristics. By scaling the operating parameters and/or characteristics of the CI system when control circuitry 9901 determines that different operating parameters and/or characteristics are necessary or advantageous, the control circuitry 9901 can dynamically change the operating parameters and/or characteristics, thereby providing compatibility or the desired performance. For example, dynamically scaling the bit rate enables widely varying signal bandwidths, adjustment of delay-spread tolerances, and adaptability to different SNR requirements. A scaleable CI system is particularly suitable for applications in mobile wireless communications, as well as other applications that support a variety of services in a variety of environments.

In accordance with aspects of certain embodiments of the scaleable CI modulation system, a CI modulation system can be designed with an upper limit on the number of carriers and a variable symbol duration. The control circuitry can dynamically scale the number of carriers below the upper limit to decrease the signal bandwidth and the transmission rate while delay-spread tolerance remains the same. The control circuitry 901 can also dynamically increase the symbol duration to decrease the transmission rate and the signal bandwidth and provide an increase in delay-spread tolerance. The control circuitry 9901 may be adapted to adjust the transmission rate by changing the type of modulation. In accordance with other embodiments, a scaleable coded CI modulation system achieves variable transmission rates using adaptive coding where different coding schemes are used to improve the link reliability and/or to decrease the peak-to-average power ratio.

In accordance with yet other embodiments of the scaleable CI modulation system, scaleable transmission rates permit asymmetric data rates between mobile units and base stations. For example, the mobile units can have lower data rates than the base stations by allocating only a fraction of the total number of carriers to each mobile, while the base stations transmit on all carriers simultaneously. Additionally, during data downloading, for example, a mobile unit could have a larger downlink data rate than uplink data rate. In accordance with other aspects of a scaleable CI system, mobile units and base stations using the same antennas for both transmit and receive operations can benefit from adaptive antennas without any additional processing requirements at the base station, thereby keeping the mobile units as simple as possible. The scaleable CI modulation system can use an adaptive antenna at the base by sending feedback through the uplink when uplink and downlink channel characteristics are not identical.

Power control may be performed by either or both CI transmitters and CI receivers on each carrier or on subgroups of carriers. Alternative to power control, certain carriers may be selected to optimize one or more operational parameters, such as throughput, probability of error, received signal power, transmitter power efficiency, SNR, QOS, etc. CI carriers may be selected with respect to the types of services being provided. For example, different qualities of service corresponding to different-priority links and/or different link services may be criteria for selecting CI carriers. In one case, carriers having little distortion and interference may be selected for services (such as data links) that do not tolerate high BER. In another case, a transmission may be divided into sections and sent on two or more groups of carriers. An important section, such as addressing information, may be sent on higher-quality channels than the channels on which the payload data is sent. Addressing and other control information is typically less tolerant to errors than payload data. Thus, important parts of a transmission may be transmitted on orthogonal phase spaces and/or on carriers having little distortion and fading.

Another aspect of the invention employs a medium access contention (MAC) protocol that is highly beneficial in wireless networks, and particularly in CI-based wireless networks that employ a fixed minimum burst size. In one embodiment, a MAC protocol is a demand-assigned protocol that maximizes utilization of the allocated frequency spectrum (i.e., the bus medium). Each data communication device (DCD) in the network communicates with a central access point (AP). Multiple DCDs may request access from the AP in the same request access (RA) burst. In one embodiment, each of the multiple DCDs transmits its access request to the AP within a frequency-domain channel in the RA burst that is orthogonal to the frequency domain channels used by the other DCDs requesting access. In another embodiment, each of the multiple DCDs transmits its access request to the AP within a phase-space channel in the RA burst that is orthogonal to the phase-space channels used by the other DCDs requesting access. Alternatively, other orthogonal diversity-parameter values may be employed. Each DCD includes channel training information in the access request burst to allow the AP and/or DCD to adapt to rapid variations in channel characteristics.

18. AD-HOC CI NETWORKING

FIG. 100A illustrates a plurality of subscriber units 10001 and 10002 (e.g., mobile or fixed subscriber units) in a network having a plurality of access points 1001 to 10015 (e.g., base stations). At least one of the subscriber units 10001 is adapted to transmit a pilot signal or known training signal that is received at the plurality of access points 10011 to 10015. Signal paths 9931 to 9935 corresponding to a pilot transmission from the subscriber unit 10001 and the access points 10011 to 10015 are shown. The propagation environment ensures that the set of pilot signals received by the access points 10011 to 10015 is unique for each subscriber's location. The uniqueness of the propagation environment may be exploited to provide or enhance coding. The access points 10011 to 10015 are adapted to process the received pilot signals. Processing operations may depend on various characteristics of the received pilot signals, including absolute and/or relative signal power levels. For example, a predetermined number of access points 10011 to 10015 may be selected to process signals for a given subscriber unit based on the received pilot signal power.

At least one of the access points 10011 to 10015 is adapted to perform channel analysis to characterize the propagation environment of the transmissions between the subscriber unit 10001 and the access point(s). Channel analysis may include delay-profile and/or flat-fading characterizations. The propagation environment may be employed as a unique identifier for each subscriber unit. Channel weights calculated from channel estimates may be utilized in multiple-access codes, encryption codes, and/or authentication and verification procedures.

Channel analysis may be used to generate filter weights and/or array-processing weights at the access points 10011 to 10015 to process received and/or transmitted signals. The access points 10015 to 10015 may include single-antenna systems or multi-antenna systems, such as antenna arrays. Received signals may be compared to some local or global timing reference, such as to analyze phase offsets and/or signal timing.

FIG. 100B illustrates a plurality of access points 10011 to 10015 adapted to transmit channel-compensated signals 9941 to 9945. The transmissions 9941 to 9945 exploit the propagation channels between the access points 10015 to 10015 and at least one subscriber unit 10001 to constructively combine at the at least one subscriber unit's 10001 location.

In one set of embodiments of the invention, transmission weights are generated from the reciprocal of a channel matrix that characterizes the propagation environment between one or more access points (such as access points 10011 to 10015) and the at least one subscriber unit 10001. Channel weights may be provided via any combination of deterministic (i.e., training) and blind-adaptive processing. Channel weights may be selected and/or adapted to optimize coherent combining of access-point transmissions to one or more subscriber units. Similarly, the channel weights may be selected and/or adapted to optimize coherent combining of signals received from one or more subscriber units. Any of various optimal combining techniques may be employed.

Channel weights may be adapted to generate beam-pattern nulls at one or more undesired subscriber units or interference sources (not shown). Channel weights may be adapted to provide time-varying channel compensation. Thus, beam steering, null steering, or any other time-dependent adaptive array processing may be performed. Appropriate combinations of carrier selection and carrier weighting may be provided to achieve simultaneous directionality and diversity benefits. In some applications, the access points 10011 to 10015 shown may be replaced by subscriber units acting as routers, relays, and/or array elements of an adaptive transceiver array.

FIG. 101 illustrates a plurality of access points 10011 to 10015 connected to a network 10200, such as an optical-fiber or wireline network. A central processor 10201 is adapted to process signals received and transmitted by the networked access points 10011 to 10015. In this case, the access points 10011 to 10015 may be "dumb terminals," wherein most or all of the signal processing is performed by the central processor 10201. For example, the central processor 10201 may perform channel analysis and generate access-point weights to optimize communication with the subscriber units (not shown). The access points 10011 to 10015 may perform only basic signal-processing functions, such as RF processing and frequency conversion.

The central processor 10201 may provide base-station functionality, such as power control, code assignments, and synchronization. The central processor 10201 may provide network load balancing, including providing for balancing transmission power, bandwidth, and/or processing requirements across the network. Base-station functionality may be controlled by individual access points or subscriber transceivers assigned to act as base stations. Array processing may be performed in a distributed sense wherein channel estimation, weight calculation, and optionally, other network processing functions (such as load balancing) are computed by a plurality of spatially separated processors (e.g., access points and/or subscriber units) adapted to work together. A central processor (such as central processor 10201) may optionally be provided to control data flow and processing assignments throughout the network.

Other types of networks, including wireless networks, may connect the access points 10011 to 10015. One or more of the access points 10011 to 10015 may be replaced by subscriber units (not shown) adapted to perform as routers, repeaters, and/or elements of an antenna array.

In this case, the entire access-point network 10011 to 10015 is adapted to operate as an antenna array. In most applications, a portion of the network may be adapted to serve a particular subscriber transceiver. The network may be adapted to perform long baseline interferometry. The central processor 10201 and/or the access points 10011 to 10015 may be adapted to perform other signal-processing operations, such as, but not limited to, waveform shaping, error detection, error correction, power control, channel selection, multiple access control, multiplexing, modulation, formatting, synchronization, coding, etc. In alternative embodiments of the invention, the central processor 10201 is replaced by a distributed computing system (not shown) that may reside at a plurality of subscriber units, repeaters, and/or access points.

FIG. 102 illustrates a network architecture in which a plurality of subscriber units 10201 to 10205 are adapted to function as routers and/or repeaters. Each network node (e.g., subscriber unit 10201 to 10205, access point (not shown), etc.) may be adapted to function as a router and/or repeater. As the network evolves, the nodes adapt the routing tables to optimize throughput. As network loads change, the nodes perform load balancing to ensure a predetermined range of bandwidth and transmit-power loads across the network. One or more paths to each subscriber unit may be selected or modified to optimize loads across the network, minimize transmission power, and/or ensure received signal quality. In one aspect of the invention, multiple transmission paths to the subscriber units are employed to achieve one or more objectives, such as reducing the effects of fading, reducing transmission power in some of the relays, and/or distributing transmission power across the network.

Information intended for a particular subscriber unit (e.g., subscriber unit 10210) is passed through the network along a chain of subscriber units 10201, 10202, and 10203. One or more subscriber units (e.g., units 10204 and 10205) provide a final radio link 10224 and 10225 for the transmission.

The transmission signals may include multiple addresses corresponding to at least one path to the intended subscriber unit(s). The transmission may include multiple addresses corresponding to a plurality of devices that provide the final RF link to the desired subscriber. Alternatively, the transmission may include only the destination address of the desired subscriber. More than one destination address may be included for a particular transmission. The transmission signal may be duplicated only when the paths diverge. For example, a message with addresses to units 10204 and 10205 is duplicated by transceiver 10203. Alternatively, a broadcast message may include a plurality of addresses and the network may be adapted to propagate a single version of the message to all of the addresses.

In one set of embodiments, a data message is provided that includes a plurality of destination addresses. Processing instructions, such as transmission weight values, may be included in the data message. A single copy of the message is routed through nodes that form a path that is common to all of the destination addresses. The message is duplicated where the paths to the destination addresses diverge. The addresses may include any combination of codes and network header data bits. The codes may include any combination of polyphase CI codes, CI-based codes, and channel-specific spatial interferometry codes. For example, the channel characteristics for each subscriber may be exploited to provide addressing and/or multiple-access coding. CI codes may be implemented across one or more diversity-parameter spaces. Coding may include space-time coding, space-frequency coding, polarization coding, etc.

In some applications, CI codes may be adapted to accommodate changing numbers of users, different network topologies, load balancing, and varying network services. Code lengths, code orthogonality, number of codes per transmission, and/or chip values for one or more codes may be adapted. CI codes and/or network header addresses may be adapted to changing network conditions. In one set of embodiments, one or more network nodes (e.g., transceivers) may be adapted to process a predetermined set of addresses specified by codes and/or headers. A firewall may be implemented to isolate processing for transmissions routed through a transceiver from transmissions that are addressed to that transceiver. The nodes may perform error detection and/or error correction for each data stream prior to re-addressing and re-transmission.

In another embodiment of the present communication system, every subscriber has access to every transmitted message. Transmitted signals may be routed throughout the entire network. A transmitted message may be received by more than one unit and may be received while the unit is transmitting. CI coding may be employed to provide multiple access and thus, eliminate conflicts to increase system capacity. Similarly, channel-specific coding may be employed. In one aspect of the current embodiment, each transmission has a preamble that includes the code, which allows subscribers to synchronize with the transmission. Optionally, a tag may follow the preamble to identify the data payload.

In the current embodiment, each subscriber has access to the community transmissions. The system allows each subscriber to dynamically select for reception only those transmissions that are relevant to that subscriber. Individual subscriber transceivers may be equipped with adaptable or programmable decoders designed to select and decode one or more transmissions. The transceivers may be provided with a bank of decoders to decode and process multiple received signals simultaneously. The system further provides data inter-operability by use of a common CI-based waveform structure.

In one aspect of the invention, the communication signals are provided as coded sets of low-bandwidth subchannels. Thus, interference resulting from multipath and effective multipath due to retransmissions of information through the network is reduced to flat fades. Sub-carrier bandwidths may be adapted to the multipath channel in one or more parts of the network. Coding may be adapted with respect to one or more parameters, including geographical distributions of subscriber units and access points, channel conditions, link priority, security, subscriber services, number of subscribers, etc.

In one embodiment of the invention, base-station responsibilities are assigned to, or assumed by individual subscriber units. Base-station operations are coordinated with simultaneous coded transmissions of a communications channel and a control channel. Codes may include CI codes, CI-based coding, channel-specific coding, or any combination thereof. A time division duplexing method may be employed for transmit and receive operations to implement the necessary control functions for operation without a base station. Each subscriber unit can be assigned to be a network control station. By using time division duplexing for transmit and receive operations in a CI-based multiple access system the entire frequency bandwidth can be used, in contrast to base station operations having one set of frequencies for transmitting and another set of frequencies for receiving.

The subscriber unit that is acting as a network control station maintains power control and time synchronization normally performed by the base station. Power control is maintained within predetermined time intervals by a feedback control loop using proportional integration and differentiation to smooth control such that power oscillations are maintained within desired limits. The network control functions may automatically be transferred if the connection with the transceiver is terminated or there is a predetermined degree of signal-quality degradation. The network control station has channel control capabilities to assure transmission security. For example, the network control station may assign codes to the other subscriber units to change the security or priority of individual communication links.

FIG. 103A illustrates a CI transceiver adapted to perform routing. Transmitted signals are received by a receiver system 10301 that outputs a baseband signal. The receiver system 10301 performs RF and (optionally) baseband processes typically performed to convert an RF signal to a baseband or intermediate frequency signal. For example, the receiver system 10301 may perform channel selection, filtering, amplification, frequency conversion, and A/D conversion.

A CI decoder 10302 is adapted to decode the baseband signal relative to one or more address codes intended for the transceiver. The decoder 10302 may select a signal relative to an address in a header prior to decoding. A signal processor 10303 may process the decoded signals prior to producing an output data stream. Signal processing may include one or more signal-processing operations, including, but not limited to, quantization, channel decoding, multiple access decoding, demultiplexing, formatting, demodulation, channel estimation, channel compensation, synchronization, filtering, error detection, error correction, signal-quality analysis, multi-user detection, phase-jitter compensation, frequency-offset correction, time-offset correction, etc.

A control system 10304 is adapted to select, adapt, or otherwise control the operation of one or more transceiver components. For example, channel estimates and/or signal-quality analysis performed by the signal processor 10303 may be processed in the control system 10304 to adapt decoding performed by the decoder 10302. The control system 10304 may provide power control to the transmission system 10306 and/or otherwise provide network control. Similarly, CI coding may be adapted by the control system 10304.

A CI coder 10305 is adapted to process input data bits to produce a coded signal that is coupled to a transmission system 10306. The transmission system 10306 performs signal-processing operations typically performed to prepare a baseband signal for transmission into a communication channel. The transmission system 10306 may perform one or more processes, including, but not limited to, D/A conversion, modulation, filtering, amplification, frequency conversion, beam forming, etc.

Signals from the receiver system 10301 are coupled to a CI decoder 10312, which may include a bank of CI decoders. The decoder 10312 decodes received signals that are to be retransmitted. The decoded signals are processed in a signal processor 10313. The signal processor 10313 may perform similar signal-processing operations as signal processor 10303. Furthermore, the signal processor 10313 may perform pre-processing operations prior to coding in a CI coder 10315. The coder 10315 may include a CI coder bank. A control system 10314 is adapted to select, adapt, or otherwise control the operation of one or more of the transceiver components 10312, 10313, and 10315.

The control system 10314 and the coder 10315 may provide channel-compensation and/or beam-forming weights to the coded symbols. Such weights may be regarded as part of the routing process. Since routing decodes some signals that are not intended for the transceiver, the router components 10312, 10313, 10314, and 10315 are isolated from the rest of the transceiver by a fire wall 10310.

Code division duplexing or cancellation division duplexing may be employed to permit reliable reception while concurrently transmitting. Alternatively, other types of duplexing may be employed. Pseudo-random time, frequency, and/or phase codes are typically used to avoid self-jamming. However, CI codes and CI-based waveforms enable the frequency-domain processing required for optimal performance in a multipath environment while providing data redundancy (i.e., channel coding) needed to mitigate errors. Optionally, additional channel coding (e.g., block, convolutional, TCM, turbo) may be provided to CI waveforms and/or CI coding.

FIG. 103B illustrates an alternative embodiment of a CI receiver adapted to perform routing. Many of the system components shown in FIG. 103B are similar to components shown in FIG. 103A and thus, are identified by corresponding reference numbers. A portion of the baseband (or IF) signal(s) produced by the receiver system 10301 is optionally processed in a processor 10319 prior to being coupled into the transmission system 10306. The processor 10319 may perform one or more baseband or IF processes, including, but not limited to, signal shaping, filtering, re-quantization, error detection, error correction, interference mitigation, multi-user detection, amplification, up sampling, down sampling, frequency conversion, D/A conversion, AGC, symbol remapping, etc.

FIG. 103C illustrates a CI transceiver adapted to decode received signals intended for the transceiver and partially decode and route signals intended for one or more other transceivers. System components shown in FIG. 103C are similar to components shown in FIG. 103B, as indicated by similar reference numbers.

The CI decoder applies one or more decode signals to the received baseband signal. If the received baseband signal is coded with one or more codes including complex conjugates of the one or more decode signals, a sum of decoded baseband symbols over a code period combines coherently. The combined symbols have a value associated with one or more information signals. The combined symbols may be provided as a data output after one or more optional signal-processing operations.

Symbols generated by the CI decoder 10302 are optionally processed in processor 10319 prior to being coupled to a transmission system 10306 for re-transmission. CI-encoded signals not corresponding to complex conjugates of at least one of the decode signals (i.e., not intended for the transceiver) contribute a substantially zero value to the combined symbols. The processor 10319 may be adapted to remove one or more signal components intended for the transceiver. Since the signals intended for the transceiver provide a dc offset to the individual symbols generated by the CI decoder 10306, these signals may be removed by filtering, cancellation, or some other dc-removal process.

FIG. 104A illustrates a tree network that may be implemented in aspects of the present invention. Transmissions passed to one or more nodes in the network may be branched off, or routed, to a plurality of nodes. Routing may include processing any combination of network addresses conveyed in headers and network addresses conveyed by codes (e.g., spreading codes, multiple-access codes, channel codes, etc.).

Network addresses may provide routing information and/or directions. For example, multiple addresses may convey one or more paths between a source node and a destination node. Various types of control information may be included in a code. For example, certain codes may convey priority information or identify the type of data payload.

FIG. 104B illustrates a network design that permits a plurality of communication paths to each node. Multiple network connections between a source node and a destination node may be provided for redundancy. Alternatively, each path may be selected based on one or more criteria, such as channel conditions and load balancing.

FIG. 104C illustrates a network design adapted to provide array processing performance advantages. A plurality of nodes 10426, 10427, 10402, 10420, 10421, and 10422 are adapted to provide complex-weighted transmissions to at least one destination node, such as nodes 10431 and 10432. For example, a data sequence addressed to node 10431 is routed to nodes 10426, 10427, 10402, 10420, 10421, and 10422, which provide appropriate weights to the data transmission to generate a phase front 10441 that converges at the destination node 10431. Similarly, appropriate delays or complex weights may be provided to transmissions to produce a coherent phase front 10442 that converges at destination node 10432. Signals received by the nodes may be combined with respect to any combining technique, including optimal combining.

Nodes in a wireless network may generate weighted transmissions (or process received signals) to perform various types of array processing. Individual nodes may include one or more transceiver (e.g., antenna) elements. Array processing operations may include combinations of local and global processing. For example, diversity combining may be performed at each multi-element node and signals from each node may be combined in a central processor to perform sub-space processing. Other combinations of local and global processing may be employed.

Array processing may include space-time processing, space-frequency processing, beam forming, null steering, blind-adaptive processing, long baseline interferometry, frequency-diversity interferometry, etc. Array processing may be performed to achieve any combination of sub-space processing (i.e., increased capacity) and diversity benefits (i.e., improved performance). Selection of transmitting and receiving nodes in an array-processing network can be adapted to changing node positions, network loads, throughput requirements, user services, bandwidth availability, frequency-reuse requirements, channel conditions, etc.

FIG. 105A illustrates a concentric ring network configuration in which a base station 10500 or access point provides direct or indirect communication links to a plurality of subscriber units 10501 to 10535 arranged in a plurality of concentric-ring regions 10551 to 10553. Subscriber units 10501 to 10506 in region 10551 are adapted to route signals to one or more subscriber units 10521 to 10535 in one or more regions, such as region 10553. Similarly, subscriber units 10511 to 10518 in region 10552 may be adapted to route signals to subscribers in other regions. In some applications, one or more subscribers may be adapted to route signals to at least one other subscriber in the same region.

Region shapes and sizes may be adapted to numbers of users and/or the geographical distributions of the users. Similarly, regions may be adapted to balance network loads. For example, subscriber power consumption and processing requirements associated with routing signals through subscribers near the base 10500 can be mitigated by distributing routing operations over a larger number of subscribers. Thus, subscribers in regions 10551 and 10552 perform routing associated with a direct transmission from and/or to the base 10500. Similarly, the number of subscribers in primary arteries of tree networks (or other networks) can be increased. Routing functions can be assigned to subscribers based on subscriber location, subscriber load, channel conditions, and network load. The network configuration illustrated in FIG. 105A may be integrated with other network architectures, such as tree configurations.

FIG. 105B illustrates a network configuration adapted to the geographic distribution of a plurality of subscribers 10521 to 10526 and 10531 to 10536 located along a roadway. In this case, there are two routing paths 10561 and 10562 provided by subscriber routing. Network configurations, including transmission paths, may be adapted to subscriber distributions and channel conditions. For example, urban channel environments are typically characterized by a waveguide grid. Thus, routing paths may be provided with a grid architecture in urban areas.

A transmission may include multiple levels of coding intended to be stripped off at each node along a predetermined path to a particular address. FIG. 106A illustrates three nodes 10601, 10602, and 10604. The first node is adapted to decode a one-rotation basic CI code by applying complex-conjugate decoding of the one-rotation code. A basic CI code $c_m$ characterized by m rotations (m<N) is expressed by the following equation:

$$c_m = e^{im\phi'} \sum_{n=0}^{N-1} e^{imn2\pi/N} \hat{n}$$

The complex-conjugate decoding essentially unwinds the code. Similarly, nodes 10602 and 10604 are adapted to decode two-rotation and four-rotation codes, respectively. For simplicity, the rotations are provided in a common predetermined direction.

In one aspect of the invention, each node splits a received signal into at least two signals. At least one of the split signals is decoded at the node to extract any information intended for that node. A node may be associated with one or more addresses, or codes. At least one split signal is passed through the node without any decoding. Thus, node 10601 receives signals coded (or addressed) with one code rotation, node 10602 receives signals coded (or addressed) with two code rotations, etc.

In another aspect of the invention, a signal input to a node is not split prior to being decoded to extract any signals intended for that node. The decoded signal is then re-encoded with respect to the complex conjugate of the decoding operation. Thus, any unwinding associated with decoding is reversed prior to re-transmission of the coded information signal. Optionally, a node transceiver may cancel or otherwise remove signals addressed to itself prior to re-encoding.

In yet another aspect of the invention, coded transmissions are coded with respect to the intended path(s) to a predetermined address, thus obviating the need for splitting or re-encoding. For example, an information signal addressed to nodes 10602 and 10604 input to the first node 10601 is encoded with a pair of basic CI codes having three rotations and seven rotations, respectively:

$$r_{node901} = \sum_{n=0}^{N-1} (s_2(t)e^{i3n2\pi/N} + s_4(t)e^{i7n2\pi/N})\hat{n}$$

Decoding at the first node 10601 unwinds the coded signals by one rotation. The decode signal is characterized by C*(1), which is the complex conjugate of code C(1). Thus, node 10601 passes a coded information signal to node 10602 expressed by two-rotation and six-rotation codes:

$$r_{node902} = \sum_{n=0}^{N-1} (s_2(t)e^{i2n2\pi/N} + s_4(t)e^{i6n2\pi/N})\hat{n}$$

A sum of the decoded chips yields zero because there are no input signals coded with a single-rotation code. A sum of the chips generated at node 10601 is zero because the non-zero rotations cause the chip values to cancel.

Decoding with decode signal C*(2) at node 10602 unwinds the coded signals by two rotations. Thus, a sum of the decoded signal at node 10602 coherently combines chip values associated with signal $s_2(t)$. Node 10602 produces a coded information signal expressed by:

$$r_{node904} = \sum_{n=0}^{N-1} (s_2(t) + s_4(t)e^{i4n2\pi/N})\hat{n}$$

The values $s_2(t)$ may optionally be removed (such as by cancellation, dc-offset removal, etc.) prior to transmission to node 10604. A node transceiver at node 10602 may ensure non-zero chip values prior to transmission.

Coded signals received by node 10604 are processed with a complex-conjugate code C*(4) that unwinds the coded signal by four rotations. The resulting decoded signal is expressed by:

$$r_{node904'} = \sum_{n=0}^{N-1} s_4(t)\hat{n}$$

Decoding and summing the code chips at node 10604 coherently combines signal values $s_4(t)$ associated with a four-rotation code C(4).

FIG. 106B illustrates a simple tree-style CI-based network. Nodes 10601, 10602, and 10604 are provided with decode signals corresponding to C*(1), C*(2), and C*(4), respectively. A branch node 10603 employs a decode signal C*(3) adapted to decode signals characterized by three rotations in a predetermined direction. A signal addressed with basic CI codes corresponding to rotations of seven, three, and six are input to node 10601. Signals output by node 10601 to node 10602 correspond to rotations of six, two, and five. Node 10602 provides a decode signal of C*(2) to its input signal. Thus, the input corresponding to two rotations is decoded and the resulting value is processed at the node 10602. The resulting output signal(s) from node 10602 is expressed by rotations as four, zero, three. The zero value may characterize a substantially null signal resulting from cancellation of the decoded signal at node 10602.

Node 10602 may provide a broadcast signal to nodes 10603 and 10604. Alternatively, node 10602 may duplicate the signal four, zero, three and provide a signal to each of the nodes 10603 and 10604. In some cases, node 10602 may be adapted to separate its input signal into a plurality of components relative to addresses. Each component may be forwarded directly to its intended node. In some cases, separate signals may be provided via beam forming. In other cases, some form of multiple access, including header addresses, may be employed.

FIG. 106C illustrates a simple multipath CI-based network. Node 10602 is provided with coded signals (expressed in rotations as 2, 5, 6, 3, 4). The value two is addressed to node 10602. The values five and six are addressed to nodes 10603 and 10604. A fourth node 10606 receives transmissions from nodes 10603 and 10604. Thus, values three and four characterize paths through nodes 10603 and 10604, respectively, that are addressed to node 10606. Signals received and decoded at node 10606 may be combined coherently. Such combining may include optimal combining.

In some aspects of the invention, node 10606 may be provided with additional decode values (e.g., C*(5)) to enhance reception. Furthermore, two or more decode values (e.g., C*(6) and C*(5)) may be exploited in appropriate combinations to provide beam forming (or equivalent array processing) operations. Various combining operations may be provided to provide any combination of interference rejection, diversity enhancement, and sub-space processing (i.e., capacity enhancement).

FIG. 106D illustrates a plurality of nodes 10601 to 10605 and at least two communication paths. A first communication path includes nodes 10602, 10604 and 10605. A second communication path includes nodes 10601, 10603, and 10605. In this case, the two paths illustrate communication to node 5. Alternatively communication paths may be provided indicating communications from node 10605.

Signals arriving from the first communication path are encoded with at least one code $c_1(n)$. Similarly, the signals arriving from the second communication path are encoded with at least one code $c_2(n)$. In various applications of the invention, additional communication paths (not shown) may be provided.

The codes $c_1(n)$ and $c_2(n)$ may be address codes or they may include address codes. The codes $c_1(n)$ and $c_2(n)$ may be similar or different. Alternatively, the codes $c_1(n)$ and $c_2(n)$ may be separate (or different) from address codes. In some cases, address codes may be adapted to provide additional coding or achieve other objectives, such as, but not limited to, encryption, verification, authentication, identification, anti-jamming, and/or diversity benefits.

In one set of embodiments of the invention, redundant information signals or signals providing redundant information are routed along the multiple paths to the destination node 10605. This can provide diversity benefits. The codes $c_1(n)$ and $c_2(n)$ may include similar or different channel codes. Signals provided along the multiple paths may be decoded (if necessary) and coherently combined in a receiver at the node 10605. Combining may include one or more optimal-combining techniques. The number of transmission paths that are coherently combined is proportional to an effective processing gain of the combining process. Consequently, low-power information-bearing transmissions may be employed over the multiple transmission paths. Signals received from different paths may be processed via soft-decision processing to provide confidence measurements for symbol estimates and/or enhance channel compensation and/or decoding.

In another set of embodiments, each of a plurality of signals routed along different paths to a given node may provide necessary keys (or equivalent information) necessary for decoding. For example, signals routed along a first path may provide a coded information signal to a predetermined destination. Signals routed along a second path to the same destination may provide a decode sequence to decode the coded information signal. The codes $c_1(n)$ and $c_2(n)$ may include codes that are complex conjugates of each other. The first code $c_1(n)$ may include a public key and the second code $c_2(n)$ may include a private key wherein the two codes $c_1(n)$ and $c_2(n)$ contribute the necessary code keys for decoding a coded information signal transmitted along the first and/or second paths, or along a third path. Various pluralities of codes, paths, and/or coded information signals may be employed.

The process of providing multiple decoder keys across multiple transmission paths may be part of an authentication and/or verification process. The codes $c_1(n)$ and $c_2(n)$ may include channel-specific codes that characterize the channel between at least one transceiver and the destination node 10605. The codes $c_1(n)$ and $c_2(n)$ may include channel compensation. Consequently, a channel analysis of received signals at the destination node 10605 will indicate the likelihood that the signals were transmitted from known nodes, such as nodes 10603 and 10604. Similarly, channel analysis may be employed to determine the immediate originating node of a given transmission. The codes $c_1(n)$ and $c_2(n)$ may include beam-forming weights.

In some aspects of the invention, channel estimation may be performed on a signal received from a transceiver attempting to access the network. Various location-finding processes (e.g., direction-of-arrival determination, geo-location tracking, triangulation, etc.) may be implemented to determine the transceiver's location relative to a set or range of allowed locations. In some applications, identification of unauthorized users may be combined with location finding.

FIG. 106E illustrates a node 10602 used in a plurality of crossing communication paths. Nodes 10601, 10602, and 10604 are part of a first communication path. Nodes 10611, 10602, and 10613 are part of a second communication path characterized by at least one unique diversity parameter value. In this case, the communication paths are distinguished by different carrier frequencies. Alternatively, communication paths may be differentiated by code, polarization, subspace, time, phase, subspace, or any combination thereof.

Although basic CI codes are illustrated in the exemplary network architectures, other types of codes (including, but not limited to, complex CI codes, Walsh codes, multi-code sets, multi-level (or stacked) codes, and/or codes derived from invertible transforms) may be implemented in the examples shown, as well as in variations, adaptations, permutations, and combinations of the exemplary network architectures. Network address codes may be employed for one or more additional functions, including, but not limited to, spread spectrum, multiple access, channel coding, and encryption. Network designs shown in the figures and described in the specification are intended to convey basic principles and various aspects of the invention. These network designs do not limit the scope of the invention. Consequently, various network designs may be considered as building blocks for complex network architectures.

Network designs and other aspects of the invention may be combined with prior-art network designs, systems, devices, protocols, formats, and/or methods. Such combinations are clearly anticipated and suggested. Aspects and embodiments of the invention may serve as portions of networks. Network designs, systems, and/or methods of the invention may be adapted to various types of networks, such as long-haul, short-haul, last-mile, local-area, metropolitan-area, sensor, RF-identification, tracking, ad-hoc, mobile radio, personal communication, cellular, airborne, air-ground, and/or satellite networks. Network architectures of the invention may include one or more types of multiple access. Network architectures of the invention may include any combination of addressing, including address codes and packet headers containing addresses.

FIG. 107A illustrates a multi-level cellular architecture that may be employed by systems and methods of the present invention. At least one macro-cell 10721 is subdivided into one or more micro-cells 10731. Various multiple-access techniques may be used to separate communications in different cells. For example, a predetermined code may be provided to transmissions within the macro-cell 10721. Macro-cell codes may be provided for inter-cell multiple access or radio isolation. Micro-cell codes may be provided for intra-cell multiple access. Codes applied to transmissions may implement additional network functions, such as spread spectrum, encryption, authentication, channel coding, addressing, and/or interference mitigation.

In some applications, multi-level codes may be implemented. In some cases, macro-cell codes may provide greater processing gain than the micro-cell codes. For example, macro-cell codes may consist of long codes and micro-cell codes may consist of shorter channel codes and/or multiple-access codes. Either or both micro-cell codes and macro-cell codes may implement CI and/or CI-based coding. Coding may be implemented with, or as part of, array processing.

FIG. 107B illustrates three cells 10721 to 10723 in a cellular network of the present invention. Each cell 10721 to 10723 employs a different long code $C_{L1}$ to $C_{L3}$, respectively, to differentiate between communications in adjacent cells. Each cell 10721 to 10723 provides intra-cell communications with codes $C_{s1-N}$ to differentiate between subscriber units in each cell. Coding may include CI and/or CI-based codes. Additional multiple-access techniques may be employed to provide for inter-cell and intra-cell multiple access.

FIG. 107C shows a cellular architecture of the present invention that includes a plurality of cells 10721 to 10725 and a plurality of base stations 10701 to 10705 located on cell boundaries. The base stations 10701 to 10705 may include spatially sectorized antennas to provide communication to a plurality of cells. For example, base 10702 may be adapted to service users in cells 10721, 10722, and 10723.

The base stations 10701 to 10705 may be adapted to route coded information across multiple cells. For example, coded data and/or control information is routed from base 10702 to base 10703. A coded signal may be duplicated or decomposed for routing to multiple bases or subscriber units. For example, base 10703 transmits coded information to bases 10704 and 10705. In some applications, subscriber units, such as subscriber units 10711 and 10712 may be employed to route information between two or more base stations. In any of the implementations of the invention, transmission paths through a network may be selected based on one or more criteria, including transceiver availability, transceiver locations, network loads, channel conditions, transmission-power requirements, etc.

FIG. 107D illustrates a cellular network of the invention including a plurality of cells 10721 to 10730, a plurality of base stations 10700 to 10709, and a plurality of subscriber units, such as subscriber units 10761 to 10763 and 10771 to 10773. In this case, the bases 10700 to 10709 are located inside each cell 10721 to 10730. Other cellular architectures may be employed.

A base station (e.g., base 10700) may route information directly to other bases (e.g., bases 10701, 10702, 10704, 10705, and 10706). Such direct transmissions paths are indicated by transmission paths 10741 to 10745. A direct transmission path 10746 may be provided to a base (such as base 10709) that is not adjacent to the originating base 10700. A transmission between bases may be routed through intermediate bases. For example, base 10705 acts as a router for transmissions between base 10700 and bases 10707 and 10708. Similarly, subscriber units (such as subscriber units 10771 and 10772 may be employed as routers for communications between bases (e.g., bases 10700 and 10703), between subscribers, and/or between bases and subscribers.

FIG. 108A illustrates a method for providing CI-coded transmissions of information and control signals. The method described in FIG. 108A may be performed by a subscriber unit acting as a base station in a CI network. A CI code generation process 10801 provides CI codes and/or CI-based codes for at least one information signal and at least one control signal. A control signal may provide for one or more control functions, such as, but not limited to, power control, synchronization, code assignments, priority assignments, link assignments, channel assignments, duplexing control, training-signal generation, notice of transfer of control responsibilities, and request acknowledgement. Coding processes 10802 and 10803 encode the information signal(s) and control signal(s), respectively. A transmission process 10804 provides for transmission of the coded signals.

FIG. 108B illustrates a method for managing network control in a CI network by one or more subscriber units adapted to function as base stations. A CI transceiver acting as a base station transmits CI-coded information and control signals in a transmission step 10810. In a network identification and communication restriction step 10811, CI codes can be used, at least in part, to address the communication and control channels. CI codes can be allocated to restrict communications between transceivers permitted to operate in the network. CI codes can also be used to identify a radio network and each of the radio devices, as well as the type of communications being transmitted.

A duplexing step 10812 provides for management of transmission and reception. Various types of duplexing may be employed, such as time-division duplexing, frequency-division duplexing, code-division duplexing, polarization-division duplexing, etc. A CI transceiver may include a plurality of CI decoders in parallel to allow reception of more than signal simultaneously. Similarly, transmission of coded signals may be performed simultaneous with reception when the transmitted CI codes differ from the code of the received signal. Furthermore, different CI codes may be used to encode transmissions to differentiate types of transmitted signals.

A network-control step 10813 indicates that at least one of the subscriber units becomes a network control station. A network control station initiates communications and maintains power control and time synchronization of the network in the same manner that a base station would normally function. A transfer step provides for transfer of network control from at least one subscriber to at least one different subscriber. The network control station can voluntarily transfer, or be commanded to transfer, power control and time synchronization of the network to any other radio in the network.

FIG. 108C illustrates a network-control method of the present invention. A CI coding step 10821 provides different CI codes (such as may be used to spread a signal) to information and control signals. A network control station may provide time-division duplexing 10822 to regulate transmission and reception. A network-control step 10823 provides for network control by the network control station. Network control can include various operations, including, but not limited to, synchronization, power control, code assignment, channel assignments, channel coding, transmission-path selection, load balancing, and spectrum management.

FIG. 108D shows a routing method of the present invention. A coding step 10831 provides a multi-address, CI-coded signal for transmission in a transmission step 10832. The addresses may be provided by any combination of CI coding and header addressing. Transmitted signals may be routed via one or more paths through a network. A duplication step 10833 is provided when transmission paths through a node diverge. Duplicated signals are transmitted along their respective paths.

FIG. 109A shows a relay method of the present invention. Received signal are decoded in a decoding step 10901 at each node. The decoding step 10901 involves applying a code to a received signal corresponding to the complex conjugate of the node's address code. A processing step 10902 processes information signals coded with the node's address codes. Processing 10902 may include summing the decoded symbols and performing hard and/or soft decisions. Information signals addressed to the node provide a dc offset to the symbols of the decoded signal. This offset may optionally be removed 10903 prior to transmitting 10905 the resulting decoded signals.

FIG. 109B illustrates an alternative embodiment of a relay method of the invention. Some of the steps in the relay method shown in FIG. 109B are similar to the steps shown in FIG. 109A, as indicated by similar reference numbers. A reverse-decoding step 10904 provided between steps 10903 and 10905 applies the complex conjugate of any codes applied to the received signals in the decoding step 10902.

FIG. 110A illustrates a transceiver processing and routing method of the invention. A decoding step 11001 processes received signals with at least one complex-conjugate code corresponding to at least one address code associated with the transceiver address and/or one or more predetermined addresses. Decoding 11001 may include one or more decoding processes, such as channel decoding, multiple-access decoding, spread-spectrum decoding, and decryption. The decoding step 11001 may optionally include a level-detect function (not shown) to verify that a received signal is present prior to decoding.

A processing step 11002 is adapted to provide one or more signal-processing steps to the decoded signals. The processing step 11002 may estimate the values of information or control signals impressed onto address codes corresponding to the complex-conjugate code(s) provided in the decoding step 11001. For example, an adding step (not shown) may provide for coherent combining of addressed information symbols. A decision step (not shown) may follow the adding step (not shown). If any signal values are present, they may be passed to an optional error detection/correction step 11011.

Error detection/correction 11011 may employ parity checks, trellis demodulation, convolutional decoding, block decoding, and/or any other channel decoding or error-checking technique. Errors may be corrected via receiver-side processing. Alternatively, error detection may initiate a request for re-transmission. Error detection/correction 1101 may include re-quantization, channel estimation, channel compensation, predistortion of transmissions, multi-user detection, and/or optimal combining. Error detection/correction 11011 may include decision processing, including hard decisions and/or soft decisions. Decision processing may include iterative feedback processing, such as turbo decoding.

The signal values may be provided to an optional system-function step 11012. Confidence measures from soft-decision processes may be used to adapt receiver parameters (e.g., the processing step 11002), such as to optimize reception. Similarly, received control information may be used to adjust receiver parameters. System functions 11012 may include automatic gain control, adapting filter parameters, adjusting quantization constellations, and/or changing sampling parameters. System functions may also include removing symbols or values associated with one or more predetermined addresses from the input signal values.

The signal values may be provided to an optional network-function step 11013. Network functions 11013 may be selected or adapted relative to received control information. Network functions 11013 may include routing, addressing, power control, synchronization, request re-transmission, multiple-access control, channel selection, authentication, verification, identification, link-priority assignments, load balancing, spectrum management, and/or error processing. Network functions 11013 may include adding, removing, and/or changing system control information.

Data and control information are re-encoded in a coding step 11004. Re-encoding 11004 may include the application of one or more codes, including address codes, multiple-access codes, spreading codes, channel codes, and encryption. Coded signals are processed for transmission into a communication channel in a transmission step 11005.

FIG. 110B illustrates a transceiver processing and routing method of the invention. A received signal is duplicated in a duplication step 11000. At least one duplicated signal is coupled into a decoding step 11021 that applies a complex-conjugate code to the received signal. The complex-conjugate code is related to the address code of the transceiver. The decoded signal is processed in a processing step 11022 to extract or otherwise estimate information values addressed to the transceiver.

At least one of the duplicated signals is input to a secure procedure 11010. For example, the at least one duplicated signal is passed through a fire wall (not shown). A decoding step 11016 provides for decoding signals addressed to one or more destinations other than the current transceiver. A processing step 11018 is adapted to provide one or more signal-processing steps to the decoded signals. The processing step 11018 may estimate the values of information or control signals impressed onto address codes corresponding to the complex-conjugate code(s) provided in the decoding step 11010.

Processed signals may be coupled to one or more optional processing steps, including error detection/correction 11011, system function 11012, and network function 11013 steps. The processed signals are encoded 11014 prior to being transmitted 11005. Similarly, data input to the transceiver is encoded 11024 prior to being transmitted 11005.

FIG. 111A illustrates a method of receiving, processing, and re-transmitting signals. A receiving process 11101 provides reception of one or more signals received from one or more communication channels (not shown). The received signals are sampled in a sampling process 11103 with respect to a plurality of sampling parameters that are selected 11102 or predetermined.

Sampling parameters may include sample width, sample rate, sample duration, sample shape, and/or number of samples per symbol. One or more sampling parameters may be selected relative to characteristics of the received signal(s). For example, a multicarrier signal may be sampled in such a way as to generate symbols corresponding to the received sub-carrier channels. Alternatively, a single-carrier signal may be sampled with respect to a CI-signal generation algorithm adapted to generate a plurality of CI components from the single-carrier signal. Other signal characteristics that may be used to determine sampling parameters include carrier frequency, bandwidth, signal strength, noise, and/or interference levels.

The samples are provided for CI processing 11104 to generate a plurality of CI components. CI-component generation 11104 may include a Fourier transform operation. CI components may include CI signals and/or CI signal values. The CI components are combined in a combining process 11105 that may include a plurality of parallel combining processes. The combined CI components produce data symbols, such as data symbols indicative of high-rate, broadband, symbols received from a single-carrier signal.

The data symbols are processed in a data symbol processing step 11106 that may include one or more signal-processing steps 11110, including, but not limited to, symbol analysis, symbol blocking, symbol insertion, interception of symbols, symbol-stream and/or packet addressing, symbol redirection, and/or symbol generation. The data symbol processing step 11106 may include a plurality of parallel processes. For example, a plurality of parallel low-speed CI combining processes that produce a plurality of data symbols can be coupled to a plurality of low-speed, data symbol processing steps.

A CI component generation step 11107 provides for generation of a plurality of CI components from the processed data symbols. Alternatively, a parallel-to-serial process (not shown) may be employed to generate a high-rate data-symbol sequence that is coupled to a transmission system 11108. In the present example, CI components are provided to the transmission system 11108 for processing and coupling into at least one communication channel (not shown). The CI components may be processed with an inverse-Fourier transform to generate a high-rate, time-domain signal.

FIG. 111B illustrates a system adapted to receive, process, and re-transmit signals according to the method outlined in FIG. 111A. A receiver system 11121 processes transmitted signals received from one or more communication channels (not shown). The processed signals may optionally be filtered by an anti-aliasing filter 11122 prior to being coupled into a sub-carrier generator, such as a Fourier transform processor 11123. CI components generated by the processor 11123 are provided to a combining system 11124 to generate a plurality of data symbols. The combining system 11124 may include a plurality of combiners adapted to operate in parallel. Similarly, a data processor 11125 may be adapted to process the data symbols via a plurality of simultaneous parallel operations.

A CI symbol generator 11126 generates a plurality of CI symbols from the processed data symbols. The CI symbols are impressed onto a plurality of carriers, such as by an inverse Fourier transform 11127, which generates a high-rate, time-domain signal. Alternative one or more systems may be employed that generate a high-rate data stream from the processed data symbols. The data stream is provided to a transmission system 11128 adapted to process the data stream for transmission into at least one communication channel (not shown).

19. SCOPE OF THE INVENTION

In the preferred embodiments, several kinds of carrier interferometry, coding, filtering, and spatial processing are demonstrated to provide a basic understanding of applications of CI processing. With respect to this understanding, many aspects of this invention may vary. For example, signal spaces and diversity parameters may include redundantly modulated signal spaces. Descriptions of spatial processing may be applied to processing methods for non-spatial diversity parameters. Descriptions of systems and methods using spatial subspaces may be extended to systems and methods that use non-spatial subspaces.

For illustrative purposes, flowcharts and signal diagrams represent the operation of the invention. It should be understood, however, that the use of flowcharts and diagrams is for illustrative purposes only, and is not limiting. For example, the invention is not limited to the operational embodiment(s) represented by the flowcharts. The invention is not limited to specific signal architectures shown in the drawings. Instead, alternative operational embodiments and signal architectures will be apparent to persons skilled in the relevant art(s) based on the discussion contained herein. Also, the use of flowcharts and diagrams should not be interpreted as limiting the invention to discrete or digital operation.

In practice, as will be appreciated by persons skilled in the relevant art(s) based on the discussion herein, the invention can be achieved via discrete or continuous operation, or a combination thereof. Furthermore, the flow of control represented by the flowcharts is provided for illustrative purposes only. As will be appreciated by persons skilled in the relevant art(s), other operational control flows are within the scope and spirit of the present invention.

Exemplary structural embodiments for implementing the methods of the invention are also described. It should be understood that the invention is not limited to the particular embodiments described herein. Alternate embodiments (equivalents, extensions, variations, deviations, combinations, etc.) of the methods and structural embodiments of the invention and the related art will be apparent to persons skilled in the relevant arts based on the teachings contained herein. The invention is intended and adapted to include such alternate embodiments. Such equivalents, extensions, variations, deviations, combinations, etc., are within the scope and spirit of the present invention.

Signal processing with respect to sinusoidal oscillating signals are described herein. Those skilled in the art will recognize that other types of periodic oscillating signals that can be used, including, but not limited to, sinusoids, square waves, triangle waves, wavelets, repetitive noise waveforms, pseudo-noise signals, and arbitrary waveforms.

The foregoing discussion and the claims that follow describe the preferred embodiments of the present invention. With respect to the claims, it should be understood that changes can be made without departing from the essence of the invention. To the extent such changes embody the essence of the present invention, each naturally falls within the breadth of protection encompassed by this patent. This is particularly true for the present invention because its basic concepts and understandings are fundamental in nature and can be broadly applied.

The invention claimed is:

1. A receiver system including:

a multiple-element receiver to generate a plurality of interfering received signals relative to at least a first set of diversity-parameter values, at least one filter band adapted to separate the plurality of interfering received signals into a plurality of carrier interferometry (CI) components relative to at least a second set of diversity-parameter values, and a combiner adapted to combine the plurality of CI components with the at least first set of diversity-parameter values to produce a plurality of combined CI components, the combiner further adapted to combine the plurality of combined CI components with the at least second set of diversity-parameter values to produce at least one estimate information signal.

2. A communication apparatus comprising:

a carrier interferometry (CI)-based radio receiver configured according to a computer-based system including:

at least one hardware component including at least one computer processing unit and at least one memory device adapted to support software module; and at least one software module, to be supported by said at least one memory device including at least one software application program adapted to perform carrier selection and carrier weighting such that a superposition of any of a plurality of weighted carriers is provided with at least one of a set of predetermined signal parameters, the set including formatting, source decoding, decryption, subchannel decoding, channel decoding, demultiplexing, demodulation, spread-spectrum decoding, and multiple-access decoding.

* * * * *

UNITED STATES PATENT AND TRADEMARK OFFICE

CERTIFICATE OF CORRECTION

PATENT NO. : 7,430,257 B1
APPLICATION NO. : 10/131163
DATED : September 30, 2008
INVENTOR(S) : Steve Shattil It is certified that error appears in the above-identified patent and that said Letters Patent is hereby corrected as shown below:

Col. 154 Claim 2, line 6, change “module” to read --modules--

Signed and Sealed this

Eighteenth Day of November, 2008

JON W. DUDAS
*Director of the United States Patent and Trademark Office*

UNITED STATES PATENT AND TRADEMARK OFFICE

CERTIFICATE OF CORRECTION

PATENT NO. : 7,430,257 B1
APPLICATION NO. : 10/131163
DATED : September 30, 2008
INVENTOR(S) : Steve Shattil It is certified that error appears in the above-identified patent and that said Letters Patent is hereby corrected as shown below:

Col. 154 Claim 2, line 33, change “module” to read --modules--

This certificate supersedes the Certificate of Correction issued November 18, 2008.

Signed and Sealed this

Ninth Day of December, 2008

JON W. DUDAS
*Director of the United States Patent and Trademark Office*